United States Patent
Robinson et al.

(10) Patent No.: US 12,038,649 B2
(45) Date of Patent: *Jul. 16, 2024

(54) DIRECTIONAL DISPLAY APPARATUS

(71) Applicant: RealD Spark, LLC, Beverly Hills, CA (US)

(72) Inventors: Michael G. Robinson, Boulder, CO (US); Graham J. Woodgate, Henley on Thames (GB); Ben Ihas, Boulder, CO (US)

(73) Assignee: RealD Spark, LLC, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/379,678

(22) Filed: Jul. 19, 2021

(65) Prior Publication Data

US 2022/0043290 A1   Feb. 10, 2022

Related U.S. Application Data

(63) Continuation of application No. 16/675,647, filed on Nov. 6, 2019, now Pat. No. 11,092,852.

(Continued)

(51) Int. Cl.
*G02F 1/1335*   (2006.01)
*G02F 1/03*   (2006.01)
(Continued)

(52) U.S. Cl.
CPC ........ *G02F 1/13363* (2013.01); *G02F 1/0311* (2013.01); *G02F 1/137* (2013.01);
(Continued)

(58) Field of Classification Search
CPC ............ G02F 1/1335; G02F 1/133528; G02F 1/133536; G02F 1/1336; G02F 1/13363;
(Continued)

(56) References Cited

U.S. PATENT DOCUMENTS 3,914,022 A   10/1975   Kashnow
4,059,916 A   11/1977   Tachihara et al.
(Continued)

FOREIGN PATENT DOCUMENTS

CA   2222313 A1   6/1998
CN   1125943 C   10/2003
(Continued)

OTHER PUBLICATIONS

Adachi, et al. "P-228L: Late-News Poster: Controllable Viewing-Angle Displays using a Hybrid Aligned Nematic Liquid Crystal Cell", ISSN, SID 2006 Digest, pp. 705-708.
(Continued)

*Primary Examiner* — Thoi V Duong
(74) *Attorney, Agent, or Firm* — Penny L. Lowry

(57) ABSTRACT

A switchable privacy display comprises a spatial light modulator, and switchable liquid crystal retarder arranged between crossed quarter-wave plates and polarisers. In a privacy mode of operation, on-axis light from the spatial light modulator is directed without loss, whereas off-axis light has reduced luminance to reduce the visibility of the display to off-axis snoopers. The display may be rotated to achieve privacy operation in landscape and portrait orientations. Further, display reflectivity may be reduced for on-axis reflections of ambient light, while reflectivity may be increased for off-axis light to achieve increased visual security. In a public mode of operation, the liquid crystal retardance is adjusted so that off-axis luminance and reflectivity are unmodified. The display may also be operated to switch between day-time and night-time operation, for example for use in an automotive environment.

32 Claims, 68 Drawing Sheets

Related U.S. Application Data

(60) Provisional application No. 62/844,980, filed on May 8, 2019, provisional application No. 62/756,902, filed on Nov. 7, 2018.

(51) Int. Cl.
*G02F 1/13363* (2006.01)
*G02F 1/137* (2006.01)

(52) U.S. Cl.
CPC .. *G02F 1/133528* (2013.01); *G02F 1/133638* (2021.01); *G02F 1/13706* (2021.01)

(58) Field of Classification Search
CPC ......... G02F 1/133633; G02F 1/133638; G02F 1/1343; G02F 1/137; G02F 1/13706; G02F 1/0311; G02F 2203/62
See application file for complete search history.

(56) References Cited

U.S. PATENT DOCUMENTS

| | | |
|---|---|---|
| 4,586,790 A | 5/1986 | Umeda et al. |
| 4,621,898 A | 11/1986 | Cohen |
| 4,974,941 A | 12/1990 | Gibbons et al. |
| 5,005,108 A | 4/1991 | Pristash et al. |
| 5,035,491 A | 7/1991 | Kawagishi et al. |
| 5,126,882 A | 6/1992 | Oe et al. |
| 5,579,139 A | 11/1996 | Abileah et al. |
| 5,608,550 A | 3/1997 | Epstein et al. |
| 5,658,490 A | 8/1997 | Sharp et al. |
| 5,671,994 A | 9/1997 | Tai et al. |
| 5,715,028 A | 2/1998 | Abileah et al. |
| 5,726,729 A | 3/1998 | Takei |
| 5,779,337 A | 7/1998 | Saito et al. |
| 5,791,757 A | 8/1998 | O'Neil et al. |
| 5,808,784 A | 9/1998 | Ando et al. |
| 5,835,166 A | 11/1998 | Hall et al. |
| 5,852,509 A | 12/1998 | Coleman |
| 5,854,872 A | 12/1998 | Tai |
| 5,894,361 A | 4/1999 | Yamazaki et al. |
| 5,914,760 A | 6/1999 | Daiku |
| 5,997,148 A | 12/1999 | Ohkawa |
| 6,055,103 A | 4/2000 | Woodgate et al. |
| 6,099,758 A | 8/2000 | Verrall et al. |
| 6,144,433 A | 11/2000 | Tillin et al. |
| 6,169,589 B1 | 1/2001 | Kaneko |
| 6,204,904 B1 | 3/2001 | Tillin et al. |
| 6,222,672 B1 | 4/2001 | Towler et al. |
| 6,280,043 B1 | 8/2001 | Ohkawa |
| 6,364,497 B1 | 4/2002 | Park et al. |
| 6,379,016 B1 | 4/2002 | Boyd et al. |
| 6,392,727 B1 | 5/2002 | Larson et al. |
| 6,437,915 B2 | 8/2002 | Moseley et al. |
| 6,731,355 B2 | 5/2004 | Miyashita |
| 6,752,505 B2 | 6/2004 | Parker et al. |
| 6,987,550 B2 | 1/2006 | Takato et al. |
| 7,067,985 B2 | 6/2006 | Adachi |
| 7,072,096 B2 | 7/2006 | Holman et al. |
| 7,163,319 B2 | 1/2007 | Kuo et al. |
| 7,227,602 B2 | 6/2007 | Jeon et al. |
| 7,366,392 B2 | 4/2008 | Honma et al. |
| 7,524,542 B2 | 4/2009 | Kim et al. |
| 7,528,893 B2 | 5/2009 | Schultz et al. |
| 7,528,913 B2 | 5/2009 | Kobayashi |
| 7,633,586 B2 | 12/2009 | Winlow et al. |
| 7,660,047 B1 | 2/2010 | Travis et al. |
| 7,766,534 B2 | 8/2010 | Iwasaki |
| 7,834,834 B2 | 11/2010 | Takatani et al. |
| 7,970,246 B2 | 6/2011 | Travis et al. |
| 7,991,257 B1 | 8/2011 | Coleman |
| 8,070,346 B2 | 12/2011 | Maeda et al. |
| 8,098,350 B2 | 1/2012 | Sakai et al. |
| 8,154,686 B2 | 4/2012 | Mather et al. |
| 8,228,476 B2 | 7/2012 | Shibazaki |
| 8,237,876 B2 | 8/2012 | Tan et al. |
| 8,249,408 B2 | 8/2012 | Coleman |
| 8,262,271 B2 | 9/2012 | Tillin et al. |
| 8,469,575 B2 | 6/2013 | Weber et al. |
| 8,646,931 B2 | 2/2014 | Choi et al. |
| 8,801,260 B2 | 8/2014 | Urano et al. |
| 8,848,132 B2 | 9/2014 | O'Neill et al. |
| 8,939,595 B2 | 1/2015 | Choi et al. |
| 8,973,149 B2 | 3/2015 | Buck |
| 9,195,087 B2 | 11/2015 | Terashima |
| 9,274,260 B2 | 3/2016 | Urano et al. |
| 9,304,241 B2 | 4/2016 | Wang et al. |
| 9,324,234 B2 | 4/2016 | Ricci et al. |
| 9,448,355 B2 | 9/2016 | Urano et al. |
| 9,501,036 B2 | 11/2016 | Kang et al. |
| 9,519,153 B2 | 12/2016 | Robinson et al. |
| 9,541,698 B2 | 1/2017 | Wheatley et al. |
| 9,798,169 B2 | 10/2017 | Su et al. |
| 9,939,675 B2 | 4/2018 | Peng et al. |
| 10,054,732 B2 | 8/2018 | Robinson et al. |
| 10,067,726 B2 | 9/2018 | Wakamoto et al. |
| 10,126,575 B1 | 11/2018 | Robinson et al. |
| 10,146,093 B2 | 12/2018 | Sakai et al. |
| 10,216,018 B2 | 2/2019 | Fang et al. |
| 10,288,914 B2 | 5/2019 | Chung et al. |
| 10,303,030 B2 | 5/2019 | Robinson et al. |
| 10,401,638 B2 | 9/2019 | Robinson et al. |
| 10,424,232 B2 | 9/2019 | Schubert et al. |
| 10,488,705 B2 | 11/2019 | Xu et al. |
| 10,527,775 B2 | 1/2020 | Yang et al. |
| 10,627,670 B2 | 4/2020 | Robinson et al. |
| 10,649,248 B1 | 5/2020 | Jiang et al. |
| 10,649,259 B2 | 5/2020 | Lee et al. |
| 10,712,608 B2 | 7/2020 | Robinson et al. |
| 10,802,356 B2 | 10/2020 | Harrold et al. |
| 10,935,714 B2 | 3/2021 | Woodgate et al. |
| 10,948,648 B2 | 3/2021 | Ihas et al. |
| 10,976,578 B2 | 4/2021 | Robinson et al. |
| 11,016,341 B2 | 5/2021 | Robinson et al. |
| 11,070,791 B2 | 7/2021 | Woodgate et al. |
| 11,079,645 B2 | 8/2021 | Harrold et al. |
| 11,079,646 B2 | 8/2021 | Robinson et al. |
| 11,092,851 B2 | 8/2021 | Robinson et al. |
| 11,092,852 B2 | 8/2021 | Robinson et al. |
| 11,099,433 B2 | 8/2021 | Robinson et al. |
| 11,099,447 B2 | 8/2021 | Woodgate et al. |
| 11,099,448 B2 | 8/2021 | Woodgate et al. |
| 11,237,417 B2 | 2/2022 | Woodgate et al. |
| 11,327,358 B2 | 5/2022 | Robinson et al. |
| 11,340,482 B2 | 5/2022 | Robinson et al. |
| 11,366,358 B2 | 6/2022 | Wu et al. |
| 11,442,316 B2 | 9/2022 | Woodgate et al. |
| 11,573,437 B2 | 2/2023 | Woodgate et al. |
| 11,892,717 B2 | 2/2024 | Harrold et al. |
| 2001/0024561 A1 | 9/2001 | Cornelissen et al. |
| 2002/0015300 A1 | 2/2002 | Katsu et al. |
| 2002/0024529 A1 | 2/2002 | Miller et al. |
| 2002/0171793 A1 | 11/2002 | Sharp et al. |
| 2003/0030764 A1 | 2/2003 | Lee |
| 2003/0058381 A1 | 3/2003 | Shinohara et al. |
| 2003/0089956 A1 | 5/2003 | Allen et al. |
| 2003/0107686 A1 | 6/2003 | Sato et al. |
| 2003/0117792 A1 | 6/2003 | Kunimochi et al. |
| 2003/0169499 A1 | 9/2003 | Bourdelais et al. |
| 2003/0214615 A1 | 11/2003 | Colgan et al. |
| 2003/0222857 A1 | 12/2003 | Abileah |
| 2004/0015729 A1 | 1/2004 | Elms et al. |
| 2004/0100598 A1 | 5/2004 | Adachi et al. |
| 2004/0125430 A1 | 7/2004 | Kasajima et al. |
| 2004/0141107 A1 | 7/2004 | Jones |
| 2004/0145703 A1 | 7/2004 | O'Connor et al. |
| 2004/0223094 A1 | 11/2004 | Hamada et al. |
| 2004/0240777 A1 | 12/2004 | Woodgate et al. |
| 2004/0264910 A1 | 12/2004 | Suzuki et al. |
| 2005/0002174 A1 | 1/2005 | Min et al. |
| 2005/0014913 A1 | 1/2005 | Kim et al. |
| 2005/0111100 A1 | 5/2005 | Mather et al. |
| 2005/0117186 A1 | 6/2005 | Li et al. |
| 2005/0135116 A1 | 6/2005 | Epstein et al. |
| 2005/0157225 A1 | 7/2005 | Toyooka et al. |

(56) References Cited

U.S. PATENT DOCUMENTS

| | | |
|---|---|---|
| 2005/0190326 A1 | 9/2005 | Jeon et al. |
| 2005/0190329 A1 | 9/2005 | Okumura |
| 2005/0206814 A1 | 9/2005 | Histake |
| 2005/0213348 A1 | 9/2005 | Parikka et al. |
| 2005/0219693 A1 | 10/2005 | Hartkop et al. |
| 2005/0243265 A1 | 11/2005 | Winlow et al. |
| 2005/0259193 A1 | 11/2005 | Sumiyoshi et al. |
| 2005/0259205 A1 | 11/2005 | Sharp et al. |
| 2005/0270798 A1 | 12/2005 | Lee et al. |
| 2006/0066785 A1 | 3/2006 | Moriya |
| 2006/0082702 A1 | 4/2006 | Jacobs et al. |
| 2006/0092512 A1 | 5/2006 | Shioya |
| 2006/0098296 A1 | 5/2006 | Woodgate et al. |
| 2006/0146405 A1 | 7/2006 | MacMaster |
| 2006/0203162 A1 | 9/2006 | Ito et al. |
| 2006/0215244 A1 | 9/2006 | Yosha et al. |
| 2006/0244884 A1 | 11/2006 | Jeon et al. |
| 2006/0262255 A1 | 11/2006 | Wang et al. |
| 2006/0262258 A1 | 11/2006 | Wang et al. |
| 2006/0262376 A1 | 11/2006 | Mather et al. |
| 2006/0262558 A1 | 11/2006 | Cornelissen |
| 2006/0268207 A1 | 11/2006 | Tan et al. |
| 2006/0285040 A1 | 12/2006 | Kobayashi |
| 2007/0008471 A1 | 1/2007 | Wang et al. |
| 2007/0024970 A1 | 2/2007 | Lub et al. |
| 2007/0030240 A1 | 2/2007 | Sumiyoshi et al. |
| 2007/0035964 A1 | 2/2007 | Olczak |
| 2007/0047254 A1 | 3/2007 | Schardt et al. |
| 2007/0064163 A1 | 3/2007 | Tan et al. |
| 2007/0076406 A1 | 4/2007 | Kodama et al. |
| 2007/0139772 A1 | 6/2007 | Wang |
| 2007/0223251 A1 | 9/2007 | Liao |
| 2007/0268427 A1 | 11/2007 | Uehara |
| 2007/0285775 A1 | 12/2007 | Lesage et al. |
| 2008/0008434 A1 | 1/2008 | Lee et al. |
| 2008/0068329 A1 | 3/2008 | Shestak et al. |
| 2008/0068862 A1 | 3/2008 | Shimura |
| 2008/0106689 A1 | 5/2008 | Inoue et al. |
| 2008/0129899 A1 | 6/2008 | Sharp |
| 2008/0158491 A1 | 7/2008 | Zhu et al. |
| 2008/0158912 A1 | 7/2008 | Chang et al. |
| 2008/0205066 A1 | 8/2008 | Ohta et al. |
| 2008/0285310 A1 | 11/2008 | Aylward et al. |
| 2008/0316198 A1 | 12/2008 | Fukushima et al. |
| 2009/0009894 A1 | 1/2009 | Chuang |
| 2009/0021657 A1 | 1/2009 | Yang et al. |
| 2009/0040426 A1 | 2/2009 | Mather et al. |
| 2009/0085894 A1 | 4/2009 | Gandhi et al. |
| 2009/0086509 A1 | 4/2009 | Omori et al. |
| 2009/0109381 A1* | 4/2009 | Haruyama ........ G02F 1/134363 349/98 |
| 2009/0109703 A1 | 4/2009 | Chen et al. |
| 2009/0128735 A1 | 5/2009 | Larson et al. |
| 2009/0128746 A1 | 5/2009 | Kean et al. |
| 2009/0135623 A1 | 5/2009 | Kunimochi |
| 2009/0174843 A1 | 7/2009 | Sakai et al. |
| 2009/0213147 A1 | 8/2009 | Sagardoyburu et al. |
| 2009/0213298 A1 | 8/2009 | Mimura et al. |
| 2009/0213305 A1 | 8/2009 | Ohmuro et al. |
| 2009/0244415 A1 | 10/2009 | Ide |
| 2010/0002296 A1 | 1/2010 | Choi et al. |
| 2010/0014313 A1 | 1/2010 | Tillin et al. |
| 2010/0066960 A1 | 3/2010 | Smith et al. |
| 2010/0128200 A1 | 5/2010 | Morishita et al. |
| 2010/0149459 A1 | 6/2010 | Yabuta et al. |
| 2010/0177113 A1 | 7/2010 | Gay et al. |
| 2010/0187704 A1 | 7/2010 | Hsu et al. |
| 2010/0205667 A1 | 8/2010 | Anderson et al. |
| 2010/0214324 A1 | 8/2010 | Broughton et al. |
| 2010/0238376 A1 | 9/2010 | Sakai et al. |
| 2010/0283930 A1 | 11/2010 | Park et al. |
| 2010/0289989 A1 | 11/2010 | Adachi et al. |
| 2010/0295755 A1 | 11/2010 | Broughton et al. |
| 2010/0328438 A1 | 12/2010 | Ohyama et al. |
| 2011/0018860 A1 | 1/2011 | Parry-Jones et al. |
| 2011/0032483 A1 | 2/2011 | Hruska et al. |
| 2011/0176089 A1 | 7/2011 | Ishikawa et al. |
| 2011/0241573 A1 | 10/2011 | Tsai et al. |
| 2011/0241983 A1 | 10/2011 | Chang |
| 2011/0255304 A1 | 10/2011 | Kinoshita |
| 2011/0286222 A1 | 11/2011 | Coleman |
| 2011/0321143 A1 | 12/2011 | Angaluri et al. |
| 2012/0002121 A1 | 1/2012 | Pirs et al. |
| 2012/0020078 A1 | 1/2012 | Chang |
| 2012/0086875 A1 | 4/2012 | Yokota |
| 2012/0086893 A1 | 4/2012 | Ou et al. |
| 2012/0120351 A1 | 5/2012 | Kawata |
| 2012/0127573 A1 | 5/2012 | Robinson et al. |
| 2012/0147026 A1 | 6/2012 | Gass et al. |
| 2012/0147280 A1 | 6/2012 | Osterman et al. |
| 2012/0170315 A1 | 7/2012 | Fan et al. |
| 2012/0188792 A1 | 7/2012 | Matsumoto et al. |
| 2012/0212414 A1 | 8/2012 | Osterhout et al. |
| 2012/0235891 A1 | 9/2012 | Nishitani et al. |
| 2012/0294037 A1 | 11/2012 | Holman et al. |
| 2012/0299913 A1 | 11/2012 | Robinson et al. |
| 2012/0314145 A1 | 12/2012 | Robinson |
| 2012/0320311 A1 | 12/2012 | Gotou et al. |
| 2012/0327101 A1 | 12/2012 | Blixt et al. |
| 2013/0039062 A1 | 2/2013 | Vinther et al. |
| 2013/0050610 A1 | 2/2013 | Parry-Jones et al. |
| 2013/0057807 A1 | 3/2013 | Goto et al. |
| 2013/0100097 A1 | 4/2013 | Martin |
| 2013/0107174 A1 | 5/2013 | Yun et al. |
| 2013/0120817 A1 | 5/2013 | Yoon et al. |
| 2013/0128165 A1 | 5/2013 | Lee et al. |
| 2013/0242231 A1 | 9/2013 | Kurata et al. |
| 2013/0242612 A1 | 9/2013 | Lee et al. |
| 2013/0278544 A1 | 10/2013 | Cok |
| 2013/0293793 A1 | 11/2013 | Lu |
| 2013/0300985 A1 | 11/2013 | Bulda |
| 2013/0307831 A1 | 11/2013 | Robinson et al. |
| 2013/0308185 A1 | 11/2013 | Robinson et al. |
| 2013/0308339 A1 | 11/2013 | Woodgate et al. |
| 2013/0321340 A1 | 12/2013 | Seo et al. |
| 2013/0328866 A1 | 12/2013 | Woodgate et al. |
| 2014/0009508 A1 | 1/2014 | Woodgate et al. |
| 2014/0022619 A1 | 1/2014 | Woodgate et al. |
| 2014/0071382 A1 | 3/2014 | Scardato |
| 2014/0098418 A1 | 4/2014 | Lin |
| 2014/0098558 A1 | 4/2014 | Vasylyev |
| 2014/0104147 A1 | 4/2014 | Nakahara et al. |
| 2014/0111760 A1 | 4/2014 | Guo et al. |
| 2014/0132887 A1 | 5/2014 | Kurata |
| 2014/0133181 A1 | 5/2014 | Ishida et al. |
| 2014/0140091 A1 | 5/2014 | Vasylyev |
| 2014/0140095 A1 | 5/2014 | Yuki et al. |
| 2014/0176873 A1 | 6/2014 | Shinohara et al. |
| 2014/0185322 A1 | 7/2014 | Liao |
| 2014/0201844 A1 | 7/2014 | Buck |
| 2014/0211125 A1 | 7/2014 | Kurata |
| 2014/0232836 A1 | 8/2014 | Woodgate et al. |
| 2014/0232960 A1 | 8/2014 | Schwartz et al. |
| 2014/0240344 A1 | 8/2014 | Tomono et al. |
| 2014/0240828 A1 | 8/2014 | Robinson et al. |
| 2014/0240839 A1 | 8/2014 | Yang et al. |
| 2014/0268358 A1 | 9/2014 | Kusaka et al. |
| 2014/0286043 A1 | 9/2014 | Sykora et al. |
| 2014/0286044 A1 | 9/2014 | Johnson et al. |
| 2014/0289835 A1 | 9/2014 | Varshavsky et al. |
| 2014/0313464 A1 | 10/2014 | Li et al. |
| 2014/0340728 A1 | 11/2014 | Taheri |
| 2014/0361990 A1 | 12/2014 | Leister |
| 2014/0367873 A1 | 12/2014 | Yang et al. |
| 2015/0035872 A1 | 2/2015 | Shima et al. |
| 2015/0055366 A1 | 2/2015 | Chang et al. |
| 2015/0088284 A1 | 3/2015 | Hendricks et al. |
| 2015/0116212 A1 | 4/2015 | Freed et al. |
| 2015/0177447 A1 | 6/2015 | Woodgate et al. |
| 2015/0177563 A1 | 6/2015 | Cho et al. |
| 2015/0185398 A1 | 7/2015 | Chang et al. |
| 2015/0205157 A1 | 7/2015 | Sakai et al. |
| 2015/0268479 A1 | 9/2015 | Woodgate et al. |
| 2015/0286061 A1 | 10/2015 | Seo et al. |

(56) References Cited

U.S. PATENT DOCUMENTS

| | | |
|---|---|---|
| 2015/0286817 A1 | 10/2015 | Haddad et al. |
| 2015/0293273 A1 | 10/2015 | Chen et al. |
| 2015/0293289 A1 | 10/2015 | Shinohara et al. |
| 2015/0293409 A1 | 10/2015 | Usukura et al. |
| 2015/0301400 A1 | 10/2015 | Kimura et al. |
| 2015/0338564 A1 | 11/2015 | Zhang et al. |
| 2015/0346417 A1 | 12/2015 | Powell |
| 2015/0346532 A1 | 12/2015 | Do et al. |
| 2015/0355490 A1 | 12/2015 | Kao et al. |
| 2015/0378085 A1 | 12/2015 | Robinson et al. |
| 2016/0054508 A1 | 2/2016 | Hirayama et al. |
| 2016/0103264 A1 | 4/2016 | Lee et al. |
| 2016/0132721 A1 | 5/2016 | Bostick et al. |
| 2016/0147074 A1 | 5/2016 | Kobayashi et al. |
| 2016/0154259 A1 | 6/2016 | Kim et al. |
| 2016/0154458 A1 | 6/2016 | Liu et al. |
| 2016/0216420 A1 | 7/2016 | Gaides et al. |
| 2016/0216540 A1 | 7/2016 | Cho et al. |
| 2016/0224106 A1 | 8/2016 | Liu |
| 2016/0238869 A1 | 8/2016 | Osterman et al. |
| 2016/0259115 A1 | 9/2016 | Kitano et al. |
| 2016/0291358 A1 | 10/2016 | Kikuchi et al. |
| 2016/0334898 A1 | 11/2016 | Kwak et al. |
| 2016/0349444 A1 | 12/2016 | Robinson et al. |
| 2016/0356943 A1 | 12/2016 | Choi et al. |
| 2016/0357046 A1 | 12/2016 | Choi et al. |
| 2017/0003436 A1 | 1/2017 | Inoue et al. |
| 2017/0031206 A1 | 2/2017 | Smith et al. |
| 2017/0085869 A1 | 3/2017 | Choi et al. |
| 2017/0090103 A1 | 3/2017 | Holman |
| 2017/0090237 A1 | 3/2017 | Kim et al. |
| 2017/0092187 A1 | 3/2017 | Bergquist |
| 2017/0092229 A1 | 3/2017 | Greenebaum et al. |
| 2017/0115485 A1 | 4/2017 | Saito et al. |
| 2017/0123241 A1 | 5/2017 | Su et al. |
| 2017/0139110 A1 | 5/2017 | Woodgate et al. |
| 2017/0168633 A1 | 6/2017 | Kwak et al. |
| 2017/0205558 A1 | 7/2017 | Hirayama et al. |
| 2017/0236494 A1 | 8/2017 | Sommerlade et al. |
| 2017/0269283 A1 | 9/2017 | Wang et al. |
| 2017/0269285 A1 | 9/2017 | Hirayama et al. |
| 2017/0276960 A1 | 9/2017 | Osterman et al. |
| 2017/0315423 A1 | 11/2017 | Serati et al. |
| 2017/0329399 A1 | 11/2017 | Azam et al. |
| 2017/0336661 A1 | 11/2017 | Harrold et al. |
| 2017/0339398 A1 | 11/2017 | Woodgate et al. |
| 2017/0343715 A1 | 11/2017 | Fang et al. |
| 2017/0363798 A1 | 12/2017 | Hirayama et al. |
| 2017/0363913 A1 | 12/2017 | Yi |
| 2018/0011173 A1 | 1/2018 | Newman |
| 2018/0014007 A1 | 1/2018 | Brown |
| 2018/0052346 A1 | 2/2018 | Sakai et al. |
| 2018/0082068 A1 | 3/2018 | Lancioni et al. |
| 2018/0095581 A1 | 4/2018 | Hwang et al. |
| 2018/0113334 A1 | 4/2018 | Fang et al. |
| 2018/0188576 A1 | 7/2018 | Xu et al. |
| 2018/0188603 A1 | 7/2018 | Fang et al. |
| 2018/0196275 A1 | 7/2018 | Robinson et al. |
| 2018/0210243 A1 | 7/2018 | Fang et al. |
| 2018/0210253 A1 | 7/2018 | Kashima |
| 2018/0231811 A1 | 8/2018 | Wu |
| 2018/0252949 A1 | 9/2018 | Klippstein et al. |
| 2018/0259799 A1 | 9/2018 | Kroon |
| 2018/0259812 A1 | 9/2018 | Goda et al. |
| 2018/0284341 A1 | 10/2018 | Woodgate et al. |
| 2018/0321523 A1 | 11/2018 | Robinson et al. |
| 2018/0321553 A1 | 11/2018 | Robinson et al. |
| 2018/0329245 A1 | 11/2018 | Robinson et al. |
| 2018/0364526 A1 | 12/2018 | Finnemeyer et al. |
| 2019/0086706 A1 | 3/2019 | Robinson et al. |
| 2019/0121173 A1 | 4/2019 | Robinson et al. |
| 2019/0154896 A1 | 5/2019 | Yanai |
| 2019/0196235 A1 | 6/2019 | Robinson et al. |
| 2019/0196236 A1 | 6/2019 | Chen et al. |
| 2019/0197928 A1 | 6/2019 | Schubert et al. |
| 2019/0215509 A1 | 7/2019 | Woodgate et al. |
| 2019/0227366 A1 | 7/2019 | Harrold et al. |
| 2019/0235304 A1 | 8/2019 | Tamada et al. |
| 2019/0250458 A1 | 8/2019 | Robinson et al. |
| 2019/0278010 A1 | 9/2019 | Sakai et al. |
| 2019/0293858 A1 | 9/2019 | Woodgate et al. |
| 2019/0293983 A1 | 9/2019 | Robinson et al. |
| 2019/0331944 A1 | 10/2019 | Fang et al. |
| 2019/0339433 A1 | 11/2019 | Benoit et al. |
| 2019/0353944 A1 | 11/2019 | Acreman et al. |
| 2019/0361165 A1 | 11/2019 | Chang et al. |
| 2020/0019006 A1 | 1/2020 | Robinson et al. |
| 2020/0026114 A1 | 1/2020 | Harrold et al. |
| 2020/0026125 A1 | 1/2020 | Robinson et al. |
| 2020/0041839 A1 | 2/2020 | Robinson et al. |
| 2020/0110301 A1 | 4/2020 | Harrold et al. |
| 2020/0132904 A1 | 4/2020 | Smith et al. |
| 2020/0159055 A1 | 5/2020 | Robinson et al. |
| 2020/0185590 A1 | 6/2020 | Malhotra et al. |
| 2020/0218101 A1 | 7/2020 | Ihas et al. |
| 2020/0225402 A1 | 7/2020 | Ihas et al. |
| 2020/0233142 A1 | 7/2020 | Liao et al. |
| 2021/0033898 A1 | 2/2021 | Woodgate et al. |
| 2021/0116627 A1 | 4/2021 | Tsuji |
| 2021/0149233 A1 | 5/2021 | Robinson et al. |
| 2021/0149234 A1 | 5/2021 | Woodgate et al. |
| 2021/0271121 A1 | 9/2021 | Woodgate et al. |
| 2021/0341769 A1 | 11/2021 | Woodgate et al. |
| 2021/0373382 A1 | 12/2021 | Sakai et al. |
| 2022/0404540 A1 | 12/2022 | Robinson et al. |
| 2022/0413338 A1 | 12/2022 | Matsushima et al. |
| 2023/0254457 A1 | 8/2023 | Robinson et al. |
| 2023/0375863 A1 | 11/2023 | Woodgate et al. |

FOREIGN PATENT DOCUMENTS

| | | |
|---|---|---|
| CN | 1690800 A | 11/2005 |
| CN | 1776484 A | 5/2006 |
| CN | 1949046 A | 4/2007 |
| CN | 101042449 A | 9/2007 |
| CN | 101256251 A | 9/2008 |
| CN | 101435952 A | 5/2009 |
| CN | 101454712 A | 6/2009 |
| CN | 101518095 A | 8/2009 |
| CN | 101681061 A | 3/2010 |
| CN | 102540544 A | 7/2012 |
| CN | 103109226 A | 5/2013 |
| CN | 103473494 A | 12/2013 |
| CN | 103688211 A | 3/2014 |
| CN | 103988121 A | 8/2014 |
| CN | 104133292 A | 11/2014 |
| CN | 104303085 A | 1/2015 |
| CN | 104321686 A | 1/2015 |
| CN | 104380177 A | 2/2015 |
| CN | 104597661 A | 5/2015 |
| CN | 204740413 U | 11/2015 |
| CN | 105842909 A | 8/2016 |
| CN | 105960609 A | 9/2016 |
| CN | 106104372 A | 11/2016 |
| CN | 106415342 A | 2/2017 |
| CN | 107102460 A | 8/2017 |
| CN | 108027530 A | 5/2018 |
| CN | 108254947 A | 7/2018 |
| CN | 209171779 U | 7/2019 |
| EP | 1956423 A1 | 8/2008 |
| EP | 2037318 A1 | 3/2009 |
| GB | 2405542 A | 3/2005 |
| GB | 2415850 A | 1/2006 |
| GB | 2418518 A | 3/2006 |
| GB | 2428100 A | 1/2007 |
| GB | 2428345 A | 1/2007 |
| GB | 2482065 A | 1/2012 |
| GB | 2486935 B | 9/2013 |
| JP | S58143305 A | 8/1983 |
| JP | H01130783 U | 9/1989 |
| JP | H09197405 A | 7/1997 |
| JP | H10268251 A | 10/1998 |
| JP | H11174489 A | 7/1999 |
| JP | 2005316470 A | 11/2005 |

(56) References Cited

FOREIGN PATENT DOCUMENTS

| | | |
|---|---|---|
| JP | 2005345799 A | 12/2005 |
| JP | 2006139160 A | 6/2006 |
| JP | 2006201326 A | 8/2006 |
| JP | 2006330164 A | 12/2006 |
| JP | 2007501966 A | 2/2007 |
| JP | 2007148279 A | 6/2007 |
| JP | 2007273288 A | 10/2007 |
| JP | 2008310271 A | 12/2008 |
| JP | 2009020293 A | 1/2009 |
| JP | 2011095719 A | 5/2011 |
| JP | 2011103241 A | 5/2011 |
| JP | 2013160818 A | 8/2013 |
| JP | 2014032953 A | 2/2014 |
| JP | 2014099363 A | 5/2014 |
| KR | 20090106062 A | 10/2009 |
| KR | 20120011228 A | 2/2012 |
| KR | 20130046116 A | 5/2013 |
| KR | 1020150021937 A | 3/2015 |
| KR | 1020170013915 A | 2/2017 |
| KR | 1020170019006 A | 2/2017 |
| KR | 1020170040565 A | 4/2017 |
| KR | 101990286 B1 | 6/2019 |
| TW | M537663 U | 3/2017 |
| TW | I612360 B | 1/2018 |
| WO | 2005071449 A2 | 8/2005 |
| WO | 2005071474 A2 | 8/2005 |
| WO | 2006030702 A1 | 3/2006 |
| WO | 2008001896 A1 | 1/2008 |
| WO | 2008078764 A1 | 7/2008 |
| WO | 2008093445 A1 | 8/2008 |
| WO | 2009008406 A1 | 1/2009 |
| WO | 2009011199 A1 | 1/2009 |
| WO | 2010021926 A2 | 2/2010 |
| WO | 2010101141 A1 | 9/2010 |
| WO | 2010143705 A1 | 12/2010 |
| WO | 2014011328 A1 | 1/2014 |
| WO | 2014130860 A1 | 8/2014 |
| WO | 2015040776 A1 | 3/2015 |
| WO | 2015057625 A1 | 4/2015 |
| WO | 2015143227 A1 | 9/2015 |
| WO | 2015157184 A1 | 10/2015 |
| WO | 2015190311 A1 | 12/2015 |
| WO | 2015200814 A1 | 12/2015 |
| WO | 2016195786 A1 | 12/2016 |
| WO | 2017050631 A1 | 3/2017 |
| WO | 2017065745 A1 | 4/2017 |
| WO | 2017117570 A1 | 7/2017 |
| WO | 2018003380 A1 | 1/2018 |
| WO | 2018035492 A1 | 2/2018 |
| WO | 2018178790 A1 | 10/2018 |
| WO | 2018208618 A1 | 11/2018 |
| WO | 2018221413 A1 | 12/2018 |
| WO | 2019055755 A1 | 3/2019 |
| WO | 2019067846 A1 | 4/2019 |
| WO | 2019090252 A1 | 5/2019 |
| WO | 2019147762 A1 | 8/2019 |
| WO | 2021003383 A1 | 1/2021 |

OTHER PUBLICATIONS

Brudy et al., "Is Anyone Looking? Mitigating Shoulder Surfing on Public Displays through Awareness and Protection", Proceedings of the International Symposium on Persuasive Displays (Jun. 3, 2014), pp. 1-6.
CN201780030715.3 Notification of the First Office Action dated Jan. 21, 2020.
CN201880042320.X Notification of the First Office Action dated May 25, 2021.
EP-16860628.3 Extended European Search Report of European Patent Office dated Apr. 26, 2019.
EP-17799963.8 Extended European Search Report of European Patent Office dated Oct. 9, 2019.
EP-18855604.7 Extended European Search Report of European Patent Office dated Jun. 1, 2021.
EP-18857077.4 Extended European Search Report of European Patent Office dated Jun. 16, 2021.
Gass, et al. "Privacy LCD Technology for Cellular Phones", Sharp Laboratories of Europe Ltd, Mobile LCD Group, Feb. 2007, pp. 45-49.
Ishikawa, T., "New Design for a Highly Collimating Turning Film", SID 06 Digest, pp. 514-517.
Kalantar, et al. "Backlight Unit With Double Surface Light Emission," J. Soc. Inf. Display, vol. 12, Issue 4, pp. 379-387 (Dec. 2004).
PCT/US2016/058695 International search report and written opinion of the international searching authority mailed Feb. 28, 2017.
PCT/US2017/032734 International search report and written opinion of the international searching authority mailed Jul. 27, 2017.
PCT/US2018/031206 International search report and written opinion of the international searching authority mailed Jul. 20, 2018.
PCT/US2018/031218 International search report and written opinion of the international searching authority mailed Jul. 19, 2018.
PCT/US2018/051021 International search report and written opinion of the international searching authority mailed Nov. 21, 2018.
PCT/US2018/051027 International search report and written opinion of the international searching authority mailed Nov. 30, 2018.
PCT/US2018/053328 International search report and written opinion of the international searching authority mailed Nov. 30, 2018.
PCT/US2018/059249 International search report and written opinion of the international searching authority mailed Jan. 3, 2019.
PCT/US2018/059256 International search report and written opinion of the international searching authority mailed Jan. 3, 2019.
PCT/US2019/014889 International search report and written opinion of the international searching authority mailed May 24, 2019.
PCT/US2019/014902 International search report and written opinion of the international searching authority mailed Jun. 25, 2019.
PCT/US2019/023659 International search report and written opinion of the international searching authority mailed Jun. 10, 2019.
PCT/US2019/038409 International search report and written opinion of the international searching authority mailed Sep. 19, 2019.
PCT/US2019/038466 International search report and written opinion of the international searching authority mailed Nov. 5, 2019.
PCT/US2019/042027 International search report and written opinion of the international searching authority mailed Oct. 15, 2019.
PCT/US2019/054291 International search report and written opinion of the international searching authority mailed Jan. 6, 2020.
PCT/US2019/059990 International search report and written opinion of the international searching authority mailed Feb. 28, 2020.
PCT/US2019/066208 International search report and written opinion of the international searching authority mailed Feb. 27, 2020.
PCT/US2020/017537 International search report and written opinion of the international searching authority mailed Apr. 29, 2020.
PCT/US2020/040686 International search report and written opinion of the international searching authority mailed Nov. 20, 2020.
PCT/US2020/044574 International search report and written opinion of the international searching authority mailed Oct. 21, 2020.
PCT/US2020/053863 International search report and written opinion of the international searching authority mailed Mar. 12, 2021.
PCT/US2020/060155 International search report and written opinion of the international searching authority mailed Feb. 5, 2021.
PCT/US2020/060191 International search report and written opinion of the international searching authority mailed Feb. 8, 2021.
PCT/US2020/063638 International search report and written opinion of the international searching authority mailed Mar. 2, 2021.
PCT/US2020/064633 International search report and written opinion of the international searching authority mailed Mar. 15, 2021.
Robson, et al. "Spatial and temporal contrast-sensitivity functions of the visual system", J. Opt. Soc. Amer., vol. 56, pp. 1141-1142 (1966).
Simonyan et al., "Very Deep Convolutional Networks for Large-Scale Image Recognition", ICLR 2015.
Weindorf et al., "Active Circular Polarizer OLED E-Mirror", Proceedings of the Society for Information Display 25th Annual Symposium of Vehicle Displays, Livonia, MI, pp. 225-237, Sep. 25-26, 2018.
Cheng, et al., "Fast-Response Liquid Crystal Variable Optical Retarder and Multilevel Attenuator," Optical Engineering 52 (10), 107105 (Oct. 16, 2013). (Year: 2013).

(56) References Cited

OTHER PUBLICATIONS

CN201680061632.6 Notification of the First Office Action dated Sep. 14, 2021.
CN201880073578.6 Notification of the First Office Action dated Aug. 27, 2021.
EP-19743619.9 Extended European Search of European Patent Office dated Nov. 23, 2021.
EP-19743701.5 Extended European Search Report of European Patent Office dated Nov. 24, 2021.
EP19771688.9 Extended European Search Report of European Patent Office dated Dec. 2, 2021.
PCT/US2021/029937 International search report and written opinion of the international searching authority mailed Aug. 6, 2021.
PCT/US2021/029944 International search report and written opinion of the international searching authority mailed Aug. 3, 2021.
PCT/US2021/029947 International search report and written opinion of the international searching authority mailed Aug. 10, 2021.
PCT/US2021/029954 International search report and written opinion of the international searching authority mailed Aug. 10, 2021.
PCT/US2021/029958 International search report and written opinion of the international searching authority mailed Aug. 10, 2021.
PCT/US2021/043435 International search report and written opinion of the international searching authority mailed Nov. 1, 2021.
PCT/US2021/043444 International search report and written opinion of the international searching authority mailed Nov. 1, 2021.
CN-201880042320.X Notification of the Third Office Action from the Chinese Patent Office dated Dec. 30, 2022.
CN-201980082757.0 Notification of the 1st Office Action of the Chinese Patent Office mailed Dec. 5, 2022.
JP2020-540724 Non-Final Notice of Reasons for Rejection dated Jan. 4, 2023.
JP-2020-540797 Non-Final Notice of Reasons for Rejection from the Japan Patent Office mailed Dec. 6, 2022.
PCT/US2022/045030 International search report and written opinion of the international searching authority mailed Jan. 3, 2023.
CN201980030279.9 Notification of the First Office Action dated Mar. 29, 2022.
EP-19825448.4 Extended European Search Report of European Patent Office dated Mar. 10, 2022.
JP2019-561773 Non-Final Notice of Reasons for Rejection dated Mar. 22, 2022.
EP-20754927.0 Extended European Search Report of European Patent Office dated Sep. 19, 2022.
EP-19881483.2 Extended European Search Report of European Patent Office dated Aug. 5, 2022.
JP2020-509511 Non-Final Notice of Reasons for Rejection dated Jul. 19, 2022.
Nelkon et al., "Advanced Level Physics", Third edition with SI units, Heinemann Educational Books Ltd, London, 1970.
TW107132221 First Office Action dated Apr. 28, 2022.
CN-201980020303.0—Notification of the First Office Action dated Dec. 16, 2021.
EP-20835231.0 Extended European Search Report of European Patent Office dated May 15, 2023.
PCT/US2023/012240 International search report and written opinion of the international searching authority mailed Apr. 27, 2023.
PCT/US2023/012243 International search report and written opinion of the international searching authority mailed May 10, 2023.
EP19771688.9 Notification of the First Office Action dated Mar. 6, 2023.
JP2020-550747 Non-Final Notice of Reasons for Rejection dated Mar. 29, 2023.
KR10-2020-7010753 Notice of Preliminary Rejection mailed Feb. 17, 2023.
EP-20851155.0 Extended European Search Report of European Patent Office dated Aug. 2, 2023.
PCT/US2023/017639 International search report and written opinion of the international searching authority mailed Jul. 6, 2023.
EP-20887756.3 Extended European Search Report of European Patent Office dated Jan. 2, 2024.
EP-20898295.9 Extended European Search Report of European Patent Office dated Jan. 22, 2024.
IN202017035853 Hearing Notice dated Jan. 3, 2024.
KR10-2020-7024293 Notice of Preliminary Rejection mailed Dec. 7, 2023.
TW108140291 First Office Action dated Nov. 9, 2023.
CN201980056000.4 Notification of the First Office Action dated Nov. 1, 2023.
CN201980056022.0 Notification of the First Office Action dated Oct. 23, 2023.
CN202080020818.3 Notification of the First Office Action dated Oct. 23, 2023.
CN202080059812.7 Notification of the First Office Action dated Oct. 19, 2023.
EP-20872625.7 Extended European Search Report of European Patent Office dated Sep. 20, 2023.
EP-20887527.8 Extended European Search Report of European Patent Office dated Nov. 20, 2023.
JP2021-518864 Non-Final Notice of Reasons for Rejection dated Oct. 24, 2023.
Chiu, et al, "Advanced Hyoer-Viewing Angle Controllable LCD", 39-1 / M.-H. Chiu Invited Paper; AUO Technology Center, AU Optronics Corp., Hsinchu, Taiwan, SID 2021 Digest, ISSN 0097-996X/21/5202-0543, pp. 543-545.
CN202080089170.5 Notification of the First Office Action dated Apr. 7, 2024.
EP23218625.4 Extended European Search Report of European Patent Office dated Feb. 23, 2024.
JP2022-506340 Non-Final Notice of Reasons for Rejection dated Mar. 19, 2024.
EP21795524.4 Extended European Search Report of European Patent Office dated Apr. 26, 2024.
EP21796016.0 Extended European Search Report of European Patent Office dated Apr. 29, 2024.
JP2022-526302 Non-Final Notice of Reasons for Rejection dated Apr. 30, 2024.

* cited by examiner

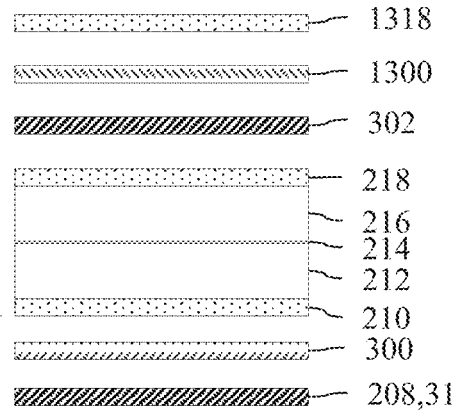 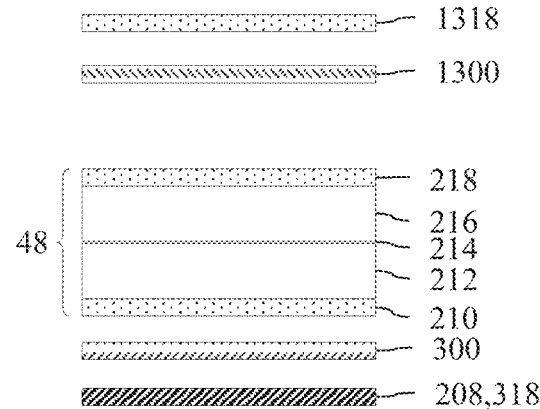
FIG. 27G  FIG. 27H
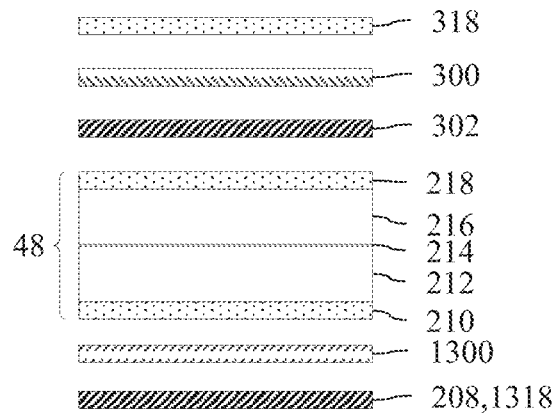 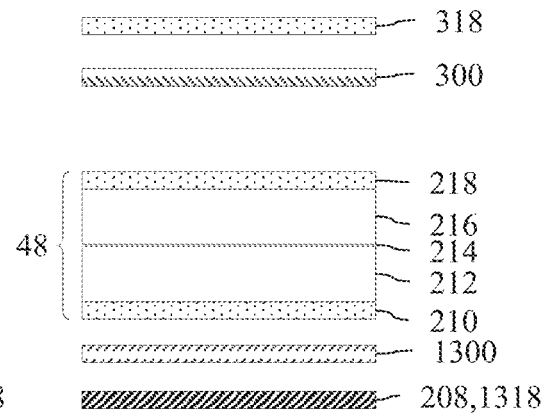
FIG. 27I  FIG. 27J
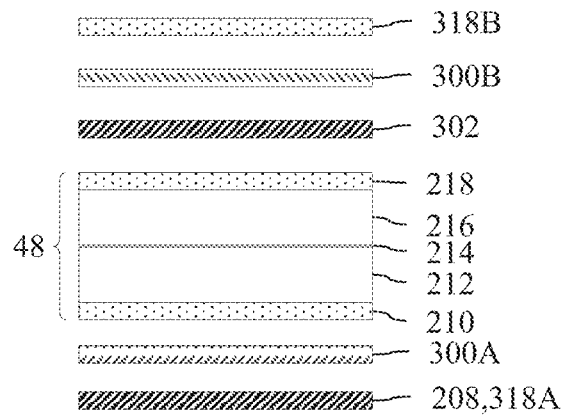 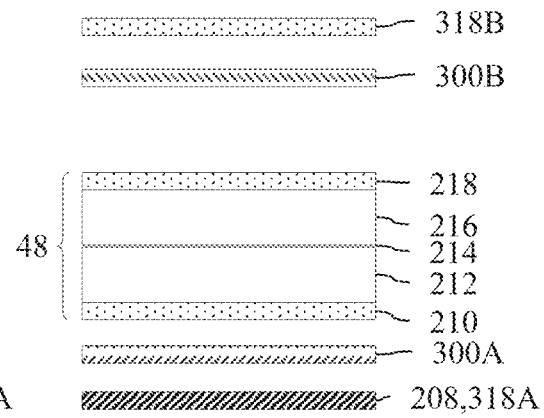
FIG. 27K  FIG. 27L

DIRECTIONAL DISPLAY APPARATUS

TECHNICAL FIELD

This disclosure generally relates to illumination from light modulation devices, and more specifically relates to optical stacks for providing control of illumination for use in display including privacy display and night-time display.

BACKGROUND

Privacy displays provide image visibility to a primary user that is typically in an on-axis position and reduced visibility of image content to a snooper, that is typically in an off-axis position. A privacy function may be provided by micro-louvre optical films that transmit some light from a display in an on-axis direction with low luminance in off-axis positions. However such films have high losses for head-on illumination and the micro-louvres may cause Moiré artefacts due to beating with the pixels of the spatial light modulator. The pitch of the micro-louvre may need selection for panel resolution, increasing inventory and cost.

Switchable privacy displays may be provided by control of the off-axis optical output.

Control may be provided by means of luminance reduction, for example by means of switchable backlights for a liquid crystal display (LCD) spatial light modulator. Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. Pat. No. 9,519,153, which is herein incorporated by reference in its entirety.

BRIEF SUMMARY

According to a first aspect of the present disclosure there is provided a display device comprising: a spatial light modulator arranged to output light along an output direction; a display polariser arranged on a side of the spatial light modulator; an additional polariser arranged on the same side of the spatial light modulator as the display polariser, the display polariser and the additional polariser being arranged to pass respective linearly polarised polarisation states; and first and second quarter-wave plates arranged between the additional polarises and the display polariser, the first quarter-wave plate being arranged on the input side of the second quarter-wave plate and being arranged to convert a linearly polarised polarisation state passed by the one of the display polariser and the additional polariser on the input side thereof into a circularly polarised polarisation state, and the second quarter-wave plate on the output side being arranged to convert a circularly polarised polarisation state that is incident thereon into a linearly polarised polarisation state that is passed by the other of the display polariser and the additional polariser on the output side thereof; and at least one retarder arranged between the pair of quarter-wave plates.

Advantageously a privacy display or low stray light display that may be operated in landscape and portrait modes may be provided. Advantageously, the modification of output light may be independent of azimuthal angle, and so provide a symmetry that has a degree of circular symmetry. Further a display for an automotive application may be operated to reduce reflections from windscreens and side windows during night-time operation.

The pair of quarter-wave plates may each comprise a passive quarter-wave plate comprising a layer of aligned uniaxial birefringent material. Advantageously the retarders may have low cost and conveniently be manufactured in large volume and large area.

The pair of quarter-wave plates may have optical axis that are crossed. Each of the pair of quarter-wave plates may have an optical axis that is arranged at 45 degrees to the electric vector transmission direction of the adjacent display polariser or additional polariser. The pair of quarter-wave plates may each have a retardance for light of a wavelength of 550 nm in a range from 110 nm to 175 nm, and preferably in a range from 130 nm to 140 nm. Advantageously light may be transmitted with high efficiency in an on-axis direction. Advantageously colour variations of the luminance roll-off may be reduced.

The retarder may comprise a liquid crystal retarder comprising a layer of liquid crystal material. Advantageously retardance of the retarder may be increased to achieve unproved polar variation of transmission and reflectivity.

The liquid crystal retarder may be a switchable liquid crystal retarder. The liquid crystal retarder may further comprise electrodes arranged to apply a voltage for switching the layer of liquid crystal material. Advantageously the display may be switched between a narrow angle mode for privacy and other low stray light applications; and wide-angle mode, or public mode for public viewing by multiple users. Further display luminance uniformity may be improved in public mode of operation.

The liquid crystal retarder may comprise two surface alignment layers disposed adjacent to the layer of liquid crystal material and on opposite sides thereof. The two surface alignment layers may each be arranged to provide homogenous alignment in the adjacent liquid crystal material. The liquid crystal material may have a positive dielectric anisotropy. Advantageously the display may be resistant to the visibility of material flow under compression.

Each of the two surface alignment layers may have an alignment direction that is arranged at 45 degrees to the electric vector transmission direction of at least one of the display polariser and additional polariser. Advantageously the chromaticity of the display may be unproved.

The layer of liquid crystal material may have a twist. Advantageously the display may be switchable between a wide-angle mode, and a narrow angle mode with a symmetry of transmission and reflectivity that has a degree of circular symmetry.

The twist may be (90+m*180) degrees, where m is zero or a positive integer. Advantageously the variation of the transmission with polar angle through the retarders may be adjusted.

The layer of liquid crystal material may have a twist of 90 degrees and a retardance for light of a wavelength of 550 nm in a range from 420 nm to 550 nm and most preferably in a range from 460 nm to 480 nm. The layer of liquid crystal material may have a twist of 270 degrees and a retardance for light of a wavelength of 550 nm in a range from 650 nm to 800 nm and most preferably in a range from 700 nm to 720 nm. The layer of liquid crystal material may have a twist of 450 degrees and a retardance for light of a wavelength of 550 nm in a range from 820 nm to 1000 nm and most preferably in a range from 880 nm to 920 nm. The layer of liquid crystal material may have a twist of 360 degrees and a retardance for light of a wavelength of 550 nm. in a range from 1100 nm to 1400 nm. and most preferably in a range from 1150 nm to 1300 nm. The layer of liquid crystal material may have a twist of 225 degrees and a retardance for light of a wavelength of 550 nm in a range from 750 nm to 1200 nm and most preferably in a range from 900 nm to 1100 nm. Advantageously the degree of symmetry of the narrow angle mode may be adjusted by selection of the twist and retardance of the layer of liquid crystal material.

The first and second quarter-wave plates and the at least one retarder may be arranged to introduce phase shifts to polarisation components of light passed by the one of the display polariser and the additional polariser on the input side of the at least one retarder that causes reduction of the luminance of light passed by the one of the other one of the display polariser and the additional polariser along axes that are inclined to the optical axis, and the liquid crystal retarder has a total retardance for light of a wavelength of 550 nm that is within 10% different of a value R in nanometres that is given by the formula $$|R|=-0.02947*\theta^3+5.81385*\theta^2-397.950*\theta+10090$$

where θ is the lateral angle of the inclined axis at which a maximum reduction of luminance occurs for inclined axes having an elevation angle of 0 degrees. The liquid crystal retarder may have a retardance for light of a wavelength of 550 nm that is within 4% different of the value R. Advantageously in a privacy mode of operation, the polar location of the minimum transmission may be selected.

The at least one retarder may comprise at least one passive retarder. Advantageously the cost, thickness and complexity of a privacy display or other low stray light display may be reduced.

The at least one passive retarder may comprise a passive retarder having an optical axis perpendicular to the plane of the passive retarder. Advantageously the thickness of the passive retarder may be reduced.

The at least one passive retarder may comprise plural passive retarders having an optical axis parallel to the plane of the passive retarder that are crossed. Advantageously the plural passive retarders may be provided at low cost.

The at least one passive retarder may comprise a layer of liquid crystal material having a retardance for light of a wavelength of 550 nm in a range from −400 nm to −1000 nm or in a range from +500 nm to +1200 nm and preferably in a range from −750 nm to −850 nm or preferably in a range from +950 nm to +1050 nm. Advantageously thickness may be reduced and desirable field of view for narrow angle mode may be provided.

The at least one passive retarder may comprise a pair of passive retarders having an optical axis parallel to the plane of the passive retarder that are crossed. The pair of passive retarders may have slow axes that extend at 45° and at 135°, respectively, with respect to an electric vector transmission direction that is parallel to the electric vector transmission of the display polariser. The display device may further comprise an additional pair of passive retarders disposed between the first mentioned pair of passive retarders. The additional pair of passive retarders may have slow axes in the plane of the passive retarders that are crossed. The additional pair of passive retarders may have slow axes that each extend at 0° and at 90°, respectively, with respect to an electric vector transmission direction that is parallel to the electric vector transmission of the display polariser. Advantageously the passive retarders may be provided at low cost.

The chromatic variation of transmission and reflection may be reduced. A symmetry of transmission and reflectivity that has a degree of circular symmetry may be provided in a thin structure.

The first and second quarter-wave plates and the at least one retarder may be arranged to introduce phase shifts to polarisation components of light passed by the one of the display polariser and the additional polariser on the input side of the at least one retarder that causes reduction of the luminance of light passed by the one of the other one of the display polariser and the additional polariser along axes that are inclined to the optical axis, and the at least one passive retarder has a total retardance for light of a wavelength of 550 nm that is within 10% different of a value R in nanometres that is given by the formula $$|R|=-0.02947*\theta^3+5.81385*\theta^2-397.950*\theta+10090$$

where θ is the lateral angle of the inclined axis at which a maximum reduction of luminance occurs for inclined axes having an elevation angle of 0 degrees. The at least one passive retarder may have a retardance for light of a wavelength of 550 nm that is within 4% different of the value R. Advantageously the polar location of the minimum transmission may be selected.

The display polariser and the additional polariser may have electric vector transmission directions that are parallel. Advantageously high efficiency may be achieved in public modes and for output in the normal direction.

The at least one retarder may comprise a retarder comprising an aligned uniaxial birefringent material. Advantageously low cost may be provided.

The at least one retarder may be arranged to introduce a phase shift to polarisation components of light passed by the one of the display polariser and the additional polariser and the quarter-wave plate on the input side of the at least one retarder along an axis inclined to the optical axis of the retarder. Advantageously the transmission and reflectivity may vary with polar angle.

The at least one retarder may comprise at least one switchable liquid crystal retarder. The at least one retarder may be arranged to introduce a phase shift to polarisation components of light passed by the one of the display polariser and the additional polariser and the quarter-wave plate on the input side of the at least one retarder along an axis inclined to the optical axis of the retarder in a switchable mode of the switchable liquid crystal retarder. Advantageously the display may be switched to a mode in which the transmission and reflectivity may vary with polar angle.

The at least one retarder may be arranged to introduce no phase shift to polarisation components of light passed by one of the display polariser and the additional polariser and the quarter-wave plate on the input side of the at least one retarder along an axis along the optical axis of the retarder. Advantageously the head-on transmission may have high efficiency.

The display polariser may be an output polariser arranged on the output side of the spatial light modulator. The additional polariser may be arranged on the output side the display polariser. One of the display polariser and the additional polariser on the input side thereof may be the display polariser. Advantageously thickness and efficiency may be optimised.

A reflective polariser may be arranged between the display polariser and the first quarter-wave plate. The display polariser and the reflective polariser may be arranged to pass the same linearly polarised polarisation state. Advantageously the display may be provided with increased reflectivity for off-axis polar locations. Advantageously off-axis visual security level is increased in ambient illumination.

A further additional polariser may be arranged on the output side of the first mentioned additional polariser, the further additional polariser being arranged to pass linearly polarised polarisation states; and at least one further retarder may be arranged between the first mentioned additional polariser and the further additional polariser. Advantageously off-axis luminance may be further reduced in a privacy mode of operation, increasing visual security level.

The further additional polariser may be a reflective polariser, and the at least one further retarder may comprise a switchable liquid crystal retarder comprising a layer of liquid crystal material and electrodes arranged to apply a voltage for switching the layer of liquid crystal material. Advantageously high off-axis reflectivity may be provided in a privacy mode of operation to increase visual security level and low off-axis reflectivity may be provided in a public mode of operation to increase image visibility.

The at least one retarder arranged between the pair of quarter-wave plates may comprise at least one passive retarder having a retardance for light of a wavelength of 550 nm in a range from −100 nm to −400 nm or in a range from +200 nm to +600 nm and preferably in a range from −200 nm to −300 nm or preferably in a range from +300 nm to +500 nm. Such retarders may be provided with spatial light modulators with elevated luminance at off-axis viewing angles, wherein undesirable visual security level is otherwise achieved. Advantageously off-axis luminance is reduced with low visibility of colour changes. Increased visual security level in privacy mode may be provided with acceptable off-axis image visibility in public mode. Emissive displays may be provided with high visual security level.

The display polariser may be an input polariser arranged on the input side of the spatial light modulator. The additional polariser may be arranged on the input side the display polariser. One of the display polariser and the additional polariser on the input side thereof may be the additional polariser. Advantageously the contrast of the display may be increased in comparison to arrangements with additional front surface components. Further the visibility of material flow in the at least one liquid crystal layer may be reduced.

An output polariser may be arranged on the output side of the spatial light modulator; a further additional polariser may be arranged on the output side of the output polariser, the output polariser and the further additional polariser being arranged to pass respective linearly polarised polarisation states; and at least one further retarder may be arranged between the output polariser and the further additional polariser. The display device may further comprise a reflective polariser arranged between the output polariser and the at least one further retarder, the output polariser and the reflective polariser being arranged to pass the same linearly polarised polarisation state, and the at least one further retarder may comprise a switchable liquid crystal retarder comprising a layer of liquid crystal material and electrodes arranged to apply a voltage for switching the layer of liquid crystal material. Advantageously the number of front surface components may be reduced.

The at least one retarder arranged between the pair of quarter-wave plates may comprise at least one passive retarder having a retardance for light of a wavelength of 550 nm in a range from −100 nm to −400 nm or in a range from +200 nm to +600 nm and preferably in a range from −200 nm to −300 nm or preferably in a range from +300 nm to +500 nm. Advantageously off-axis luminance is reduced with low visibility of colour changes.

The additional polariser when crossed with a second notional polariser of the same material may have transmission for wavelengths from 520 nm to 560 nm that is less than the transmission for wavelengths from 450 nm to 490 nm. The transmission for wavelengths from 450 nm to 490 nm may be greater than 1%, preferably greater than 2% and most preferably greater than 3%; and the transmission for wavelengths from 520 nm to 560 nm may be less than 3%, preferably less than 2% and most preferably less than 1%. Advantageously off-axis colour variations may be reduced in comparison to broadband polarisers. Transmission efficiency may be increased and reflectivity in privacy mode may be increased, providing higher visual security level.

The first aspect may exclude the case wherein the pair of quarter-wave plates have slow axes that are crossed, wherein the retarder further comprises an additional pair of passive retarders disposed between the quarter-wave plates and which have slow axes in the plane of the passive retarders that are crossed.

The first aspect may exclude the case wherein one of the pair of quarter-wave plates has slow axes that extend at at least 40° and at most 50° with respect to an electric vector transmission direction that is parallel to the electric vector transmission of the display polariser, and the other of the pair of quarter-wave plates has slow axes that extend at at least 130° and at most 140° with respect to an electric vector transmission direction that is parallel to the electric vector transmission of the display polariser, wherein the retarder further comprises an additional pair of passive retarders disposed between the quarter-wave plates, one of additional pair of passive retarders having slow axes in the plane of the passive retarders that extend at at least −10° and at most 10° with respect to an electric vector transmission direction that is parallel to the electric vector transmission of the display polariser and the other of additional pair of passive retarders having slow axes in the plane of the passive retarders that extend at at least −10° and at most 10° with respect to an electric vector transmission direction that is parallel to the electric vector transmission of the display polariser.

According to a second aspect of the present disclosure there is provided a view angle control optical element for application to the output side of a display device for use in ambient illumination comprising a spatial light modulator arranged to output light; wherein the spatial light modulator comprises an output polariser, the view angle control optical element comprising an additional polariser; first and second quarter-wave plates; and at least one retarder arranged between the first and second of quarter-wave plates.

Advantageously the view angle control optical element may provide an after-market privacy control element for attaching to an existing display to form a display device that may be operated in landscape and portrait modes may be provided. Advantageously, the modification of output light may be independent of azimuthal angle, and so provide a symmetry that has a degree of circular symmetry.

The view angle control element may further comprise a reflective polariser. The first and second quarter-wave plates and retarder may be arranged between the reflective polariser and additional polariser. Advantageously the modification of display reflectivity in ambient illumination may provide increased reflectivity with a symmetry that has a degree of circular symmetry.

Any of the aspects of the present disclosure may be applied in any combination.

Embodiments of the present disclosure may be used in a variety of optical systems. The embodiments may include or work with a variety of projectors, projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

Figure 1A:
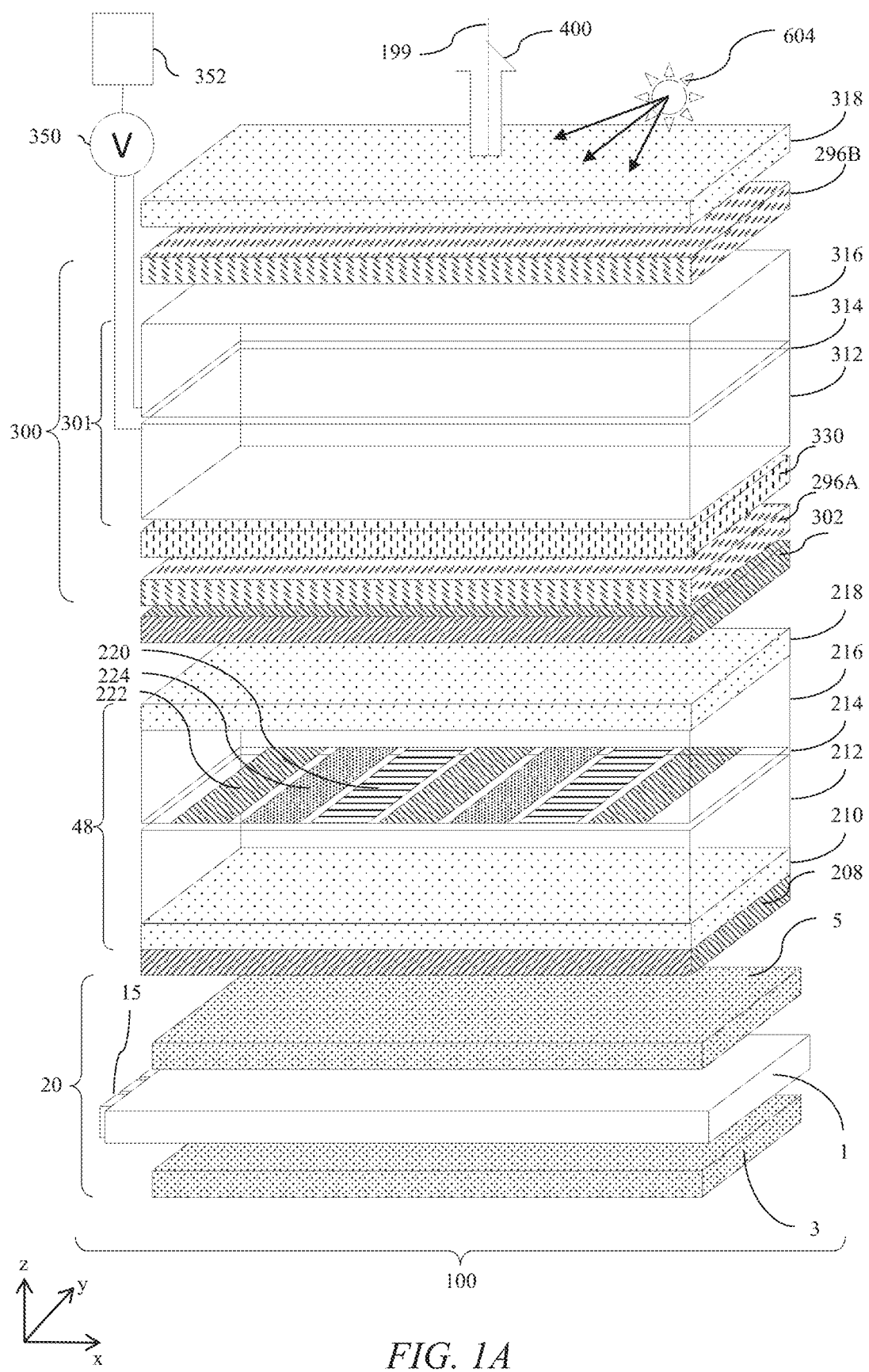
FIG. 1A is a schematic diagram illustrating in side perspective view a switchable privacy display for use in ambient illumination comprising a transmissive spatial light modulator, reflective polariser, a switchable retarder arranged between quarter-wave plates and an additional polariser arranged on the output side of the spatial light modulator.

Terms related to optical retarders for the purposes of the present disclosure will now be described.

In a layer comprising a uniaxial birefringent material there is a direction governing the optical anisotropy whereas all directions perpendicular to it (or at a given angle to it) have equivalent birefringence.

The optical axis of an optical retarder refers to the direction of propagation of a light ray in the uniaxial birefringent material in which no birefringence is experienced. This is different from the optical axis of an optical system which may for example be parallel to a line of symmetry or normal to a display surface along which a principal ray propagates.

For light propagating in a direction orthogonal to the optical axis, the optical axis is the slow axis when linearly polarized light with an electric vector direction parallel to the slow axis travels at the slowest speed. The slow axis direction is the direction with the highest refractive index at the design wavelength. Similarly the fast axis direction is the direction with the lowest refractive index at the design wavelength.

For positive dielectric anisotropy uniaxial birefringent materials the slow axis direction is the extraordinary axis of the birefringent material. For negative dielectric anisotropy uniaxial birefringent materials the fast axis direction is the extraordinary axis of the birefringent material.

The terms half a wavelength and quarter a wavelength refer to the operation of a retarder for a design wavelength $\lambda_0$ that may typically be between 500 nm and 570 nm. In the present illustrative embodiments exemplary retardance values are provided for a wavelength of 550 nm unless otherwise specified.

The retarder provides a phase shift between two perpendicular polarization components of the light wave incident thereon and is characterized by the amount of relative phase, $\Gamma$, that it imparts on the two polarization components; which is related to the birefringence $\Delta n$ and the thickness d of the retarder by $$\Gamma = 2 \cdot \pi \cdot \Delta n \cdot d / \lambda_0 \quad \text{eqn. 1}$$

In eqn. 1, $\Delta n$ is defined as the difference between the extraordinary and the ordinary index of refraction, i.e.

$$\Delta n = n_e - n_o \quad \text{eqn. 2}$$

For a half-wave retarder, the relationship between d, $\Delta n$, and $\lambda_0$ is chosen so that the phase shift between polarization components is $\propto = \pi$. For a quarter-wave retarder, the relationship between d, $\Delta n$, and $\lambda_0$ is chosen so that the phase shift between polarization components is $\Gamma = \pi/2$.

The term half-wave retarder herein typically refers to light propagating normal to the retarder and normal to the spatial light modulator.

Some aspects of the propagation of light rays through a transparent retarder between a pair of polarisers will now be described.

The state of polarisation (SOP) of a light ray is described by the relative amplitude and phase shift between any two orthogonal polarization components. Transparent retarders do not alter the relative amplitudes of these orthogonal polarisation components but act only on their relative phase. Providing a net phase shift, between the orthogonal polarisation components alters the SOP whereas maintaining net relative phase preserves the SOP. In the current description, the SOP may be termed the polarisation state.

A linear SOP has a polarisation component with a non-zero amplitude and an orthogonal polarisation component which has zero amplitude.

A linear polariser transmits a unique linear SOP that has a linear polarisation component parallel to the electric vector transmission direction of the linear polariser and attenuates light with a different SOP.

Absorbing polarisers are polarisers that absorb one polarisation component of incident light and transmit a second orthogonal polarisation component. Examples of absorbing linear polarisers are dichroic polarisers.

Reflective polarisers are polarisers that reflect one polarisation component of incident light and transmit a second orthogonal polarisation component. Examples of reflective polarisers that are linear polarisers are multilayer polymeric film stacks such as DBEF™ or APF™ from 3M Corporation, or wire grid polarisers such as ProFlux™ from Moxtek. Reflective linear polarisers may further comprise cholesteric reflective materials and a quarter waveplate arranged in series.

A retarder arranged between a linear polariser and a parallel linear analysing polariser that introduces no relative net phase shift provides full transmission of the light other than residual absorption within the linear polariser.

A retarder that provides a relative net phase shift between orthogonal polarisation components changes the SOP and provides attenuation at the analysing polariser.

In the present disclosure an 'A-plate' refers to an optical retarder utilizing a layer of birefringent material with its optical axis parallel to the plane of the layer.

A 'positive A-plate' refers to positively birefringent A-plates, i.e. A-plates with a positive $\Delta n$.

In the present disclosure a 'C-plate' refers to an optical retarder utilizing a layer of birefringent material with its optical axis perpendicular to the plane of the layer. A 'positive C-plate' refers to positively birefringent C-plate, i.e. a C-plate with a positive Δn. A 'negative C-plate' refers to a negatively birefringent C-plate, i.e. a C-plate with a negative Δn.

'O-plate' refers to an optical retarder utilizing a layer of birefringent material with its optical axis having a component parallel to the plane of the layer and a component perpendicular to the plane of the layer. A 'positive O-plate' refers to positively birefringent O-plates, i.e. O-plates with a positive Δn.

Achromatic retarders may be provided wherein the material of the retarder is provided with a retardance Δn·d that varies with wavelength λ as $$\Delta n \cdot d / \lambda = \kappa \qquad \text{eqn. 3}$$

where κ is substantially a constant.

Examples of suitable materials include modified polycarbonates from Teijin Films. Achromatic retarders may be provided in the present embodiments to advantageously minimise color changes between polar angular viewing directions which have low luminance reduction and polar angular viewing directions which have increased luminance reductions as will be described below.

Various other terms used in the present disclosure related to retarders and to liquid crystals will now be described.

A liquid crystal cell has a retardance given by Δn·d where Δn is the birefringence of the liquid crystal material in the liquid crystal cell and d is the thickness of the liquid crystal cell, independent of the alignment of the liquid crystal material in the liquid crystal cell.

Homogeneous alignment refers to the alignment of liquid crystals in switchable liquid crystal displays where molecules align substantially parallel to a substrate. Homogeneous alignment is sometimes referred to as planar alignment. Homogeneous alignment may typically be provided with a small pre-tilt such as 2 degrees, so that the molecules at the surfaces of the alignment layers of the liquid crystal cell are slightly inclined as will be described below. Pretilt is arranged to minimise degeneracies in switching of cells.

In the present disclosure, homeotropic alignment is the state in which rod-like liquid crystalline molecules align substantially perpendicularly to the substrate. In discotic liquid crystals homeotropic alignment is defined as the state in which an axis of the column structure, which is formed by disc-like liquid crystalline molecules, aligns perpendicularly to a surface. In homeotropic alignment, pretilt is the tilt angle of the molecules that are close to the alignment layer and is typically close to 90 degrees and for example may be 88 degrees.

In a twisted liquid crystal layer a twisted configuration (also known as a helical structure or helix) of nematic liquid crystal molecules is provided. The twist may be achieved by means of a non-parallel alignment of alignment layers. Further, cholesteric dopants may be added to the liquid crystal material to break degeneracy of the twist direction (clockwise or anti-clockwise) and to further control the pitch of the twist in the relaxed (typically undriven) state. A supertwisted liquid crystal layer has a twist of greater than 180 degrees. A twisted nematic layer used in spatial light modulators typically has a twist of 90 degrees.

Liquid crystal molecules with positive dielectric anisotropy are switched from a homogeneous alignment (such as an A-plate retarder orientation) to a homeotropic alignment (such as a C-plate or O-plate retarder orientation) by means of an applied electric field.

Liquid crystal molecules with negative dielectric anisotropy are switched from a homeotropic alignment (such as a C-plate or O-plate retarder orientation) to a homogeneous alignment (such as an A-plate retarder orientation) by means of an applied electric field.

Rod-like molecules have a positive birefringence so that $n_e > n_o$ as described in eqn. 2. Discotic molecules have negative birefringence so that $n_e < n_o$.

Positive retarders such as A-plates, positive O-plates and positive C-plates may typically be provided by stretched films or rod-like liquid crystal molecules. Negative retarders such as negative C-plates may be provided by stretched films or discotic like liquid crystal molecules.

Parallel liquid crystal cell alignment refers to the alignment direction of homogeneous alignment layers being parallel or more typically antiparallel. In the case of pre-tilted homeotropic alignment, the alignment layers may have components that are substantially parallel or antiparallel. Hybrid aligned liquid crystal cells may have one homogeneous alignment layer and one homeotropic alignment layer. Twisted liquid crystal cells may be provided by alignment layers that do not have parallel alignment, for example oriented at 90 degrees to each other.

Transmissive spatial light modulators may further comprise retarders between the input display polariser and the output display polariser for example as disclosed in U.S. Pat. No. 8,237,876, which is herein incorporated by reference in its entirety. Such retarders (not shown) are in a different place to the passive retarders of the present embodiments. Such retarders compensate for contrast degradations for off-axis viewing locations, which is a different effect to the luminance reduction for off-axis viewing positions of the present embodiments.

A private mode of operation of a display is one in which an observer sees a low contrast sensitivity such that an image is not clearly visible. Contrast sensitivity is a measure of the ability to discern between luminances of different levels in a static image. Inverse contrast sensitivity may be used as a measure of visual security, in that a high visual security level (VSL) corresponds to low image visibility.

For a privacy display providing an image to an observer, visual security may be given as:

$$VSL = (Y+R)/(Y-K) \qquad \text{eqn. 4}$$

where VSL is the visual security level, Y is the luminance of the white state of the display at a snooper viewing angle, K is the luminance of the black state of the display at the snooper viewing angle and R is the luminance of reflected light from the display.

Panel contrast ratio is given as:

$$C = Y/K \qquad \text{eqn. 5}$$

For high contrast optical LCD modes, the white state transmission remains substantially constant with viewing angle. In the contrast reducing liquid crystal modes of the present embodiments, white state transmission typically reduces as black state transmission increases such that $$Y + K \sim P \cdot L \qquad \text{eqn. 6}$$

The visual security level may then be further given as:

$$VSL = \frac{(C + I.\rho/\pi.(C+1)/(P.L))}{(C-1)} \qquad \text{eqn. 7}$$

where off-axis relative luminance, P is typically defined as the percentage of head-on luminance, L at the snooper angle and the display may have image contrast ratio C and the surface reflectivity is ρ.

The off-axis relative luminance, P is sometimes referred to as the privacy level. However, such privacy level P describes relative luminance of a display at a given polar angle compared to head-on luminance, and is not a measure of privacy appearance.

The display may be illuminated by Lambertian ambient illuminance I. Thus in a perfectly dark environment, a high contrast display has VSL of approximately 1.0. As ambient illuminance increases, the perceived image contrast degrades, VSL increases and a private image is perceived.

For typical liquid crystal displays the panel contrast C is above 100:1 for almost all viewing angles, allowing the visual security level to be approximated to:

$$VSL = 1 + I \cdot \rho / (\pi \cdot P \cdot L) \qquad \text{eqn. 8}$$

In comparison to privacy displays, desirably wide-angle displays are easily observed in standard ambient illuminance conditions. One measure of image visibility is given by the contrast sensitivity such as the Michelson contrast which is given by:

$$M = (I_{max} - I_{min}) / (I_{max} + I_{min}) \qquad \text{eqn. 9}$$

and so:

$$M = ((Y+R) - (K+R)) / ((Y+R) + (K+R)) = (Y-K) / (Y+K+2 \cdot R) \qquad \text{eqn. 10}$$

Thus the visual security level (VSL), is equivalent (but not identical to) 1/M. In the present discussion, for a given off-axis relative luminance, P the wide-angle image visibility, W is approximated as $$W = 1 / VSL = 1 / (1 + I \cdot \rho / (\pi \cdot P \cdot L)) \qquad \text{eqn. 11}$$

In the present discussion the colour variation $\Delta \varepsilon$ of an output colour $(u_w' + \Delta u', v_w' + \Delta v')$ from a desirable white point $(u_w', v_w')$ may be determined by the CIELUV colour difference metric, assuming a typical display spectral illuminant and is given by:

$$\Delta \varepsilon = (\Delta u'^2 + \Delta v'^2)^{1/2} \qquad \text{eqn. 12}$$

The structure and operation of various directional display devices will now be described. In this description, common elements have common reference numerals. It is noted that the disclosure relating to any element applies to each device in which the same or corresponding element is provided. Accordingly, for brevity such disclosure is not repeated.

It would be desirable to provide a switchable privacy display that has a symmetry that has a degree of circular symmetry.

FIG. 1A is a schematic diagram illustrating in side perspective view a switchable privacy display for use in ambient illumination 604 comprising a transmissive spatial light modulator 48, reflective polariser 302, plural retarders 300 comprising: a switchable retarder 301; and a passive retarder 330 arranged between quarter-wave plates 296A, 296B, and an additional polariser 318 arranged on the output side of the spatial light modulator 48. The switchable privacy display is an example of a display device 100.

A display device 100 for use in ambient illumination 604 comprises a spatial light modulator 48 arranged to output light along an output direction; a display polariser arranged on a side of the spatial light modulator 48; an additional polariser 318 arranged on the same side of the spatial light modulator 48 as the display polariser, the display polariser and the additional polariser 318 being arranged to pass respective linearly polarised polarisation states; and first 296A and second 296B quarter-wave plates arranged between the additional polariser 318 and the display polariser, the first quarter-wave plate 296A being arranged on the input side of the second quarter-wave plate 296B and being arranged to convert a linearly polarised polarisation state passed by the one of the display polariser and the additional polariser 318 on the input side thereof into a circularly polarised polarisation state, and the second quarter-wave plate 296A on the output side being arranged to convert a circularly polarised polarisation state that is incident thereon into a linearly polarised polarisation state that is passed by the other of the display polariser and the additional polariser 318 on the output side thereof and at least one retarder arranged between the pair of quarter-wave plates 296A, 296B.

Figure 23A:
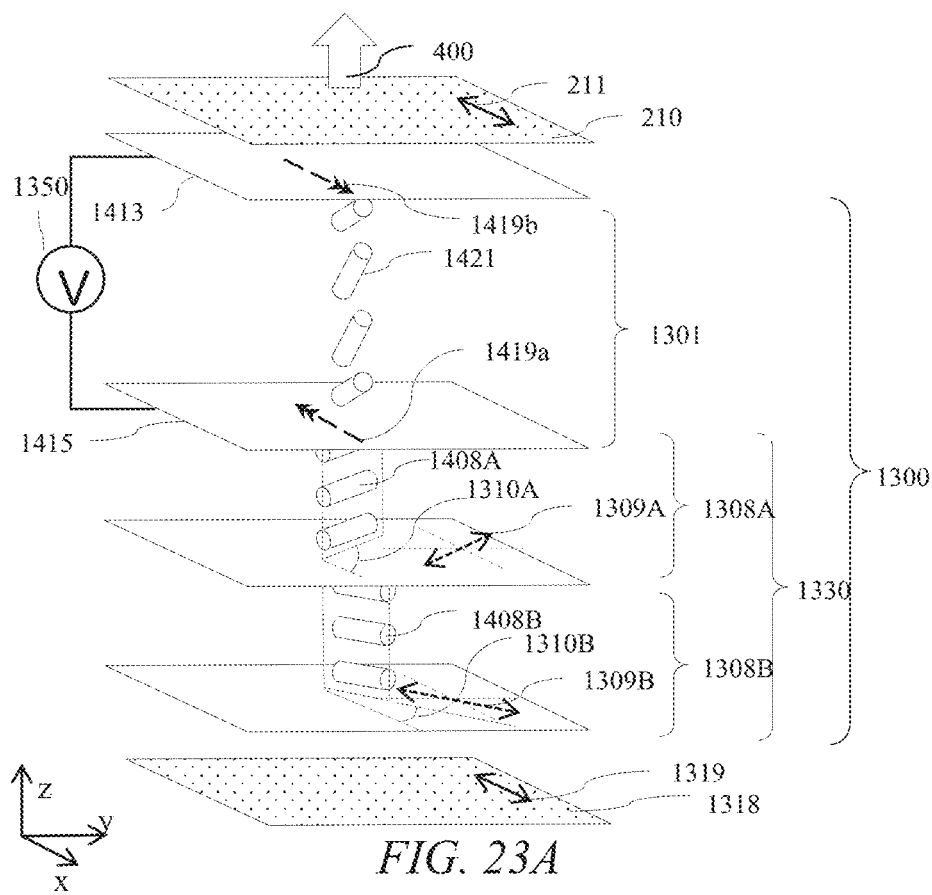
FIG. 23A is a schematic diagram illustrating in side perspective view an example arrangement of a further plurality of retarders comprising a passive control retarder, a passive compensation retarder, and a switchable liquid crystal retarder.

The present disclosure provides modification of transmitted phase of circularly polarised light by means of the at least one retarder between the quarter-wave plates 296A, 296B. Modification of phase is independent of azimuthal angle, and so provides a symmetry that has a degree of circular symmetry. By way of comparison, the arrangement illustrated in FIG. 23A provides a control of phase in a predominately lateral direction, with less control in an elevation direction. Advantageously a privacy display that may be operated in landscape and portrait modes may be provided.

Further a display device 100 that achieves reduction of viewing cone angle in two dimensions is achieved, for example to achieve night mode operation in an automotive vehicle 600 that reduces reflections from windscreens as well as reducing stray light to other passengers and internal surfaces of the vehicle 600.

The pair of quarter-wave plates 296A, 296B may each comprise a passive quarter-wave plate comprising a layer of aligned uniaxial birefringent material, as discussed above. A passive quarter-wave plate is a plate formed from a material which exists in a state that does not change during operation of the display device 100. The alignment of the molecules of the layer of material may be considered a state of the material. This is in contrast to a layer comprising a switchable material which may be switched between at least a first state and a second state during operation of the display device 100.

The pair of quarter-wave plates 296A, 296B each may have a retardance for light of a wavelength of 550 nm in a range from 110 nm to 175 nm, and preferably in a range from 130 nm to 140 nm. Such quarter-wave plates are first-order quarter-wave plates. Advantageously passive quarter-wave plates can be manufactured in high volume, large area and low cost.

The display polariser may be the output polariser 218 of the display device 100. The display device 100 may further comprises a reflective polariser 302 arranged between the plural retarders 300 and the output polariser 218, the output polariser 218 and the reflective polariser 302 being arranged to pass the same linearly polarised polarisation state. In this case, the electric vector transmission direction 303 of the reflective polariser 302 is parallel to the electric vector transmission direction 319 of the additional polariser 318. The electric vector transmission direction 303 of the reflective polariser 302 may be parallel to the electric vector transmission direction 219 of the output polariser 218.

The display device 100 for use in ambient illumination 604 may comprise a spatial light modulator 48 arranged to output light 400. In the present disclosure, spatial light modulator 48 may comprise a liquid crystal display comprising input polariser 210, output polariser 218 with substrates 212, 216, liquid crystal layer 214 and red, green and blue pixels 220, 222, 224. A backlight 20 is arranged to illuminate the spatial light modulator 48 and comprises input light sources 15, waveguide 1, rear reflector 3 and optical stack 5 comprising diffusers, light turning films and other known optical backlight structures. Asymmetric diffusers, that may comprise asymmetric surface relief features for example, may be provided in the optical stack 5 with increased diffusion in the elevation direction in comparison to the lateral direction may be provided. Advantageously Image uniformity may be increased.

In the present embodiments, the backlight 20 may be arranged to provide an angular light distribution that has reduced luminance for off-axis viewing positions in comparison to head-on luminance. A typical wide-angle backlight has a roll-off at higher angles such that the full-width half-maximum of relative luminance may be preferably greater than 40°, more preferably greater than 60° and most preferably greater than 80°.

The backlight 20 may be a directional backlight that provides a luminance at polar angles to the normal to the spatial light modulator 48 greater than 45 degrees that is at most 30% of the luminance along the normal to the spatial light modulator 48, preferably at most 20% of the luminance along the normal to the spatial light modulator 48, and more preferably at most 10% of the luminance along the normal to the spatial light modulator 48. In an illustrative embodiment of FIG. 1A, the luminance at polar angles to the normal to the spatial light modulator greater than 45 degrees may be at most 18%.

The backlight 20 may further comprise a switchable backlight arranged to switch the output angular luminance profile in order to provide reduced off-axis luminance in a privacy mode of operation and higher off-axis luminance in a public mode of operation. In a narrow angle mode such as a privacy display mode, such a directional backlight provides some off-axis luminance reduction, advantageously increasing head-on efficiency and reducing display visibility and stray light for off-axis locations. In a public mode of operation such as the public mode of a switchable privacy display, such a switchable backlight provides increased luminance for off-axis viewing directions. Advantageously image visibility is increased for off-axis users and image uniformity is increased for on-axis users.

Illustrative embodiments of a backlight 20 are described below with reference to FIGS. 28-31.

The display may further comprise a reflective recirculation polariser 208 arranged between the backlight 20 and spatial light modulator 48. The reflective recirculation polariser 208 is different to the reflective polariser 302 of the present embodiments. The reflective recirculation polariser 208 provides reflection of polarised light from the backlight that has a polarisation that is orthogonal to the electric vector transmission direction of the dichroic input polariser 210. The reflective recirculation polariser 208 may not reflect ambient light 604 to a snooper.

The output polariser 218 may be arranged on the output side of the spatial light modulator 48, and the additional polariser 318 may be arranged on the output side the output polariser 218, whereby said one of the output polariser 218 and the additional polariser on the input side thereof is the output polariser 218. The output polariser 218 may be arranged to provide high extinction ratio for light from the pixels 220, 222, 224 of the spatial light modulator 48 and to prevent back reflections from the reflective polariser 302 towards the pixels 220, 222, 224.

The additional polariser 318 may be arranged on the output side of the output polariser 218. One or more of the polarisers 210, 218, 318 may be dichroic polarisers.

In the embodiment of FIG. 1A, the plural retarders 300 comprise the pair of quarter-wave plates 296A, 296B, a passive retarder 330 and a switchable liquid crystal retarder 301, but in general may be replaced by other configurations of at least one retarder arranged between the quarter-wave plates 296A, 296B, some examples of which are present in the devices described below. The retarders 300 do not affect the luminance of light passing through the reflective polariser 302, the retarders 300 and the additional polariser 318 along an axis 199 along a normal to the plane of the retarders 300 but the retarders 300 do reduce the luminance of light passing therethrough along an axis inclined to a normal to the plane of the retarders 300. at least in one of the switchable states of the switchable retarder 301. The principles leading to this effect are described in greater detail below with reference to FIGS. 32A-36 and arise from the presence or absence of a phase shift introduced by the retarders 300 to light along axes that are angled differently with respect to the liquid crystal material of the retarders 300. A similar effect is achieved in all the devices described below.

The substrates 312, 316 of the switchable liquid crystal retarder 301 may comprise electrodes arranged to provide a voltage across the layer 314 of liquid crystal material 414. Control system 352 may be arranged to control the voltage applied by voltage driver 350 across the electrodes of the switchable liquid crystal retarder 301.

Any of the layers discussed may be attached by means of adhesives such as pressure sensitive adhesives and optically clear adhesives, may be solvent bonded. Advantageously image contrast may be improved. Some of the interfaces may be provided with air gaps. Advantageously assembly yield may be increased, reducing cost. Further frontal reflections may be increased and visual security level increased.

Figure 1B:
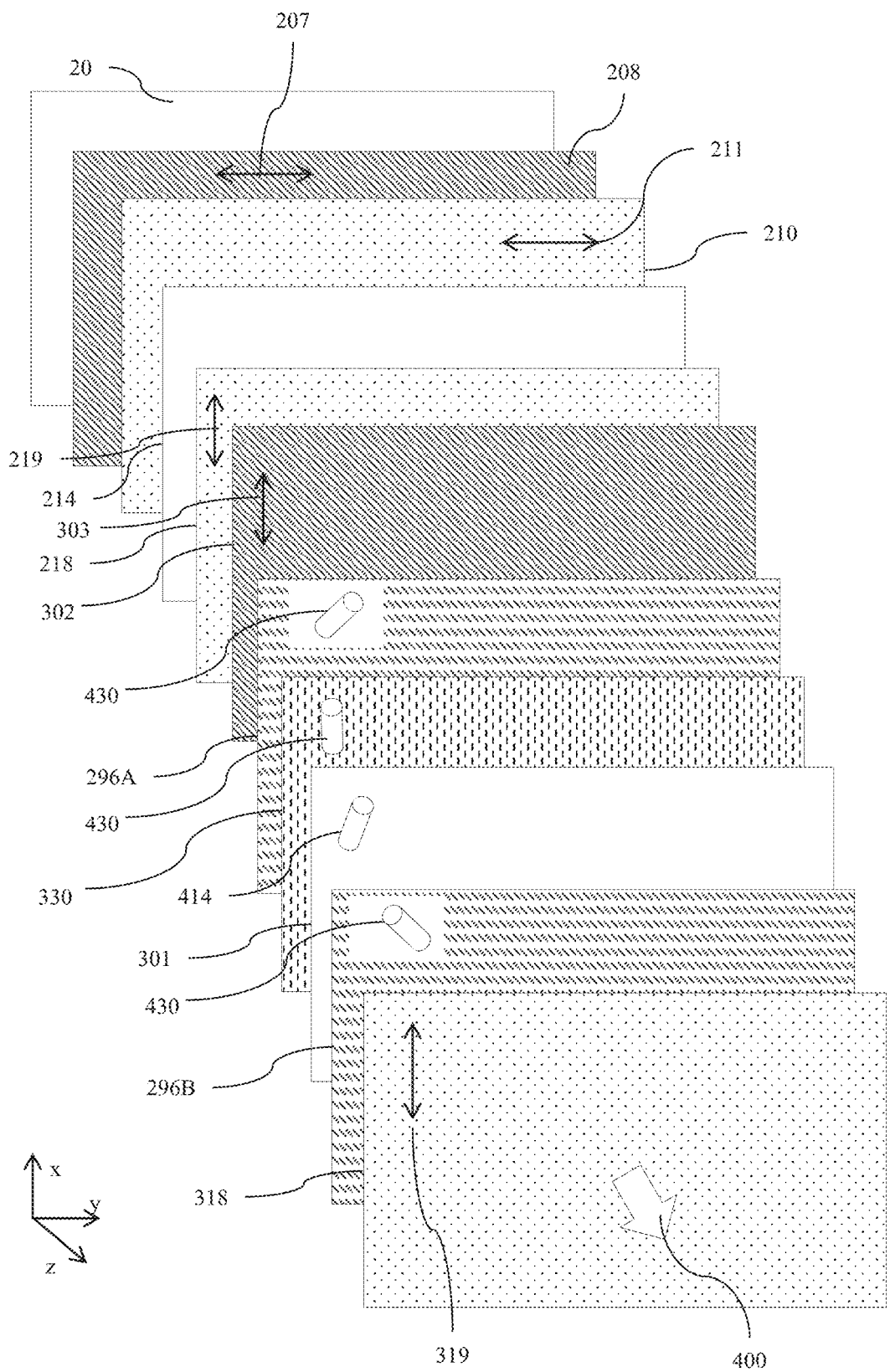
FIG. 1B is a schematic diagram illustrating in front view alignment of optical layers in the optical stack of FIG. 1A.

FIG. 1B is a schematic diagram illustrating in front view alignment of optical layers in the optical stack of FIG. 1A.

The electric vector transmission direction of the polarisers in the stack are shown. Any two of the electric transmission vector direction 219 of the outer polariser 218, the electric vector transmission direction 303 of the reflective polariser 302 and the electric vector transmission direction 319 of the additional polariser 318 may be parallel to each other. The electric vector transmission direction 211 of the input polariser 210 and the electric vector transmission direction 207 of the reflective re-circulation polariser 208 may be perpendicular to the electric vector transmission direction of the oilier polarisers in the stack.

As illustrated in FIG. 1B, the input electric vector transmission direction 211 at the input polariser 210 may provide an input polarisation state that may be transformed by the liquid crystal layer 214 to provide output polarisation state determined by the electric vector transmission direction 219 of the output polariser 218. This arrangement may be appropriate when the spatial light modulator 48 is a liquid crystal display. The passive retarder 330 may comprise retardation layer formed of material 430, the switchable liquid crystal retarder 301 may comprise a layer 314 of liquid crystal material 414 and the and the first and second quarter-wave plate 296A, 296B may comprise retardation layers formed of material 496A and 496B respectively, as will be described in detail below.

The pair of quarter-wave plates 296A, 296B may have optical axis that are crossed. This means that the optical axis of the first quarter-wave plate 296A is arranged at 90 degrees to the optical axis of the second quarter-wave plate when viewed from a direction parallel to the viewing surface of the display 100. Each of the pair of quarter-wave plates 296A, 296B may has an optical axis that is arranged at 45 degrees to the electric vector transmission direction of the adjacent output polariser 218 or additional polariser 318.

Light rays that are transmitted through the retarders 301, 330 in the head-on direction, along the axis 199 have a polarisation state that is not modified by the retarders 301, 330. In such on-axis operation, the crossed quarter-wave plates 296A, 296B are arranged to provide no modification of the polarisation state from the output polariser 218 such that the polarisation state is transmitted by the additional polariser 318. Advantageously high efficiency is achieved for on-axis light viewing directions.

When the display device 100 further includes the reflective polariser 302, the first quarter-wave plate 296A adjacent to the reflective polariser 302 may has an optical axis that is arranged at 45 degrees to the electric vector transmission direction 303 of the reflective polariser 302. In the case where the electric vector transmission direction 303 of the reflective polariser 302 is parallel to the electric vector transmission direction 219 of the output polariser 218, the first quarter-wave plate 296A therefore may have an optical axis that is arranged at 45 degrees to the electric vector transmission direction of the output polariser 218 and the reflective polariser 302

In the example shown in FIG. 1B, the electric vector transmission direction of the polarisers are shown parallel to the x and y direction defining a vertical and horizontal direction of the display. However, the arrangement is not limited to this orientation and the entire stack may be rotated to any particular angle, for example by 90 degrees, as long as the relative angles of the various electric vector transmission directions of the polarisers and optical axis of the retarders is maintained.

The spatial light modulator 48 may be for example an In-Plane-Switching (IPS) type liquid crystal display, a Fringe Field Switching (FFS) type liquid crystal display or a Vertically Aligned nematic (VA) type liquid crystal display. Such spatial light modulators have output electric vector directions 219 that are typically horizontal or vertical.

By comparison, twisted nematic (TN) liquid crystal displays may have output polariser 218 electric vector transmission directions 219 that are typically aligned at 45 degrees to the horizontal. It would be desirable to provide TN-LCD displays that have vertical output electric vector transmission direction 219 that is vertical such that said displays may be used with polarised sunglasses (that typically have vertical electric vector transmission direction) in at least one orientation.

Figure 1C:
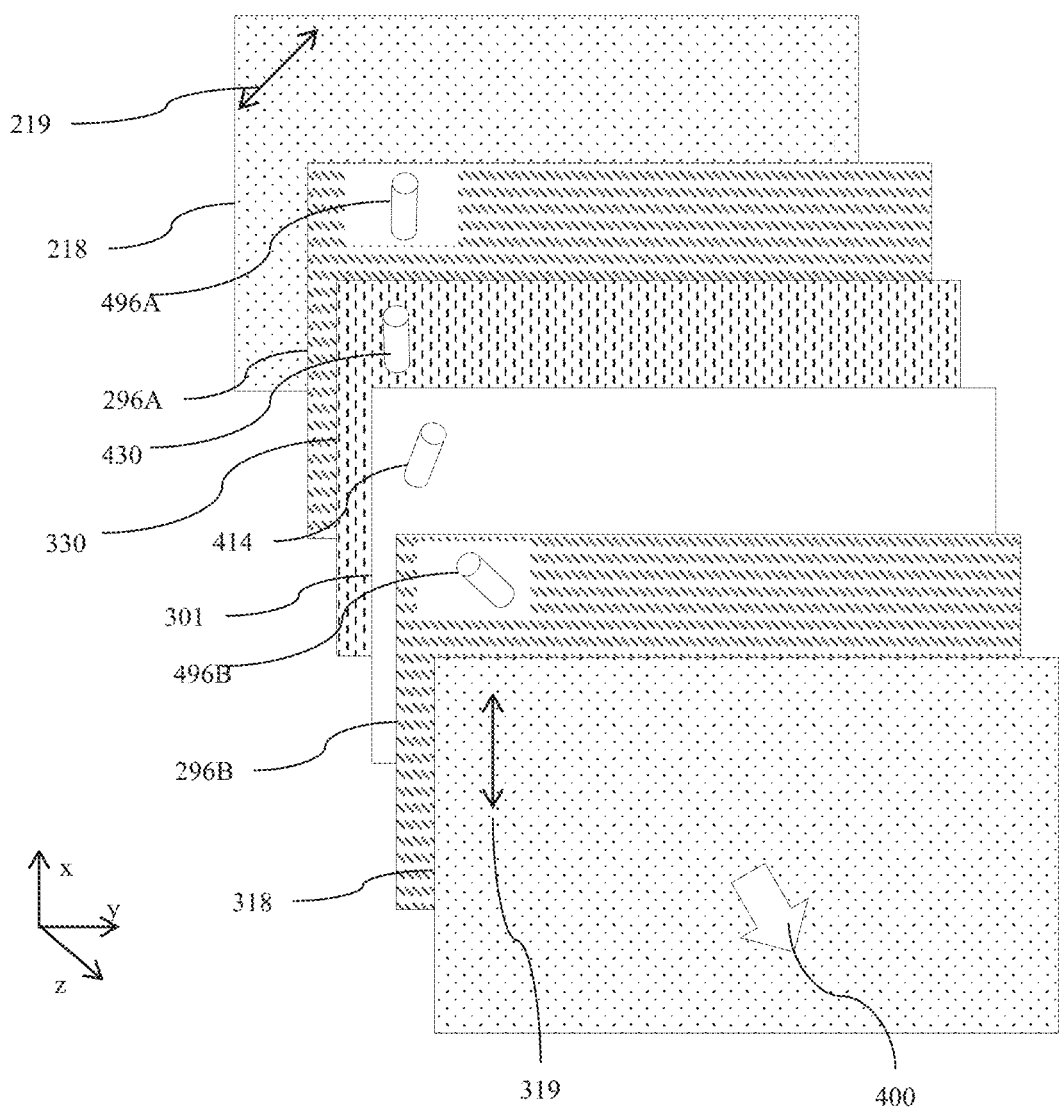
FIG. 1C is a schematic diagram illustrating in front view alignment of optical layers for the output of a twisted nematic spatial light modulator to achieve a vertical output polarisation state.

FIG. 1C is a schematic diagram illustrating in front view alignment of optical layers for the output of a twisted nematic spatial light modulator 48 to achieve a vertical output polarisation state.

The layers defining the spatial light modulator 48 are not shown, but the layers and their properties may be the same as those for the spatial light modulator 48 discussed above. In the example shown in FIG. 1C, the electric transmission vector direction 219 of the output polariser 218, is arranged at 45 degrees to the horizontal and vertical direction of the display when viewed perpendicular to a viewing surface of the display device 100. The optical axis of the first quarter-wave plate 496A is arranged at 45 degrees to the electric transmission vector direction 219 of the adjacent output polariser 218. The orientation of the remaining layers shown in FIG. 1C are not modified from the arrangement shown in FIG. 1B.

The electric transmission vector direction 219 of the output polariser 218 is therefore no longer parallel to the electric transmission vector direction 319 of the additional polariser 318, but is instead orientated at a 45 degree angle. The optical axis of pair of quarter-wave plates 296A and 296B are therefore not crossed in the example shown in FIG. 1C, but instead are arranged at a 45 degree angle to each other. However, the arrangement shown in FIG. 1C may still function in a similar way to the arrangement shown in FIGS. 1A and 1B to reduce the transmission of light 400 in an off-axis direction. This arrangement may be particularity suited for application in sunglasses. Further TN-LCDs may advantageously be manufactured with lower cost than other LCD types and are suitable for operation in environments with high temperature ranges, such as automotive cabins.

In other embodiments the additional polariser 318 may be provided with transmission direction 319 that is parallel to the output polariser 218 electric vector transmission direction 219. Advantageously the display may be visible with polarised sunglasses in both landscape and portrait modes of operation.

Figure 2:
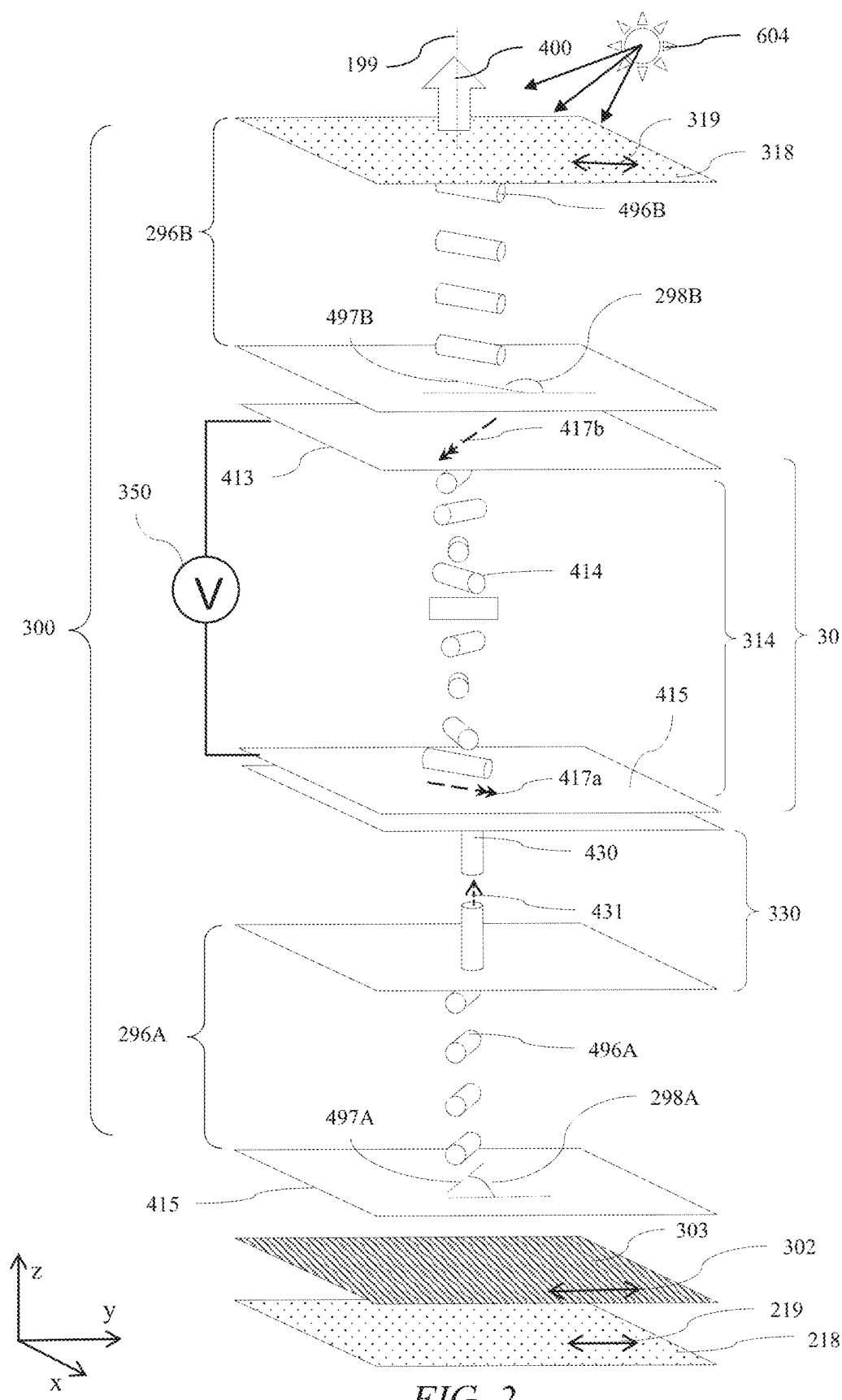
FIG. 2 is a schematic diagram illustrating in perspective side view an arrangement of a plurality of retarder layers arranged between parallel polariser s and comprising a passive positive C-plate compensation retarder and a 270 degree supertwisted switchable liquid crystal retarder arranged between quarter-wave plates.

FIG. 2 is a schematic diagram illustrating in perspective side view an arrangement of a plurality of retarder layers 300 arranged between parallel polarisers 218, 302, 318 and comprising a passive positive C-plate compensation retarder 330 and a 270 degree supertwisted switchable liquid crystal retarder 301 arranged between quarter-wave plates 296A, 296B.

FIG. 2 depicts an example of the embodiment described above. The at least one retarder comprises a liquid crystal retarder 301 comprising a layer of liquid crystal material 414. The switchable liquid crystal retarder 301 comprises two surface alignment layers 413, 415 disposed adjacent to the liquid crystal material 414 on opposite sides thereof and arranged to provide homogeneous alignment to the adjacent liquid crystal material 414. The alignment directions 417A, 417B of the alignment layers (arranged on electrodes 413, 415 but not shown separately) is perpendicular to each other. Each of the quarter-wave plates 296A, 296B are formed from a material with optical axis directions 497A, 497B respectively. As discussed above, the optical axis of both of the quarter-wave plate layers is parallel to the plane of the layers and defines an angle 298A, 298B respectively with the electric vector transmission direction of the output polariser 218, the additional polariser 318 and the reflective polariser 302. In the example shown in FIG. 2, the optical axis direction 497A of the first quarter-wave plate 296A defines a 45 degree angle 298A with the electric vector transmission directions 219, 303 of the polarisers 218, 302 respectively. The optical axis direction 497B of the second quarter-wave plate 296B defines a 135 degree angle 298B with the electric vector transmission director defined by the polarisers. The optical axis direction 497A, 497B of the first and second quarter-wave plates 296A, 296B are therefore arranged at 90 degrees to each other and are therefore crossed.

The quarter-wave plates 296A, 296B may have crossed optical axes 497A, 497B to minimise chromatic variation of the light 400 output by the display device 100. This is because for on-axis operation, the crossed quarter-wave plates 296A, 296B are arranged together to provide no modification of the polarisation state from the output polariser 218 such that on-axis light rays are transmitted efficiently through the additional polariser 318. Further the chromaticity of the first quarter-wave plate 497A may be corrected by the chromaticity of the second quarter-wave plate 497B in at least one of the modes of operation.

In the present embodiments, 'crossed' refers to an angle of substantially 90° between the optical axes 497A, 497B of the quarter-wave plates in the plane of the quarter-wave plates. To reduce cost of retarder materials, it is desirable to provide materials with some variation of retarder orientation due to stretching errors during film manufacture and film alignment during assembly for example. Variations in retarder orientation away from preferable directions can reduce the head-on luminance and increase the minimum transmission. Preferably the angle 497A is at least 35° and at most 55°, more preferably at least 40° and at most 50° and most preferably at least 42.5° and at most 47.5°. Preferably the angle 497B is at least 125° and at most 145°, more preferably at least 130° and at most 135° and most preferably at least 132.5° and at most 137.5°.

The quarter-wave plates 296A, 296B may be arranged to provide circular output polarisation. The quarter-wave plates 296A, 296B may have a retardance of $$\Delta n \cdot d = (2q+1) \cdot \lambda/4 \qquad \text{eqn. 13}$$

where m is (zero or) an integer and $\lambda$ is the design wavelength as discussed above. In an example, one or both of the quarter-wave plates 296A, 296B may each have a retardance light of a wavelength of 550 nm in a range from 110 nm to 175 nm, and preferably in a range from 130 nm to 140 nm. Such quarter-wave plates 296A, 296B are examples of zero-order quarter-wave plates when q=0 in in eqn. 13.

Higher order waveplates (q>0) may be used. Tuning of the polar properties of the luminance and reflectivity variations described elsewhere herein may be provided.

The at least one retarder 300 may be a switchable liquid crystal retarder 301 and may further comprise electrodes 413, 415 arranged to apply a voltage V for switching the material 414 of the switchable liquid crystal retarder 301. The material 414 of the switchable liquid crystal retarder 301 may be switchable between two states. In a first state, where a first voltage that may be zero volts is applied by the electrode layers 413, 415, the material 414 may be in a state where the molecules of the material 414 of the layer 314 are aligned parallel to the plane of the layer 314 defined by the switchable liquid crystal retarder 301. An example of this state is the twisted nematic state or super twisted nematic state.

In a second state, where a second voltage different to the first voltage is applied by the electrode layers 413, 415, the molecules of the material 414 of the switchable liquid crystal retarder 301 may realign to a vertical alignment where the molecules of the material 414 of the layer 314 are aligned perpendicular to the plane of the layer 314 defined by the switchable liquid crystal retarder 301. In this case, the liquid crystal material 414 has a positive dielectric anisotropy as discussed above.

Light 400 incident on the plurality of retarders 300 is provided with a particular linearly polarised state from either the output polariser 218 or the additional polariser 318. As the light 400 passes through either the first quarter-wave plate 296A or the second quarter-wave plate 296B, the linear polarisation is converted to a circularly polarised state. As the light 400 passes through the at least one retarder 301, 330, the circular polarisation of the light 400 may experience a retardation of one of the components of polarisation depending on the state of the material of the at least one retarder 301, 330. The retardation may vary based on the angle of incidence of the light 400 relative to the axis 199 perpendicular to the viewing surface of the display device 100. In particular, the retardation of polarisation experienced by on-axis light 410 passing though the at least one retarder may be different to the retardation experienced by off-axis light 420 as discussed in detail below.

The at least one retarder may comprise a retarder comprising an aligned uniaxial birefringent material. The at least one retarder may be arranged to introduce a phase shift to polarisation components of light 400 passed by the one of the output polariser 218 and the additional polariser 318 and the quarter-wave plate 296A, 296B on the input side of the plural retarders 300 along an axis inclined to the optical axis of the at least one retarder.

The light 400 then passes though the other of the second quarter-wave plate 296B and the first quarter-wave plate 296A and the retarded circularly polarised state is converted to a linear polarisation state. However, depending on the retardation of the light 400 when passing through the at least one retarder, the resulting linearly polarised state may vary. The luminance of the light 400 that is then passed by the other of the additional polariser 318 or the output polariser 218 may then vary depending on the retardation of the light 400 when passing through the at least one retarder. As discussed in more detail below, this arrangement may be used to control the luminance of on-axis 410 and off-axis 420 light passing through the plurality of retarders 300.

The at least one retarder 301, 330 may be arranged to introduce no phase shift to polarisation components of light 400 passed by one of the output polariser 218 and the additional polariser 318 and the quarter-wave plate 296A, 296B on the input side of the plural retarders 300 along an axis along the optical axis of the at least one retarder.

When the at the least one retarder comprises at least one switchable liquid crystal retarder 301, the at least one retarder may be arranged to introduce a phase shift to polarisation components of light 400 passed by the one of the output polariser 218 and the additional polariser 318 and the quarter-wave plate 296A, 296B on the input side of the plural retarders 300 along an axis inclined to the optical axis of the at least one retarder in a switchable mode of the switchable liquid crystal retarder 301.

As discussed above, the layer 314 of liquid crystal material 414 may have a twist. The twist, $\tau$ may be given by eqn. 14 where m is zero or a positive integer.

$$\tau = (90 + m*180) \text{ degrees} \qquad \text{eqn. 14}$$

The twist of the liquid crystal material may be defined as the total angle of rotation of the molecules of the material of the layer of liquid crystal material 301 across the thickness defined by the layer of liquid crystal material 301. The twist of the layer of liquid crystal material 301 in the embodiment shown in FIG. 2 is 270 degrees. The twist of the layer of liquid crystal material 301 may also be any one of 90 degrees or 450 degrees.

The plurality of retarders 300 may further comprise at least one passive retarder 330. The at least one passive retarder 330 may comprises a passive retarder having an optical axis 431 perpendicular to the plane of the passive retarder. The passive retarder 300 may be a C-plate retarder.

The presence of at least one passive retarder 330 in addition to the switchable liquid crystal retarder 301 may provide a second-order improvement of the output of the display device 100. The presence of the at least one passive retarder 330 in addition to the switchable liquid crystal retarder 301 may improve the field of view of the output of the display device 100 and may compensate for chromaticity variations with polar and azimuthal angles.

As discussed above, the switchable liquid crystal retarder 301 has a thickness that is optimised to a particular wavelength of the light 400 output by the display device 100. The performance of the plurality of retarders 300 may therefore most optimised at this wavelength and less optimised at wavelengths of the light 400 output by the display device 100 that differ from this wavelength.

The passive retarder 330 may advantageously achieve increased size of the polar region for which luminance is reduced and reflectivity increased.

Figure 3A:
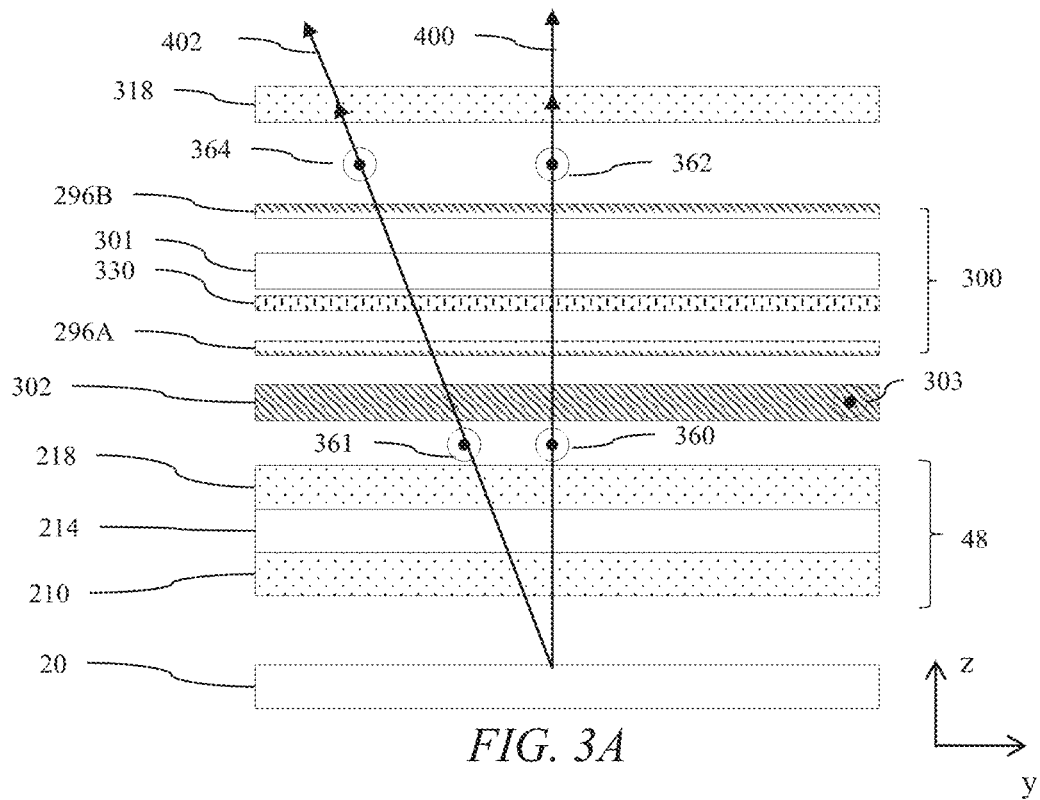
FIG. 3A is a schematic diagram illustrating in side view propagation of output light from a spatial light modulator through the optical stack of FIG. 1A in a public mode of operation.

FIG. 3A is a schematic diagram illustrating in side view propagation of output light from a spatial light modulator 48 through the optical stack of FIG. 1A in a public mode of operation.

In the public mode of operation, light rays 400, 402 emitted by the backlight 20 in an on-axis direction have a polarisation state 360 parallel to the electric vector transmission direction 219 of the output polariser 218 on exiting the spatial light modulator 48. The on-axis ray 400 then traverses the multiple retarder layers 300 where the polarisation is converted to circular polarisation by the first quarter-wave plate 296A, passes through the switchable liquid crystal retarder 301 and the passive retarder 330 and is then converted back from a circularly polarised state to the linear polarised state 362 by the first quarter-wave plate 296B. In public mode, the switchable liquid crystal retarder 301 is in the off state where typically (but not necessarily) a voltage is not applied. In the case where the switchable liquid crystal retarder 301 has a positive dielectric anisotropy, the switchable liquid crystal retarder 301 therefore acts in a similar manner to an A-plate retarder in the first state.

The circularly polarised state of the on-axis light ray 400 therefore experiences a retardation when passing through the switchable liquid crystal retarder 301. However, the retardation of the switchable liquid crystal layer 314 of the liquid crystal retarder 301 may be configured such that the components of the circular polarised ray are retarded by the same amount. In the case where the passive retarder 330 is a C-plate retarder, the on-axis light ray 400 is propagating in a direction that is substantially parallel to the optical axis of the passive retarder 330. The on-axis light ray 400 therefore experiences minimal retardation when passing through the passive retarder 330. The combined effect off the plurality of retarders 300 results in the on-axis light ray 400 exiting the plurality of retarders 300 with the same or similar linear polarisation state 362 to the linear polarisation state 360 with which the on-axis light ray 400 entered the plurality of retarders 300. This linear polarisation state 362 is parallel to the electric vector transmission direction 319 of the additional polariser 318 and the on-axis ray 400 therefore exits the display device 100 with a relatively unchanged luminance.

In the public mode, the off-axis ray 402 traverses the plurality of retarders 300 in a similar fashion to the on-axis ray 400. Thus, when the switchable liquid crystal retarder 301 is in a first state of said two states, the plurality of retarders 300 provides no overall transformation of polarisation states 360, 361 of light ray 400 passing therethrough perpendicular to the plane of the switchable retarder or light ray 402 passing therethrough at an acute angle to the perpendicular to the plane of the switchable retarder 301.

Polarisation state 362 is substantially the same as polarisation state 360 and polarisation state 364 is substantially the same as polarisation state 361. Thus the angular transmission profile is substantially uniformly transmitting across a wide polar region.

In other words, when the layer 314 of liquid crystal material 414 is in the first state of said two states, the plural retarders 300 provide no overall retardance to light passing therethrough perpendicular to the plane of the retarders or at an acute angle to the perpendicular to the plane of the plural retarders 300.

Advantageously the variation of display luminance with viewing angle in the first state is substantially unmodified. Multiple users may conveniently view the display from a wide range of viewing angles.

Figure 3B:
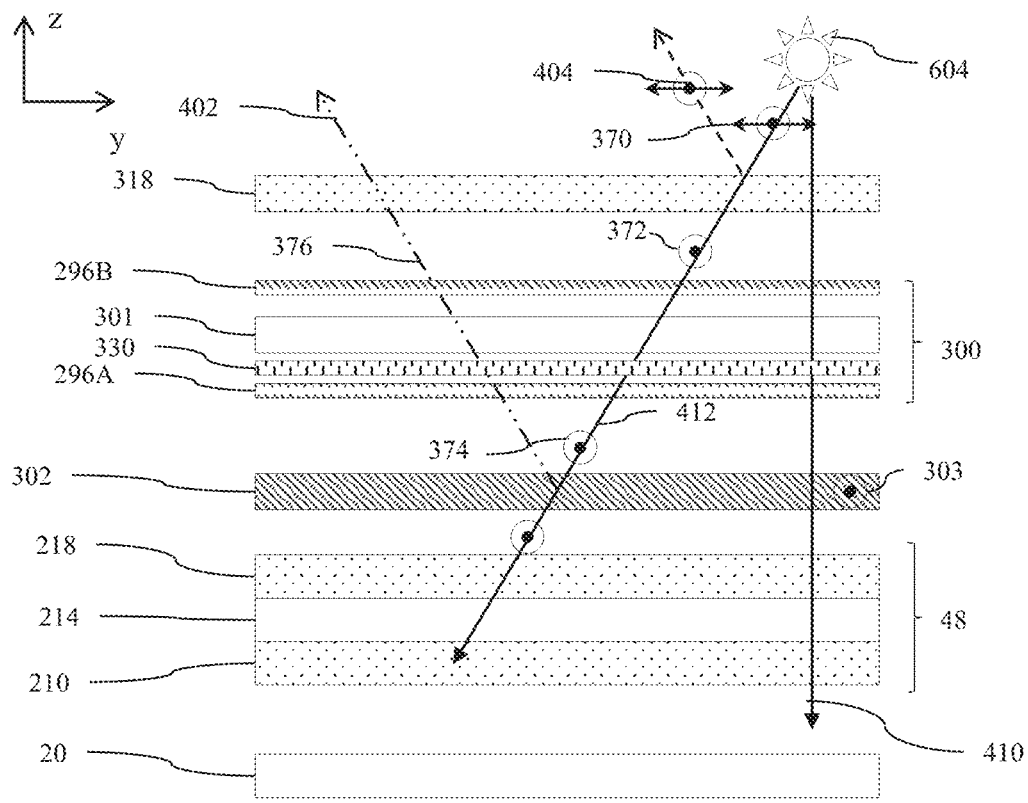
FIG. 3B is a schematic diagram illustrating in side view propagation of light rays from an ambient light source through the optical stack of FIG. 1A in a public mode of operation.

FIG. 3B is a schematic diagram illustrating in side view propagation of light rays from an ambient light source 604 through the optical stack of FIG. 1A in a public mode of operation.

The on-axis ray 410 of ambient light 604 traverses the plurality of retarders 300 in a similar fashion to the on-axis ray 400 emitted from the backlight 20 discussed above. Although the on-axis ray 410 traverses the plurality of retarders 300 in the reverse direction to the on-axis ray 400 emitted from the backlight 20, the traversal of the plurality of retarders 300 in a reverse direction may not change the effect of the plurality of retarders 300 on the light ray as discussed above for light emitted from the backlight 20. The on-axis ray 410 therefore reaches the backlight 20 where it may be absorbed or recirculated as emitted light 400 from the display device 100.

In a similar fashion, the off-axis ray 402 experiences no overall transformation of polarisation state when passing through the plurality of retarders 300. Ambient light 604 is unpolarised and the off-axis light ray initially has no polarisation 370. The additional polariser 318 passes the polarisation component 372 that is parallel to the electric vector transmission direction 319 of the additional polariser. The additional polariser 318 absorbs the majority of the polarisation state 372 that is perpendicular to the electric vector transmission direction 319 of the additional polariser 318. Some light is reflected from the front surface of the polariser 318 by Fresnel reflections at the outer air interface. After traversing the plurality of retarders 300, the linear polarisation state 374 of the off-axis ray 402 is therefore parallel to the electric vector transmission direction 303 of the reflective polariser 302 and the off-axis ray is not reflected but instead passes the reflective polariser 302 to reach the spatial light modulator 448 where it may be absorbed by the input polariser 210 or transmitted into the backlight 20.

Advantageously the display reflectance in the public mode is reduced across a wide range of viewing angles. Multiple users may conveniently view the display from a wide range of viewing angles with high image contrast.

Figure 3C:
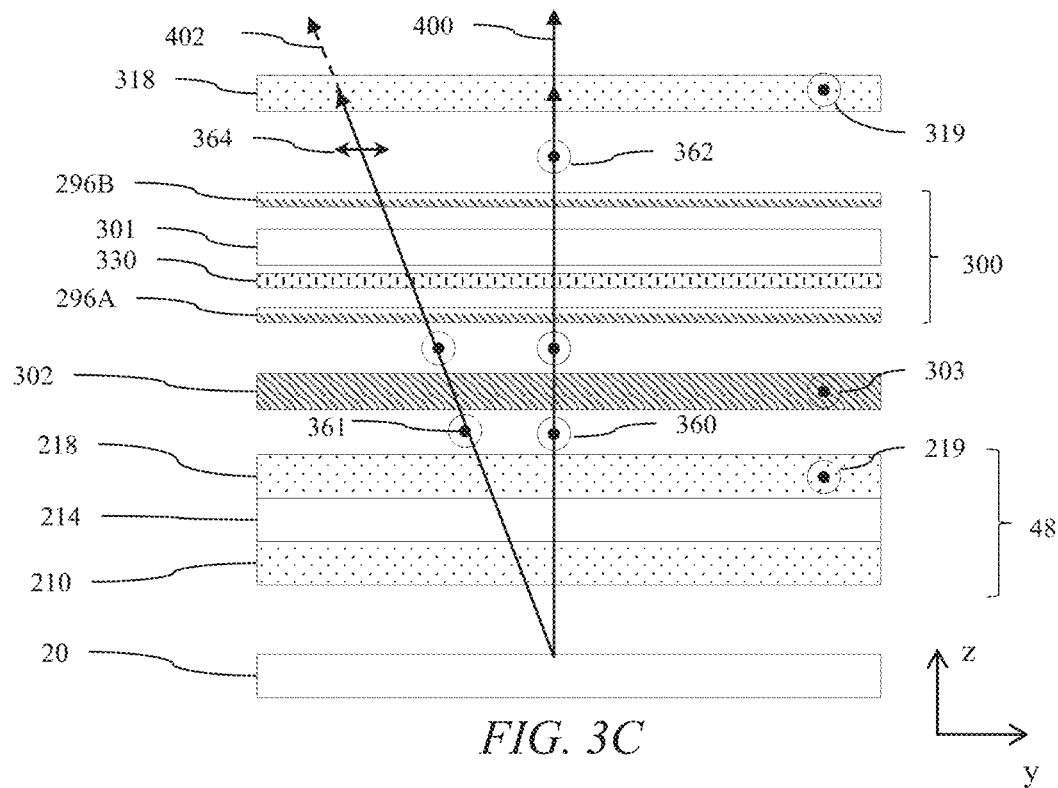
FIG. 3C is a schematic diagram illustrating in side view propagation of output light from a spatial light modulator through the optical stack of FIG. 1A in a privacy mode of operation.

FIG. 3C is a schematic diagram illustrating in side view propagation of output light from a spatial light modulator 48 through the optical stack of FIG. 1A in a privacy mode of operation.

In the privacy mode, the switchable liquid crystal retarder 301 is in the on state where a voltage is applied to the liquid crystal layer 314. The switchable liquid crystal retarder 301 may therefore be in the second state of the said two states. In the case where the switchable liquid crystal retarder 301 has a positive dielectric anisotropy, the switchable liquid crystal retarder 301 therefore acts in the second state in a similar manner to a C-plate retarder. This means that the optical axis of the switchable liquid crystal retarder 301 is substantially parallel to the propagation direction of the on-axis light ray 400 through at least some of the thickness of the layer 314. The on-axis light ray 400 therefore experiences no retardation when passing through the switchable liquid crystal retarder 301 in the second state, and therefore the linear polarisation state 360 of the on-axis light ray 400 prior to traversing the plurality of retarders 300 is the same as the linear polarisation state 362 after traversing the plurality of retarders 300. The on-axis ray 400 therefore exits the display via the additional polariser 318 with a largely unchanged luminance in the privacy mode of operation.

Off-axis light rays 402 emitted from the backlight 20 experience a transformation of polarisation when passing through the material of the switchable liquid crystal retarder 301. This is because of the acute angle of entry of the off-axis light ray 402, as discussed in further detail below. The off-axis light ray 402 therefore arrives at the additional polariser 318 with a linear polarisation state 364 that is at least partially rotated when compared to the linear polarisation state 361. The linear polarisation state 364 has at least some perpendicular component to the electric vector transmission direction 319 of the additional polariser 318 and the luminance of the off-axis light ray 402 is therefore reduced compared to the on-axis ray 400.

Advantageously the display luminance at wide viewing angles may be reduced in the second state. Snoopers may therefore be prevented from viewing the image emitted by the display device 100 at wide viewing angles. Stray light may be reduced in night-time operation while the head-on user may see an image.

Figure 3D:
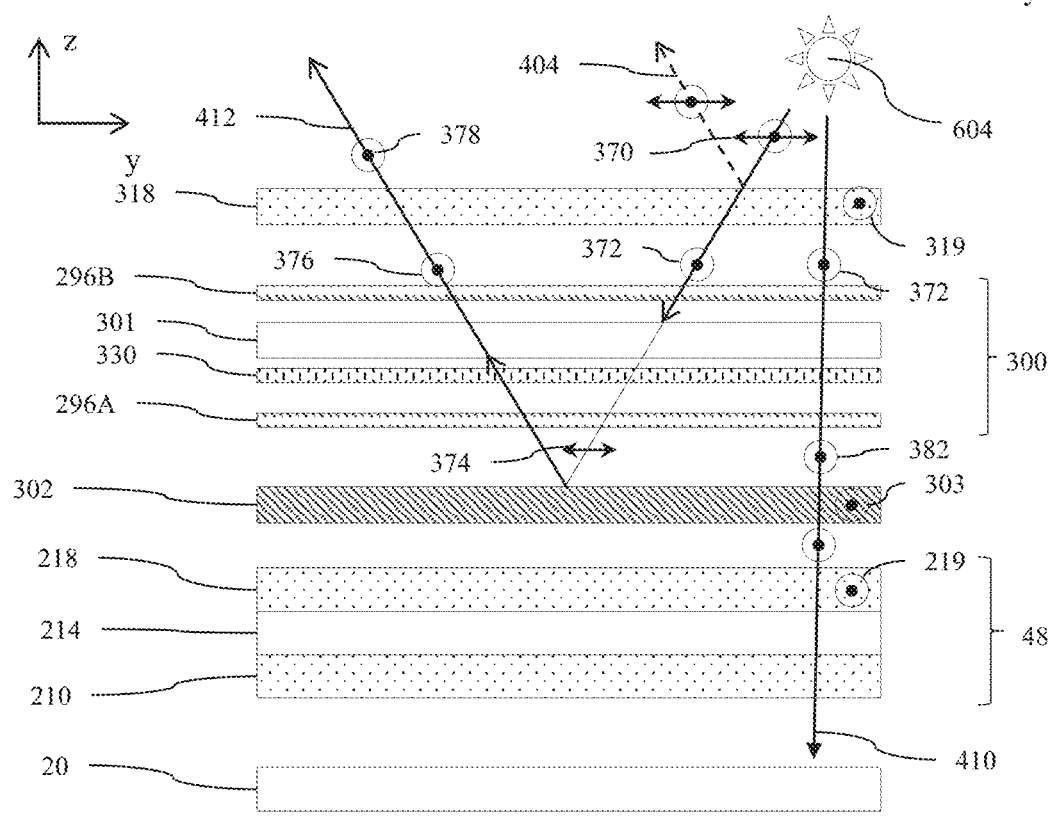
FIG. 3D is a schematic diagram illustrating in side view propagation of light rays from an ambient light source through the optical stack of FIG. 1A in a privacy mode of operation.

FIG. 3D is a schematic diagram illustrating in side view propagation of light rays from an ambient light source 604 through the optical stack of FIG. 1A in a privacy mode of operation.

In privacy mode operation, incident on-axis light rays 410 from the ambient light source 604 traverse the plurality of retarders 300 in a similar fashion to the on-axis ray 400 emitted from the backlight 20 as described in relation to FIG. 3C, Although the on-axis ray 410 traverses the plurality of retarders 300 in the reverse direction to the on-axis ray 400 emitted from the backlight 20, the direction of traversal of the plurality of retarders 300 into or out of the display does not change the effect of the plurality of retarders 300 on the light ray as discussed for light emitted from the backlight 20. The on-axis ray 410 therefore reaches the backlight 20 where it may be absorbed or recirculated as emitted light 400 from the display device 100.

In contrast to this, off-axis light rays 412 emitted from the backlight 20 experience a transformation of polarisation when passing through the material 414 of the switchable liquid crystal retarder 301. This is because of the acute angle of entry of the off-axis light ray 412, as discussed in further detail below. The off-axis light ray 412 therefore arrives at the reflective polariser 302 with a linear polarisation state 374 that is at least partially rotated when compared to the linear polarisation state 372. The linear polarisation state 374 has at least some perpendicular state to the electric vector transmission direction 303 of the reflective polariser 302 and is therefore at least partially reflected by the reflective polariser 302. The ray 412 then traverses the plurality of retarders 300 in the reverse direction, reversing the polarisation conversion from the first pass of the plurality of retarders 300 and resulting in a polarisation state 376 that is parallel to the electric vector transmission direction of the additional polariser 318. The off-axis ray 412 therefore leaves the display device 100 with polarisation state 378, resulting in the stack appearing as a mirror when viewed from a wide-angle. The additional polariser 318 absorbs the majority of the polarisation state 372 that is perpendicular to the electric vector transmission direction 319 of the additional polariser, but may reflect a small proportion of the perpendicular state 404.

Advantageously the reflectance at wide viewing angles may be increased in the second state. Snoopers may therefore be prevented from viewing the image emitted by the display device 100 at wide viewing angles due to the reflected light reducing the contrast of the image being emitted by the display device, and so increasing visual security level, VSL as described in eqn. 4, above due to increased reflectivity, R.

Figure 4A:
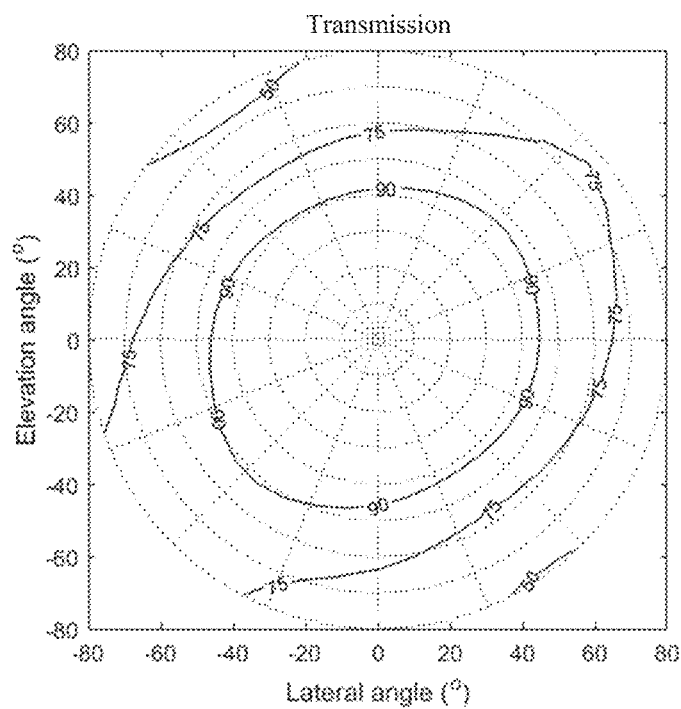
FIG. 4A is a schematic graph illustrating the variation of transmission with polar direction for the transmitted light rays in FIG. 3A.
Figure 4B:
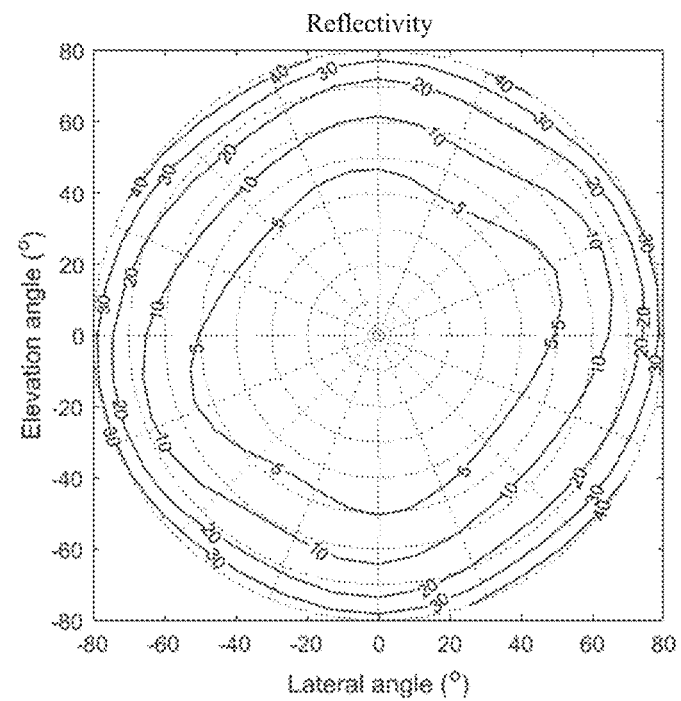
FIG. 4B is a schematic graph illustrating the variation of reflectivity with polar direction for the transmitted light rays in FIG. 3B.
Figures 4C, 4D:
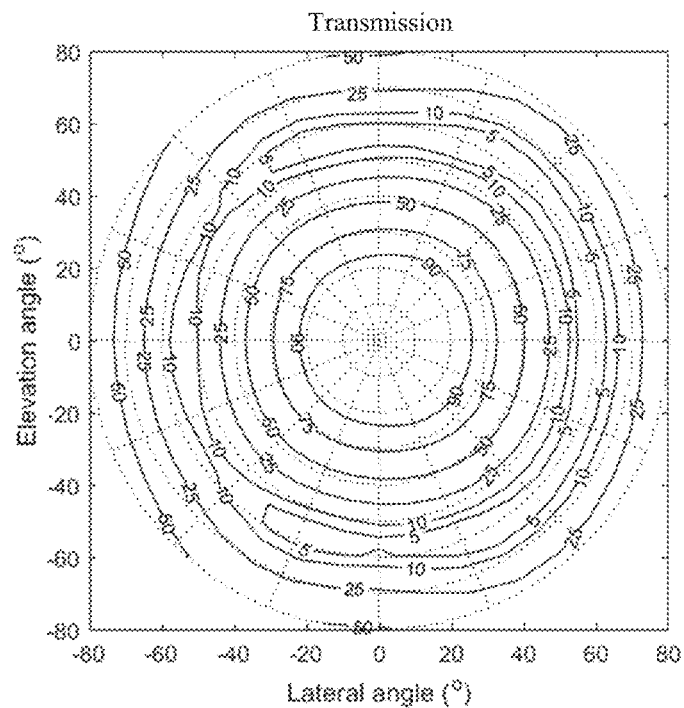
FIG. 4C is a schematic graph illustrating the variation of transmission with polar direction for the transmitted light rays in FIG. 3C.
FIG. 4D is a schematic graph illustrating the variation of reflectivity with polar direction for the transmitted light rays in FIG. 3D.

FIG. 4A is a schematic graph illustrating the variation of transmission with polar direction for the transmitted light rays in FIG. 3A; FIG. 4B is a schematic graph illustrating the variation of reflectivity with polar direction for the transmitted light rays in FIG. 3B; FIG. 4C is a schematic graph illustrating the variation of transmission with polar direction for the transmitted light rays in FIG. 3C; and FIG. 4D is a schematic graph illustrating the variation of reflectivity with polar direction for the transmitted light rays in FIG. 3D.

The effect of the operation of the privacy mode of the display device 100 can therefore be seen. In the public mode shown in FIG. 4A, the transmission is high across a broad range of both lateral and elevation angles. In comparison to this, as shown in FIG. 4C when the display device 100 is operating in privacy mode, the transmission remains high in a tight range of lateral and elevation angles around 0 degrees but quickly reduces as both the lateral angle and elevation angle increases, as shown in FIG. 4C. The reduction in transmittance is substantially symmetrical around the azimuthal angle. The display device 100 may therefore act as a privacy display in both horizontal and vertical directions as a snooper at wide-angles does not receive light transmitted by the display device.

The effect of the privacy mode of the display device 100 can also be seen though a comparison of the reflectivity from the display device 100 in FIGS. 4B and 4D. In the privacy mode shown in FIG. 4D, the reflectivity remains low in a tight range of lateral and elevation angles around the 0 angle, but quickly increases as both the lateral angle and elevation angle increases. The increase in reflectivity is substantially symmetrical around the azimuthal angle. The display device 100 may therefore act as a privacy display in both horizontal and vertical directions as a snooper receives an increase in light reflected from the display device 100 and will therefore not be able to distinguish the image transmitted by the display device at wide-angles.

The schematic graphs illustrated in FIGS. 4A to 4D were obtained using a plurality of retarders 300 comprising the parameters described in TABLE 1A. Desirable ranges for retardations and the other properties of the layers has been established by means of simulation of retarder stacks and experiment with display optical stacks.

TABLE 1A

| LC alignment layers & pretilt directions | LC layer 314 twist | LC layer 314 man:lance (range) | Additional passive retarder 330 type | Additional passive retarder 330 relardance | Polariser orientation |
|---|---|---|---|---|---|
| Homogeneous 45°/315° | 270° | 720 mn (650 nm–800 nm) | Positive C-plate | +200 nm | Parallel |

TABLE 1B

| Retarder | Nominal retardance | Retardance range | Retarder orientation |
| --- | --- | --- | --- |
| Positive A-plate 296A | +135 nm | +110 nm ~ +175 nm | 45° |
| Positive A-plate 296B | +135 nm | +110 nm ~ +175 nm | 135° |

In the embodiment shown in TABLE 1A, the layer 314 of liquid crystal material has a twist 270 degrees and a retardance for light of a wavelength of 550 nm in a range from 650 nm to 800 nm and most preferably in a range from 700 nm to 720 nm. Advantageously desirable symmetric view angle profiles may be achieved for transmission, and for reflectivity in the case that the reflective polariser 302 is provided.

Figure 5A:
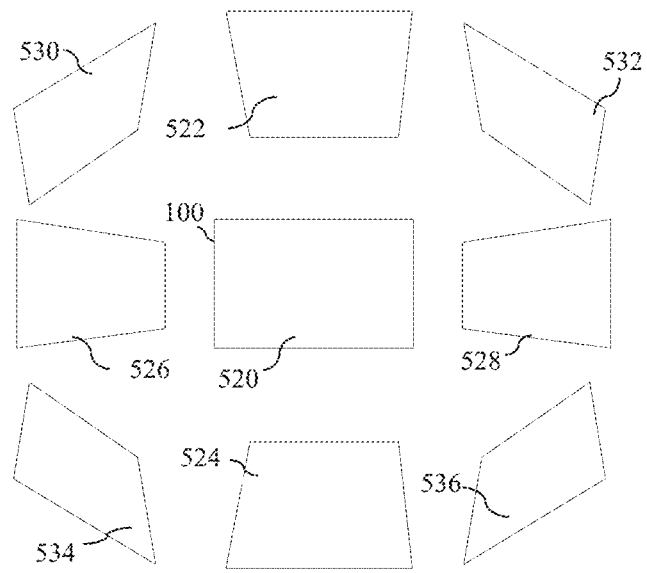
FIG. 5A is a schematic diagram illustrating in front perspective views the appearance of the display of FIG. 1A operating in public mode.

FIG. 5A is a schematic diagram illustrating in front perspective views the appearance of the display device 100 of FIG. 1A operating in public mode.

Figure 5B:
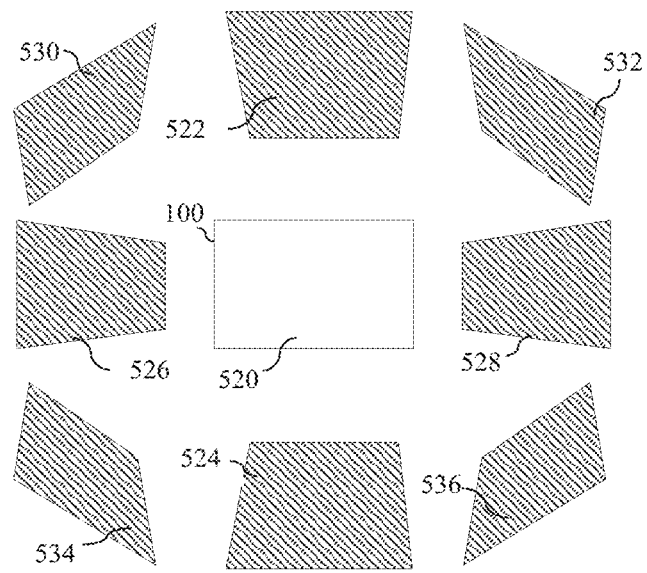
FIG. 5B is a schematic diagram illustrating in front perspective views the appearance of the display of FIG. 1A operating in privacy mode.

FIG. 5B is a schematic diagram illustrating in front perspective views the appearance of the display device 100 of FIG. 1A operating in privacy mode.

In the public mode shown in FIG. 5A, the display device 100 may be viewed at orientations corresponding to upper viewing quadrants 530, 532, lower viewing quadrants 534, 536, lateral viewing positions 526, 528 and lower central viewing regions 522, 524 and the on-axis position 520 without large variations in the luminance of the output light 400 from the display 100. The image emitted by the display 100 as viewed in an on-axis region 520 is therefore visible in all of the orientations as indicated by the white colouring representing the image emitted by the display device 100.

In the privacy mode shown in FIG. 5B, the view of the on-axis region 520 of the display device 100 is unaffected by the change in mode and the image emitted by the display device 100 in the on-axis region is therefore visible. However, for the other viewing regions, the change in mode results in a change in what is visible in these regions. As discussed above, in privacy mode the luminance of transmitted off-axis light 402 is reduced. The image visibility, W of the image emitted by the display device 100 is therefore reduced when viewed from the orientations corresponding to upper viewing quadrants 530, 532, lower viewing quadrants 534, 536, lateral viewing positions 526, 528 and lower central viewing regions 522, 524. In addition to this, as discussed above, in privacy mode the ambient light 604 is reflected off the reflective polariser 302 and exits the display device 100 as an off-axis ray 402 and the luminance of ambient light reflection in the off-axis orientation is therefore increased. Output light 400 from the display device as seen by a snooper viewing the display device 100 at an off-axis orientation therefore is determined by the light reflected by the reflective polariser 302 and output transmission and the display device 100 therefore appears as a mirror in some off-axis orientations.

Figure 6A:
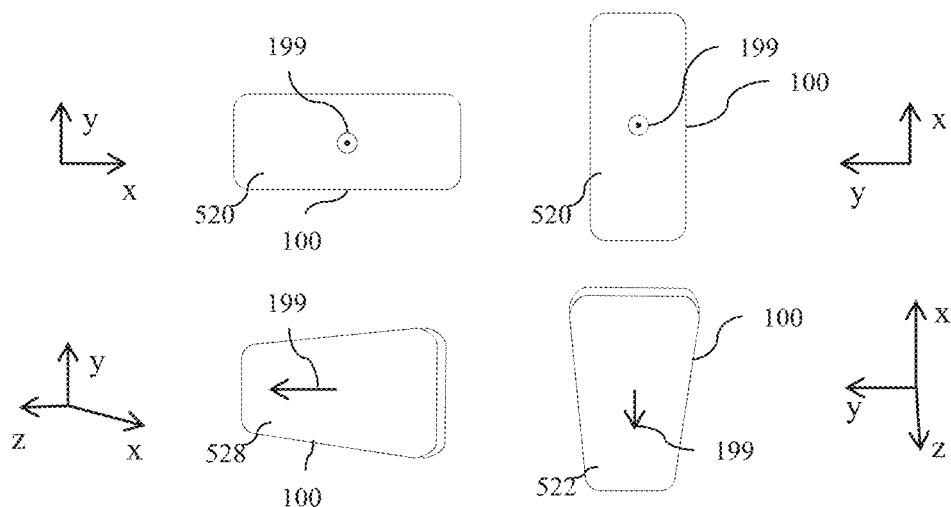
FIG. 6A is a schematic diagram illustrating in perspective views the appearance of luminance of a mobile device in public mode comprising the display of FIG. 1A with appearance shown in order from top left clockwise: head-on landscape, head-on portrait, look-down portrait and look-from-right landscape.

FIG. 6A is a schematic diagram illustrating in perspective views the appearance of luminance of a mobile device in public mode comprising the display device 100 of FIG. 1A with appearance shown in order from top left clockwise: head-on landscape, head-on portrait, look-down portrait and look-from-right landscape.

The viewing direction 199 of the display device 100 is perpendicular to the viewing surface of the display device 100. In all the orientations shown, in public mode the image being emitted by the display device 100 is visible to an observer as represented by the white colouring representing the image emitted by the display device 100. The image is visible in all of an on-axis landscape and portrait orientation 520, a look-down portrait orientation 522 and a look-from-right landscape orientation 528.

Figure 6B:
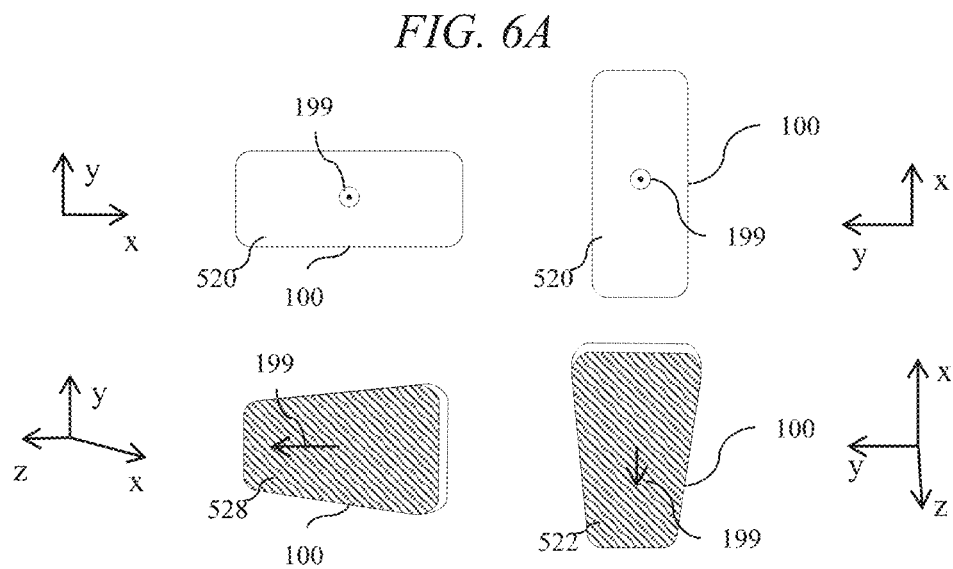
FIG. 6B is a schematic diagram illustrating in perspective views the appearance of luminance of a mobile device in privacy mode comprising the display of FIG. 1A with appearance shown in order from top left clockwise: head-on landscape, head-on portrait, look-down portrait and look-from-right landscape.

FIG. 6B is a schematic diagram illustrating in perspective views the appearance of luminance of a mobile device in privacy mode comprising the display device 100 of FIG. 1A with appearance shown in order from top left clockwise: head-on landscape, head-on portrait, look-down portrait and look-from-right landscape.

In the privacy mode, the view to an observer remains unchanged in the on-axis landscape and portrait orientation 520 and the image emitted by the display device 100 is visible to an observer. However, in the look-down portrait orientation 522 and the look-from-right landscape orientation 528 the image emitted by the display device is no longer visible. A snooper observing from a wide-angle instead observes a mirror-like surface provided by the reflective polariser 302 as described above.

Figure 6C:
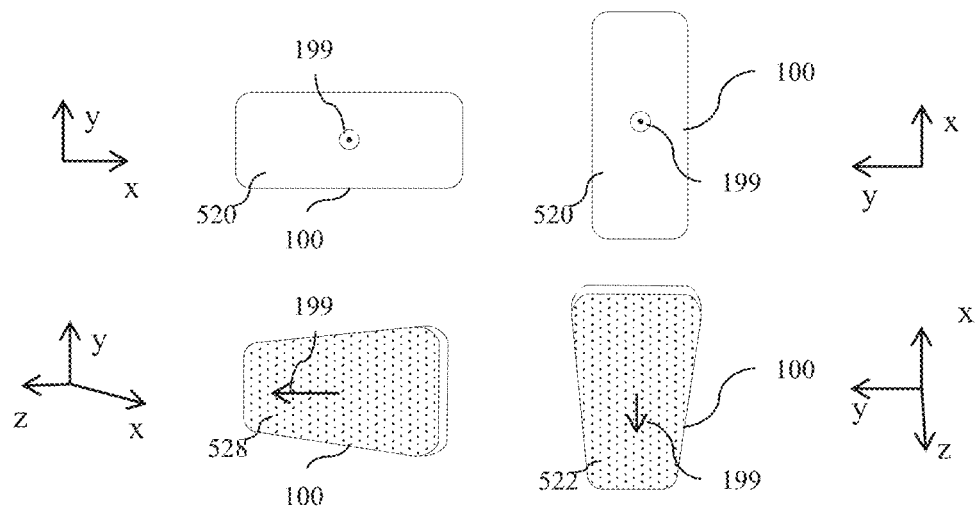
FIG. 6C is a schematic diagram illustrating in perspective views the appearance of reflectivity of a mobile device in privacy mode comprising the display of FIG. 1A with appearance shown in order from top left clockwise: head-on landscape, head-on portrait, look-down portrait and look-from-right landscape.

FIG. 6C is a schematic diagram illustrating in perspective views the appearance of reflectivity of a mobile device in privacy mode comprising the display device 100 of FIG. 1A with appearance shown in order from top left clockwise: head-on landscape, head-on portrait, look-down portrait and look-from-right landscape.

In the privacy mode, the view to an observer remains unchanged in the on-axis landscape and portrait orientation 520 as the reflectivity from the additional polariser 318 is minimal. However, in the look-down portrait orientation 522 and the look-from-right landscape orientation 528, reflections from the surface of the additional polariser 318 may result in frontal reflections as described above, desirably increasing visual security level, VSL.

Figure 7A:
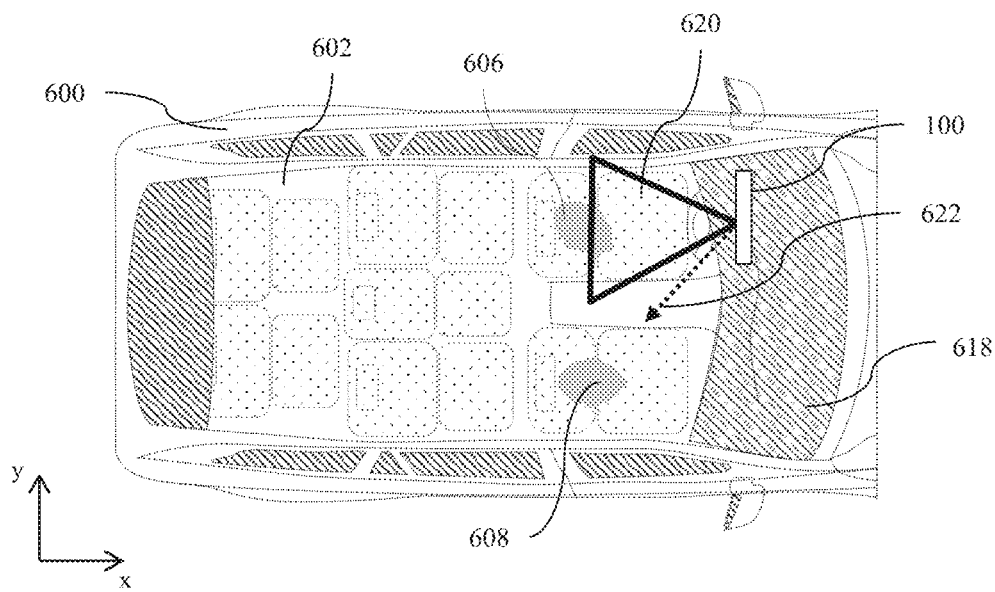
FIG. 7A is a schematic diagram illustrating in top view an automotive vehicle with a switchable directional display arranged within the vehicle cabin in a night mode of operation.

FIG. 7A is a schematic diagram illustrating in top view an automotive vehicle 600 with a switchable directional display 100 arranged within the vehicle cabin 602 in a night mode of operation.

The night mode of the switchable directional display 100 may correspond to the privacy mode discussed above. A light cone 620 (for example representing the cone of light within which the luminance is greater than 50% of the peak luminance emitted by the switchable directional display 100) may indicate the range of angles in which the image emitted by the switchable directional display 100 is discernible. As shown in FIG. 7A, when the switchable directional display 100 is in night mode, the driver 604 falls within the area defined by the light cone 620 in a horizontal direction and the image emitted by the switchable directional display 100 is therefore discernible to the driver 604. In contrast to this, high-angle light rays 622 falling outside the light cone 620 in a horizontal direction have a reduced luminance and the image emitted by the switchable directional display 100 therefore may not be discernible to a passenger 608 in the vehicle 600. This may be advantageous if the passenger is attempting to sleep or relax during the night.

In such an arrangement, the reflective polariser 302 may be omitted if some image visibility to other users is acceptable. Advantageously display efficiency may be increased and visibility of stray light reduced.

Figure 7B:
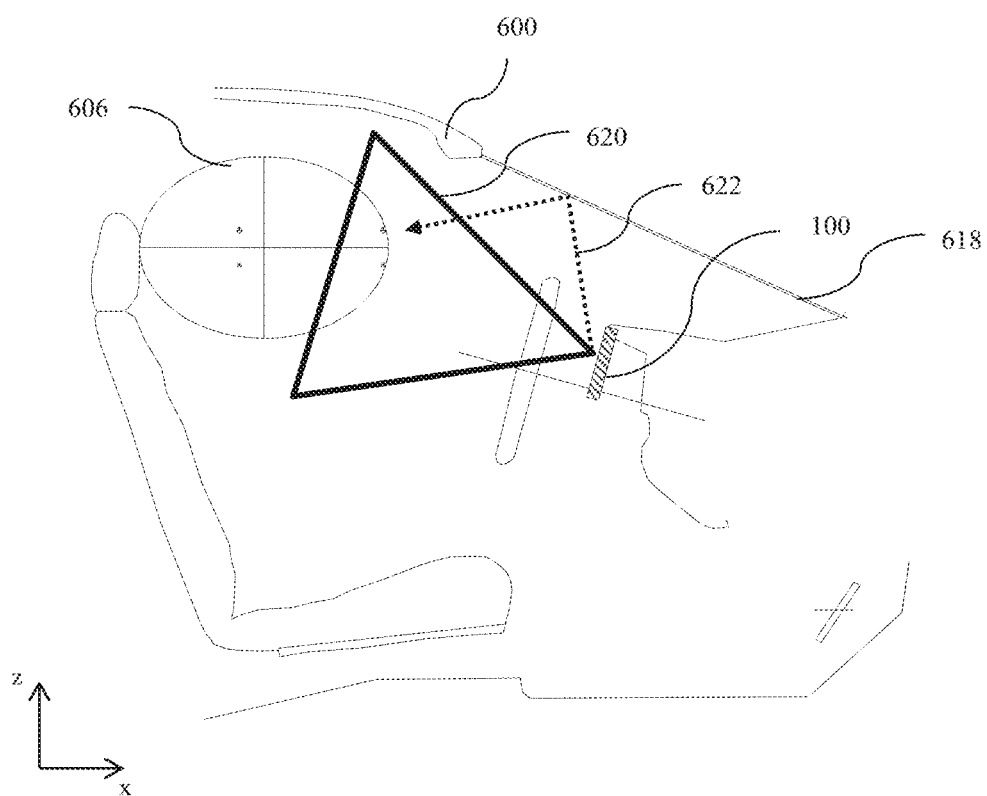
FIG. 7B is a schematic diagram illustrating in side view an automotive vehicle with a switchable directional display arranged within the vehicle cabin in a night mode of operation.

FIG. 7B is a schematic diagram illustrating in side view an automotive vehicle 600 with a switchable directional display 100 arranged within the vehicle cabin 602 in a night mode of operation.

In night mode, the volume 606 occupied by the face of the driver falls within the area defined by the light cone 620 in a vertical direction and the image emitted by the switchable directional display 100 is therefore discernible to the driver in volume 606. However, high-angle light rays 622 falling outside the light cone 620 in a vertical direction may have a reduced luminance in night mode operation. The luminance of high-angle light rays 622 that may reflect off of the windscreen 618 of the automotive vehicle 600 may be reduced. This advantageously may reduce the reflections of the display 100 perceived on the windscreen 618 by the driver in volume 606.

Figure 8A:
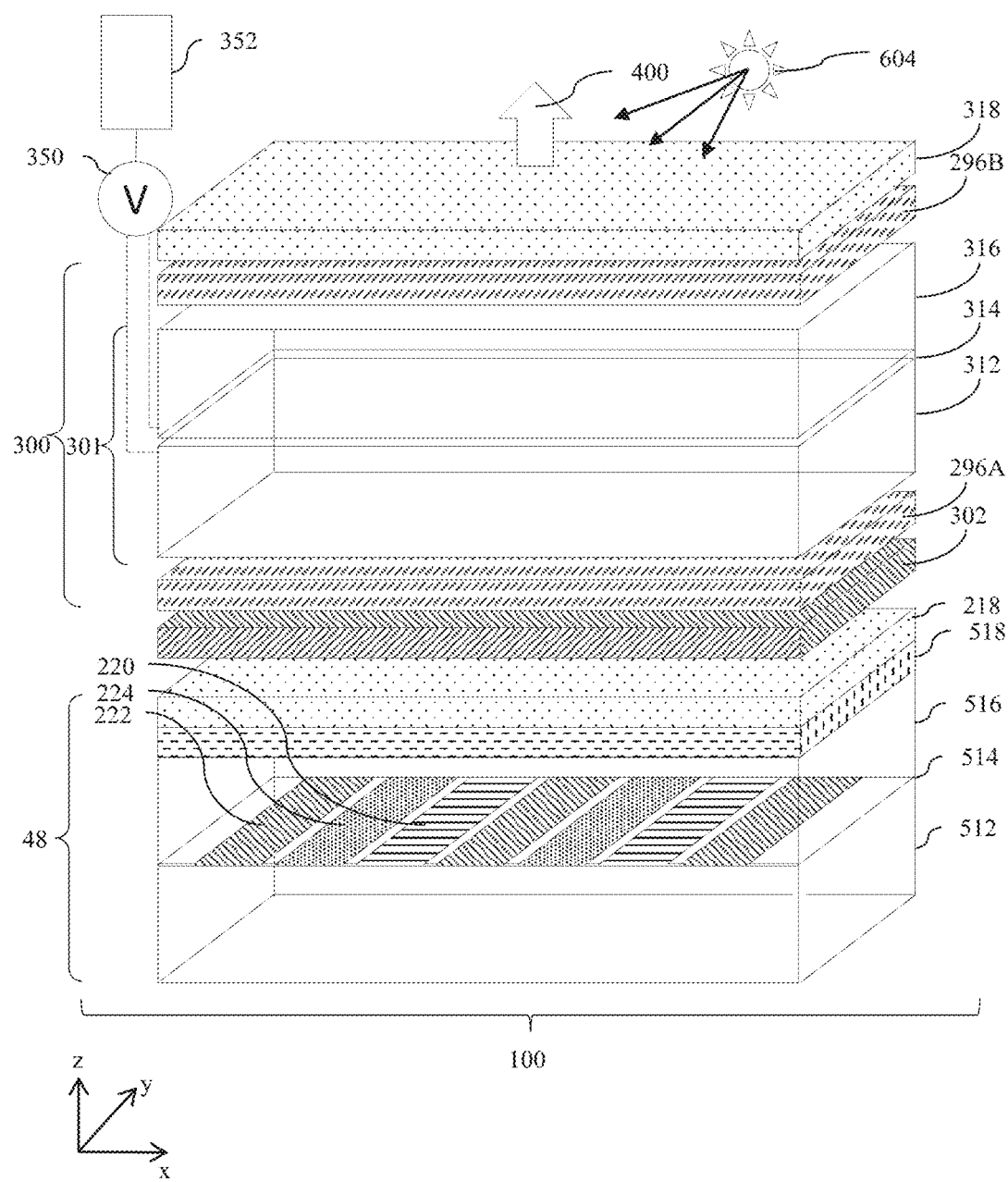
FIG. 8A is a schematic diagram illustrating in side perspective view a switchable privacy display for use in ambient illumination comprising an emissive spatial light modulator and compensated switchable liquid crystal retarder between quarter-wave plates, a reflective polariser and an additional polariser.

FIG. 8A is a schematic diagram illustrating in side perspective view a switchable privacy display 100 for use in ambient illumination 604 comprising an emissive spatial light modulator 48 and switchable liquid crystal retarder 301 between quarter-wave plates 296A, 296B, a reflective polariser 302 and an additional polariser 318.

FIG. 8A depicts an embodiment of the display device 100 in which the spatial light modulator 48 is provided by display types that provide output light 400 by emission, such as organic LED displays (OLED), with output polariser 218. Output polariser 218 may provide reduction of luminance for ambient light reflected from the OLED pixel plane by means of one of more retarders 518 inserted between the output polariser 218 and OLED pixel plane. The one or more retarders 518 may be a quarter-wave plate and is different from any of the plurality of retarders 300 of the present disclosure. Features of the embodiment of FIG. 8A not discussed in further detail may be assumed to correspond to the features with equivalent reference numerals as discussed above, including any potential variations in the features.

Another type of emissive spatial light modulator 48 may be provided by micro-LEDs that are formed as an addressable array of light emitting pixels. The micro-LEDs may be inorganic semiconductors and may have sizes that are less than the respective pixel area. Different semiconductor materials for example GaN and InP as well as electroluminescent quantum dot and quantum rod structures may be used to provide different emission wavelengths. The micro-LED semiconductors may also be formed from the same semiconductor for example directly emitting blue or UV light. The directly emitted light may be converted to other wavelengths by means of a colour conversion material such as a phosphor or quantum dot material. More than one emitting wavelength in a colour band may be provided. Multiple emitting wavelengths per colour band can increase the colour gamut of the display. Further, a yellow emitter may be provided to increase the colour gamut of the display.

The micro-LEDs may be addressed by addressing electrodes and drive circuitry which may be located at or near the micro-LED pixels themselves and may also be located at the periphery of the array. The drive and control circuitry may be portioned between the local micro-LED pixel area and the end of the row and columns. The drive and addressing circuitry may also be located in a plane (e.g. a backplane) in a plane that is different to the plane of the micro-LEDs.

In comparison to FIG. 1A, the compensation retarder 330 is omitted. Such an omission provides variation of the field-of-view profiles. Advantageously thickness, cost and complexity may be reduced.

Figure 8B:
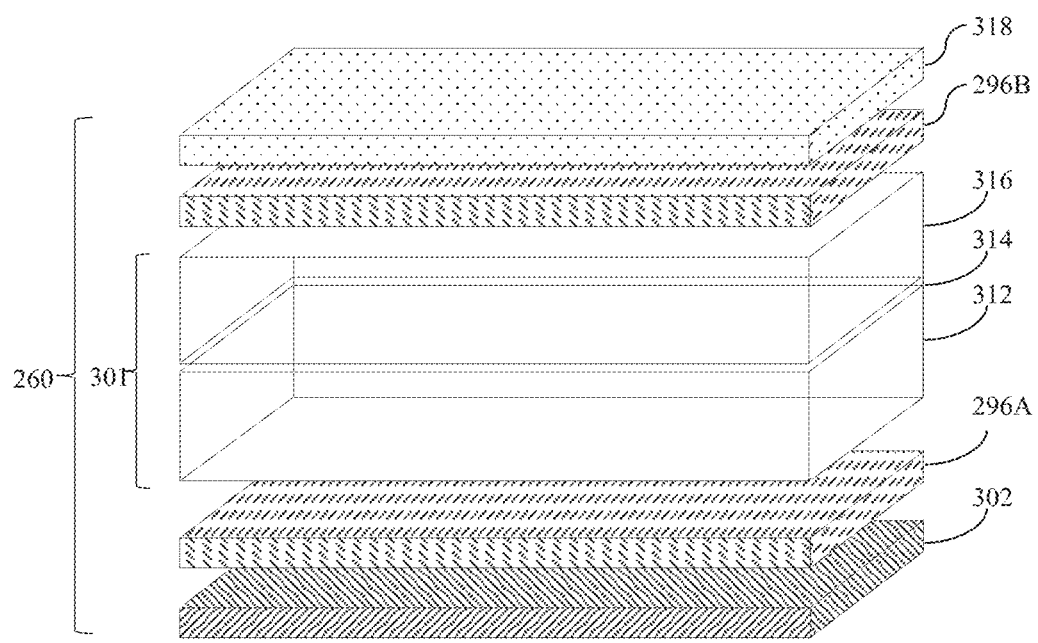
FIG. 8B is a schematic diagram illustrating in side perspective view a view angle control element comprising a reflective polariser, a switchable liquid crystal retarder between quarter-wave plates and an additional polariser.
Figure 8B:
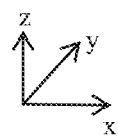

FIG. 8B is a schematic diagram illustrating in side perspective view a view angle control element 260 comprising a reflective polariser 302, a switchable liquid crystal retarder 301 between quarter-wave plates 296A, 296B and an additional polariser 318.

The view angle control optical element 260 is for application to the output side of a display device 100 for use in ambient illumination 604 and comprises a spatial light modulator 48 arranged to output light; wherein the spatial light modulator 48 comprises an output polariser 218 arranged on the output side of the spatial light modulator 48; the view angle control optical element 260 comprises an additional polariser 318; first and second quarter-wave plates 296A and 296B and at least one retarder arranged between the first and second quarter-wave plates 296A and 296B.

The view angle control optical element 260 may further comprise a reflective polariser 302 arranged between the output polariser 218 and the additional polariser 318 on application of the view angle control optical element 260 to the display device 100; the retarders 300 including the first and second quarter-wave plates 296A and 296B and at least one retarder may be arranged between the reflective polariser 302 and the additional polariser 318.

In use, the view angle control optical element 260 may be assembled separately to the other components forming the display device 100. The view angle control optical element 260 may subsequently be attached by a user or may be factory fitted to a polarised output spatial light modulator 48. The view angle control optical element 260 may be provided as a flexible film for curved and bent displays. The view angle control optical element 260 may be provided on a rigid substrate such as a glass substrate.

The view angle control optical element 260 may advantageously provide an after-market privacy control element and/or stray light control element that does not require matching to the panel pixel resolution to avoid Moiré artefacts. By attaching the view angle control optical element 260 of FIG. 8B to an existing display device, it is possible to form a display device 100 as shown in FIGS. 1A-1C.

Figure 9:
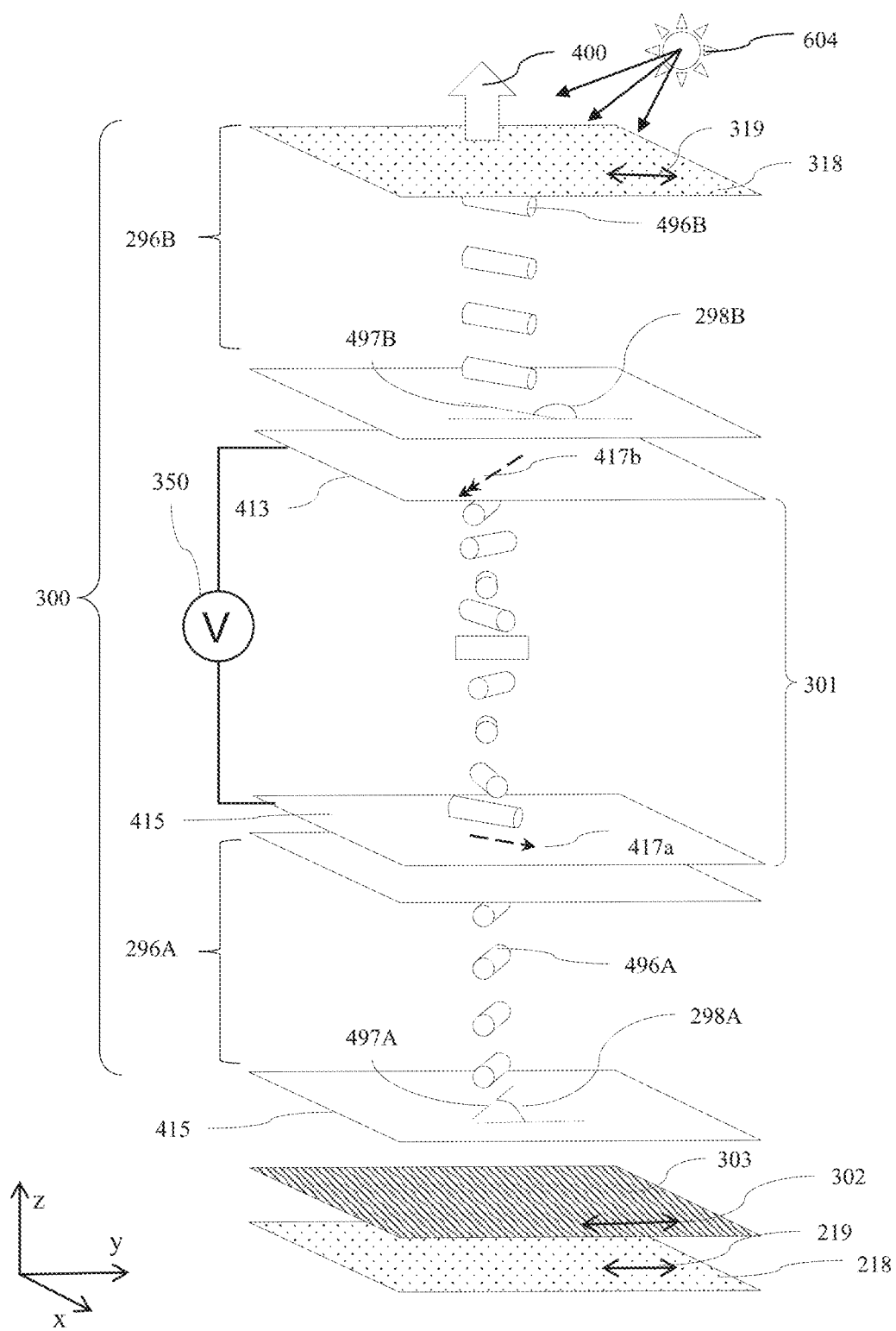
FIG. 9 is a schematic diagram illustrating in perspective side view an arrangement of a retarder layers arranged between parallel polarisers and comprising a 270 degree supertwisted switchable liquid crystal retarder arranged between quarter-wave plates.

FIG. 9 is a schematic diagram illustrating in perspective side view an arrangement of a plurality of retarders 300 arranged between parallel polarisers 218, 318 and comprising a 270 degree supertwisted switchable liquid crystal retarder 301 arranged between quarter-wave plates 296A, 296B.

FIG. 9 shows an arrangement for the plurality of retarders 300 different to the arrangement shown in FIG. 2. The arrangement of the plurality of retarders 300 is the same as for the arrangement shown in FIG. 2 except that the present arrangement does not include the passive retarder 330. Features of the arrangement of FIG. 9 not discussed in further detail may be assumed to correspond to the features with equivalent reference numerals as discussed above, including any potential variations in the features.

Figure 10A:
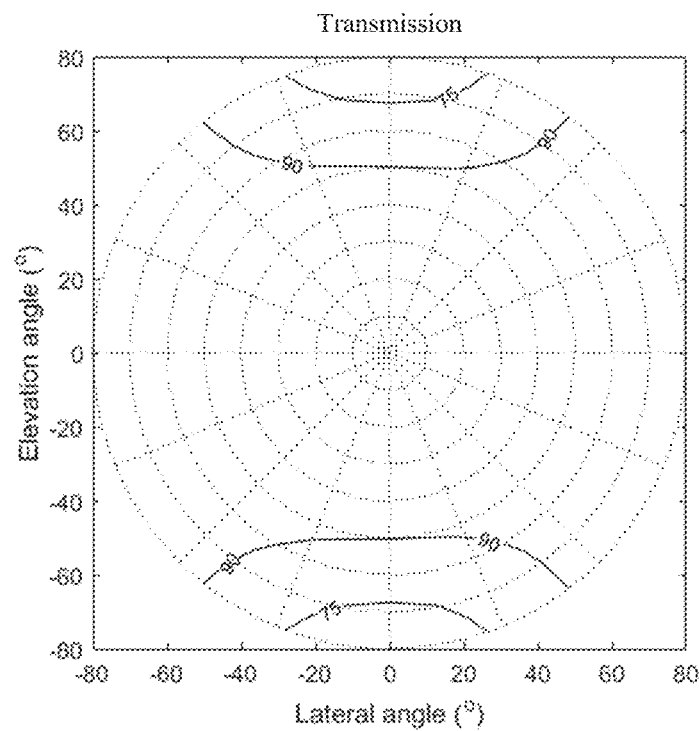
FIG. 10A is a schematic graph illustrating the variation of transmission with polar direction for the transmitted light rays in public mode for the arrangement of FIG. 9 with a 270 degree twist.
Figure 10B:
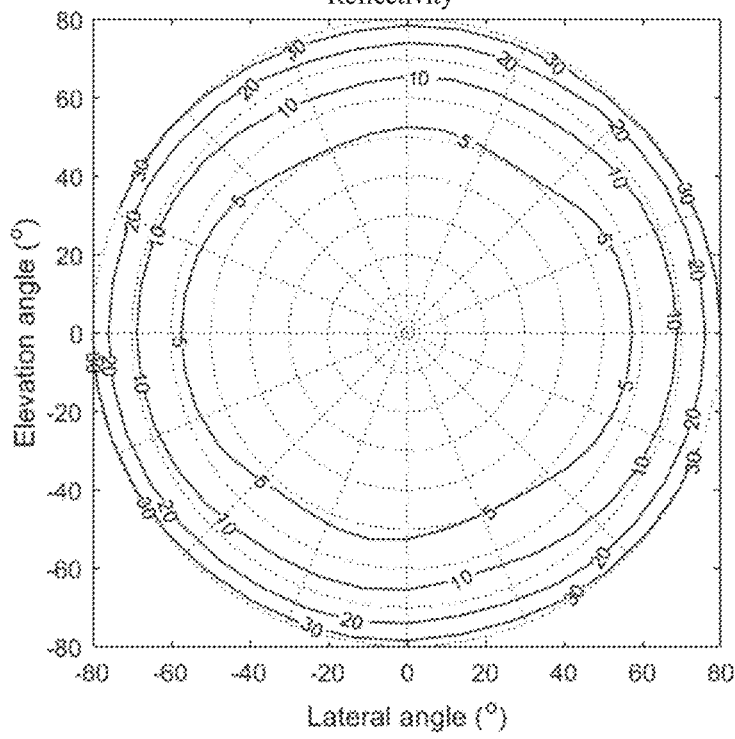
FIG. 10B is a schematic graph illustrating the variation of reflectivity with polar direction for the reflected light rays in public mode for the arrangement of FIG. 9 with a 270 degree twist.
Figure 10C:
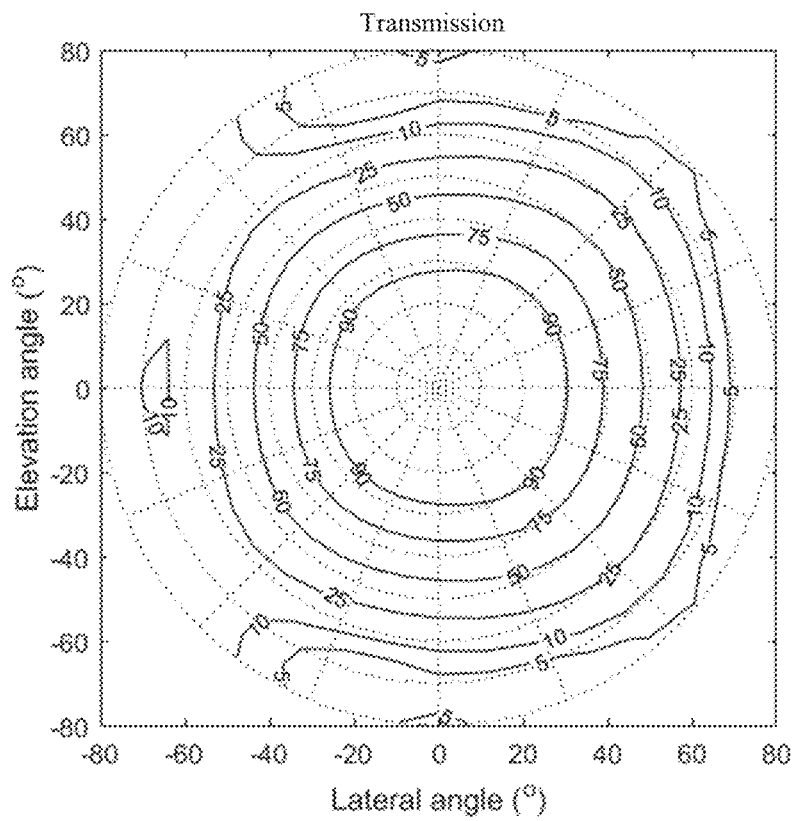
FIG. 10C is a schematic graph illustrating the variation of transmission with polar direction for the transmitted light rays in privacy mode for the arrangement of FIG. 9 with a 270 degree twist.
Figure 10D:
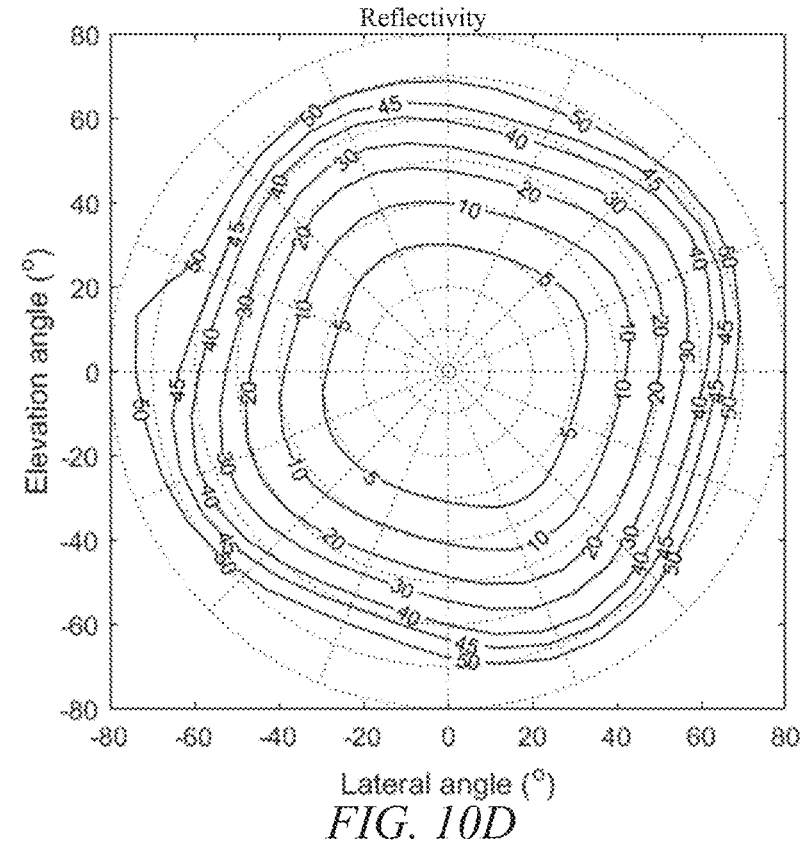
FIG. 10D is a schematic graph illustrating the variation of reflectivity with polar direction for the reflected light rays in privacy mode for the arrangement of FIG. 9 with a 270 degree twist.

FIG. 10A is a schematic graph illustrating the variation of transmission with polar direction for the transmitted light rays in public mode for the arrangement of FIG. 9 with a 270 degree twist; FIG. 10B is a schematic graph illustrating the variation of reflectivity with polar direction for the reflected light rays in public mode for the arrangement of FIG. 9 with a 270 degree twist; FIG. 10C is a schematic graph illustrating the variation of transmission with polar direction for the transmitted light rays in privacy mode for the arrangement of FIG. 9 with a 270 degree twist; and FIG. 10D is a schematic graph illustrating the variation of reflectivity with polar direction for the reflected light rays in privacy mode for the arrangement of FIG. 9 with a 270 degree twist.

It can therefore be seen that the desirable effect of reduced transmission as both lateral angle and elevation angle increase in addition to increased reflection as both lateral angle and elevation angle increase may be advantageously achieved without the presence of a passive retarder 330 in the plurality of retarders 300. Advantageously thickness, complexity and cost may be reduced.

The schematic graphs illustrated in FIGS. 10A to 10D were obtained using a plurality of retarders 300 comprising the parameters described in the first row of TABLE 2A. Desirable ranges for retardations and the other properties of the layers has been established by means of simulation of retarder stacks and experiment with display optical stacks.

Figure 11A:
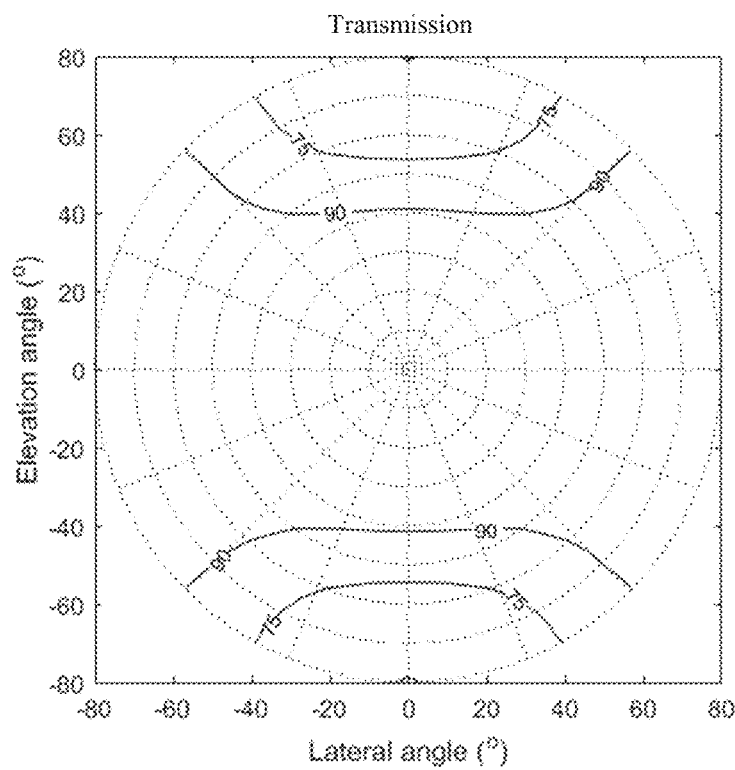
FIG. 11A is a schematic graph illustrating the variation of transmission with polar direction for the transmitted light rays in public mode for the arrangement of FIG. 9 with a 450 degree twist.
Figure 11B:
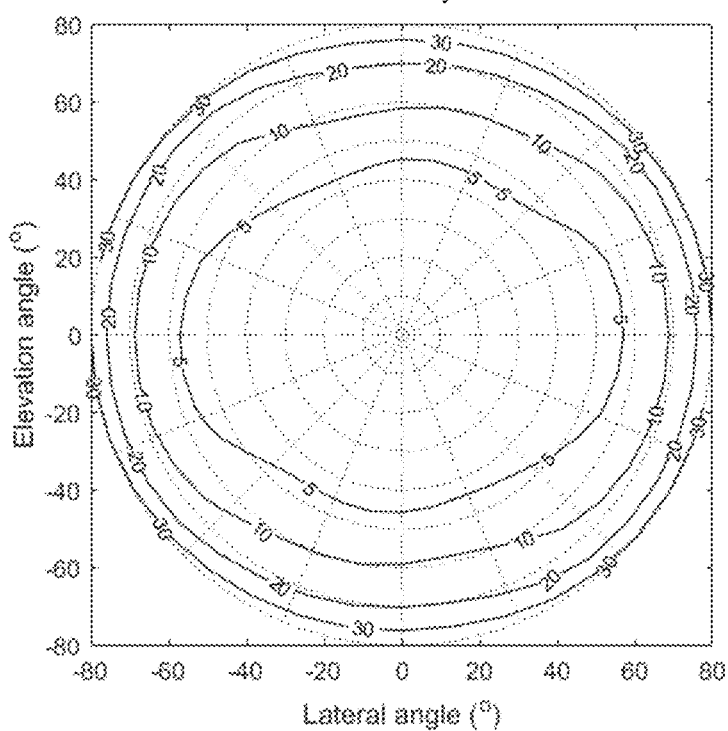
FIG. 11B is a schematic graph illustrating the variation of reflectivity with polar direction for the reflected light rays in public mode for the arrangement of FIG. 9 with a 450 degree twist.
Figure 11C:
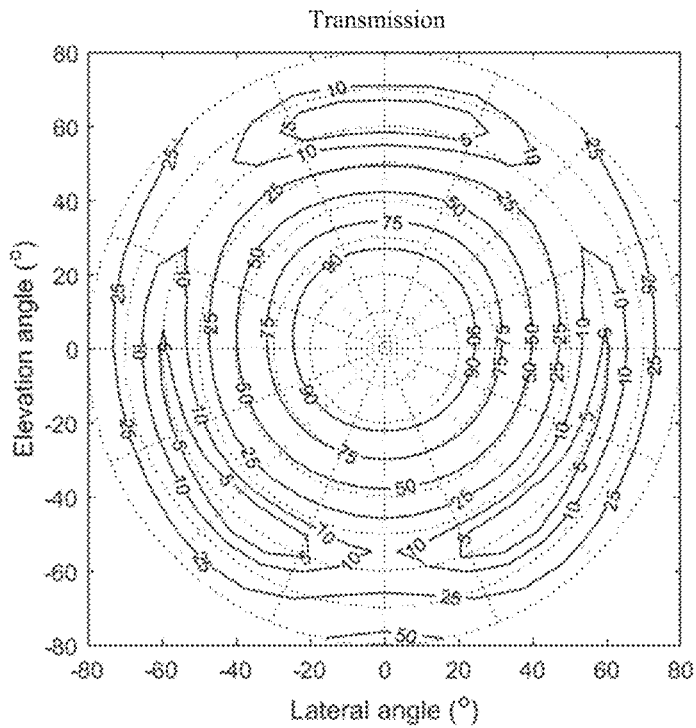
FIG. 11C is a schematic graph illustrating the variation of transmission with polar direction for the transmitted light rays in privacy mode for the arrangement of FIG. 9 with a 450 degree twist.
Figure 11D:
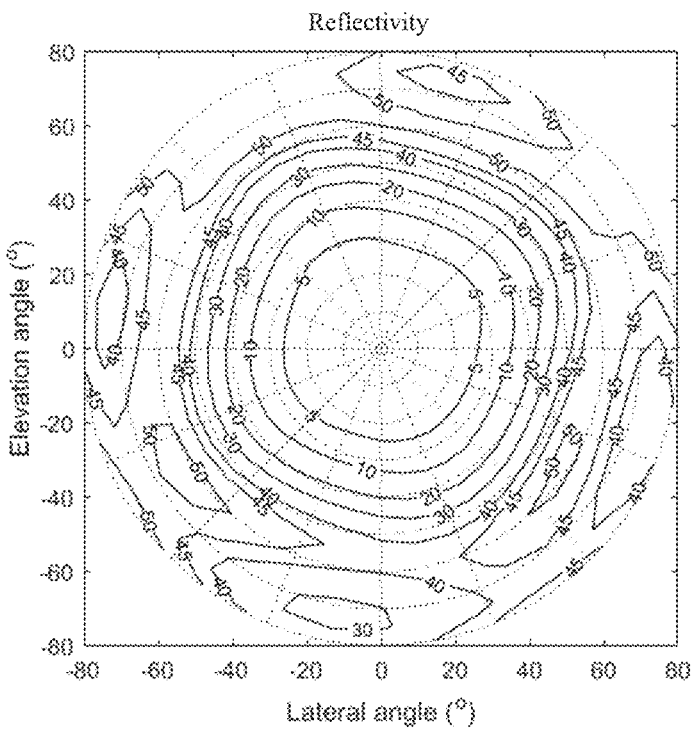
FIG. 11D is a schematic graph illustrating the variation of reflectivity with polar direction for the reflected light rays in privacy mode for the arrangement of FIG. 9 with a 450 degree twist.

FIG. 11A is a schematic graph illustrating the variation of transmission with polar direction for the transmitted light rays in public mode for the arrangement of FIG. 9 with a 450 degree twist; FIG. 11B is a schematic graph illustrating the variation of reflectivity with polar direction for the reflected light rays in public mode for the arrangement of FIG. 9 with a 450 degree twist; FIG. 11C is a schematic graph illustrating the variation of transmission with polar direction for the transmitted light rays in privacy mode for the arrangement of FIG. 9 with a 450 degree twist; and FIG. 11D is a schematic graph illustrating the variation of reflectivity with polar direction for the reflected light rays in privacy mode for the arrangement of FIG. 9 with a 450 degree twist.

It can therefore be seen that the desirable effect of reduced transmission as both lateral angle and elevation angle increase in addition to increased reflection as both lateral angle and elevation angle increase may be advantageously achieved using a liquid crystal material with a 450° twist. In comparison to FIGS. 10C-D, the polar profiles of FIGS. 11C-D achieve more rapid roll-off of transmission and reflectivity with polar angle. Advantageously, increased visual security level, VSL is achieved at smaller polar angles. A snooper cannot see the displayed image at polar angles that are closer to the user, achieving increased privacy effect.

The schematic graphs illustrated in FIGS. 11A to 11D were obtained using a plurality of retarders 300 comprising the parameters described in the second row of TABLE 2A. Desirable ranges for retardations and the other properties of the layers has been established by means of simulation of retarder stacks and experiment with display optical stacks.

TABLE 2A

| LC alignment layers & pretilt directions | LC twist | LC layer 314 retardance (range) | Additional passive retarder 330 | Polariser orientation |
|---|---|---|---|---|
| Homogeneous 45°/315° | 270° | 720 nm (650 nm ~ 800 nm) | – | Parallel |
| Homogeneous 45°/315° | 450° | 900mn (820 nm ~ 1000 nm) | – | Parallel |

In the embodiment corresponding to the first row of TABLE 2A, the layer 314 of liquid crystal material 414 has a twist of 270 degrees and a retardance for light of a wavelength of 550 nm in a range from 650 nm to 800 nm and most preferably in a range from 700 nm to 720 nm.

In the embodiment corresponding to the second row of TABLE 2A, the layer 314 of liquid crystal material 414 has a twist of 450 degrees and a retardance for light of a wavelength of 550 nm in a range from 820 nm to 1000 nm and most preferably in a range from 880 nm to 920 nm.

Figure 12A:
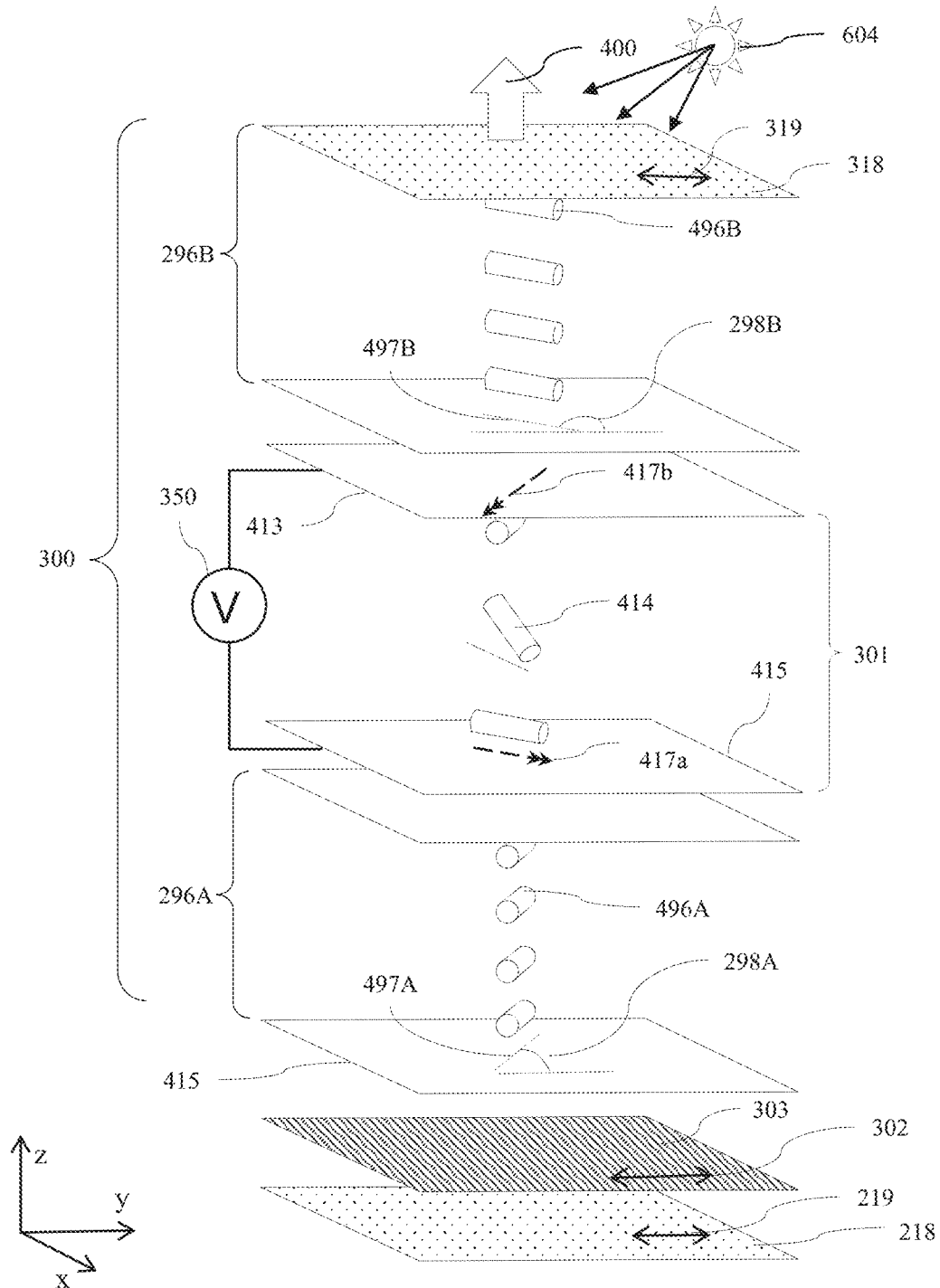
FIG. 12A is a schematic diagram illustrating in perspective side view an arrangement of a switchable liquid crystal retarder comprising a twisted nematic liquid crystal retarder with a 90 degree twist arranged between quarter-wave plates.

FIG. 12A is a schematic diagram illustrating in perspective side view an arrangement of a plurality of retarders 300 arranged between parallel polarisers 218, 318 and comprising a 90° twisted nematic switchable liquid crystal retarder 301 arranged between quarter-wave plates 296A, 296B.

FIG. 12A shows an arrangement for the plurality of retarders 300 that is different to the arrangement shown in FIG. 9. The arrangement of the plurality of retarders 300 is the same as for the arrangement shown in FIG. 9 except that the switchable liquid crystal retarder 301 is twisted nematic layer with a twist of 90 degrees. Features of the arrangement of FIG. 12A not discussed in further detail may be assumed to correspond to the features with equivalent reference numerals as discussed above, including any potential variations in the features.

Figure 12B:
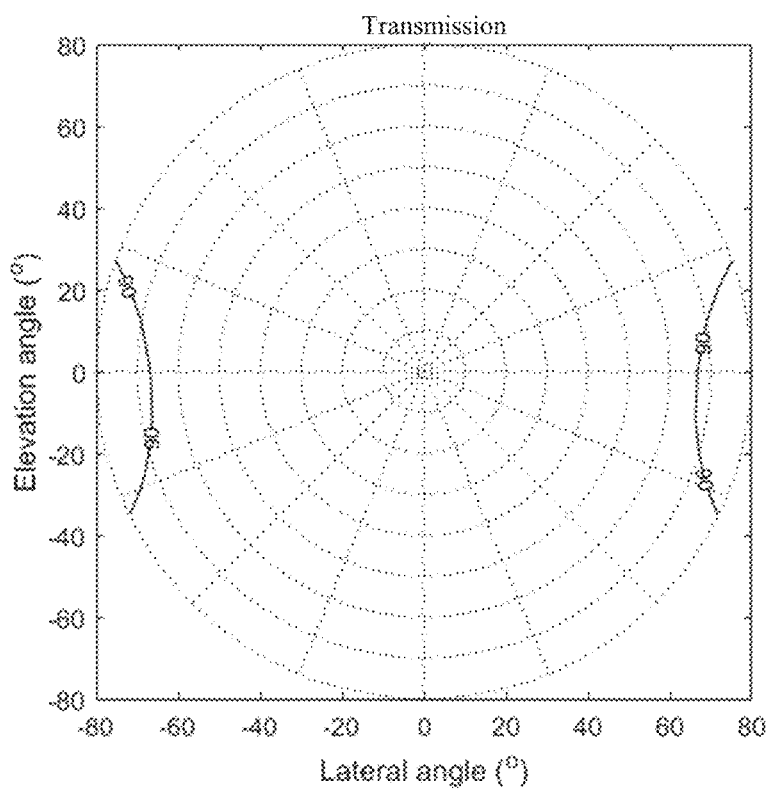
FIG. 12B is a schematic graph illustrating the variation of transmission with polar direction for the transmitted light rays in public mode for the arrangement of FIG. 12A.
Figure 12C:
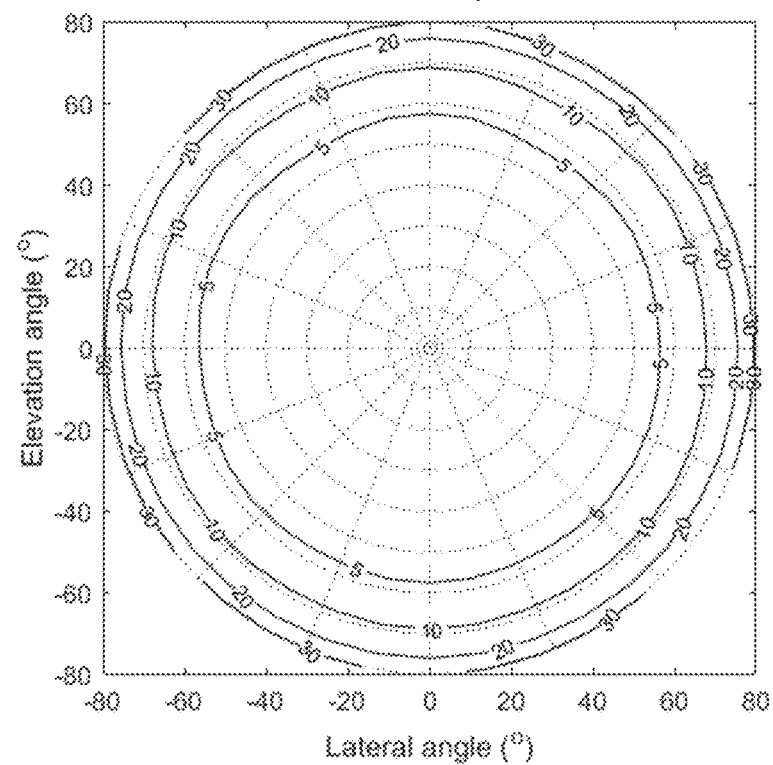
FIG. 12C is a schematic graph illustrating the variation of reflectivity with polar direction for the reflected light rays in public mode for the arrangement of FIG. 12A.
Figure 12D:
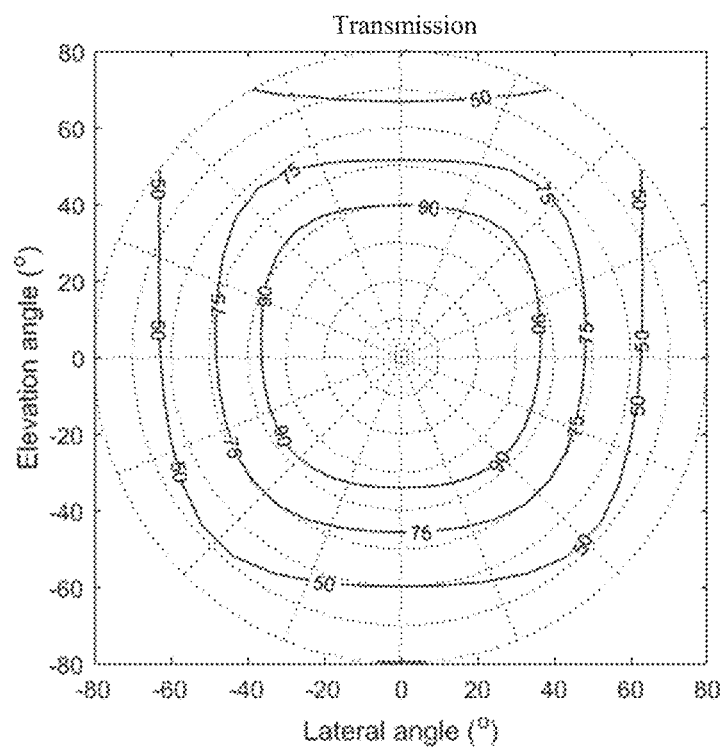
FIG. 12D is a schematic graph illustrating the variation of transmission with polar direction for the transmitted light rays in privacy mode for the arrangement of FIG. 12A.
Figure 12E:
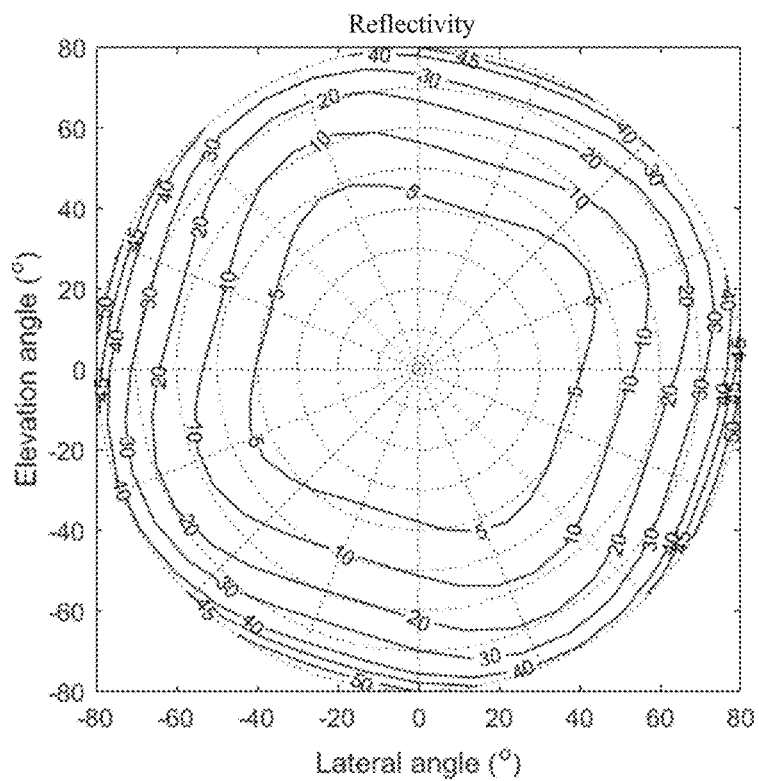
FIG. 12E is a schematic graph illustrating the variation of reflectivity with polar direction for the reflected light rays in privacy mode for the arrangement of FIG. 12A.

FIG. 12B is a schematic graph illustrating the variation of transmission with polar direction for the transmitted light rays in public mode for the arrangement of FIG. 12A; FIG. 12C is a schematic graph illustrating the variation of reflectivity with polar direction for the reflected light rays in public mode for the arrangement of FIG. 12A; FIG. 12D is a schematic graph illustrating the variation of transmission with polar direction for the transmitted light rays in privacy mode for the arrangement of FIG. 12A; and FIG. 12E is a schematic graph illustrating the variation of reflectivity with polar direction for the reflected light rays in privacy mode for the arrangement of FIG. 12A.

It can therefore be seen that the desirable effect of reduced transmission as both lateral angle and elevation angle increase in addition to increased reflection as both lateral angle and elevation angle increase may be advantageously achieved using a liquid crystal material with a 90 degree twist. In comparison to the supertwisted embodiments described above, a polar profile that is narrowest in elevation and lateral directions is provided. Such a profile may advantageously provide reduced stray light in lateral and vertical directions, for example when used in an automotive application where reduced stray light to windscreen and side windows is desirable.

The schematic graphs illustrated in FIGS. 12B-E were obtained using a plurality of retarders 300 comprising the parameters described in the first row of TABLE 2B. Desirable ranges for retardations and the other properties of the layers has been established by means of simulation of retarder stacks and experiment with display optical stacks.

Figure 13A:
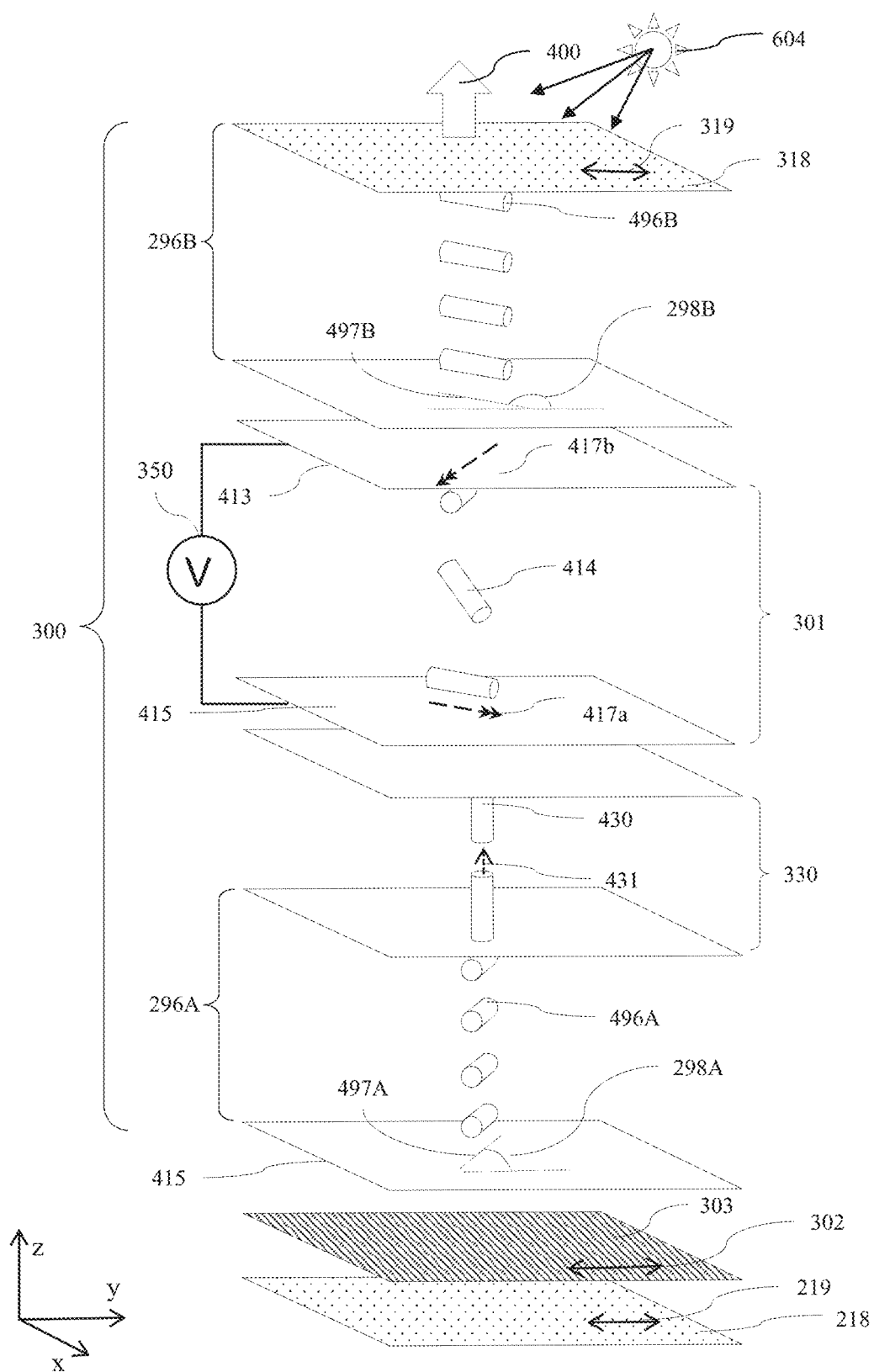
FIG. 13A is a schematic diagram illustrating in perspective side view an arrangement of a switchable liquid crystal retarder comprising a twisted nematic liquid crystal retarder with a 90 degree twist and positive C-plate compensation retarder arranged between quarter-wave plates.

FIG. 13A is a schematic diagram illustrating in perspective side view an arrangement of a plurality of retarders 300 arranged between parallel polarisers 218, 318 comprising a twisted nematic liquid crystal retarder 301 with a 90 degree twist and positive C-plate compensation retarder 330 arranged between quarter-wave plates 296A and 296B.

FIG. 13A shows an arrangement for the plurality of retarders 300 that is different to the arrangement shown in FIG. 12A. The arrangement of the plurality of retarders 300 is the same as for the arrangement shown in FIG. 12A except that the present arrangement includes a passive retarder 330. The passive retarder 330 may include any of the features discussed for the passive retarder 330 included in the arrangement of FIG. 2 discussed above. Features of the arrangement of FIG. 13A not discussed in further detail may be assumed to correspond to the features with equivalent reference numerals as discussed above, including any potential variations in the features.

Figure 13B:
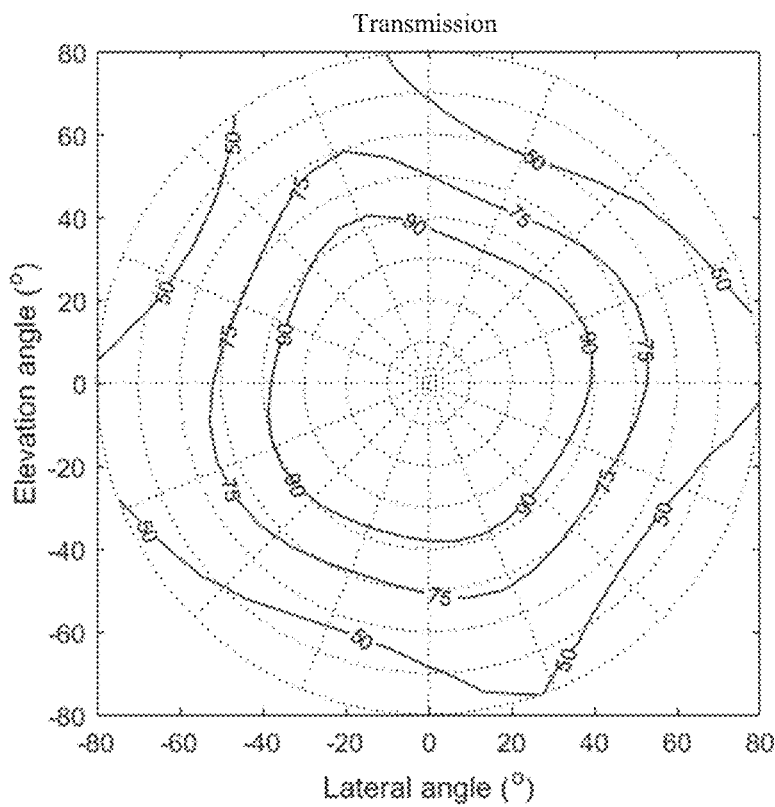
FIG. 13B is a schematic graph illustrating the variation of transmission with polar direction for the transmitted light rays in public mode for the arrangement of FIG. 13A.
Figure 13C:
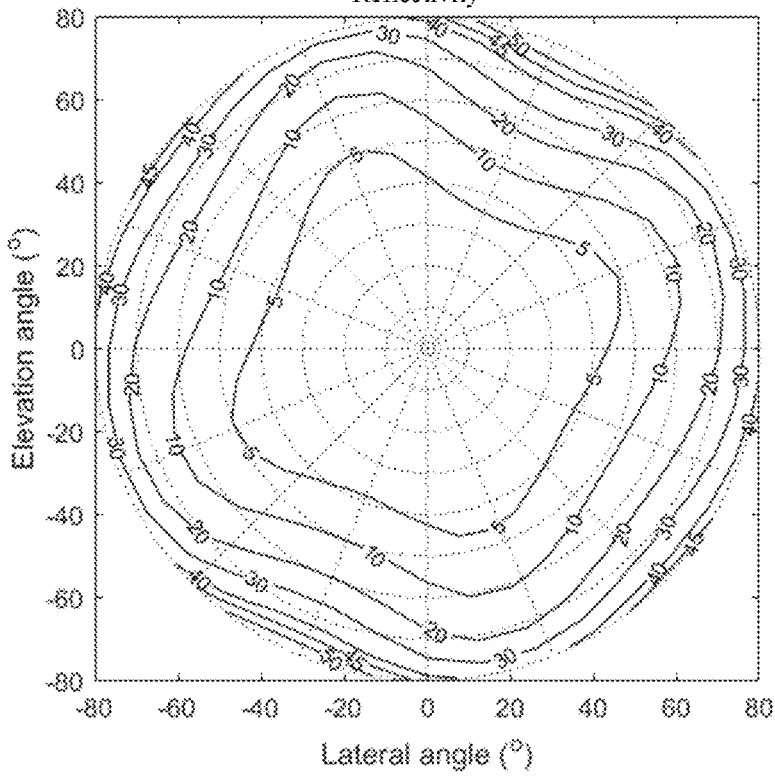
FIG. 13C is a schematic graph illustrating the variation of reflectivity with polar direction for the reflected light rays in public mode for the arrangement of FIG. 13A.
Figure 13D:
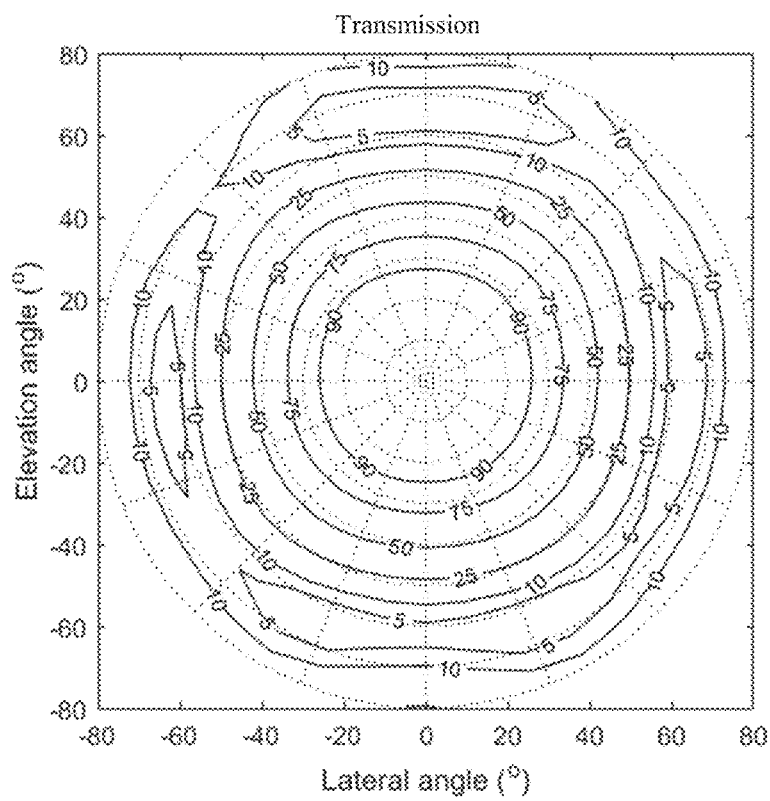
FIG. 13D is a schematic graph illustrating the variation of transmission with polar direction for the transmitted light rays in privacy mode for the arrangement of FIG. 13A.
Figure 13E:
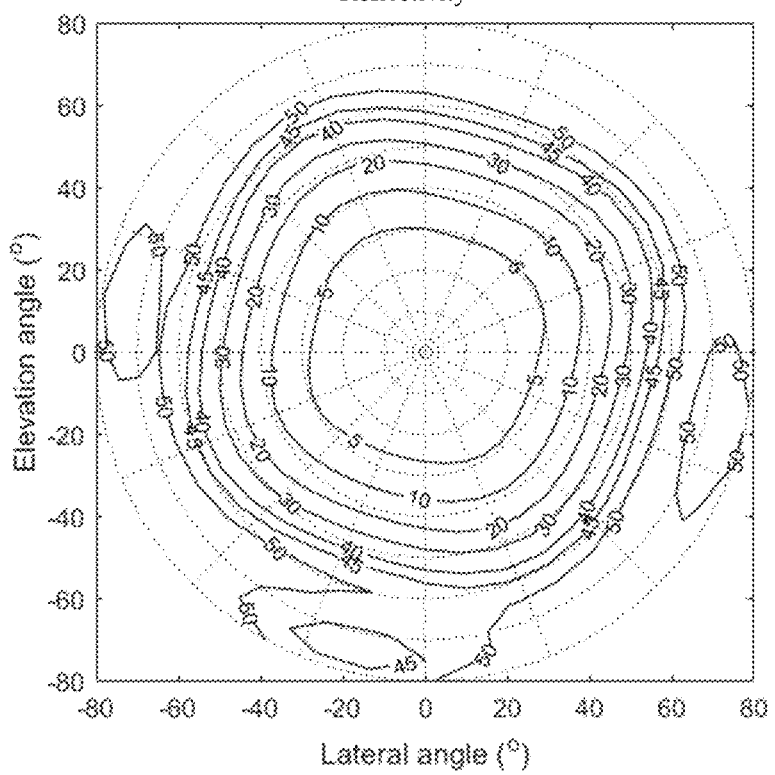
FIG. 13E is a schematic graph illustrating the variation of reflectivity with polar direction for the reflected light rays in privacy mode for the arrangement of FIG. 13A.

FIG. 13B is a schematic graph illustrating the variation of transmission with polar direction for the transmitted light rays in public mode for the arrangement of FIG. 13A; FIG. 13C is a schematic graph illustrating the variation of reflectivity with polar direction for the reflected light rays in public mode for the arrangement of FIG. 13A; FIG. 13D is a schematic graph illustrating the variation of transmission with polar direction for the transmitted light rays in privacy mode for the arrangement of FIG. 13A; FIG. 13E is a schematic graph illustrating the variation of reflectivity with polar direction for the reflected light rays in privacy mode for the arrangement of FIG. 13A.

In a similar manner to the inclusion of the passive retarder 330 in the plurality of retarders 300 in the arrangement of FIG. 2, the passive retarder 330 in the present arrangement may provide a second-order improvement of the output of the display device 100. The presence of the at least one passive retarder 330 in addition to the switchable liquid crystal retarder 301 may improve the chromaticity of the output of the display device 100.

The schematic graphs illustrated in FIGS. 13B-E were obtained using a plurality of retarders 300 comprising the parameters described in the second row of TABLE 2B. Desirable ranges for retardations and the other properties of the layers has been established by means of simulation of retarder stacks and experiment with display optical stacks.

TABLE 2B

| LC alignment layers & pretilt directions | LC twist | LC retardance (range) | Additional passive retarder | Polariser orientation |
|---|---|---|---|---|
| Homogeneous 45°/315° | 90° | 470 nm (650 nm ~ 800 nm) | – | Parallel |
| Homogeneous 45°/315° | 90° | 470 nm (820 nm ~ 1000 nm) | C-plate +400 nm | Parallel |

In the embodiment corresponding to the first and second row of TABLE 2B the layer of liquid crystal material has a twist of 90 degrees and a retardance for light of a wavelength of 550 nm in a range from 420 nm to 550 nm and most preferably in a range from 460 nm to 480 nm. In the embodiment corresponding to the second row, the plurality of retarders 300 further comprises a passive retarder 330.

The compensation retarder 330 advantageously achieves increased visual security level at polar angles that are smaller than for uncompensated structure of FIG. 12A. Privacy performance is improved.

In privacy mode, it may be desirable to achieve a minimum transmission, and where a reflective polariser 302 is provided, to achieve a maximum reflectivity at lower polar angles than those illustrated in FIGS. 10C-D for example.

Figure 14A:
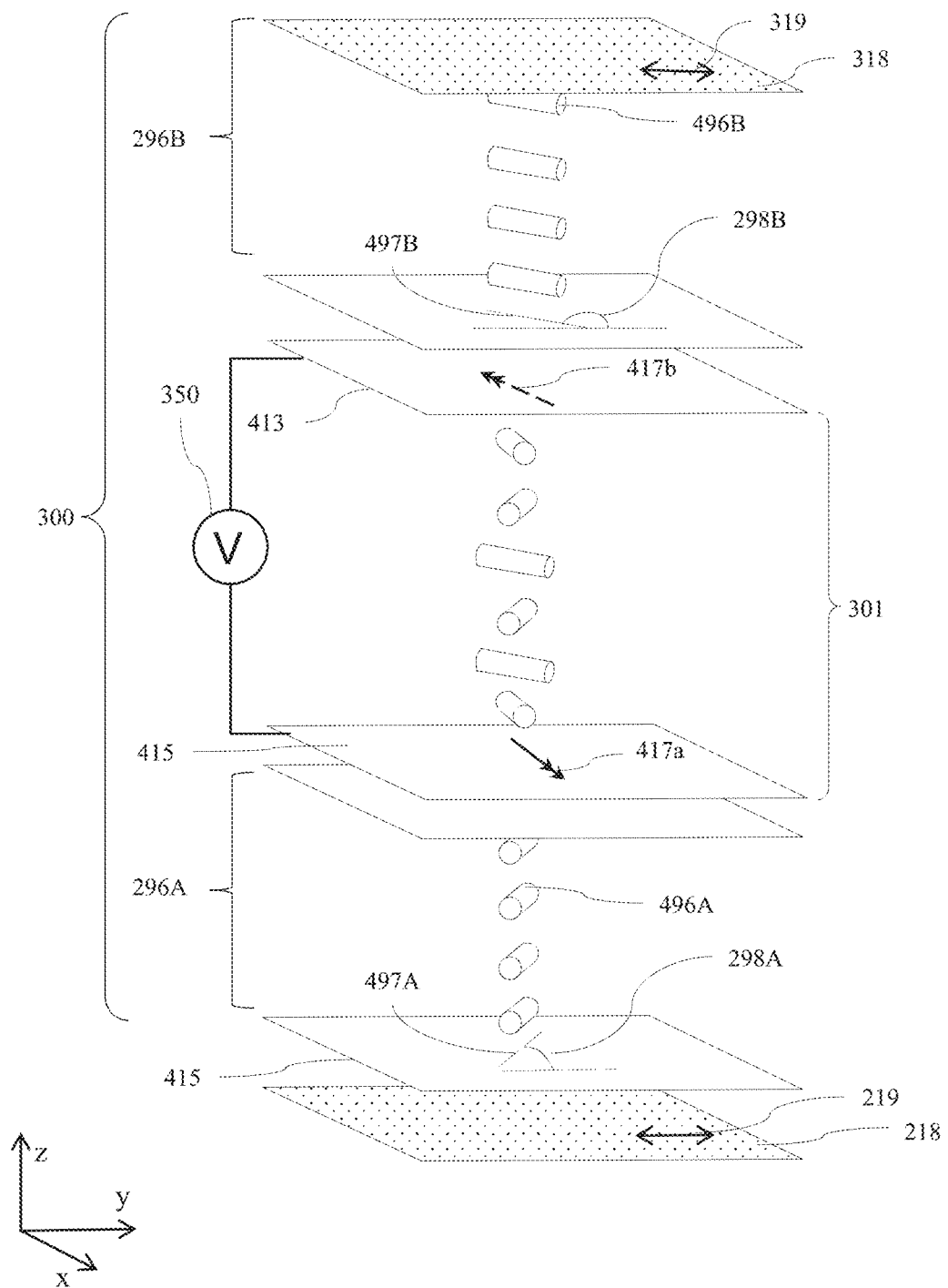
FIG. 14A is a schematic diagram illustrating in perspective side view an arrangement of a switchable liquid crystal retarder comprising a twisted nematic liquid crystal retarder with a 360 degree twist arranged between quarter-wave plates.

FIG. 14A is a schematic diagram illustrating in perspective side view an arrangement of a switchable liquid crystal retarder 301 comprising a twisted nematic liquid crystal retarder with a 360 degree twist arranged between quarter-wave plates 296A, 296B. Features of the arrangement of FIG. 14A not discussed in further detail may be assumed to correspond to the features with equivalent reference numerals as discussed above, including any potential variations in the features.

Figure 14B:
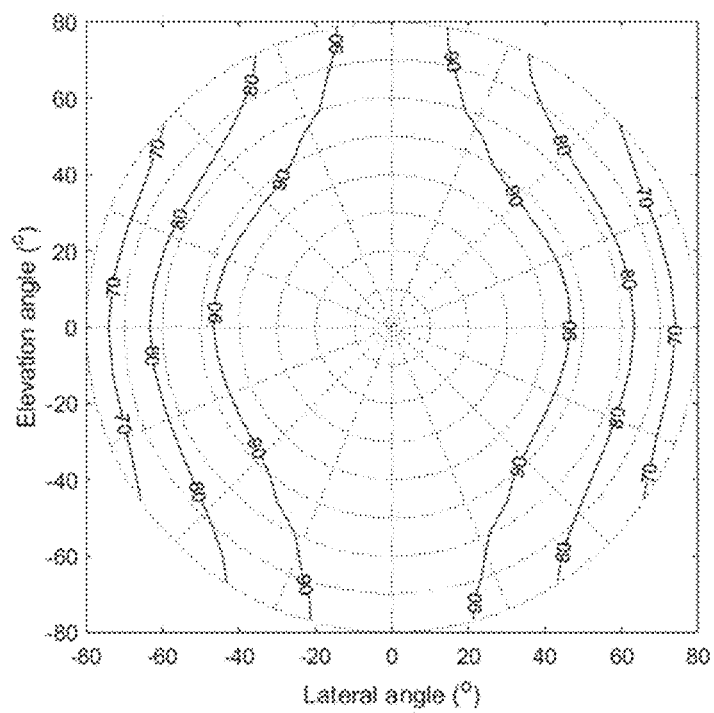
FIG. 14B is a schematic graph illustrating the variation of transmission with polar direction for the transmitted light rays in public mode for the arrangement of FIG. 14A.
Figure 14C:
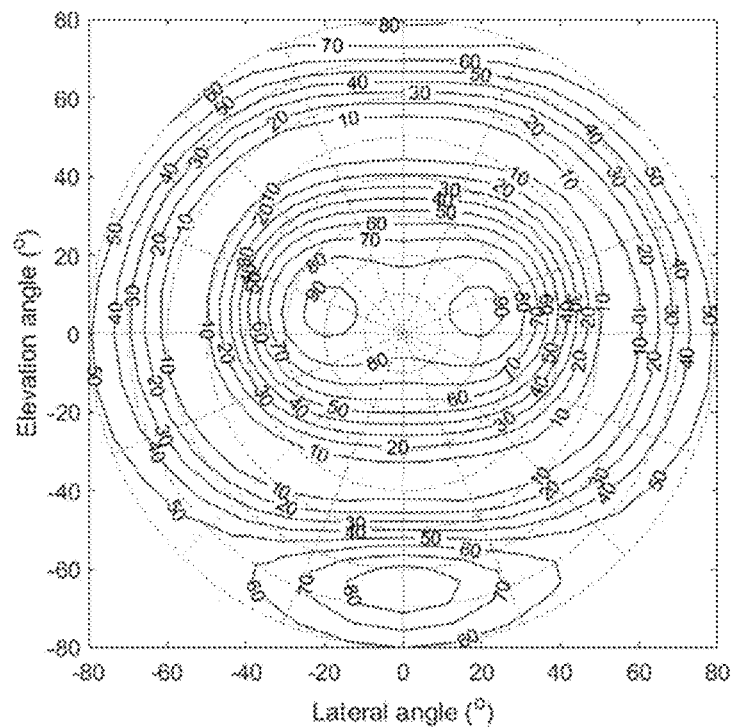
FIG. 14C is a schematic graph illustrating the variation of transmission with polar direction for the transmitted light rays in privacy mode for the arrangement of FIG. 14A.

FIG. 14B is a schematic graph illustrating the variation of transmission with polar direction for the transmitted light rays in public mode for the arrangement of FIG. 14A; and FIG. 14C is a schematic graph illustrating the variation of transmission with polar direction for the transmitted light rays in privacy mode for the arrangement of FIG. 14A wherein the schematic graphs illustrated in FIGS. 14B-C were obtained using a plurality of retarders 300 comprising the parameters described in the first row of TABLE 3.

TABLE 3

| LC alignment layers & pretilt directions | LC twist | LC retardance (range) | Additional passive retarder | Polariser orientation |
|---|---|---|---|---|
| Homogeneous 90°/90° | 360° | 1220 nm (1100 nm ~ 1400 nm) | – | Parallel |
| Homogeneous 22.5°/247.5° | 225° | 1000mn (750 nm ~ 1200 nm) | – | Parallel |

The layer of liquid crystal material has a twist of 360 degrees and a retardance for light of a wavelength of 550 nm in a range from 1100 nm to 1400 nm and most preferably in a range from 1150 nm to 1300 nm. Advantageously minimum luminance may be achieved at polar angles of 55 degrees in the lateral direction and 50 degrees in the elevation direction. Such a display may be provided to achieve different polar angles for optimum privacy in landscape and portrait operation, for example FIG. 14C may illustrate the operation in landscape orientation. Advantageously lateral uniformity may be increased in landscape mode and maximum privacy achieved in portrait mode.

It may be desirable to provide some rotational symmetry in the luminance reduction, for example in fixed orientation displays such as desktop monitor displays and notebook displays. Embodiments may be provided with twists that are different to those defined by eqn. 14.

Figure 15A:
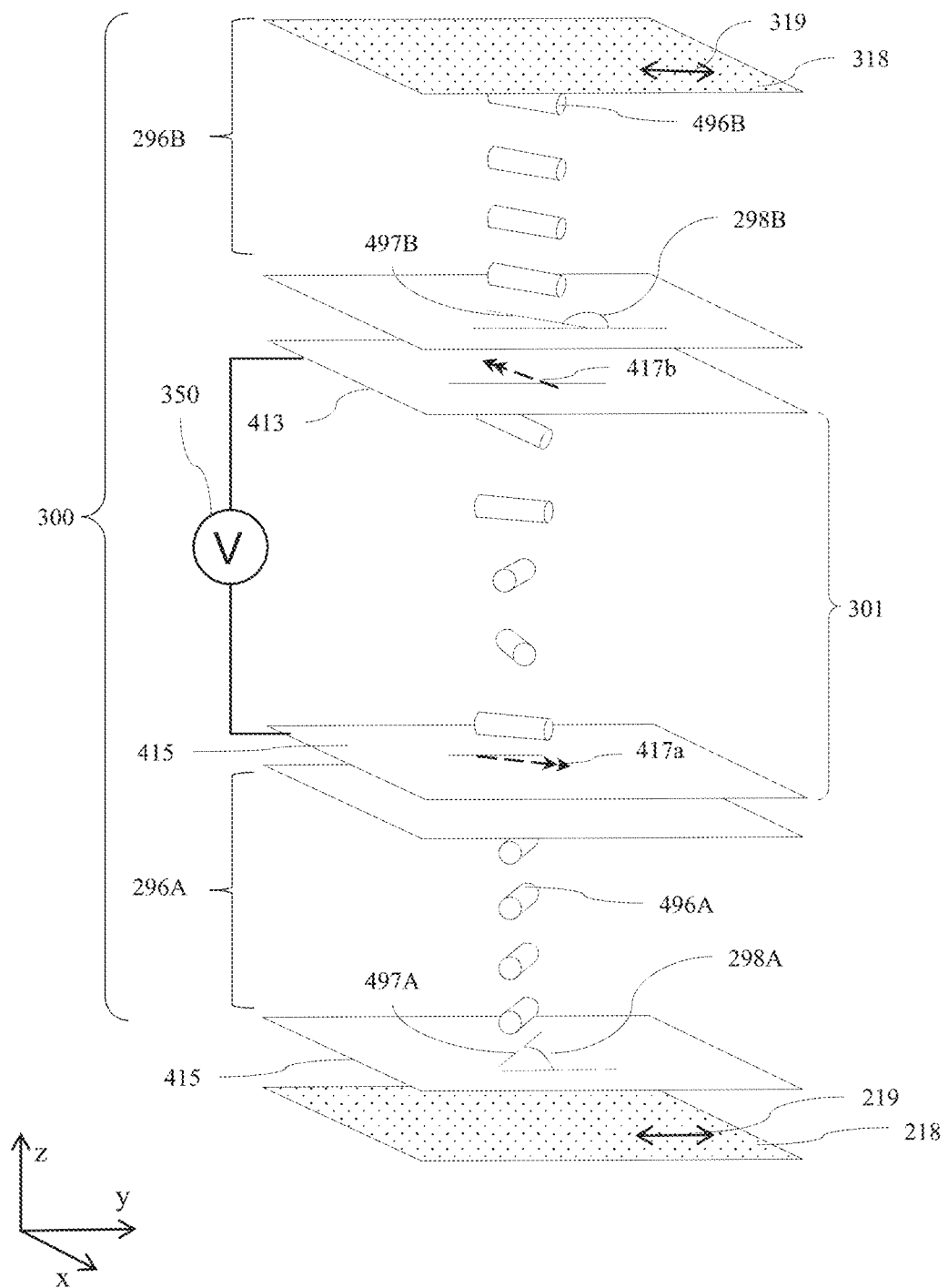
FIG. 15A is a schematic diagram illustrating in perspective side view an arrangement of a switchable liquid crystal retarder comprising a twisted nematic liquid crystal retarder with a 225 degree twist arranged between quarter-wave plates.

FIG. 15A is a schematic diagram illustrating in perspective side view an arrangement of a switchable liquid crystal retarder comprising a twisted nematic liquid crystal retarder with a 225 degree twist arranged between quarter-wave plates. Features of the arrangement of FIG. 15A not discussed in further detail may be assumed to correspond to the features with equivalent reference numerals as discussed above, including any potential variations in the features.

Figure 15B:
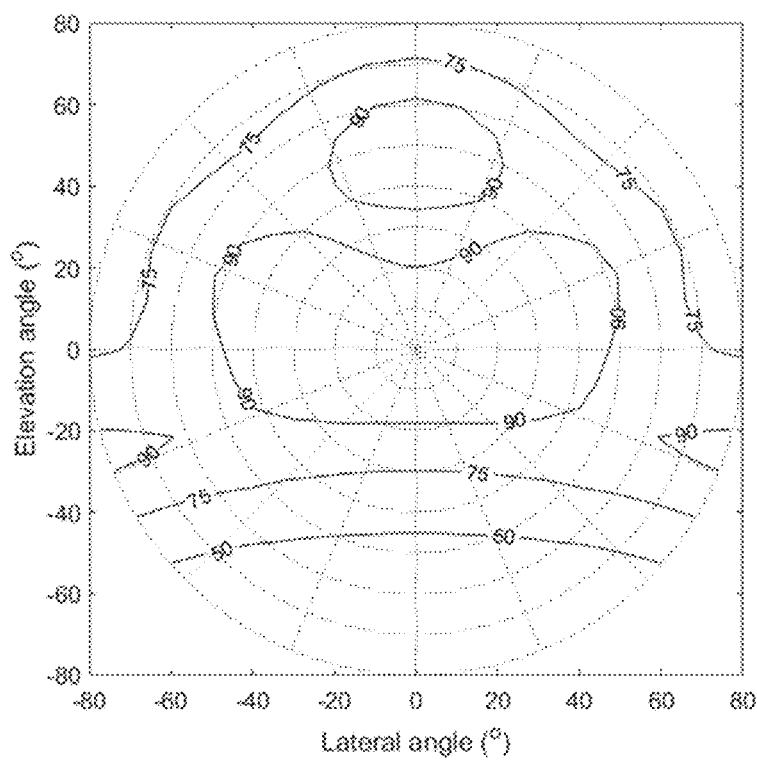
FIG. 15B is a schematic graph illustrating the variation of transmission with polar direction for the transmitted light rays in public mode for the arrangement of FIG. 15A.
Figure 15C:
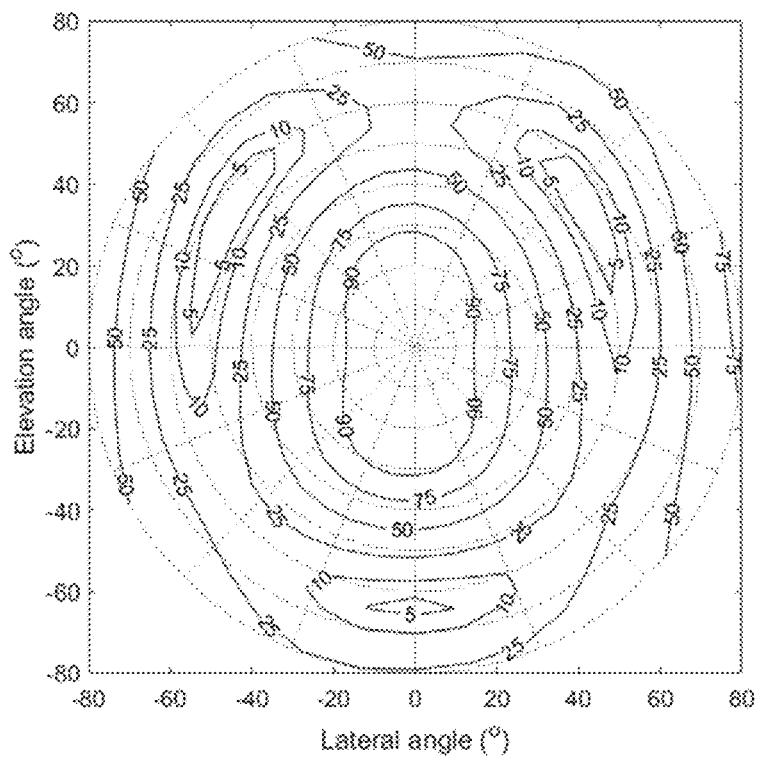
FIG. 15C is a schematic graph illustrating the variation of transmission with polar direction for the transmitted light rays in privacy mode for the arrangement of FIG. 15A.

FIG. 15B is a schematic graph illustrating the variation of transmission with polar direction for the transmitted light rays in public mode for the arrangement of FIG. 15A; and FIG. 15C is a schematic graph illustrating the variation of transmission with polar direction for the transmitted light rays in privacy mode for the arrangement of FIG. 15A wherein the schematic graphs illustrated in FIGS. 14B-C were obtained using a plurality of retarders 300 comprising the parameters described in the second row of TABLE 3.

The layer of liquid crystal material has a twist of 225 degrees and a retardance for light of a wavelength of 550 nm in a range from 750 nm to 1200 nm and preferably in a range from 900 nm to 1100 nm. Such a display may be provided to achieve different polar angles for optimum privacy in landscape and portrait operation, for example FIG. 15C may illustrate the operation in portrait orientation. Advantageously lateral uniformity may be increased in landscape mode and maximum privacy achieved in portrait mode.

It would be desirable to provide transmission minima at desirable polar angles in the privacy mode of operation.

Figure 16:
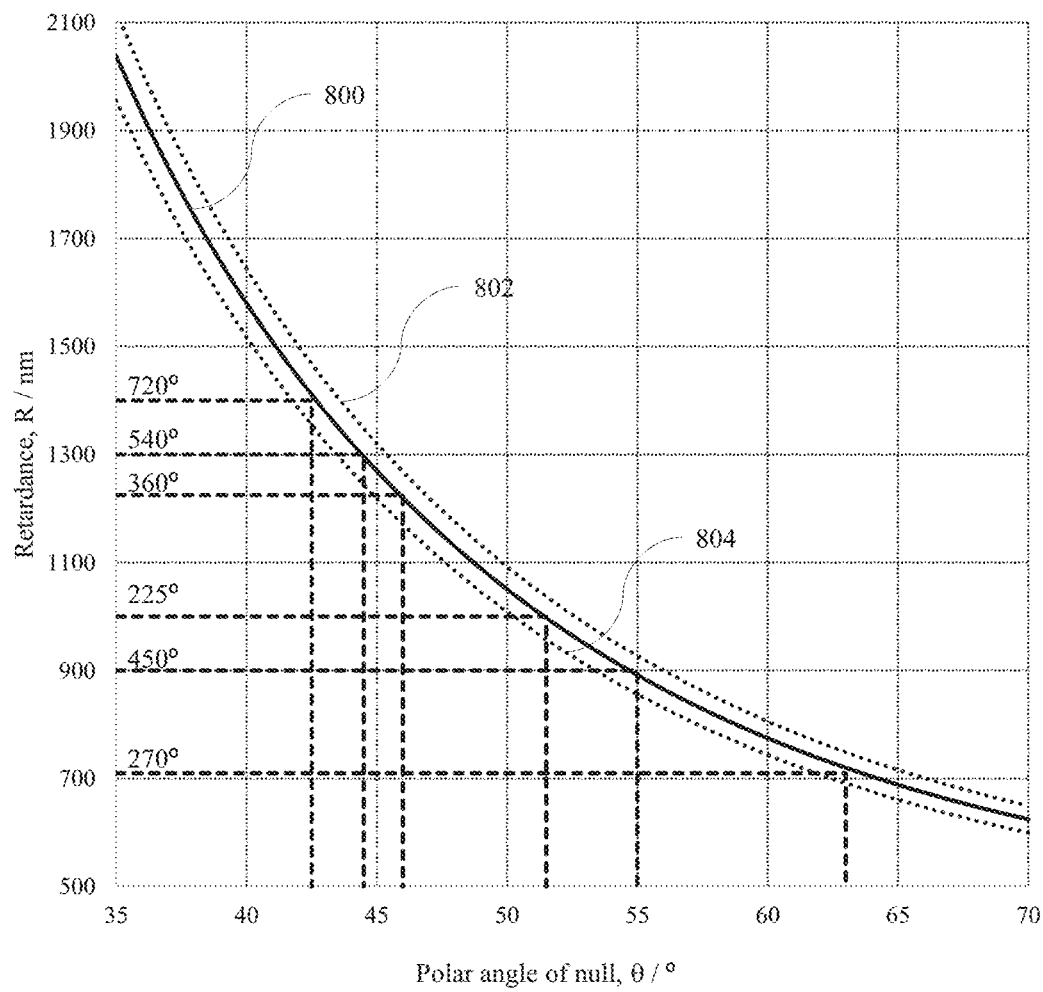
FIG. 16 is a schematic graph illustrating the variation of retarder retardance with polar angle of null for the retarder layer arranged between quarter-wave plates.

FIG. 16 is a schematic graph illustrating the variation of retarder retardance, R with polar angle of null θ for the retarder 301 arranged between quarter-wave plates 296A, 296B.

The first and second quarter-wave plates 296A, 2968 and the at least one retarder 301 may be arranged to introduce phase shifts to polarisation components of light passed by the one of the display polariser 218 and the additional polariser 318 on the input side of the at least one retarder 301 that causes reduction of the luminance of light passed by the one of the other one of the display polariser 218 and the additional polariser 318 along axes that are inclined to the optical axis 199, and the liquid crystal retarder 301 has a total absolute value of retardance for light of a wavelength of 550 nm that is within 10% different of a value R in nanometres as illustrated by profile 800 that is given by the formula:

$$|R| = -0.02947*\theta^3 + 5.81385*\theta^2 - 397.950*\theta + 10090 \qquad \text{eqn. 15}$$

The polar angle of null, θ is the lateral angle of the inclined axis at which a maximum reduction of luminance occurs for inclined axes having an elevation angle of 0 degrees. The liquid crystal retarder may further have a retardance for light of a wavelength of 550 nm that is within 4% different of the value R as illustrated by profiles 802, 804.

In other words, profile 800 illustrates the desirable optimum retardance R for a given null angle θ, where the null angle θ is the polar angle (inclination from the normal 199) for minimum transmission between the parallel polarisers 218, 318. Profiles 802 and 804 represent desirable maximum and minimum retardances to achieve desirable polar angle of the null.

FIG. 16 further illustrates desirable retardances for various retarder twist angles as described elsewhere herein. In one illustrative example, a twist angle τ of 270 degrees provides a null location at a polar angle of approximately 63° with a layer 301 nominal retardance of 710 nm.

The desirable twist angle may not monotonically increase with increased desirable retardance, as illustrated elsewhere herein. The twists may correspond to eqn. 14 or may have other values, for example 225 degrees in the illustrative embodiment of a null location near to 52 degrees.

Desirable null locations, θ may be provided by means of selection of retardance, R and twist angle τ of the liquid crystal retarder 301. Advantageously in a privacy mode of operation, the polar location θ of the minimum transmission may be selected. Visual Security Level roll-off with viewing angle may be arranged to provide desirable privacy appearance.

It would be desirable to reduce the cost and thickness of a privacy display while achieving high visual security levels to off-axis snoopers in landscape and portrait display orientations.

Figure 17A:
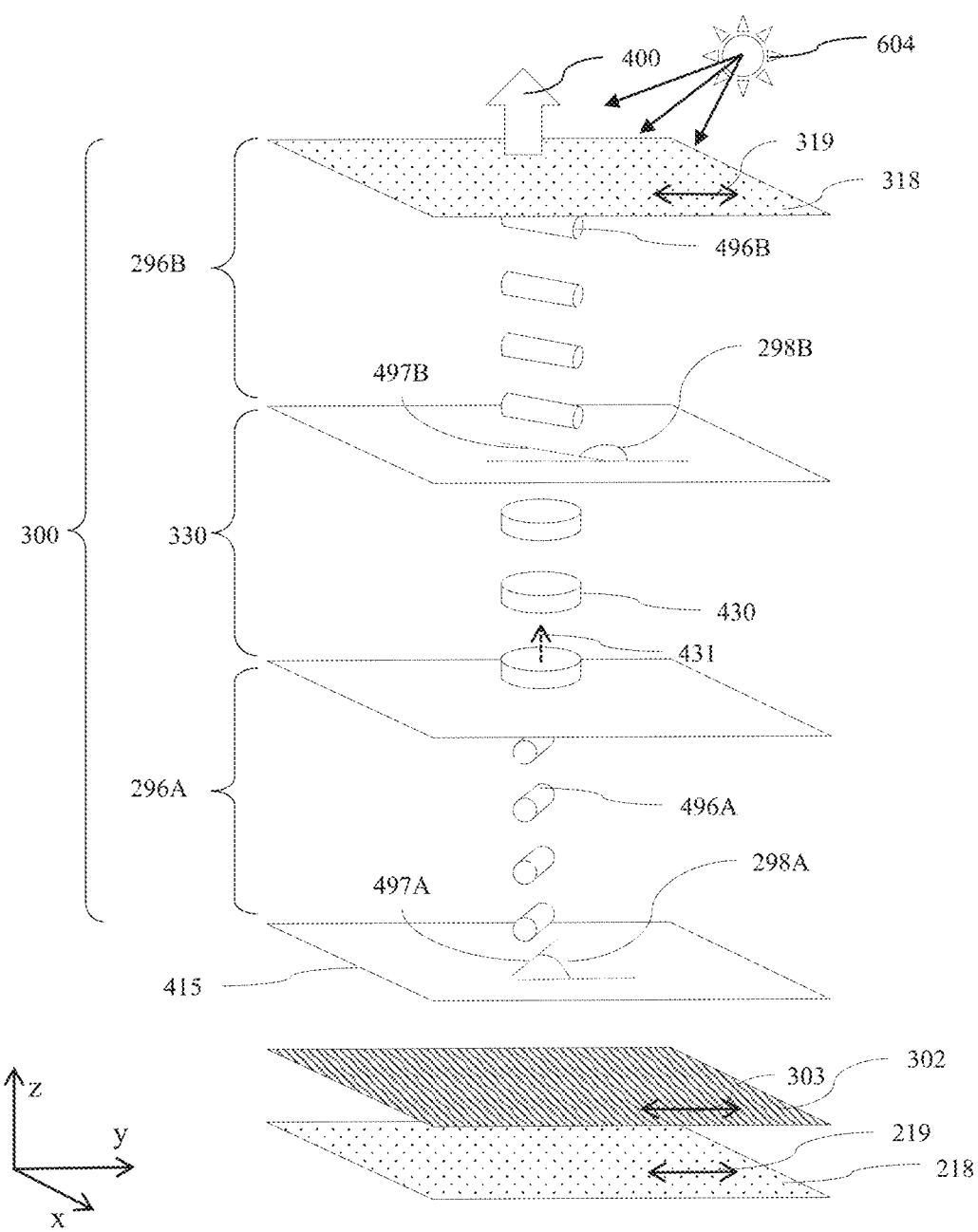
FIG. 17A is a schematic diagram illustrating in perspective side view an arrangement of a negative C-plate retarder arranged between quarter-wave plates and a reflective polariser arranged between parallel polarisers.

FIG. 17A is a schematic diagram illustrating in perspective side view an arrangement of a plurality of retarders 300 arranged between parallel polarisers 218, 318 comprising a negative C-plate passive retarder 330 arranged between quarter-wave plates 296A, 296B and a reflective polariser 303 arranged between the parallel polarisers 218, 318.

Any of the features of the plurality of retarders 300 of FIG. 17A not discussed in further detail may be assumed to correspond to the features with equivalent reference numerals as discussed above, including any potential variations in the features. The arrangement of FIG. 17A differs from the arrangements of a plurality of retarders 300 already discussed in that the plurality of retarders 300 do not comprise a switchable retarder 301. The arrangement of FIG. 17A is therefore a passive arrangement. A passive arrangement may be an arrangement in which the retarder layers in the plurality of retarders 300 remain in a particular orientation state that does not change during operation of the device. A passive arrangement may therefore not require any power to operate. The passive arrangement may therefore be continuously in operation in a privacy mode.

The at least one retarder may comprise at least one passive retarder. The at least one passive retarder may include any of the features of the passive retarder 330 discussed above. The at least one passive retarder may have an optical axis 431 perpendicular to the plane of the passive retarder. The at least one passive retarder may comprise a retarder comprising an aligned uniaxial birefringent material.

The material 430 of the C-plate retarder may have a negative dielectric anisotropy, C-plates may comprise transparent birefringent materials such as: polycarbonates or reactive mesogens that are cast onto a substrate that provides homeotropic alignment for example; Zeonex™ Cyclo Olefin Polymer (COP); discotic polymers; and Nitta Denko™ double stretched polycarbonates.

The first and second quarter-wave plates 296A, 296B and the at least one retarder 330 are arranged to introduce phase shifts to polarisation components of light passed by the one of the display polariser 218 and the additional polariser 318 on the input side of the at least one retarder 330 that causes reduction of the luminance of light passed by the one of the other one of the display polariser and the additional polariser along axes that are inclined to the optical axis 199, and the at least one passive retarder 330 has a retardance R in nm for light of a wavelength of 550 nm that is given by the formula of eqn. 15.

Advantageously in comparison to the active liquid crystal retarder embodiment of FIG. 1A, the cost, complexity and thickness of a privacy display or low stray light display may be reduced. Further off-axis luminance may be reduced in displays with or without liquid crystal retarder 301 by provision of further additional polarisers as will be described further hereinbelow.

The absolute value and desirable range of the retardance R of the at least one passive retarder 330 may be provided by FIG. 16 and eqn. 15 in dependence on desirable polar null angle θ. Advantageously desirable angular roll-off may be provided for a privacy display.

Figure 17B:
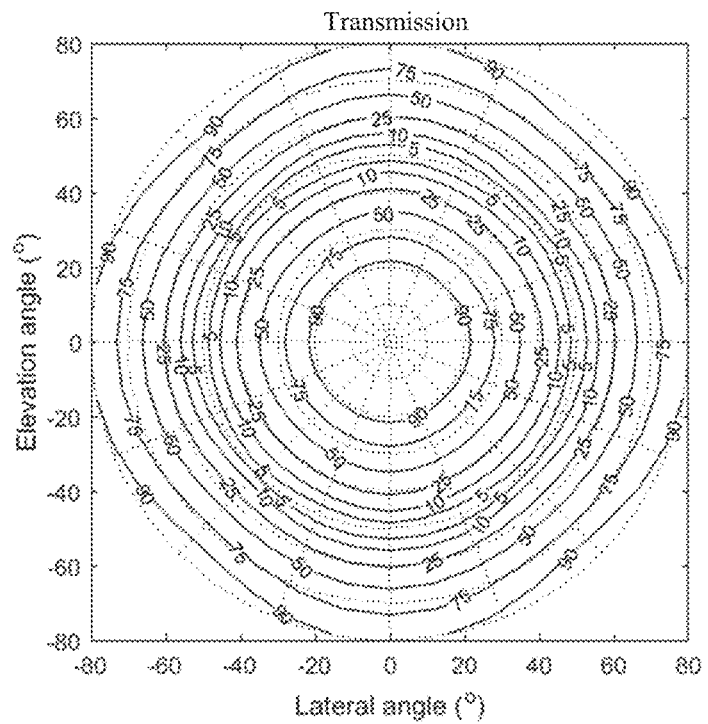
FIG. 17B is a schematic graph illustrating the variation of transmission with polar direction for the transmitted light rays for the arrangement of FIG. 17A.
Figure 17C:
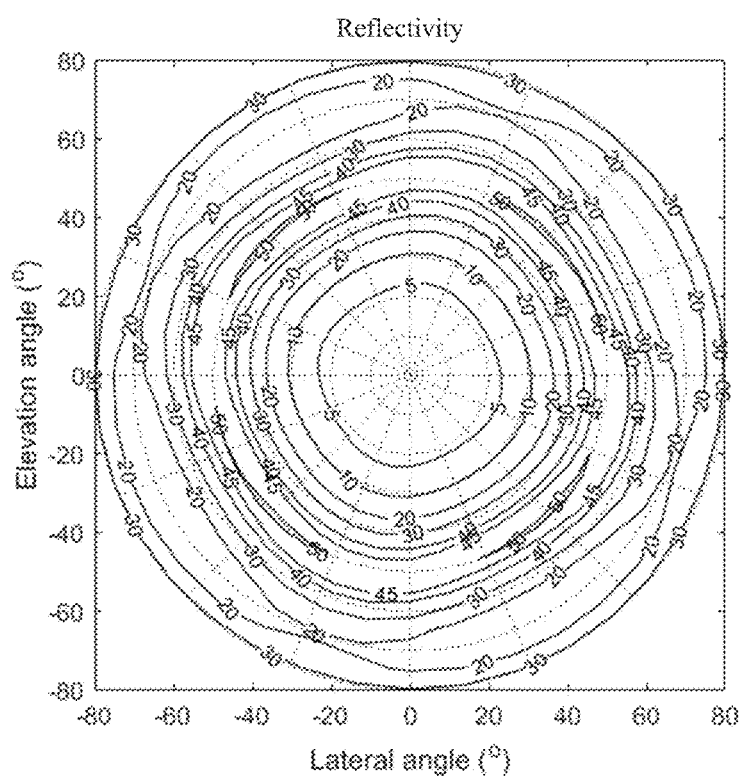
FIG. 17C is a schematic graph illustrating the variation of reflectivity with polar direction for the reflected light rays for the arrangement of FIG. 17A.

FIG. 17B is a schematic graph illustrating the variation of transmission with polar direction for the transmitted light rays for the arrangement of FIG. 17A; FIG. 17C is a schematic graph illustrating the variation of reflectivity with polar direction for the reflected light rays for the arrangement of FIG. 17A.

As shown in FIG. 17B, the transmission remains high in a tight range of lateral and elevation angles around the 0 degree angle, but quickly reduces as both the lateral angle and elevation angle increases. The reduction in luminance is substantially symmetrical around the azimuthal angle. The display device 100 including the arrangement of the plurality of retarders 300 shown in FIG. 17A may therefore act as a privacy display in both horizontal and vertical directions as a snooper does not receive light transmitted by the display device 100 at a wide-angle.

As shown in FIG. 17C, the reflectivity remains low in a tight range of lateral and elevation angles around the 0 degree angle, but quickly increases as both the lateral angle and elevation angle increases. The increase in reflectivity is substantially symmetrical around the azimuthal angle. The display device 100 including the arrangement of the plurality of retarders 300 shown in FIG. 17A may therefore act as a privacy display in both horizontal and vertical directions as a snooper receives an increase in light reflected from the display device 100 and will therefore not be able to distinguish the image transmitted by the display device 100. Additionally, the display device 100 comprising a plurality of retarders 300 in which all of the plurality of retarders 300 are passive retarders may have a reduced power consumption, thickness and cost compared to arrangements including a switchable layer.

The schematic graphs illustrated in FIGS. 17B-C were obtained using a plurality of retarders 300 comprising the parameters described in the first row of TABLE 4A. Desirable ranges for retardations and the other properties of the layers has been established by means of simulation of retarder stacks and experiment with display optical stacks.

TABLE 4A

| Visual security level effect | Passive retarder 330 | Nominal retardance | Retardance range | Polariser orientation |
|---|---|---|---|---|
| High | Negative C-plate | −800 nm | −400 nm ~ −1000 nm | Parallel |
| Low | Negative C-plate | −250 nm | −100 nm ~ −400 nm | Parallel |

In the embodiment corresponding to the first row of TABLE 4A, the at least one passive retarder comprises a layer of liquid crystal material having a retardance for light of a wavelength of 550 nm in a range from −400 nm to −1000 nm and preferably in a range from −750 nm to −850 nm.

In the embodiment corresponding to the second row of TABLE 4A, the at least one passive retarder comprises a layer of liquid crystal material having a retardance for light of a wavelength of 550 nm in a range from −100 nm to −400 nm and preferably in a range from −200 nm to −300 nm.

It may be desirable to provide a passive reduction of off-axis luminance as will be described further below for the embodiments of FIGS. 24A-D and FIGS. 25A-E.

Figure 18A:
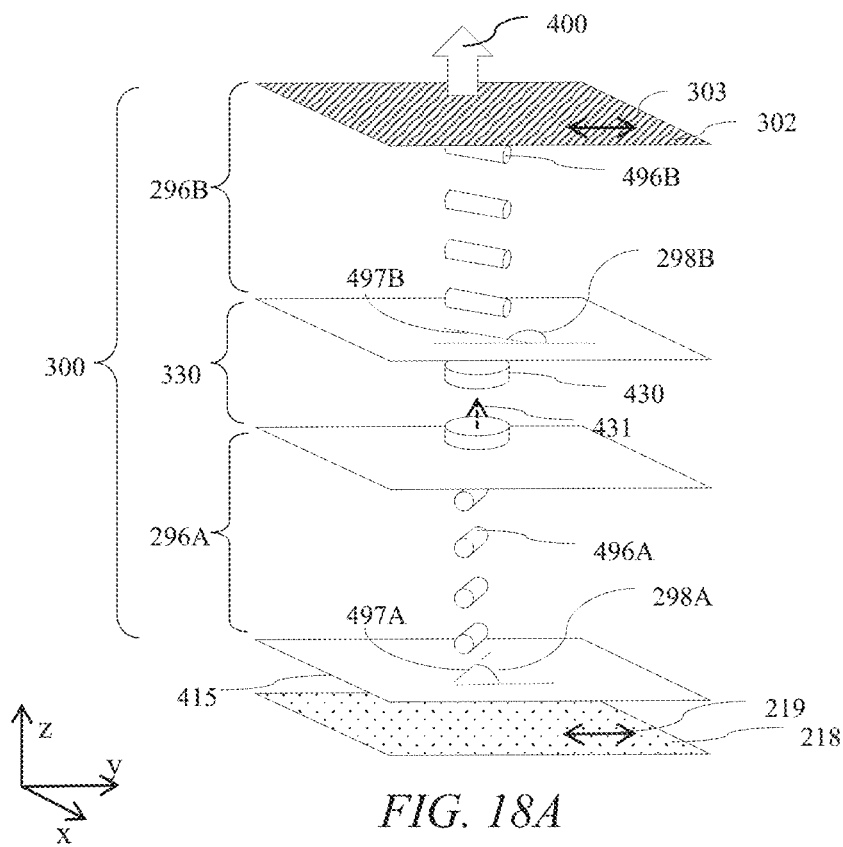
FIG. 18A is a schematic diagram illustrating in perspective side view an arrangement of a negative C-plate retarder arranged between quarter-wave plates that are arranged between the display polariser and reflective polariser.

FIG. 18A is a schematic diagram illustrating in perspective side view an arrangement of a negative C-plate retarder 330 arranged between quarter-wave plates 296A, 296B that are arranged between the display polariser 218 and reflective polariser 302. In comparison to the arrangement of FIG. 17A, the plurality of retarders 300 are arranged to provide luminance reduction only and do not change the reflective properties of the display.

Figure 18B:
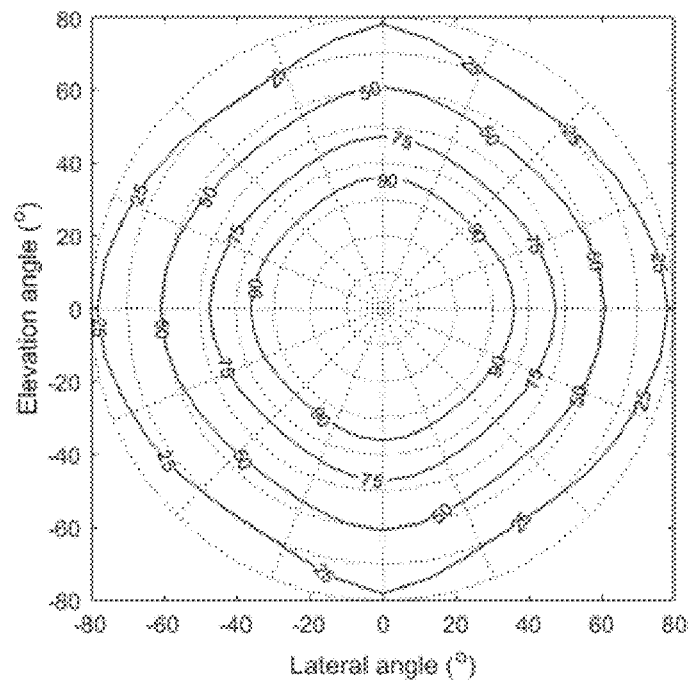
FIG. 18B is a schematic graph illustrating the variation of transmission with polar direction for the transmitted light rays for the arrangement of FIG. 18A with different retarder values to the arrangement of FIG. 18B.

FIG. 18B is a schematic graph illustrating the variation of transmission with polar direction for the transmitted light rays for the arrangement of FIG. 18A comprising the parameters described in the second row of TABLE 4A.

The retarders 300 of FIGS. 18A-B achieve some reduction of off-axis luminance that combined with a wide-angle backlight and transmissive display, or emissive display, do not achieve desirable visual security level without further luminance reduction and/or reflection increasing elements. In public mode of operation advantageously desirable off-axis image visibility may be provided.

In combination with further off-axis luminance reduction and optionally reflection advantageously increase achieve desirable visual security levels in a privacy mode of operation.

In another arrangement, the plurality of retarders 300 may be arranged between the reflective re-circulation polariser 208 and input display polariser 210 of FIG. 1A as will be illustrated in the embodiments of FIGS. 19A, 27G, 27H, 27K, 27L. Advantageously front-of-screen thickness may be reduced.

In another arrangement the plurality of retarders 300 may be arranged between a further additional absorbing polariser 318A and the input polariser 210 of a transmissive SLM 48 as will be illustrated in FIGS. 27M, 27N, 27Q and 27R below.

In comparison to the arrangement of FIGS. 16A-C, the luminance roll-off with polar angle is reduced by the lower retardance of the retarder 330, and there is no variation of reflectivity with polar angle. Advantageously high angle visual security level can be achieved when the output from the backlight or emissive spatial light modulator has elevated luminance at high polar angles.

Features of the arrangements of FIG. 18A-B not discussed in further detail may be assumed to correspond to the features with equivalent reference numerals as discussed above, including any potential variations in the features.

Figure 18C:
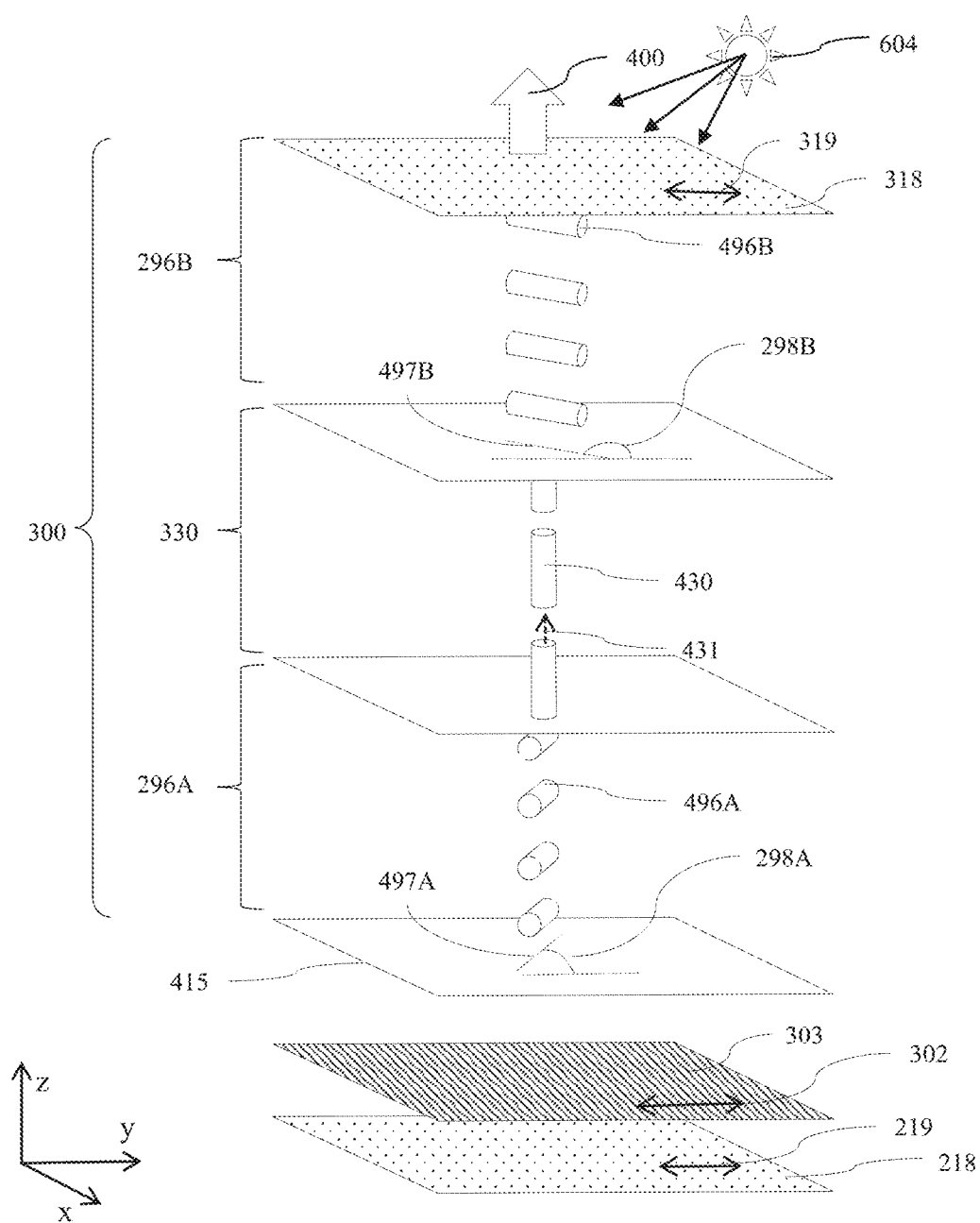
FIG. 18C is a schematic diagram illustrating in perspective side view an arrangement of a positive C-plate retarder arranged between quarter-wave plates and a reflective polariser arranged between parallel polarisers.

FIG. 18C is a schematic diagram illustrating in perspective side view an arrangement of a plurality of retarders 300 arranged between parallel polarisers 218, 318 comprising a passive positive C-plate retarder 330 arranged between quarter-wave plates 296A, 296B and a reflective polariser 303 arranged between the parallel polarisers 218, 318.

FIG. 18C shows an arrangement for the plurality of retarders 300 that is different to the arrangement shown in FIG. 17A. The arrangement of the plurality of retarders 300 is the same as for the arrangement shown in FIG. 17A except that in the present arrangement the material 430 of the C-plate retarder 330 may have a positive dielectric anisotropy with optical axis 431 perpendicular to the plane of the retarder 330. Features of the arrangement of FIG. 18C not discussed in further detail may be assumed to correspond to the features with equivalent reference numerals as discussed above, including any potential variations in the features.

Figure 18D:
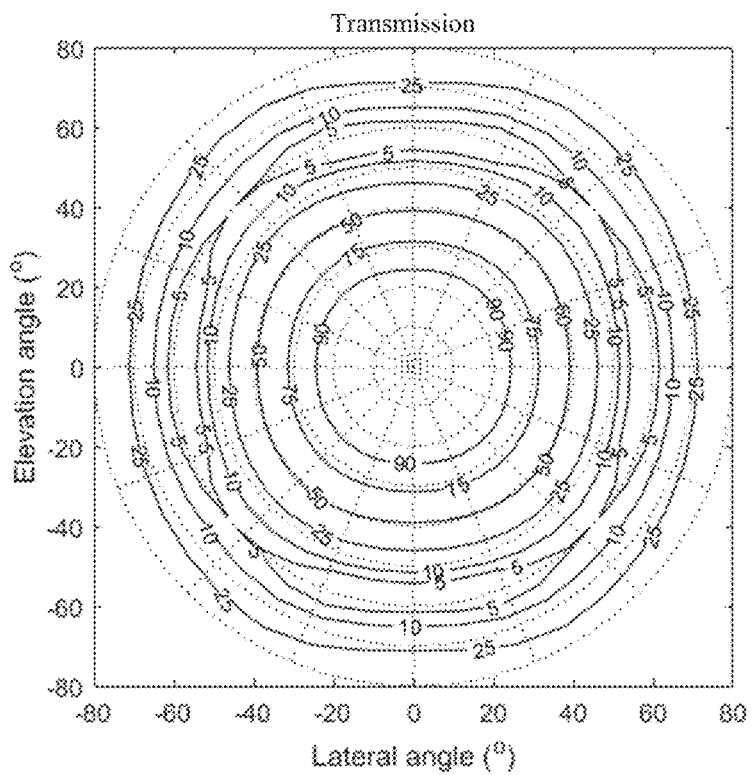
FIG. 18D is a schematic graph illustrating the variation of transmission with polar direction for the transmitted light rays for the arrangement of FIG. 18C.
Figure 18E:
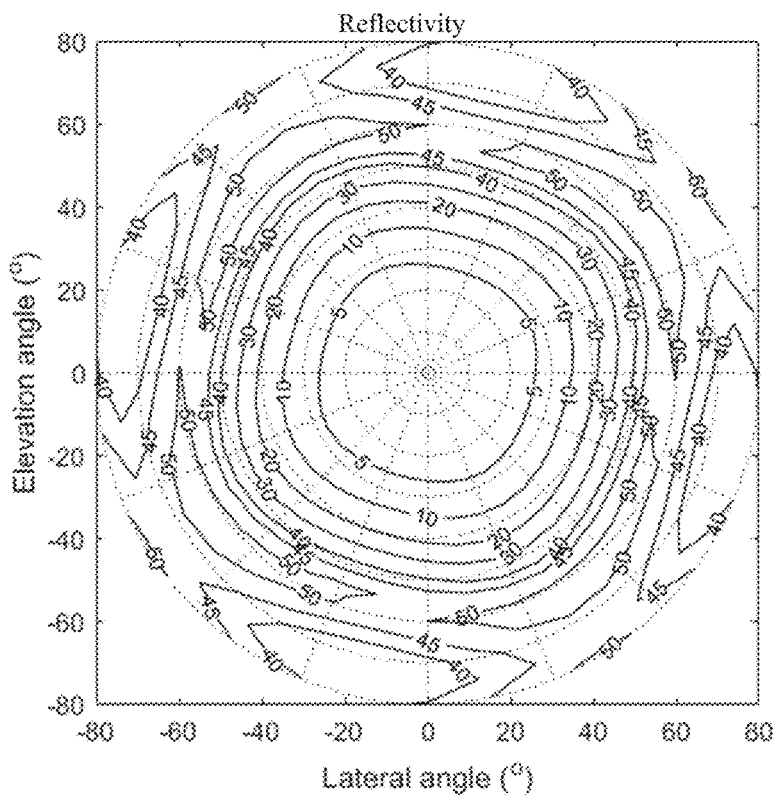
FIG. 18E is a schematic graph illustrating the variation of reflectivity with polar direction for the reflected light rays for the arrangement of FIG. 18C.

FIG. 18D is a schematic graph illustrating the variation of transmission with polar direction for the transmitted light rays for the arrangement of FIG. 18C; FIG. 18E is a schematic graph illustrating the variation of reflectivity with polar direction for the reflected light rays for the arrangement of FIG. 18C.

It can therefore be seen that the desirable effect of reduced transmission as both lateral angle and elevation angle increase in addition to increased reflection as both lateral angle and elevation angle increase may be advantageously achieved using a passive retarder with a positive dielectric anisotropy. In comparison to the negative C-plate of FIG. 17A, the positive C-plate 330 of FIG. 18C can be provided by liquid crystals materials such as reactive mesogen materials that have high retardance in comparison to stretched films typically used to provide negative C-plates. The region over which desirable visual security level can be provided to off-axis snoopers can advantageously be increased.

The schematic graphs illustrated in FIGS. 19A to 19D were obtained using a plurality of retarders 300 comprising the parameters described in TABLE 4B. Desirable ranges for retardations and the other properties of the layers has been established by means of simulation of retarder stacks and experiment with display optical stacks.

TABLE 4B

| Visual security level effect | Passive retarder 330 | Nominal retardance | Retardance range | Polariser orientation |
|---|---|---|---|---|
| High | Positive C-plate | +1000 nm | +500 nm ~ +1200 nm | Parallel |
| Low | Positive C-plate | +400 nm | +200 nm ~ +600 nm | Parallel |

In the embodiment corresponding to the first row of TABLE 4B, the at least one passive retarder comprises a layer of liquid crystal material having a retardance for light of a wavelength of 550 nm in a range from +500 nm to +1200 nm and preferably in a range from +800 nm to +1100 nm.

In the embodiment corresponding to the second row of TABLE 4B, the at least one passive retarder comprises a layer of liquid crystal material having a retardance for light of a wavelength of 550 nm in a range from +200 nm to +600 nm and preferably in a range from +300 nm to +500 nm.

It may be desirable to provide a passive reduction of off-axis luminance as will be described further below for the embodiments of FIGS. 24A-25C.

Figure 19A:
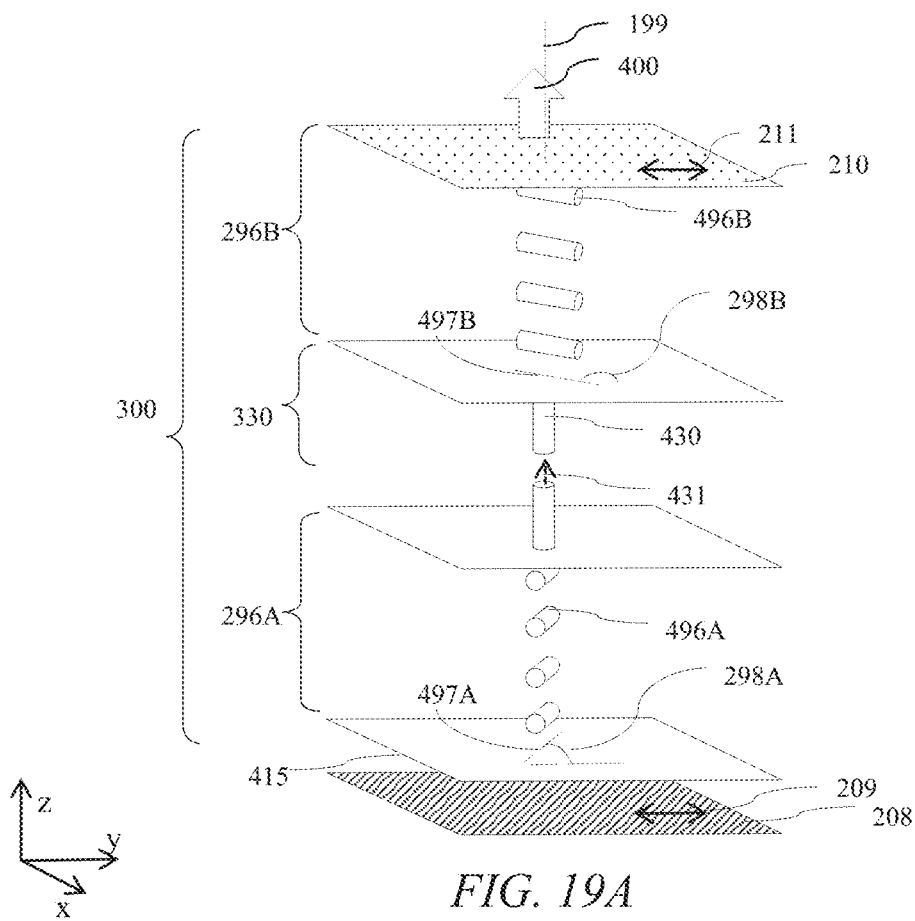
FIG. 19A is a schematic diagram illustrating in perspective side view an arrangement of a negative C-plate retarder arranged between quarter-wave plates that are arranged between the display polariser and reflective polariser.

FIG. 19A is a schematic diagram illustrating in perspective side view an arrangement of a positive C-plate retarder 330 arranged between quarter-wave plates 296A, 296B that are arranged between the display input polariser 210 and reflective re-circulation polariser 208. In comparison to the arrangement of FIG. 18C, the plurality of retarders 300 are arranged to provide luminance reduction only and do not change the reflective properties of the display.

Figure 19B:
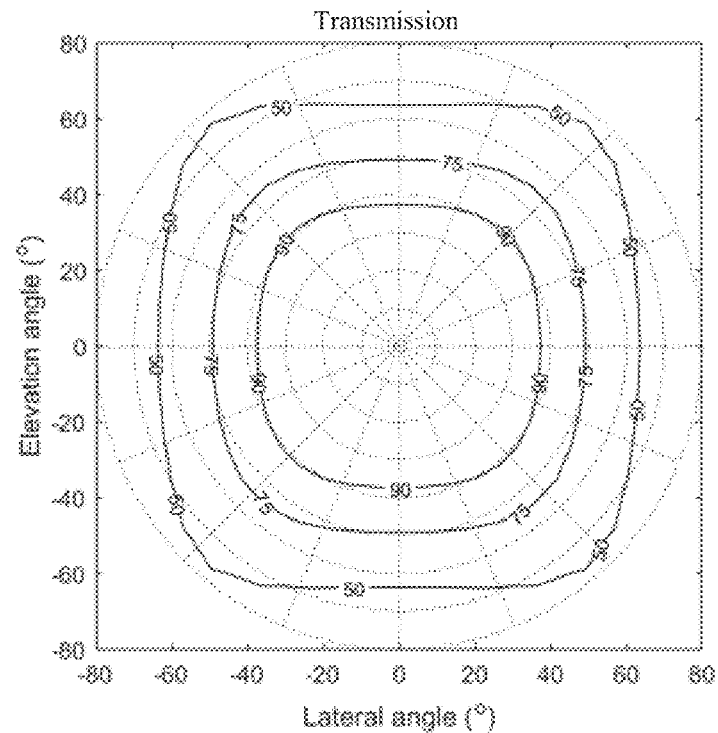
FIG. 19B is a schematic graph illustrating the variation of transmission with polar direction for the transmitted light rays for the arrangement of FIG. 19A with different retarder values to the arrangement of FIG. 18B.

FIG. 19B is a schematic graph illustrating the variation of transmission with polar direction for the transmitted light rays for the arrangement of FIG. 19A comprising the parameters described in the second row of TABLE 4B.

Thus the retarders 300 of FIGS. 19A-B achieve some reduction of off-axis luminance that combined with a wide-angle backlight or emissive display do not achieve desirable visual security level, whereas in combination with further off-axis luminance reduction and optionally reflection increase achieve desirable visual security levels in a privacy mode of operation.

In another arrangement (not shown) the plurality of retarders 300 may be arranged between the reflective polariser 302 and output display polariser 218 of FIG. 1A as described in the illustrative embodiment of FIG. 18A. Advantageously an emissive display may be provided with desirable privacy levels.

In comparison to the arrangement of FIGS. 18D-F, the luminance roll-off with polar angle is reduced by the lower retardance of the retarder 330, and there is no variation of reflectivity with polar angle. Advantageously high angle visual security level can be reduced in displays with increased luminance at high angles when the arrangement is used in cooperation with plural retarders arranged between an additional polariser (which may be a reflective polariser 302) and a further additional polariser 318.

Features of the arrangements of FIG. 19A-B not discussed in further detail may be assumed to correspond to the features with equivalent reference numerals as discussed above, including any potential variations in the features.

It would be desirable to achieve further increase of visual security level for a display 100 operating in privacy mode.

Figure 20A:
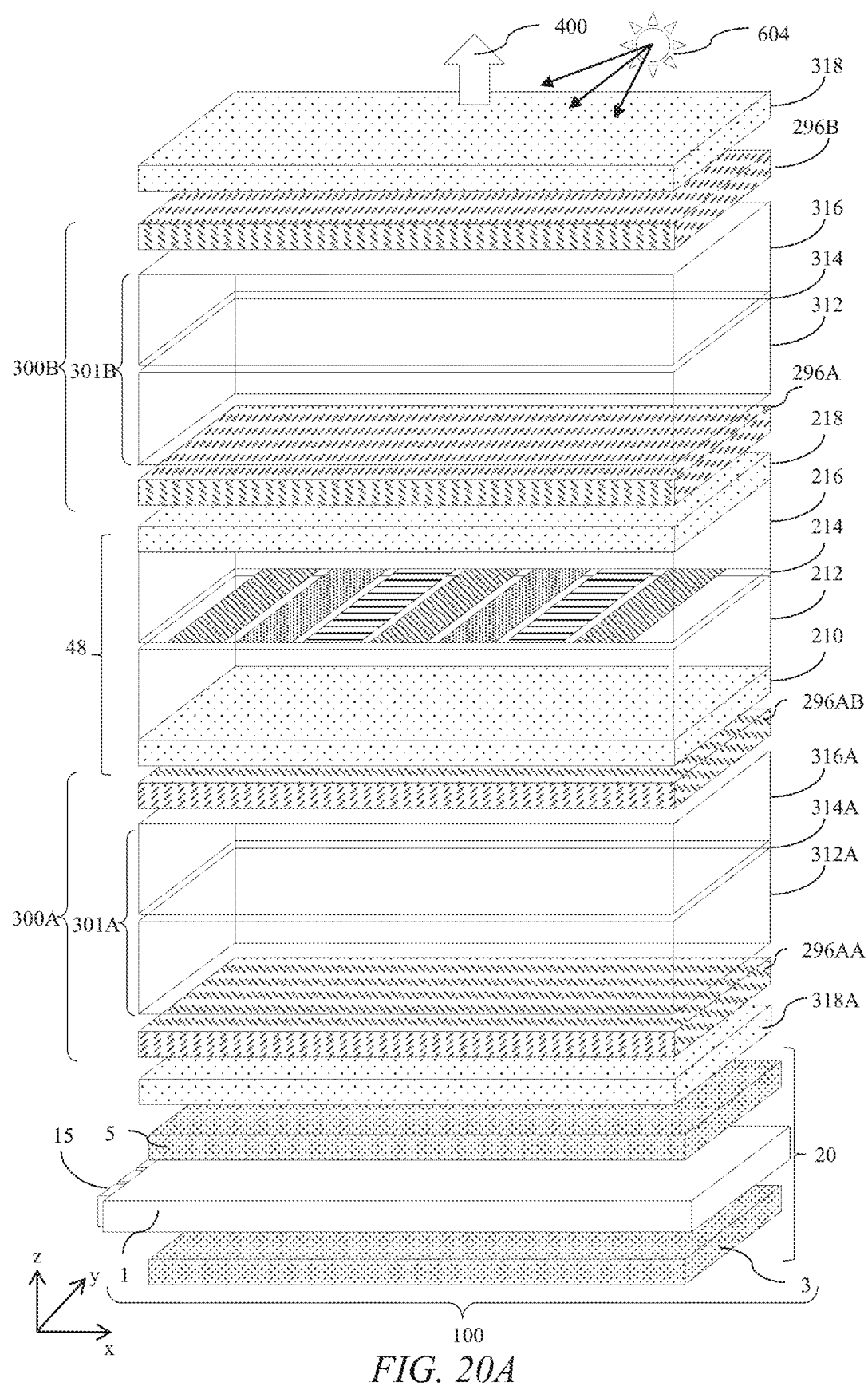
FIG. 20A is a schematic diagram illustrating in side perspective view a switchable privacy display comprising a backlight, an additional polariser, a first liquid crystal retarder arranged between a first pair of quarter-wave plates, a spatial light modulator 48, a second liquid crystal retarder arranged between a second pair of quarter-wave plates and a further additional polariser.

FIG. 20A is a schematic diagram illustrating in side perspective view a switchable privacy display device 100 comprising a backlight 20, an additional polariser 318, a first liquid crystal retarder 301 arranged between a first pair of quarter-wave plates 296A, 296B, a spatial light modulator 48, a second liquid crystal retarder 301A arranged between a second pair of quarter-wave plates 296AA, 296AB and a further additional polariser 318A.

The display polariser may be the input polariser 210 arranged on the input side of the spatial light modulator 48. A further additional polariser 308A may be arranged on the input side the display polariser. One of the display polariser and the further additional 308A polariser on the input side thereof may be the additional polariser.

FIG. 20A shows another embodiment to the display device 100. Features of the embodiment shown in FIG. 20A not discussed in further detail may be assumed to correspond to the features with equivalent reference numerals as discussed above, including any potential variations in the features. The embodiment shown in FIG. 20A is an example of an arrangement including a further plurality of retarders 300A on the input side of the spatial light modulator 48. Although the embodiment also includes a plurality of retarders 300 on the output side of the of the spatial light modulator, it is not required to include the plurality of retarders 300 on the output side and only the further plurality of retarders 300A may be included in the display 100 to achieve a privacy effect as discussed above.

The further plurality of retarders 300A may comprise any of the features of the plurality of retarders 300 as discussed above. In the embodiment shown in FIG. 20A, the further plurality of retarders 300A comprises further first and second quarter-wave plates 296AA and 296AB and a further switchable retarder 301A. The further switchable retarder 301A comprises a further layer of liquid crystal material 314A with substrates 312A, 316A. In the case of the further switchable retarder, the input polariser 210 of the spatial light modulator 48 acts as the display polariser. The reflective polariser 302 may not be included in the embodiment shown in FIG. 20A. The passive retarder 330 may not be included in the embodiment shown in FIG. 20A.

The further plurality of retarders 300A may act to reduce the luminance of transmitted light at wide viewing angles in the same way as for the plurality of retarders 300 discussed above. The inclusion of the further plurality of retarders 300A into the display device in addition to the plurality of retarders 300 may therefore advantageously further reduce the luminance of light 400 at wide-angles through the display device 100 when operating in a privacy mode and therefore may improve the effectiveness of the privacy mode of the display device 100.

Figure 20B:
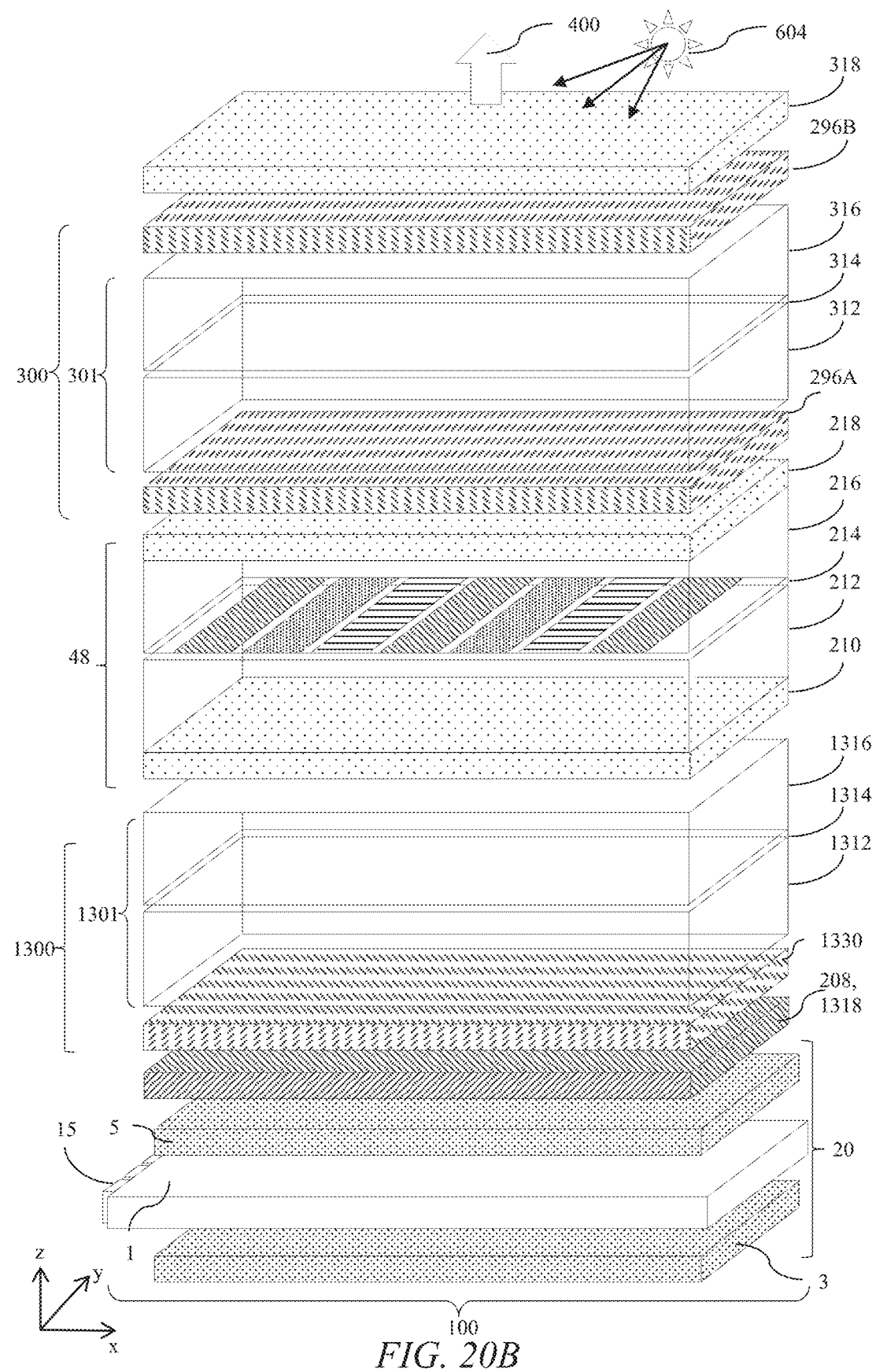
FIG. 20B is a schematic diagram illustrating in side perspective view a switchable privacy display comprising a backlight, further plurality of retarders arranged between a reflective recirculation polariser and a transmissive spatial light modulator, a reflective polariser, a plurality of retarders and an additional polariser.

FIG. 20B is a schematic diagram illustrating in side perspective view a switchable privacy display 100 comprising a backlight 20, a further plurality of retarders 1330 arranged between a reflective recirculation polariser 208 and a transmissive spatial light modulator 48, a reflective polariser 302, a plurality of retarders 300 and an additional polariser 318. Features discussed in further detail may be assumed to correspond to the features with equivalent reference numerals as discussed above, including any potential variations in the features.

The further plurality of retarders 1300 may be arranged between the reflective polariser 302 and the additional polariser 318. In the embodiment of FIG. 20B, the plural retarders 1300 comprise passive retarder 1330 and switchable liquid crystal retarder 1301, but in general may be replaced by other configurations of at least one retarder, some examples of which have been described above. The retarders 1300 do not affect the luminance of light passing through the reflective polariser 302, the retarders 1300 and the additional polariser 318 along an axis along a normal to the plane of the retarders 1300 but the retarders 1300 do reduce the luminance of light passing therethrough along an axis inclined to a normal to the plane of the retarders 1300, at least in one of the switchable states of the switchable retarder 1301. The principles leading to this effect are described in greater detail below with reference to FIGS. 32A-36 and arise from the presence or absence of a phase shift introduced by the retarders 1300 to light along axes that are angled differently with respect to the liquid crystal material of the retarders 1300. The substrates 1312, 1316 of the switchable liquid crystal retarder 1301 comprise electrodes arranged to provide a voltage across the layer of liquid crystal material 1421.

The embodiment shown in FIG. 20A is an example of an arrangement including a further plurality of retarders 1300 on the input side of the spatial light modulator 48 in addition to the plurality of retarders 300 comprising first and second 296A, 296B quarter-wave plates on the output side of the spatial light 48. An increased privacy effect may therefore be advantageously obtained by use of the further plurality of retarders 1300 in addition to the plurality of retarders 300 as discussed above.

It may be desirable to increase the luminance roll-off with a symmetry that has circular symmetry.

Figure 21:
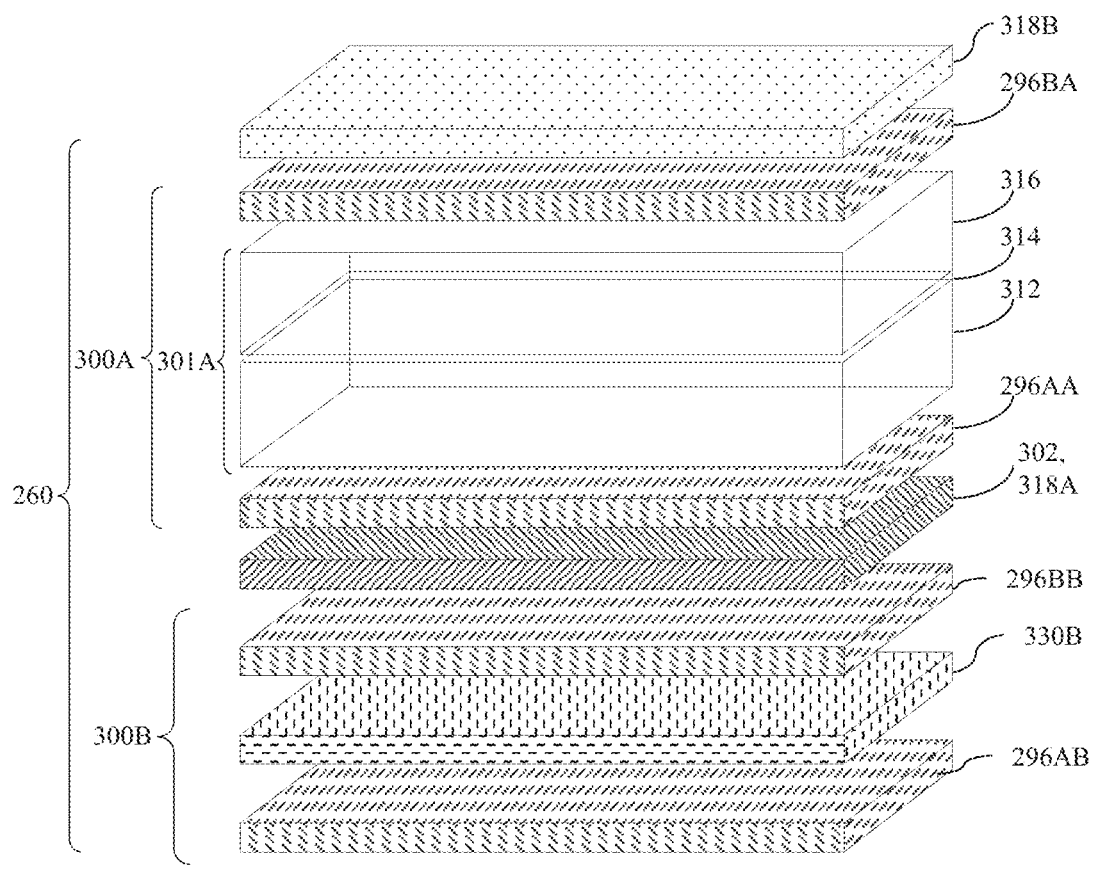
FIG. 21 is a schematic diagram illustrating in side perspective view a view angle control element comprising a passive compensation retarder between quarter-wave plates, a reflective polariser, and a switchable liquid crystal retarder 301 between quarter-wave plates that is arranged between the reflective polariser and an additional polariser.

FIG. 21 is a schematic diagram illustrating in side perspective view a view angle control element 260 comprising a passive compensation retarder 330BB between quarter-wave plates 296AB, 296BB, a reflective polariser 302, and a switchable liquid crystal retarder 301A between quarter-wave plates 296AA, 296BA that is arranged between the reflective polariser 302 and an additional polariser 318.

The view angle control element 260 of FIG. 21 represents an embodiment of the view angle control element 260 shown in FIG. 8B. Features not discussed in further detail may be assumed to correspond to the features with equivalent reference numerals as discussed above, including any potential variations in the features.

The view angle control optical element 260 is for application to the output side of a display device for use in ambient illumination 604 comprising a spatial light modulator 48 arranged to output light; wherein the spatial light modulator 48 comprises an output polariser 218 arranged on the output side of the spatial light modulator 48; the view angle control optical element 260 comprising an additional polariser 318; and the retarders 300A and further plurality of retarders 300B arranged between the output polariser 218 and the additional polariser 318.

In use, the view angle control optical element 260 may be attached by a user or may be factory fitted to a polarised output spatial light modulator 48. The view angle control optical element 260 may be provided as a flexible film for curved and bent displays. The view angle control optical element 260 may be provided on a rigid substrate such as a glass substrate.

Advantageously, an after-market privacy control element and/or stray light control element may be provided that combines the effect of the plurality of retarders 300A as discussed above and further plurality of retarders 300B. The view angle control optical element 260 may be further provided for factory fitting to the spatial light modulator 48. The plurality of retarders 300B may be similar to the plurality of retarders 300 illustrated in FIG. 18C for example.

By attaching the view angle control optical element 260 of FIG. 21 to an existing display device, it is possible to form a display device as shown in FIG. 20B.

In operation in a display 100 a wide-angle backlight 20 for a transmissive spatial light modulator 48 may be provided to illuminate the structure 260. The backlight 20 may be manufactured with reduced tolerances compared to the narrow angle backlights of FIGS. 28-31 described below. Advantageously cost may be reduced.

In operation in a display 100 an emissive spatial light modulator 48 may be provided to illuminate the structure 260. The retarders 300B provide a reduction of off-axis luminance and advantageously increase visual security level. Display thickness may be reduced in comparison to transmissive spatial light modulators 48 with backlights 20.

An arrangement to provide reduction of luminance and in a lateral direction that does not have a symmetry that is substantially circularly symmetric will now be described.

Figure 22:
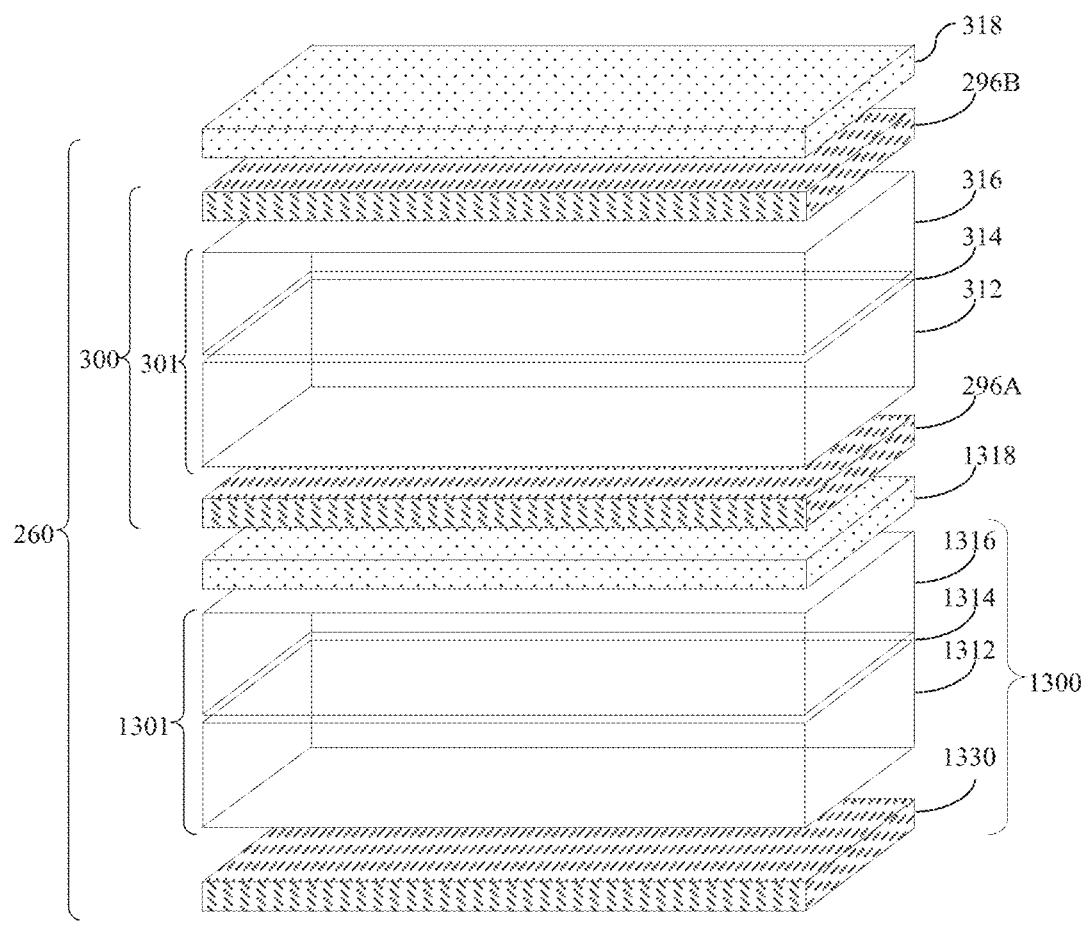
FIG. 22 is a schematic diagram illustrating in side perspective view a view angle control element comprising a passive compensation retarder, a switchable liquid crystal retarder, and a further additional polariser and a switchable liquid crystal retarder 301 between quarter-wave plates that is arranged between the further additional polariser and an additional polariser.
Figure 22:
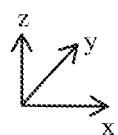

FIG. 22 is a schematic diagram illustrating in side perspective view a view angle control element 260 comprising a reflective polariser 1302, a passive compensation retarder 1330, a switchable liquid crystal retarder 1301, a further additional polariser 1318 and a switchable liquid crystal retarder 301 between quarter-wave plates 296A, 296B that is arranged between the further additional polariser 1318 and an additional polariser 318. The view angle control element 260 of FIG. 22 represents an embodiment of the view angle control element 260 shown in FIG. 8B. Features not discussed in further detail may be assumed to correspond to the features with equivalent reference numerals as discussed above, including any potential variations in the features.

The view angle control optical element 260 is for application to the output side of a display device comprising a spatial light modulator 48 arranged to output light; wherein the spatial light modulator 48 comprises an output polariser 218 arranged on the output side of the spatial light modulator 48; the view angle control optical element 260 comprising an additional polariser 318; and the retarders 300 and further plurality of retarders 1300 arranged between the output polariser 218 and the additional polariser 318.

In use, the view angle control optical element 260 may be attached by a user or may be factory fitted to a polarised output spatial light modulator 48. The view angle control optical element 260 may be provided as a flexible film for curved and bent displays. The view angle control optical element 260 may be provided on a rigid substrate such as a glass substrate.

Advantageously, an after-market privacy control element and/or stray light control element may be provided that combines the effect of the plurality of retarders 300 as discussed above and further plurality of retarders 1300 as described below with reference to FIG. 23A. The view angle control optical element 260 may be further provided for factory fitting to the spatial light modulator 48.

By attaching the view angle control optical element 260 of FIG. 22 to an existing display device, it is possible to form a display device similar to that shown in FIG. 20B.

FIG. 23A is a schematic diagram illustrating in side perspective view an example arrangement of the further plurality of retarders 1300 comprising a passive control retarder 1308B, a passive compensation retarder 1308A, and a switchable liquid crystal retarder 1301. The arrangement shown in FIG. 23A may be applied as additional components in a display device as described in any of the examples above.

Figure 23B:
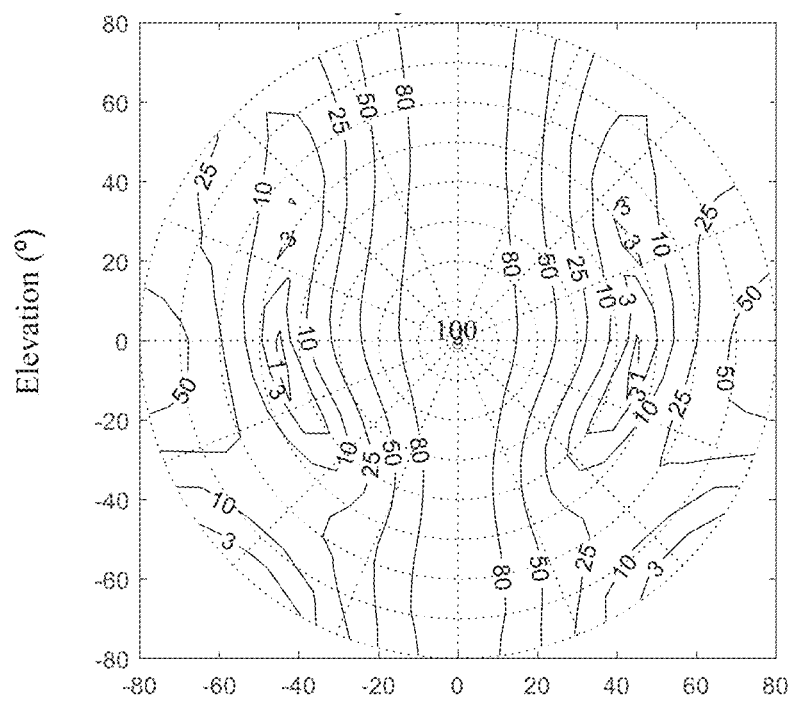
FIG. 23B is a schematic graph illustrating the variation of transmission with polar direction for the transmitted light rays for the arrangement of FIG. 23A in privacy mode.
Figure 23C:
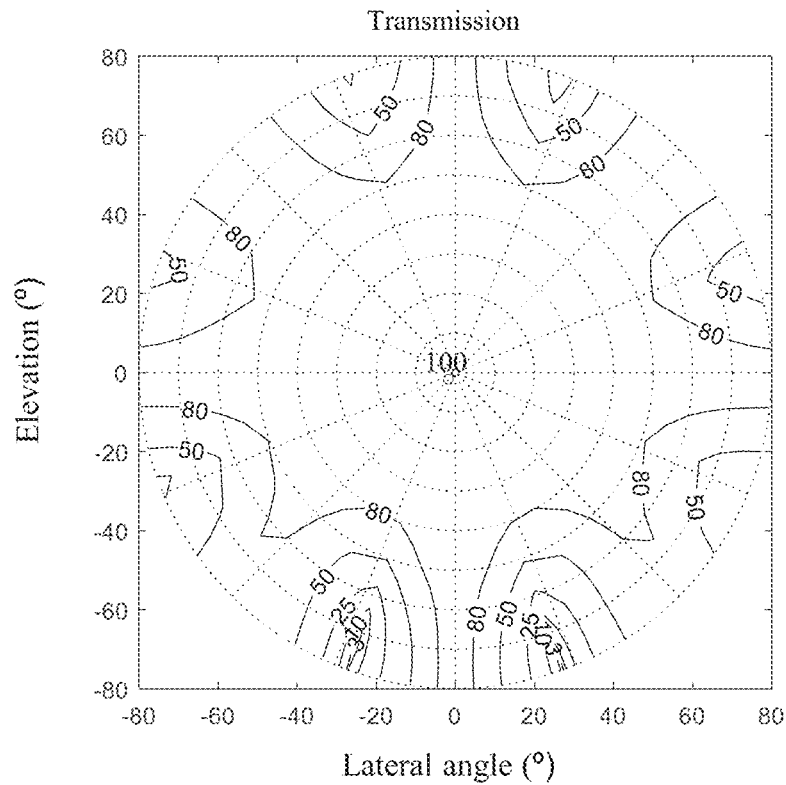
FIG. 23C is a schematic graph illustrating the variation of transmission with polar direction for the transmitted light rays for the arrangement of FIG. 23A in public mode.

FIG. 23B is a schematic graph illustrating the variation of transmission with polar direction for the transmitted light rays for the arrangement of FIG. 23A in privacy mode; and FIG. 23C is a schematic graph illustrating the variation of transmission with polar direction for the transmitted light rays for the arrangement of FIG. 23A in public mode.

The further plurality of retarders 1300 will now be described in more detail. The switchable liquid crystal retarder 1301 may comprise two surface alignment layers 1419a, 1419b disposed adjacent to the layer of liquid crystal material 1421 and on opposite sides thereof and each arranged to provide homogeneous alignment in the adjacent liquid crystal material 1421. The layer of liquid crystal material 1421 of the switchable liquid crystal retarder 1301 may comprise a liquid crystal material 1421 with a positive dielectric anisotropy. The layer of liquid crystal material 1421 may have a retardance for light of a wavelength of 550 nm in a range from 500 nm to 900 nm, preferably in a range from 600 nm to 850 nm and most preferably in a range from 700 nm to 800 nm. The further plurality of retarders 1300 may further comprises a pair of passive retarders 1308A, 1308B which may have optical axes in the plane of the retarders that are crossed, each passive retarder of the pair of passive retarders having a retardance for light of a wavelength of 550 nm in a range from 300 nm to 800 nm, preferably in a range from 350 nm to 650 nm and most preferably in a range from 450 nm to 550 nm.

The substrates 1312, 1316 of the switchable liquid crystal retarder 1301 may comprise electrodes arranged to provide a voltage across the layer 1421 of liquid crystal material. The voltage driver 1350 may apply a voltage across the electrodes of the switchable liquid crystal retarder 1301.

The passive retarder 1330 may be provided by a pair of A-plates 1308A, 1308B that have crossed optical axes 1309A and 1309B. In the present embodiments, 'crossed' refers to an angle of substantially 90° between the optical axes of the two retarders in the plane of the retarders. To reduce cost of retarder materials, it may be desirable to provide materials with some variation of retarder orientation due to stretching errors during film manufacture for example. Variations in retarder orientation away from preferable directions can reduce the head-on luminance and increase the minimum transmission. Preferably the angle 1310A is at least 35° and at most 55°, more preferably at least 40° and at most 50° and most preferably at least 42.5° and at most 47.5°. Preferably the angle 1310B is at least 125° and at most 145°, more preferably at least 130° and at most 135° and most preferably at least 132.5° and at most 137.5°.

The passive retarders may be provided using stretched films to advantageously achieve low cost and high uniformity. Further field of view for liquid crystal retarders with homogeneous alignment is increased while providing resilience to the visibility of flow of liquid crystal material during applied pressure.

Figure 24A:
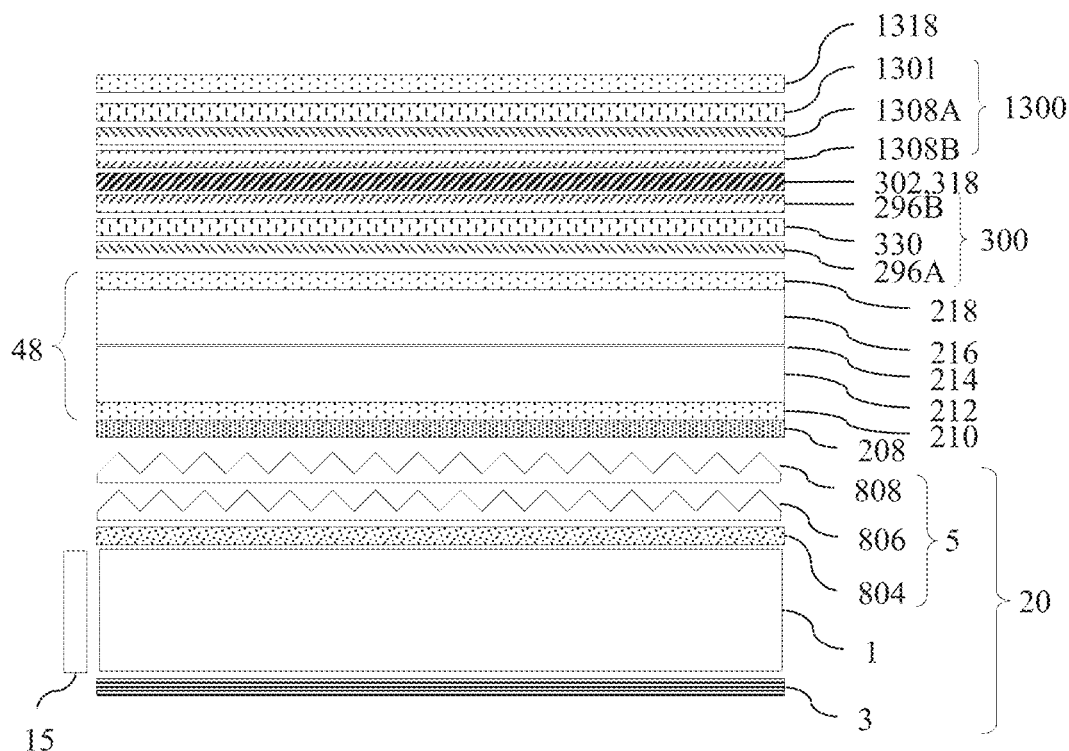
FIG. 24A is a schematic diagram illustrating in side view a switchable privacy display for use in ambient illumination comprising a transmissive spatial light modulator comprising a recirculating backlight; and on the output side of the spatial light modulator: a reflective polariser, a switchable retarder arranged between the reflective polariser and an additional polariser; and the passive retarder between quarter-wave plates arrangement of FIG. 17C that is arranged between the reflective polariser and the output polariser of the spatial light modulator.
Figure 24B:
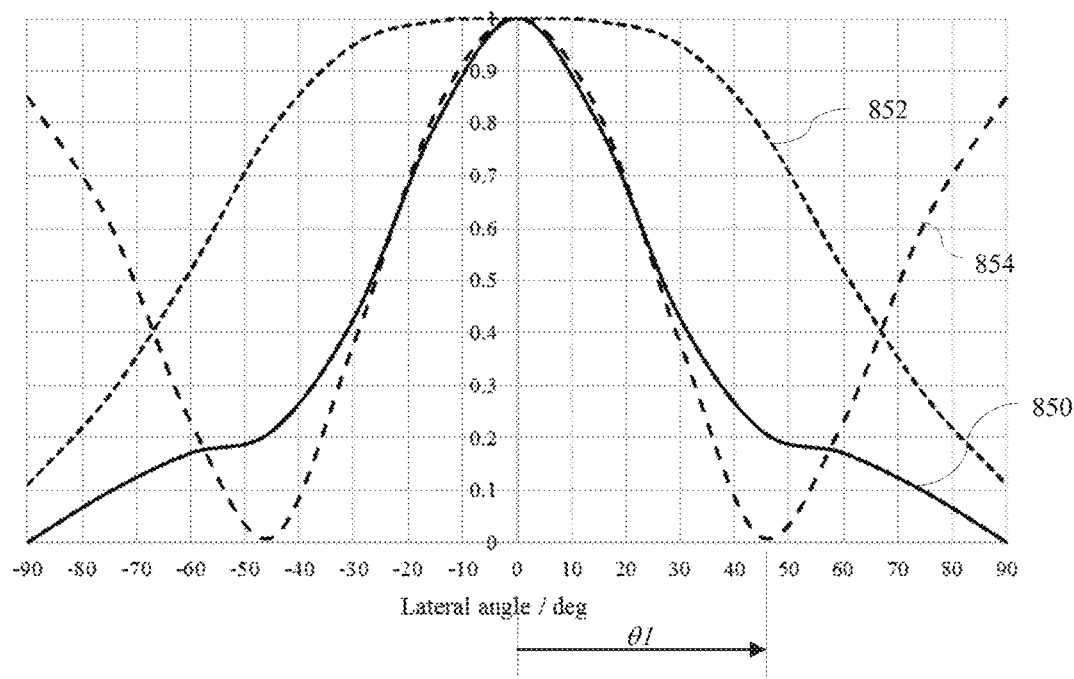
FIG. 24B is a schematic graph illustrating the variation of output luminance with lateral viewing angle for various components of the stack of FIG. 24A.

The schematic graphs illustrated in FIGS. 24A and 24B were obtained using the further plurality of retarders 1300 comprising the parameters described in the first and second rows of TABLE 5. Desirable ranges for retardations and the other properties of the layers has been established by means of simulation of retarder stacks and experiment with display optical stacks.

TABLE 5

| | Passive retarder(s) | | Active LC retarder | | | |
|---|---|---|---|---|---|---|
| Mode | Type | Δn.d/ nm | Alignment layers | Pretilt/ deg | Δn.d/ nm | Δε | Voltage/ V |
| Wide | Crossed A | +500 @ 45° | Homogeneous | 2 | 750 | 13.2 | 10 |
| Privacy | | +500 @ 135° | Homogeneous | 2 | | | 2.3 |

Figure 23D:
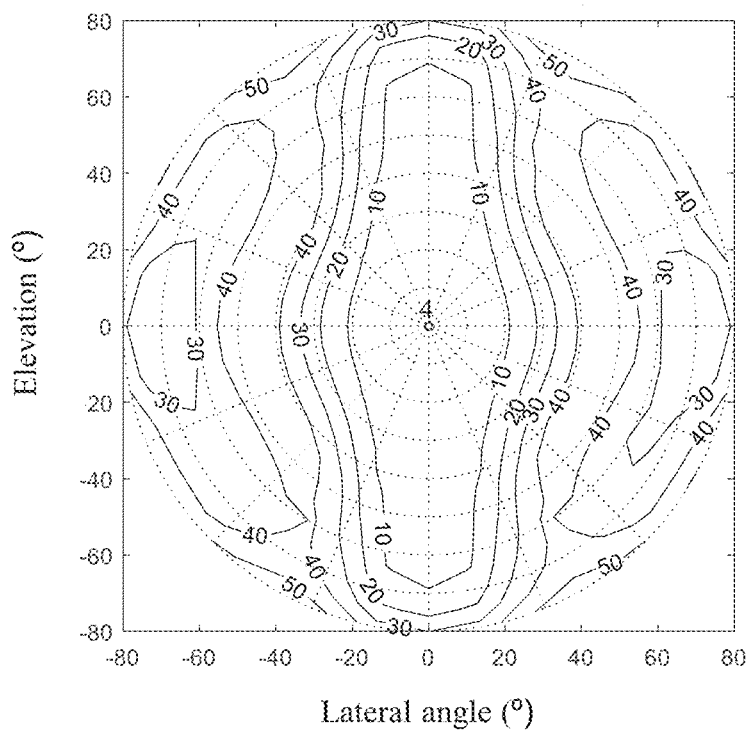
FIG. 23D is a schematic graph illustrating the variation of reflectivity with polar direction for the reflected light rays in privacy mode for the arrangement similar to FIG. 23A wherein the output polariser is provided by additional polariser and the input polariser is provided by reflective polariser.
Figure 27A:
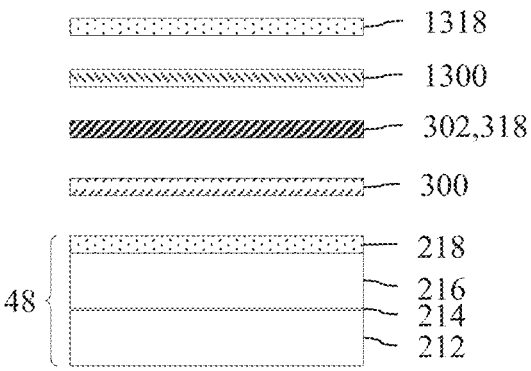
FIGS. 27A-X and FIGS. 27AA-AF are schematic diagrams illustrating in side view various arrangements of passive and active retarders arranged in series with transmissive or emissive spatial light modulators.
Figure 27B:
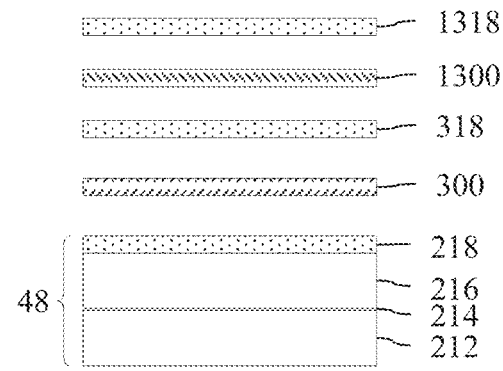
Figure 27C:
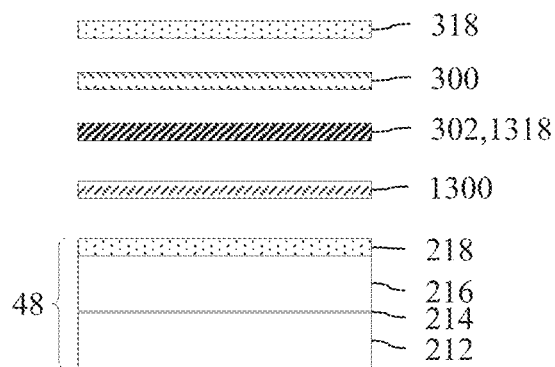
Figure 27D:
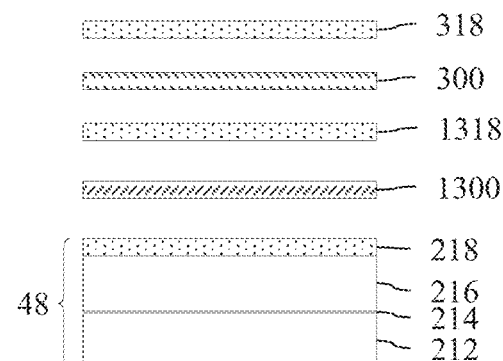
Figure 27E:
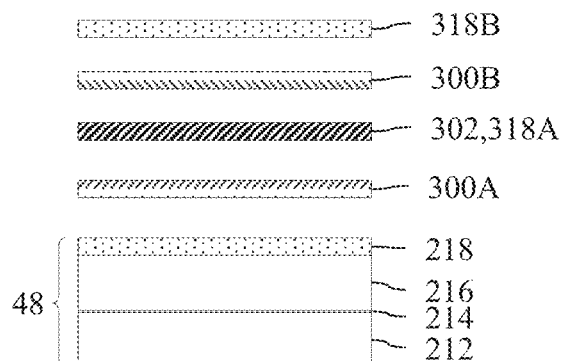
Figure 27F:
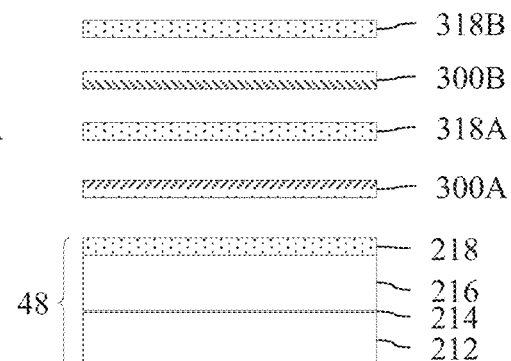
Figure 27M:
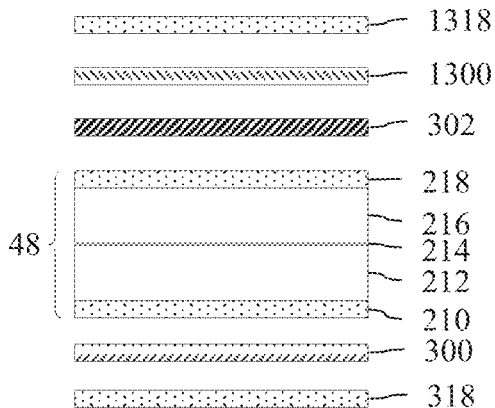
Figure 27N:
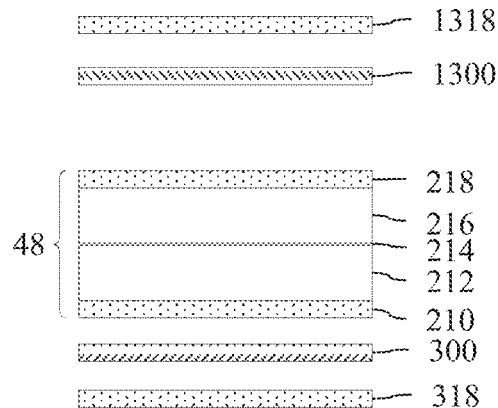
Figure 27O:
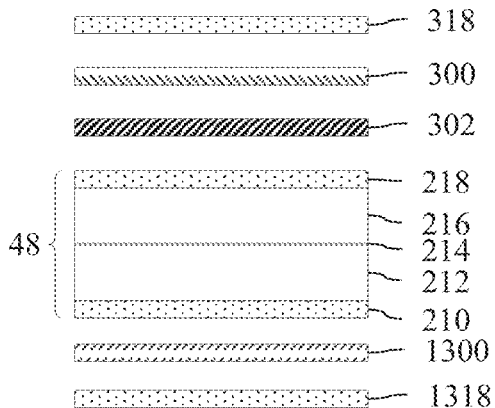
Figure 27P:
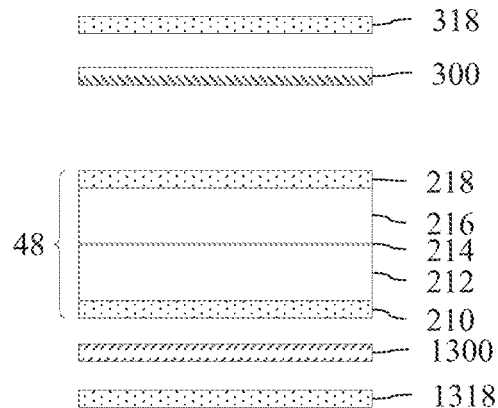
Figure 27Q:
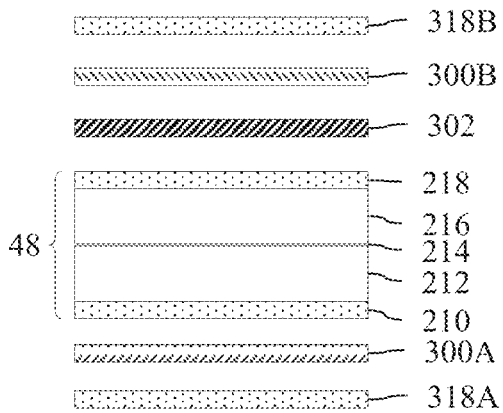
Figure 27R:
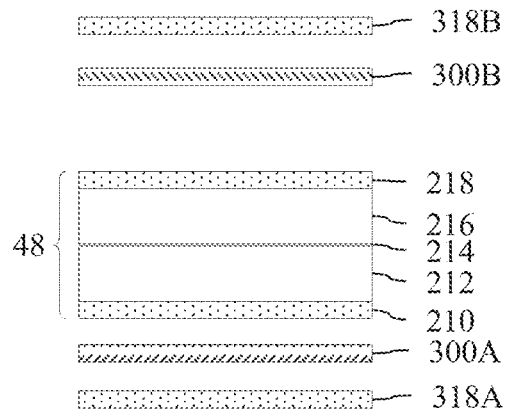
Figure 27S:
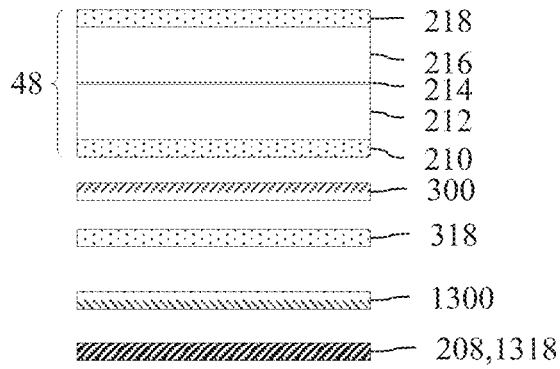
Figure 27T:
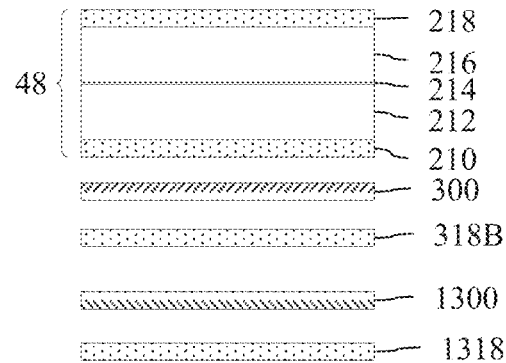
Figure 27U:
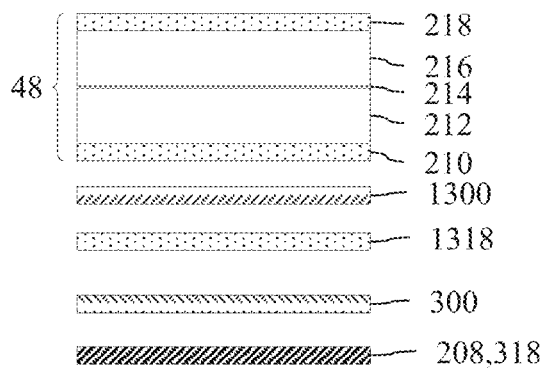
Figure 27V:
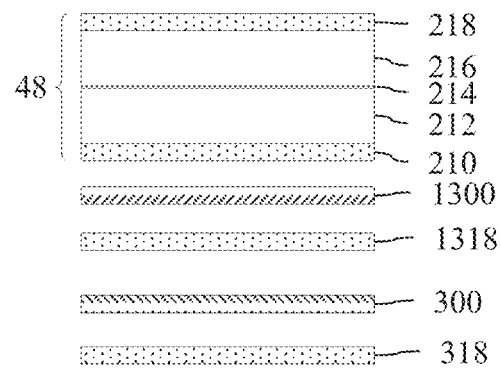
Figure 27W:
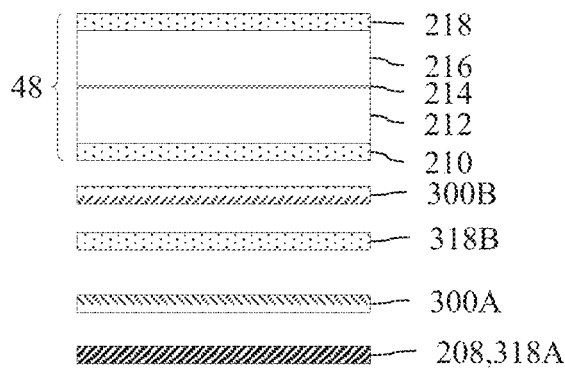

FIG. 23D is a schematic graph illustrating the variation of reflectivity with polar direction for the reflected light rays in privacy mode for the arrangement similar to FIG. 23A and using the parameters of TABLE 5 wherein the output polariser 210 is provided by additional polariser 318 and the input polariser 1318 is provided by a reflective polariser 302, such as illustrated further in FIGS. 27A, 27G and 27M. Control of off-axis reflectivity may be provided to provide a switchable privacy display with high off-axis visual security level.

It may be desirable to provide spatial light modulators with wider luminance profiles than can be achieved by collimated backlights that will be described with reference to FIGS. 29A-31.

FIG. 24A is a schematic diagram illustrating in side view a switchable privacy display for use in ambient illumination comprising a transmissive spatial light modulator 48 comprising a recirculating backlight 20. Features of the embodiment of FIG. 24A not discussed in further detail may be assumed to correspond to the features with equivalent reference numerals as discussed above, including any potential variations in the features.

A further additional polariser 1318 is arranged on the output side of the first mentioned additional polariser 318. The further additional polariser 1318 is arranged to pass linearly polarised polarisation states. At least one further retarder 1300 is arranged between the first mentioned additional polariser 318, 302 and the further additional polariser 1318. The further retarder in the embodiment of FIG. 24A is of the type illustrated in FIG. 23A but may be other retarders 1300, or 300 illustrated elsewhere herein.

In FIG. 24A the additional polariser 318 is a reflective polariser 302, and the at least one further retarder 1300 comprises a switchable liquid crystal retarder 1301 comprising a layer of liquid crystal material 1421 and electrodes 1413, 1415 arranged to apply a voltage for switching the layer of liquid crystal material. The at least one retarder 330 arranged between the pair of quarter-wave plates 296A, 296B comprises at least one passive retarder having a retardance for light of a wavelength of 550 nm in a range from −100 nm to −400 nm or in a range from +200 nm to +600 nm and preferably in a range from −200 nm to −300 nm or preferably in a range from +300 nm to +500 nm.

Recirculating backlight 20 comprises optical stack 5 that comprises diffuser 804 and prismatic films 806, 808. In operation light from the input light sources 15 is guided in waveguide 1 and output onto diffuser 804. Light is recirculated by refraction and total internal reflection at prismatic films 806, 808 and by reflected by reflective recirculation polariser 208 to provide profile such as that illustrated by profile 850. Advantageously recirculating backlights can achieve high efficiency in thin packages with high uniformity.

Switchable retarder 1300 is arranged between the reflective polariser 302 and additional polariser 318. The plurality of passive retarders 300 comprising passive retarder 330 arranged between quarter-wave plates 296A, 296B is arranged between the reflective polariser 302 and the output polariser 218 of the spatial light modulator 48. The passive retarder comprises the arrangement of FIG. 17C and the parameters of the second row of TABLE 4A.

FIG. 24B is a schematic graph illustrating the variation of output luminance with lateral viewing angle for various components of the stack of FIG. 24A. Profile 852 is provided by the plural retarders 300, with retarder values as illustrated in the second row of TABLE 4A; and profile 854 for switchable retarder 1300 operating in privacy mode, with retarder parameters as illustrated in TABLE 5. The polar angle θ1 for the switchable retarder 1300 is shown as 45 degrees while the polar angle θ2 for the plural retarders 1300 is greater than 90 degrees, that is the null is not reached at the widest viewing angles.

Thus the polar angle θ for minimum transmission is different for the retarders 300 to that provided by the retarders 1300.

Figure 24C:
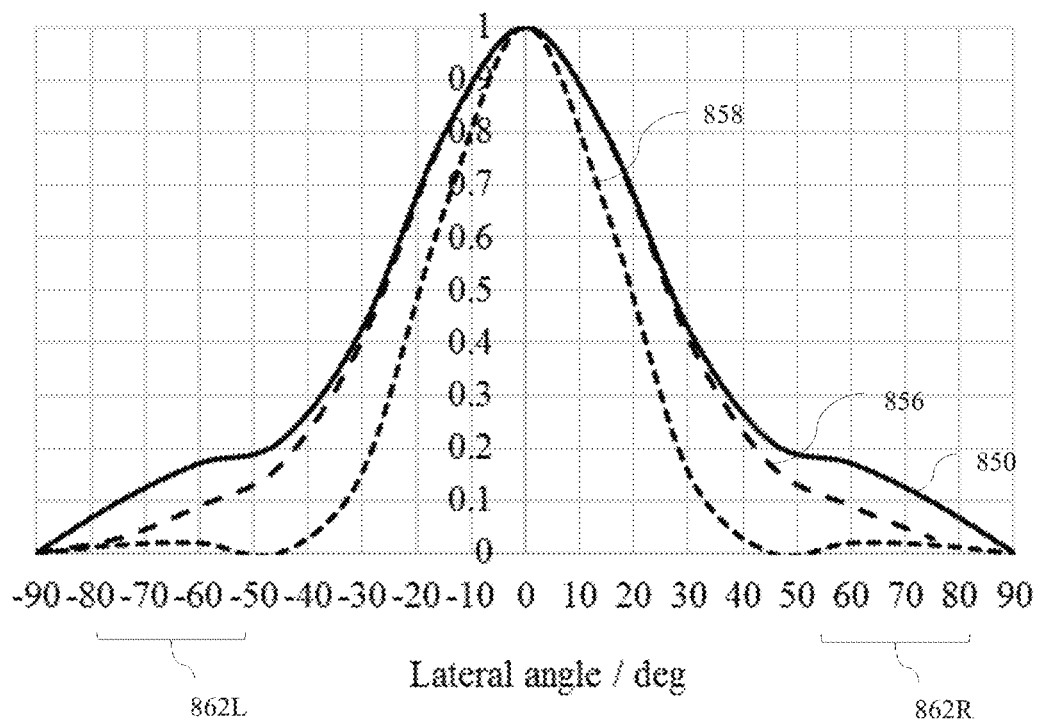
FIG. 24C is a schematic graph illustrating the variation of output luminance with lateral viewing angle for the arrangement of FIG. 24A.

FIG. 24C is a schematic graph illustrating the variation of output luminance with lateral viewing angle for the arrangement of FIG. 24A.

In public mode of operation the profile 856 is provided by the plural retarders 300 arranged between the display polariser 218 and reflective polariser 302 modifying the profile 850 of the recirculating backlight 20. Advantageously the head-on luminance is substantially unmodified and the display has some visibility at lateral angles greater than 50 degrees.

In private mode of operation the profile 858 is provided by the further effect of switched plural retarders 1300 between the reflective polariser 302 and additional polariser 318. Advantageously the head-on luminance is substantially unmodified and further the luminance at off-axis viewing regions 862R and 862L is reduced. Advantageously a high efficiency and thin recirculating backlight may be provided with high visual security level at high viewing angles.

Figure 24D:
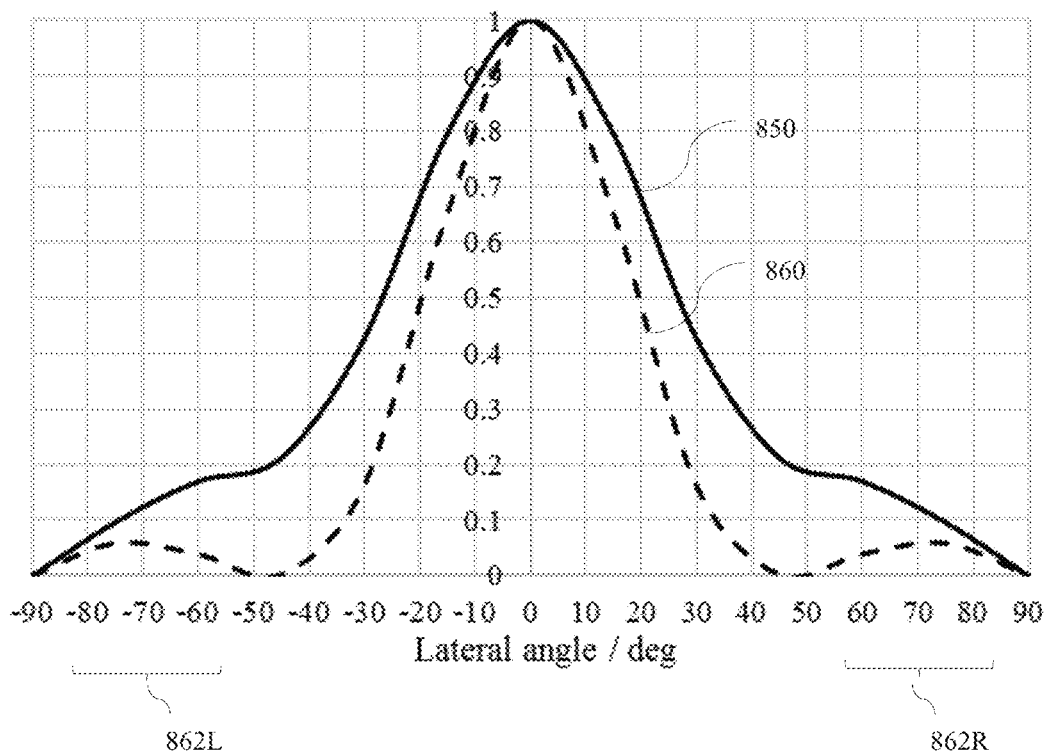
FIG. 24D is a schematic graph illustrating the variation of output luminance with lateral viewing angle for an arrangement similar to FIG. 24A wherein the passive retarder arranged between quarter-wave plates and the quarter-wave plates are omitted.

By way of comparison, FIG. 24D is a schematic graph illustrating the variation of output luminance with lateral viewing angle for an arrangement similar to FIG. 24A wherein the passive retarder arranged between quarter-wave plates and the quarter-wave plates are omitted. By way of comparison with the arrangement of FIG. 24C, the luminance in regions 862R, 862L is undesirably increased and reduced visual security level provided to off-axis snoopers.

The arrangement of FIG. 24C may provide some colour variation with viewing angle, particularly at higher viewing angles because of the variation of retardance with wavelength of the respective retarders 330, 296A, 296B.

It would be desirable to provide reduced visibility of colour changes with viewing angle.

Figure 25A:
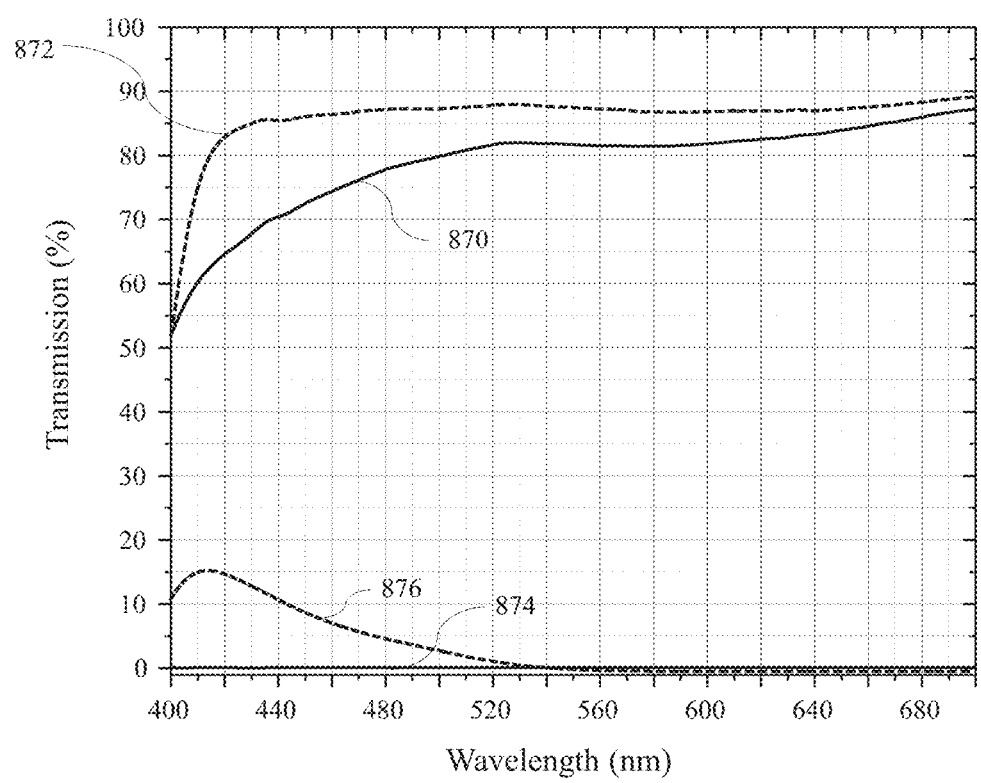
FIG. 25A is a schematic graph illustrating the variation of output luminance with wavelength for a broadband absorbing polariser and for a leaking absorbing polariser.

FIG. 25A is a schematic graph illustrating the variation of output luminance with wavelength for a case that the additional polariser 318 is a broadband absorbing and for a case that the additional polariser 318 is a leaking absorbing. Profile 870 illustrates the variation of transmitted luminance by parallel broadband polarisers, profile 872 illustrates the variation of transmitted luminance by parallel leaking polarisers; profile 874 illustrates the variation of transmitted luminance by crossed broadband polarisers and profile 876 illustrates the variation of transmitted luminance by crossed leaking polarisers. The leaking polariser 318 has increased leakage in the blue spectral band and increased transmission.

The additional polariser when crossed with a second notional polariser of the same material has transmission for wavelengths from 520 nm to 560 nm that is less than the transmission for wavelengths from 450 nm to 490 nm. The transmission for wavelengths from 450 nm to 490 nm is greater than 1%, preferably greater than 2% and most preferably greater than 3%; and the transmission for wavelengths from 520 nm to 560 nm is less than 3%, preferably less than 2% and most preferably less than 1%.

Figure 25B:
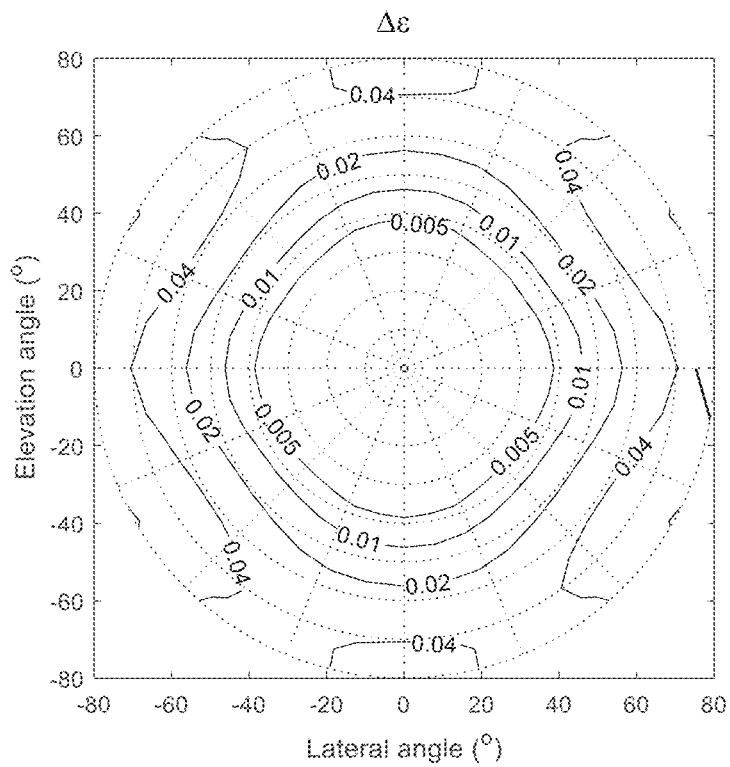
FIG. 25B is a schematic graph illustrating the variation of output colour with polar direction for the transmitted light rays for the arrangement of FIG. 23A in public mode for the broadband absorbing polariser of FIG. 25A and plural retarders 300 of FIGS. 18A-B.
Figure 25C:
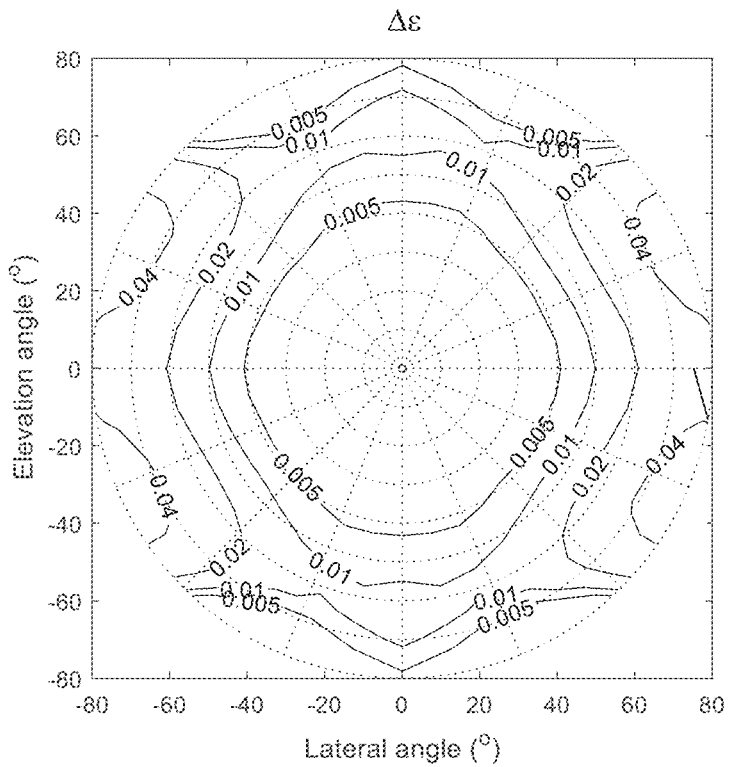
FIG. 25C is a schematic graph illustrating the variation of output colour with polar direction for the transmitted light rays for the arrangement of FIG. 23A in public mode for the leaking absorbing polariser of FIG. 25A and plural retarders 300 of FIGS. 18A-B.

FIG. 25B is a schematic graph illustrating the variation of output colour Δε with polar direction for the transmitted light rays for the arrangement of FIG. 23A in public mode for the broadband absorbing polariser 318 of FIG. 25A and plural retarders 300 of FIGS. 18A-B; and FIG. 25C is a schematic graph illustrating the variation of output colour Δε with polar direction for the transmitted light rays for the arrangement of FIG. 23A in public mode for the leaking absorbing polariser 318 of FIG. 25A and plural retarders 300 of FIGS. 18A-B.

Advantageously the colour variations in displays comprising the leaking absorbing polariser 318 are reduced in comparison to the colour variations for the broadband polariser 318. Further transmission efficiency is increased.

Figure 25D:
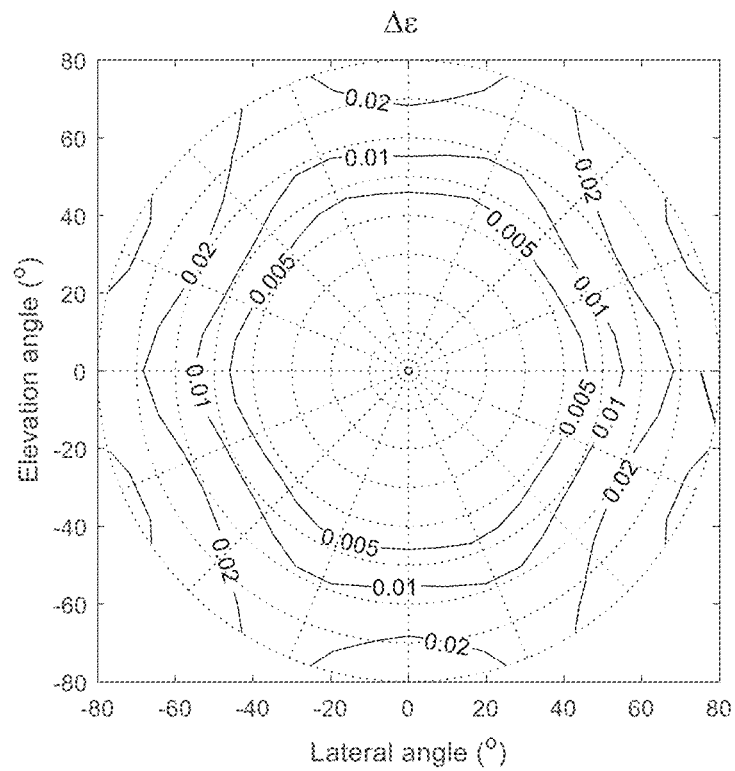
FIG. 25D is a schematic graph illustrating the variation of output colour with polar direction for the transmitted light rays for the arrangement of FIG. 23A in public mode for the broadband absorbing polariser of FIG. 25A and plural retarders 300 of FIGS. 19A-B.
Figure 25E:
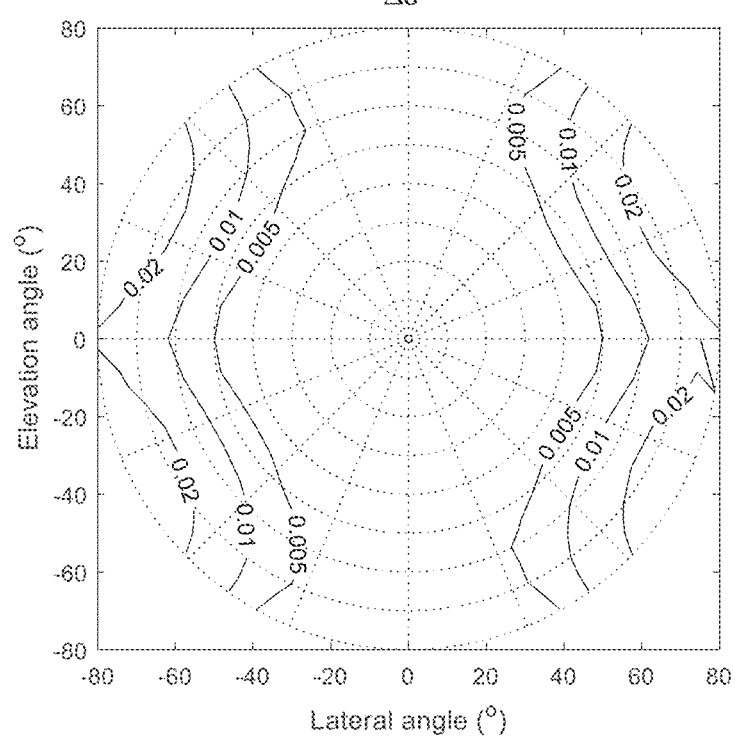
FIG. 25E is a schematic graph illustrating the variation of output colour with polar direction for the transmitted light rays for the arrangement of FIG. 23A in public mode for the leaking absorbing polariser of FIG. 25A and plural retarders 300 of FIGS. 19A-B.

FIG. 25D is a schematic graph illustrating the variation of output colour Δε with polar direction for the transmitted light rays for the arrangement of FIG. 23A in public mode for the broadband absorbing polariser of FIG. 25A and plural retarders 300 of FIGS. 19A-B; and FIG. 25E is a schematic graph illustrating the variation of output colour Δε with polar direction for the transmitted light rays for the arrangement of FIG. 23A in public mode for the leaking absorbing polariser of FIG. 25A and plural retarders 300 of FIGS. 19A-B.

In comparison to the arrangements of FIGS. 25B-C advantageously colour variations with polar angle are reduced while reduced luminance for off-axis locations is achieved.

Figure 26A:
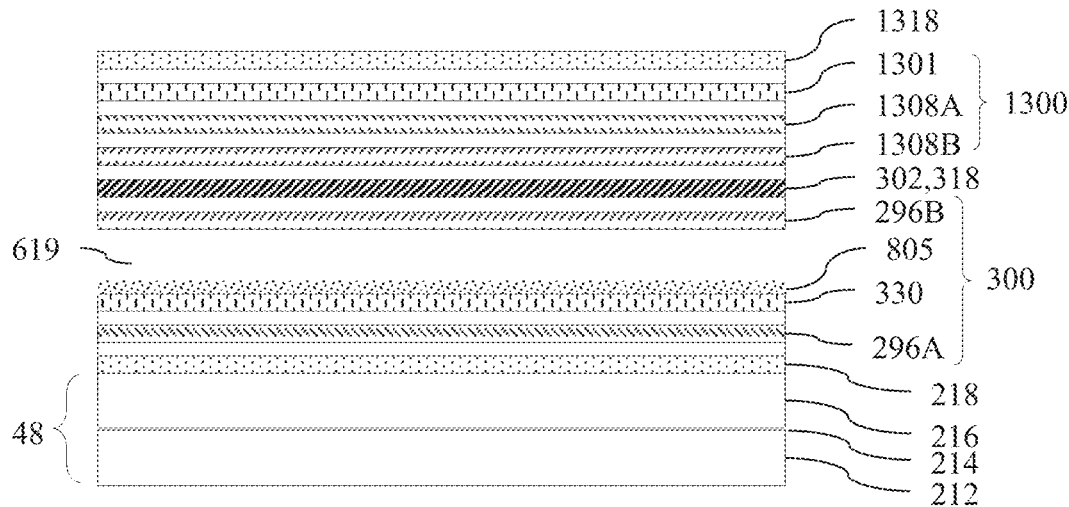
FIG. 26A is a schematic diagram illustrating in side view a switchable privacy display for use in ambient illumination comprising an emissive spatial light modulator, a switchable retarder arranged between the reflective polariser and an additional polariser; a passive retarder between quarter-wave plates arranged between the reflective polariser and the output polariser of the spatial light modulator, and an air gap and diffuser.

It would be desirable to further reduce the variation of colour with viewing angle FIG. 26A is a schematic diagram illustrating in side view a switchable privacy display for use in ambient illumination comprising an emissive spatial light modulator 48, a switchable retarder 1300 arranged between the reflective polariser 302 (that is the additional polariser 318) and further additional polariser 1318; plural retarders 300 comprising a passive retarder 330 between quarter-wave plates 296A, 296B arranged between the reflective polariser 302 and the output polariser 218 of the spatial light modulator 48, and an air gap 619 and diffuser 805 arranged between the output polariser 218 and reflective polariser 302.

The display device further comprises a reflective polariser 302 arranged between the output polariser 218 and the at least one further retarder 1300, the output polariser 218 and the reflective polariser 302 being arranged to pass the same linearly polarised polarisation state, and the at least one further retarder is comprises a switchable liquid crystal retarder comprising a layer of liquid crystal material and electrodes arranged to apply a voltage for switching the layer 1314 of liquid crystal material. The at least one retarder 330 arranged between the pair of quarter-wave plates 296A, 296B comprises at least one passive retarder 330 having a retardance for light of a wavelength of 550 nm in a range from −100 nm to −400 nm or in a range from +200 nm to +600 nm and preferably in a range from −200 nm to −300 nm or preferably in a range from +300 nm to +500 nm.

Diffuser 805 at air gap 619 achieves mixing of output angles from the passive retarder 330, advantageously reducing the visibility of colour changes with polar viewing angle. Diffuser 805 and air gap 619 may be provided by a bulk diffuser layer containing scattering elements for example.

It may be desirable to provide diffuser for colour mixing on the input side of the spatial light modulator 48.

Figure 26B:
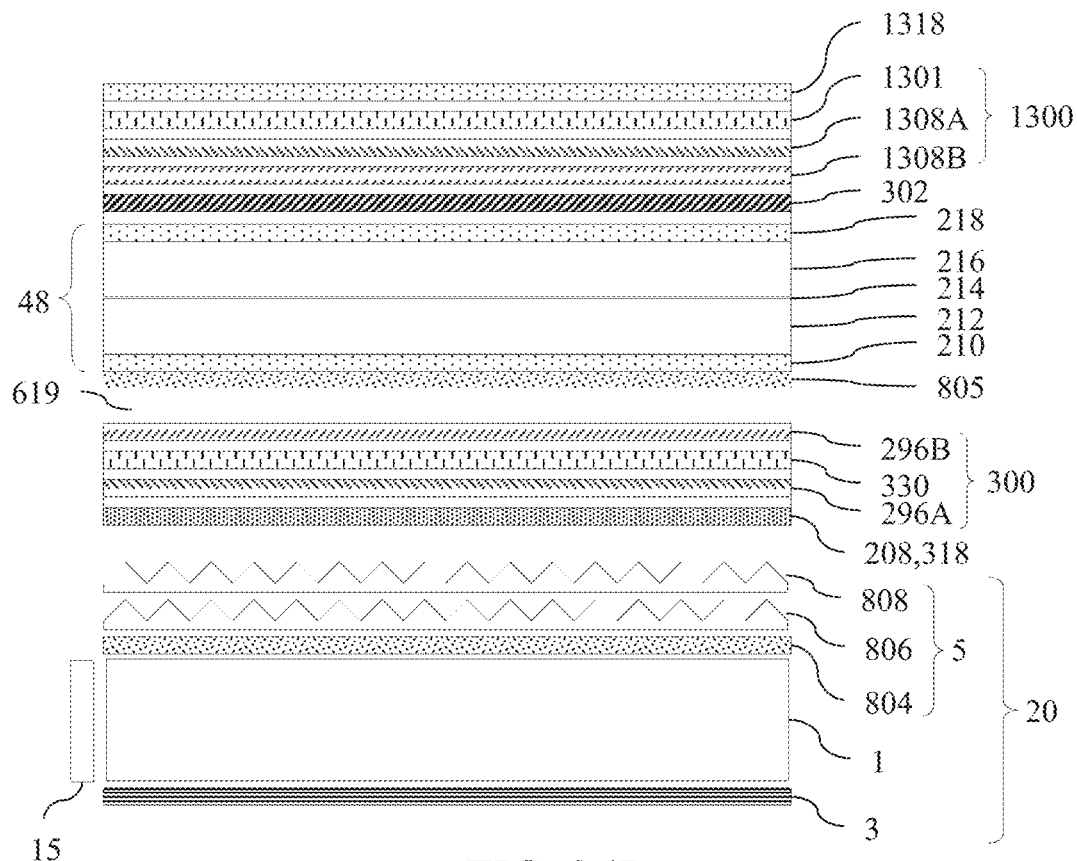
FIG. 26B is a schematic diagram illustrating in side view a switchable privacy display for use in ambient illumination comprising a transmissive spatial light modulator, a recirculating backlight, a switchable retarder arranged between the reflective polariser and an additional polariser; a passive retarder between quarter-wave plates arranged between the reflective input polariser and the input polariser of the spatial light modulator, and an air gap and diffuser.

FIG. 26B is a schematic diagram illustrating in side view a switchable privacy display for use in ambient illumination comprising a transmissive spatial light modulator 48, a recirculating backlight 20, a switchable retarder 1300 arranged between the reflective polariser 302 and further additional polariser 1318; plural retarders 300 comprising a passive retarder 330 between quarter-wave plates 296A, 296B arranged between the reflective recirculation polariser 208 (that is the additional polariser 318) and the input polariser 210 of the spatial light modulator 48, and an air gap 619 and diffuser 805.

The reflective recirculation polariser 208 is different in operation to the reflective polariser 302 as described elsewhere herein. The angular variation provided by the plural retarders 300 may be similar to that shown in FIG. 25C for example. Surface relief diffuser 805 may provide angular mixing of light from the display, reducing the variation of colour changes. Advantageously privacy performance may be enhanced while using thin and efficient recirculating backlights. Further the retardance of the passive retarder 330 may be increased, achieving reduction of luminance at smaller polar angles and advantageously increasing privacy performance while minimising colour differences.

In other embodiments the collimated backlights such as those described below with regards to FIGS. 29A-31 may be provided. Off-axis luminance may be reduced and advantageously thickness and off-axis colour variations may be achieved.

Features of the embodiments of FIGS. 26A-B not discussed in further detail may be assumed to correspond to the features with equivalent reference numerals as discussed above, including any potential variations in the features.

Various stacking arrangements for plural retarders 300, 1300 and plural retarders 300A, 300B will now be illustrated.

FIGS. 27A-F are schematic diagrams illustrating in side view various arrangements of passive and active retarders arranged in series with an emissive spatial light modulator 48. Features of the embodiments of FIGS. 27A-F not discussed in further detail may be assumed to correspond to the features with equivalent reference numerals as discussed above, including any potential variations in the features.

Figure 27X:
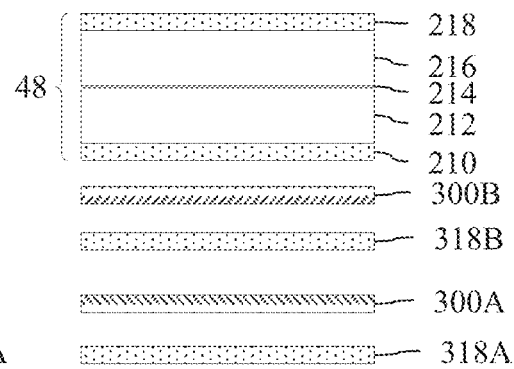
Figure 27A:
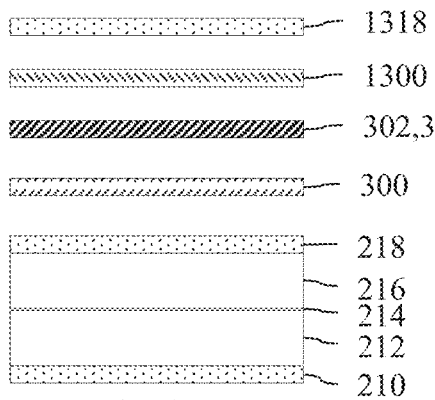
Figure 27A:
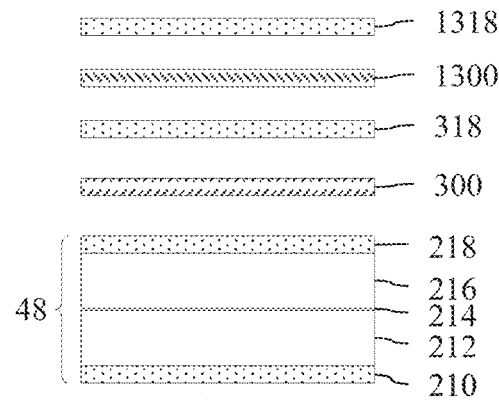
Figure 27A:
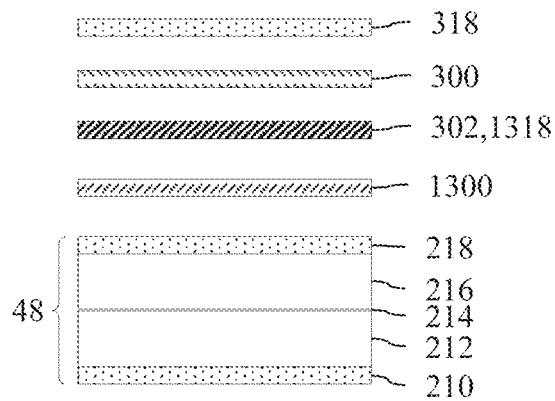
Figure 27A:
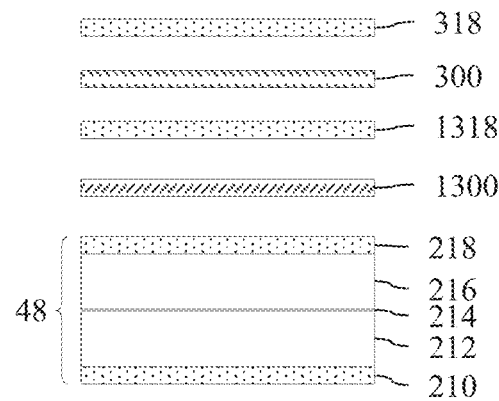
Figure 27A:
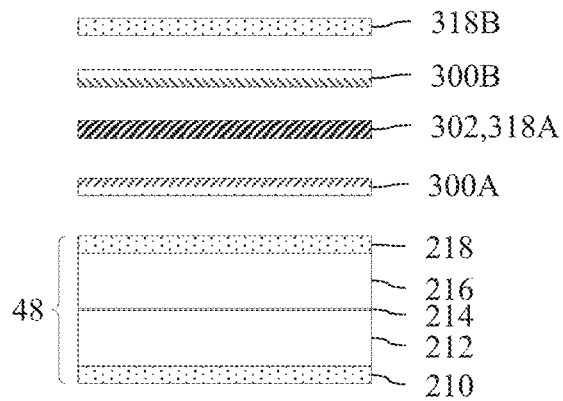
Figure 27A:
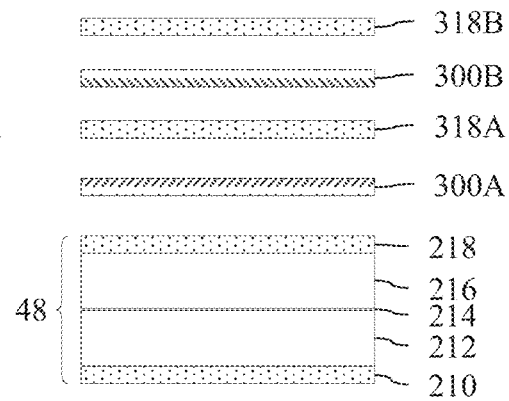

FIGS. 27G-X and FIGS. 27AA-AF are schematic diagrams illustrating in side view various arrangements of passive and active retarders arranged in series with a transmissive spatial light modulator 48. For clarity, some components such as backlights are omitted. Features of the embodiments of FIGS. 27G-X and FIGS. 27AA-AF not discussed in further detail may be assumed to correspond to the features with equivalent reference numerals as discussed above, including any potential variations in the features. The plural retarders 300, 300A, 300B may comprise passive or active retarder components as described elsewhere herein.

The location of the plural retarders 300, 1300 or 300A, 300B may be optimised to provide improved performance including visual security level, image visibility, transmission efficiency, front-of-screen thickness, total thickness, and cost.

FIGS. 26B, 27G, 27H, 27K and 27L illustrate embodiments wherein the at least one retarder between crossed quarter-wave plates is arranged between the reflective recirculation polariser 208 and display input polariser 210.

FIGS. 27M, 27N, 27Q and 27R illustrate embodiments wherein the at least one retarder between crossed quarter-wave plates is arranged between an absorbing additional polariser 318 and display input polariser 210.

Thus an output polariser 218 is arranged on the output side of the spatial light modulator 48; a further additional polariser 1318, 318B is arranged on the output side of the output polariser 210, the output polariser 210 and the further additional polariser being arranged to pass respective linearly polarised polarisation states; and at least one further retarder 1300, 300B is arranged between the output polariser 218 and the further additional polariser 1318, 318B.

Figure 28A:
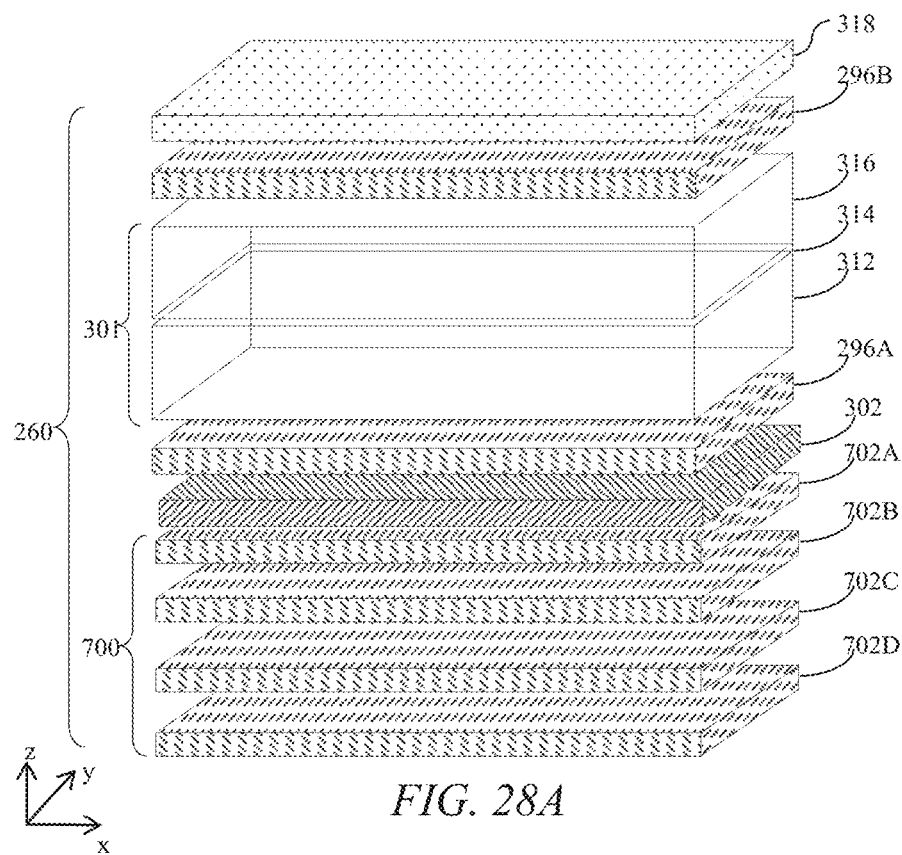
FIG. 28A is a schematic diagram illustrating in side perspective view a view angle control element comprising a passive compensation retarder stack, a reflective polariser and a switchable liquid crystal retarder between quarter-wave plates that is arranged between the reflective polarise and an additional polariser.

FIG. 28A is a schematic diagram illustrating in side perspective view a view angle control element 260 comprising a passive compensation retarder stack 700, a reflective polarise 302 and a switchable liquid crystal retarder 301 between quarter-wave plates 296A, 296B that is arranged between the reflective polariser 302 and an additional polariser 318.

FIG. 28A shows an embodiment to the view angle control element 260 different to that shown in FIG. 8B. In addition to the embodiment of FIG. 8B, the view angle control element 260 may comprise a passive retarder stack 700 comprising passive retarders 702A, 702B, 702C, and 702D. Features not discussed in further detail may be assumed to correspond to the features with equivalent reference numerals as discussed above, including any potential variations in the features.

In use, view angle control element 260 may be attached by a user to a polarised output spatial light modulator. View angle control element 6260 may be provided as a flexible film for curved and bent displays. The view angle control element 601 may be provided on a rigid substrate such as a glass substrate.

Advantageously, an after-market privacy control element and/or stray light control element may be provided that combines the effect of the plurality of retarders 300 as discussed above and a passive retarder stack 700 as described below. The view angle control element may be cut to size and orientation of the output polariser 218.

Figure 28B:
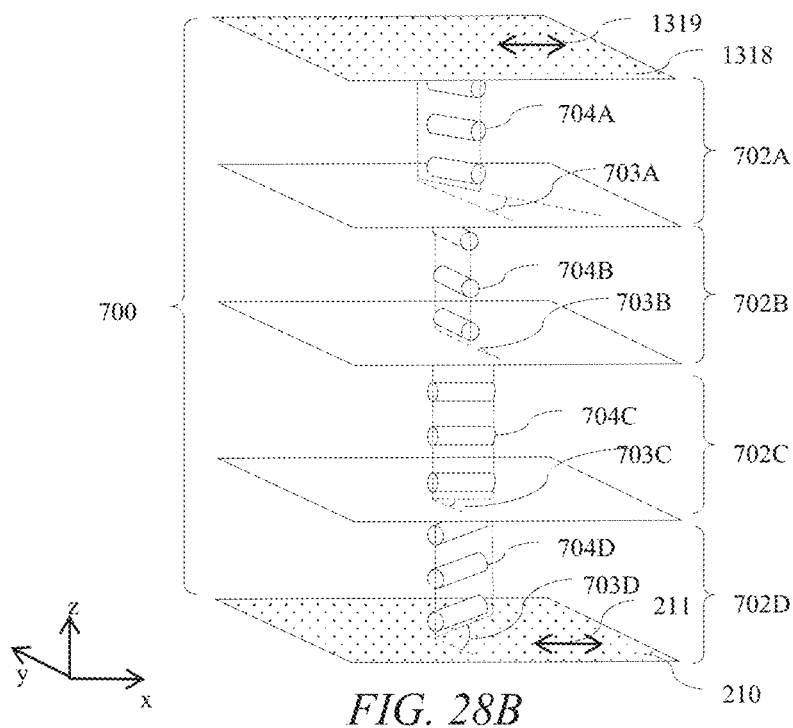
FIG. 28B is a schematic diagram illustrating in side perspective view an example of a passive retarder stack comprising a passive control retarder, comprising a series of four aligned A-plates.

FIG. 28B is a schematic diagram illustrating in side perspective view an example of a passive retarder stack 700 comprising a passive control retarder, comprising a series of four aligned A-plates.

The passive retarder stack 700 will now be discussed in more detail. The in-plane angle refers to the in-plane rotation of the slow axis orientations of the retarder material in comparison to the electric vector transmission directions 211, 1319 respectively of the input polariser 210 and further additional polariser 1318.

The passive retarder stack 700 may comprises a pair of passive retarders 702A, 702D which have slow axes in the plane of the retarders that are crossed. The pair of retarders each comprise plural A-plates having respective slow axes aligned at different angles from each other. The passive retarder stack 700 may further comprise an additional pair of passive retarders 702B, 702C disposed between the first mentioned pair of passive retarders 702A, 702D. The pair of passive retarders 702B, 702C may have slow axes that each extend at 90° and 0°, respectively, with respect to an electric vector transmission direction that is parallel to the electric vector transmission 211 of the input polariser 210. The pair of passive retarders 702B, 702C are therefore an example of a passive retarder 330 comprising plural passive retarders having an optical axis parallel to the plane of the passive retarder that are crossed.

Each passive retarder 702A, 702B, 702C, 702D may comprise birefringent molecules 704A, 704B, 704C, 704D that may be fixed liquid crystals such as UV cured reactive mesogens, stretched polymers or other known birefringent materials.

The pair of passive retarders 702A, 702D may have slow axes that extend at 45° and at 135°, respectively, with respect to an electric vector transmission direction 211 that is parallel to the electric vector transmission of the input polariser 210 respectively.

Figure 28C:
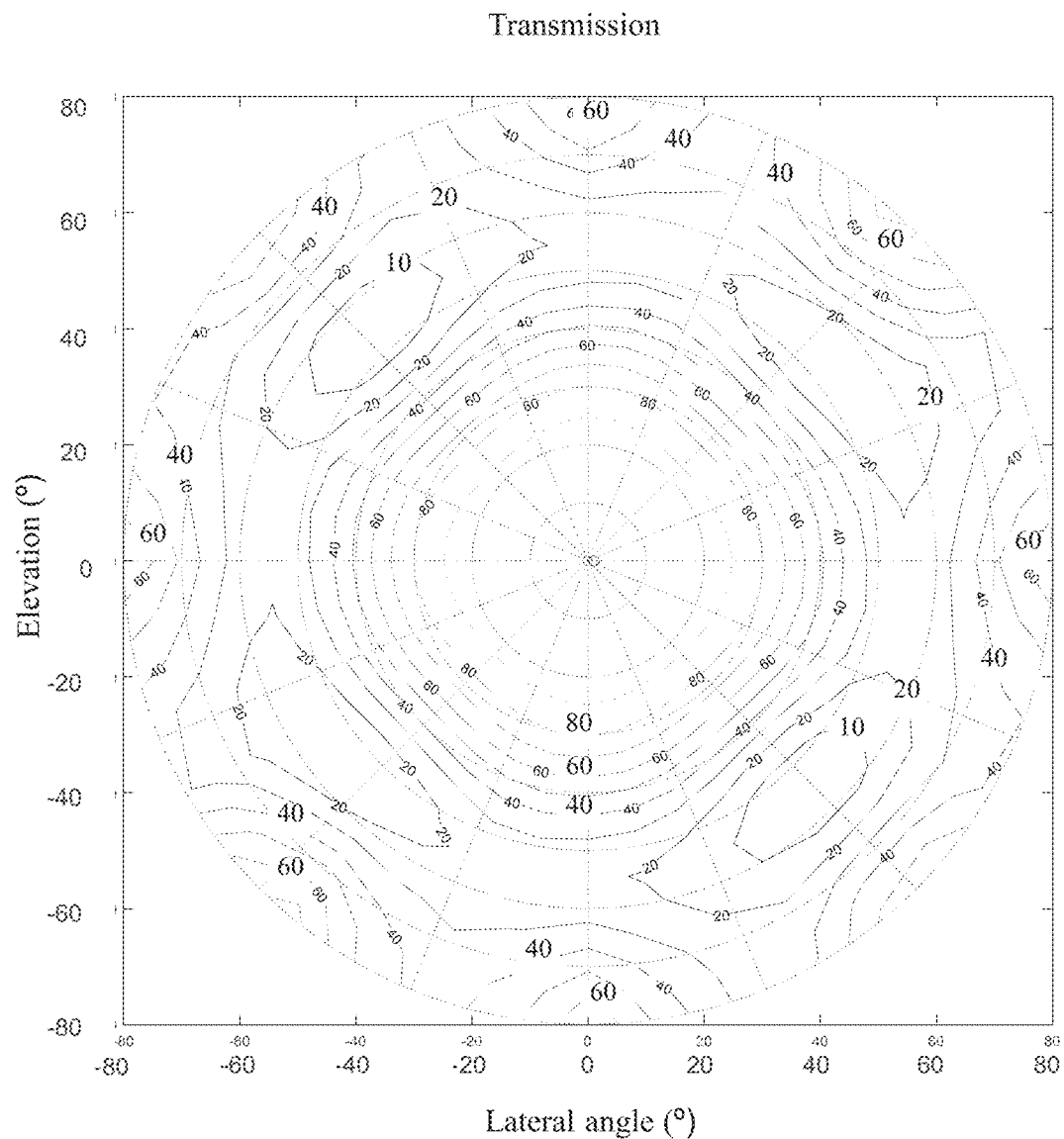
FIG. 28C is a schematic graph illustrating the variation of transmission with polar direction for the transmitted light rays for the arrangement of FIG. 28B.

FIG. 28C is a schematic graph illustrating the variation of transmission with polar direction for the transmitted light rays for the arrangement of FIG. 28B.

The graphs represent the polar variation of relative transmittance of the stack of retarders 700 between the parallel input polariser 210 and additional polariser 1318. Thus on-axis rays have substantially no change to luminance, other than losses from polariser head-on transmission and Fresnel reflection losses. Off-axis rays have reduced luminance as illustrated.

The schematic graphs illustrated in FIG. 28C was obtained using the further plurality of retarders 1300 comprising the parameters described TABLE 6. Desirable ranges for retardations and the other properties of the layers has been established by means of simulation of retarder stacks and experiment with display optical stacks.

TABLE 6

| | | Passive control retarder | | |
|---|---|---|---|---|
| Layer | Type | Out-of-plane angle/° | In-plane angle/° | Δn.d /nm |
| 272A | Positive A | 0 | 45 | 135 |
| 272B | | | 90 | 700 |
| 272C | | | 0 | 700 |
| 272D | | | 135 | 135 |

TABLE 7 is an example of another passive retarder stack 700, which is the same as shown in TABLE 6 except for the different parameters set out in the table. The quarter-wave plates 702A, 702D of TABLE 6 are zero-order waveplates whereas the quarter-wave plates 702A, 702D of TABLE 7 are second-order quarter-wave plates (q=2 in eqn. 13).

Optionally, the present disclosure may exclude either or both of be cases shown in TABLE 6 and TABLE 7.

Optionally, the present disclosure may exclude the case wherein the pair of quarter-wave plates have slow axes that extend at 45° and at 135° respectively are crossed and the retarder further comprises an additional pair of passive retarders disposed between the quarter-wave plates and which have slow axes in the plane of the passive retarders that are crossed.

Optionally, the present disclosure may exclude the case wherein one of the pair of quarter-wave plates has slow axes that extend at at least 40° and at most 50° with respect to an electric vector transmission direction that is parallel to the electric vector transmission of the display polariser, and the other of the pair of quarter-wave plates has slow axes that extend at at least 130° and at most 140° with respect to an electric vector transmission direction that is parallel to the electric vector transmission of the display polariser, wherein the retarder further comprises an additional pair of passive retarders disposed between the quarter-wave plates, one of additional pair of passive retarders having slow axes in the plane of the passive retarders that extend at at least −10° and at most 10° with respect to an electric vector transmission direction that is parallel to the electric vector transmission of the display polariser and the other of additional pair of passive retarders having slow axes in the plane of the passive retarders that extend at at least −10° and at most 10° with respect to an electric vector transmission direction that is parallel to the electric vector transmission of the display polariser.

TABLE 7

| | | Passive control retarder | | |
|---|---|---|---|---|
| Layer | Type | Out-of-plane angle/° | In-plane angle/° | Δn.d /nm |
| 272A | Positive A | 0 | 45 | 700 |
| 272B | | | 90 | |
| 272C | | | 0 | |
| 272D | | | 135 | |

Figure 29A:
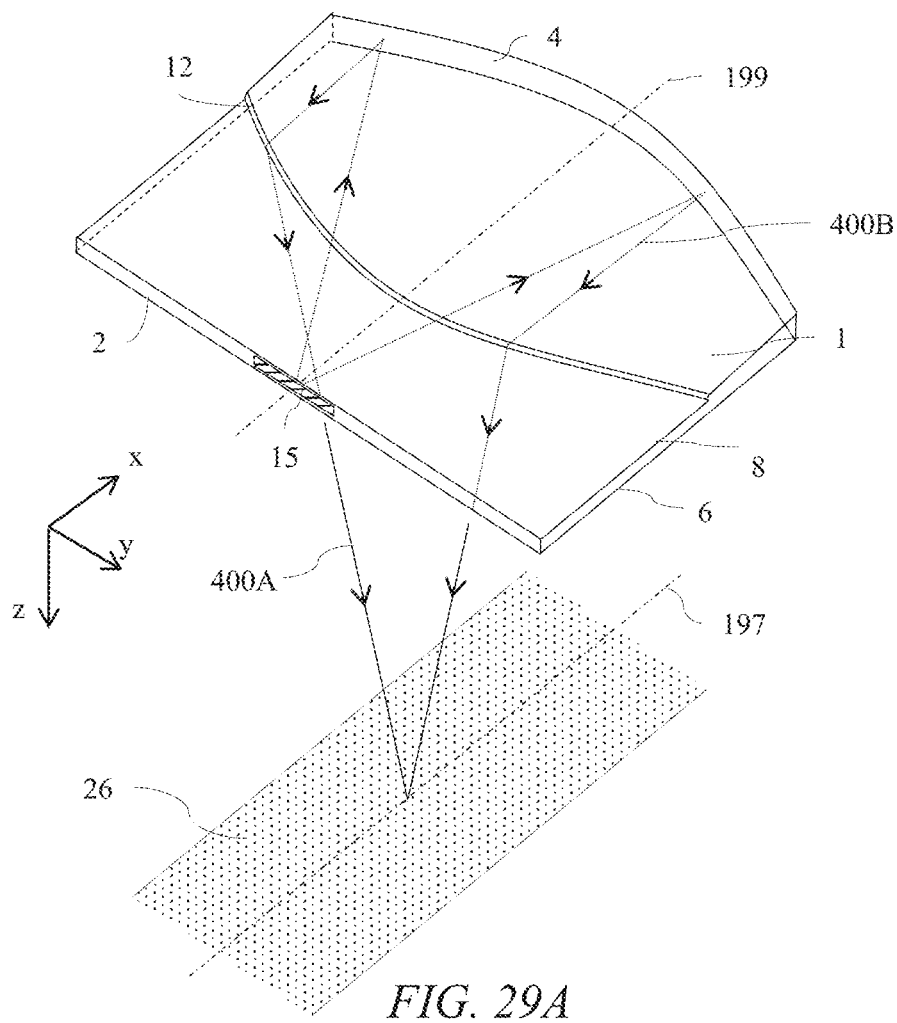
FIG. 29A is a schematic diagram illustrating a rear perspective view of operation of an imaging waveguide in a narrow angle mode of operation.

FIG. 29A is a schematic diagram illustrating a rear perspective view of operation of an imaging waveguide 1 in a narrow angle mode of operation. The example of the waveguide 1 shown in FIG. 29A may be combined with any of the embodiments of the display device 100 as discussed above.

Light rays 400A, 400B provided by input set 15 of light sources are directed to reflective end 4, and directed within the waveguide 1 to extraction feature 12 by means of total internal reflection within the waveguide 1. The waveguide 1 comprises a light input surface 2 extending along a first end of the directional waveguide 1, and a reflective end 4 extending along a second end of the directional waveguide 1 opposite to the first end 2 for reflecting the input light back along the waveguide 1, the reflective end 4 having positive optical power in the lateral direction. The second guide surface 8 comprises light extraction features 12 and intermediate regions 10 between the light extraction features 12, the light extraction features 12 being oriented to deflect the reflected input light 400A, 400B through the first guide surface 6 as output light and the intermediate regions 10 being arranged to direct light through the waveguide 1 without extracting it.

Imaging waveguides and optical systems incorporating imaging waveguides are described in U.S. Pat. No. 9,519,153 and in U.S. Pat. No. 10,054,732, both of which are herein incorporated by reference in their entireties.

As illustrated in FIG. 29A, the light extraction features may have positive optical power in the lateral direction, such optical power cooperates with the optical power of the curved reflective end 4 to provide imaging of the set 15 of light sources.

After reflection rays 400A, 400B is directed in the z-direction to optical window 26 in the window plane 106. Optical window 26 is an image in the lateral direction (y-axis) of the set 15 of light sources.

The second guide surface 8 is thus arranged to deflect the reflected input light 400A, 400B through the first guide 6 surface as output light, and the waveguide 1 is arranged to image the set 15 of light sources in the lateral direction so that the output light from the light sources is directed into respective optical windows 26 in output directions that are distributed in dependence on input positions of the light sources of the set 15 of light sources.

Advantageously imaging waveguides have demonstrated off-axis relative luminance, P at lateral angles of 45 degrees of less than 1.5%. In the present example, such waveguides 1 can achieve off-axis luminance in privacy mode of less than 0.1% when the liquid crystal retarder is appropriately driven. Very high levels of visual image security, VSL can be achieved, including VSL>4. Such displays have improved performance in low illuminance environments when >1 nits/lux display setting may be desirable.

Figure 29B:
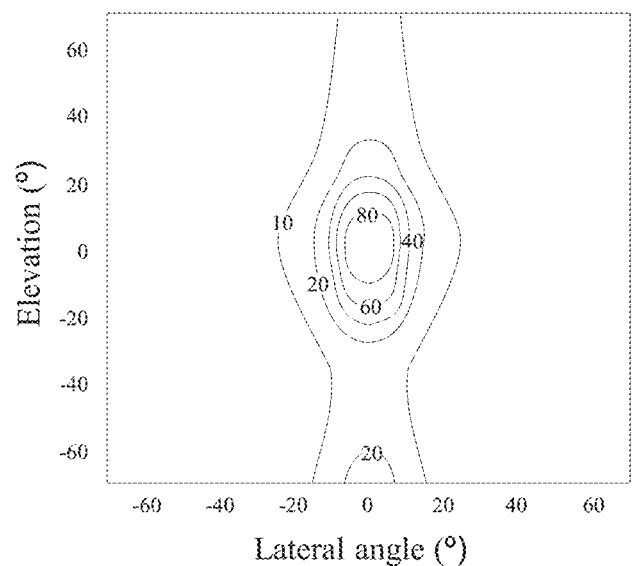
FIG. 29B is a schematic graph illustrating field-of-view luminance plot of the output of FIG. 29A when used in a display apparatus with no switchable liquid crystal retarder.

FIG. 29B is a schematic graph illustrating field-of-view luminance plot of the output of FIG. 29A when used in a display apparatus with no switchable liquid crystal retarder.

Advantageously relatively low levels of off-axis luminance may be achieved for off-axis viewing systems, because of the imaging of the waveguide. For example less than 5% of head-on luminance at a lateral angle of 45 degrees and elevation of 0 degrees may be provided.

Such a waveguide 1 has a thickness that is limited by the height of the light sources and efficiency determined by the relative height of the reflective end 4 and input end 2. It would be desirable to provide reduced thickness.

Figure 30:
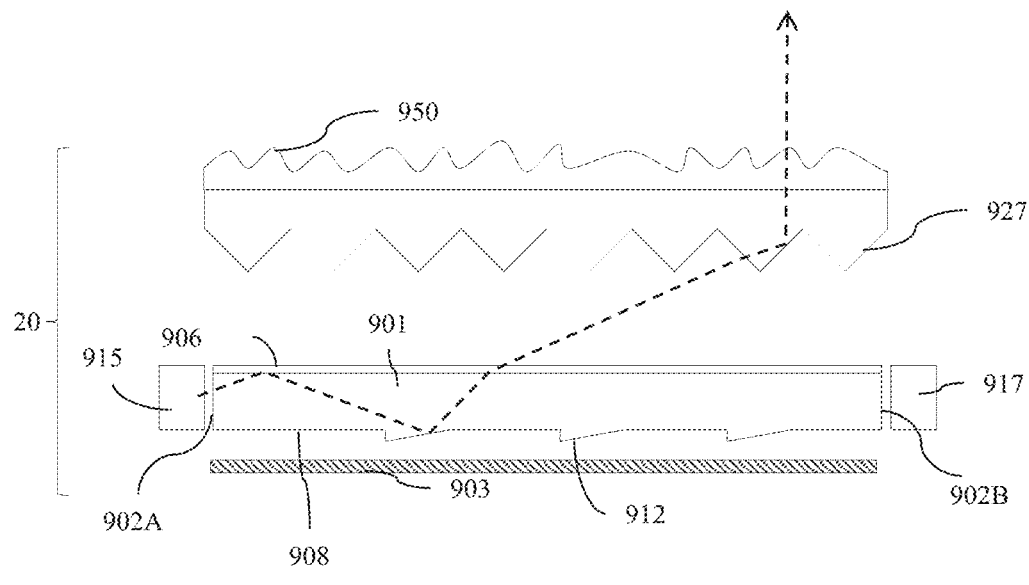
FIG. 30 is a schematic diagram illustrating side view of a backlight comprising collimating waveguide.

FIG. 30 is a schematic diagram illustrating side view of a backlight 20 comprising collimating waveguide 901. The example of the backlight 20 shown in FIG. 30 may be combined with any of the embodiments of the display device 100 as discussed above.

The directional waveguide 901 comprises: first and second light input surfaces 902A, 902B extending in a lateral direction along opposing ends of the waveguide 901, the sets 915, 917 of light sources being disposed along each respective light input surface 902A, 902B; and opposed first and second light guiding surfaces 906, 908 extending across the waveguide 901 from light input surface 902A for guiding the input light 400 along the waveguide 901 by total internal reflection, the waveguide being arranged to deflect input light guided through the waveguide to exit through the first guide surface 906.

The at least one light input surface comprises a first input surface 902A extending along a first end of the waveguide 901 and a second input surface 902B extending along a second light input end of the waveguide 901 wherein the second light input end faces the first light input end.

Reflector 903 may be arranged to deflect light that is scattered to the rear of the backlight 20 to increase efficiency. Output light rays 400 are output from the waveguide and are further deflected by turning film 927 and may be diffused by surface 950 arranged on or near the output of the turning film 927.

Figure 31:
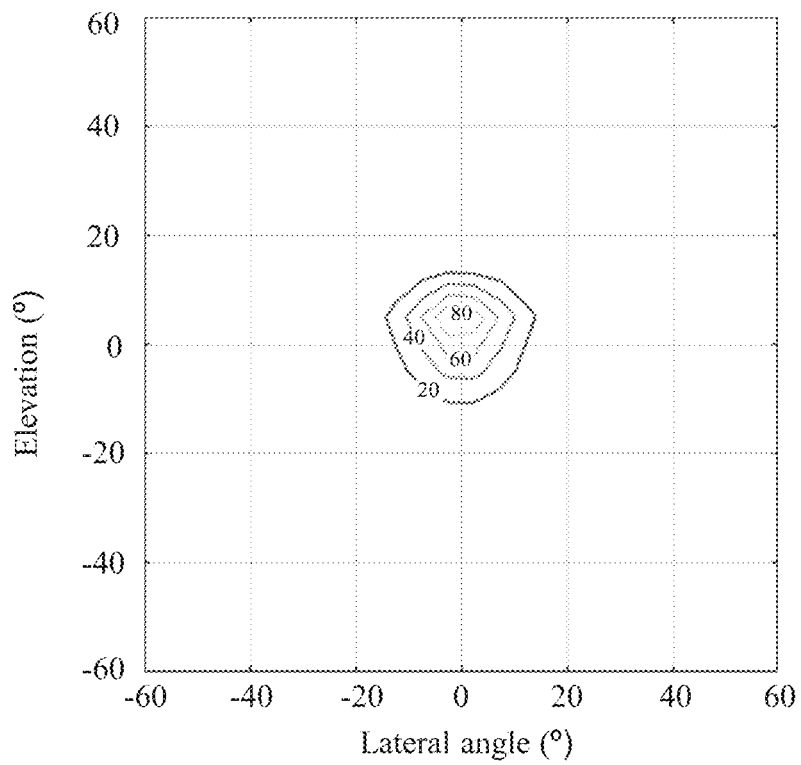
FIG. 31 is a schematic graph illustrating field-of-view luminance plot of the output of FIG. 30 when used in a display apparatus with no switchable liquid crystal retarder.

FIG. 31 is a schematic graph illustrating field-of-view luminance plot of the output of FIG. 30 when used in a display apparatus with no switchable liquid crystal retarder.

Advantageously such an illumination profile can achieve high efficiency of illumination to a head-on user. Further, such a profile is substantially uniform along the length of the optical waveguide 901, achieving high luminance uniformity and reduced power consumption. Such a profile can also be used to provide the privacy mode operation of a backlight 20 for a privacy display 100.

The operation of retarder layers between parallel polarisers for off-axis illumination will now be described further. In the various devices described above, at least one retarder is arranged between the reflective polariser 318 and the additional polariser 218 in various different configurations. In each case, the at least one retarder is configured so that it does not affect the luminance of light passing through the reflective polariser 318, the at least one retarder, and the additional polariser 218 along an axis along a normal to the plane of the retarder(s) but it does reduce the luminance of light passing through the reflective polariser 318, the at least one retarder, and the additional polariser 218 along an axis inclined to a normal to the plane of the retarder(s), at least in one of the switchable states of the compensated switchable retarder 300. There will now be given a description of this effect in more detail, the principles of which may be applied in general to all of the devices described above.

Figure 32A:
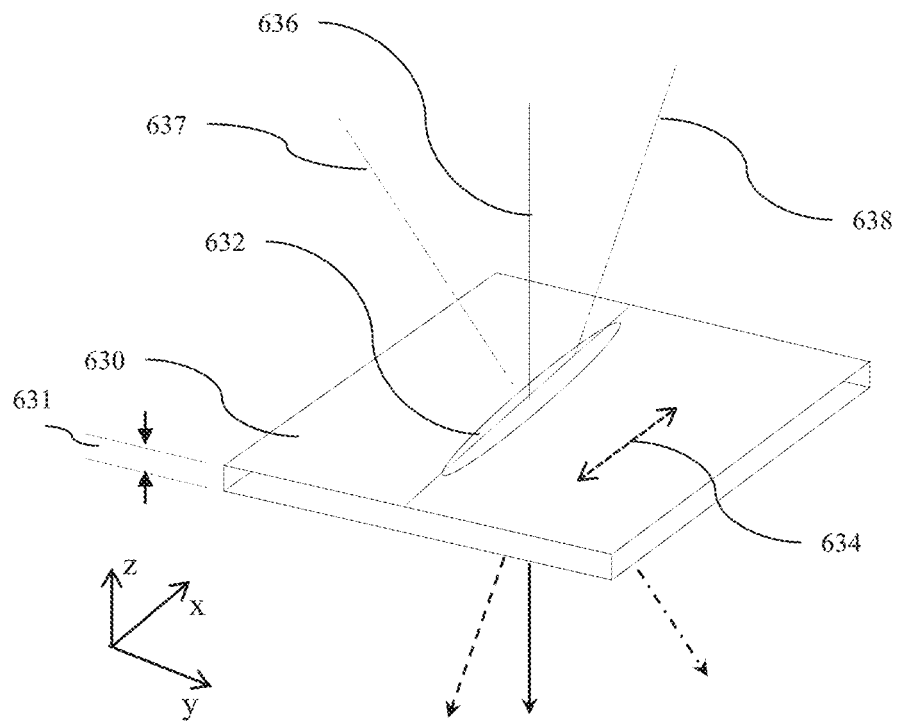
FIG. 32A is a schematic diagram illustrating in perspective view illumination of a retarder layer by off-axis light.

FIG. 32A is a schematic diagram illustrating in perspective view illumination of a retarder layer by off-axis light. Correction retarder 630 may comprise birefringent material, represented by refractive index ellipsoid 632 with optical axis direction 634 at 0 degrees to the x-axis, and have a thickness 631. Normal light rays 636 propagate so that the path length in the material is the same as the thickness 631. Light rays 637 are in the y-z plane have an increased path length; however the birefringence of the material is substantially the same as the rays 636. By way of comparison light rays 638 that are in the x-z plane have an increased path length in the birefringent material and further the birefringence is different to the normal ray 636.

The retardance of the retarder 630 is thus dependent on the angle of incidence of the respective ray, and also the plane of incidence, that is rays 638 in the x-z will have a retardance different from the normal rays 636 and the rays 637 in the y-z plane.

The interaction of polarized light with the retarder 630 will now be described. To distinguish from the first and second polarization components during operation in a directional backlight 101, the following explanation will refer to third and fourth polarization components.

Figure 32B:
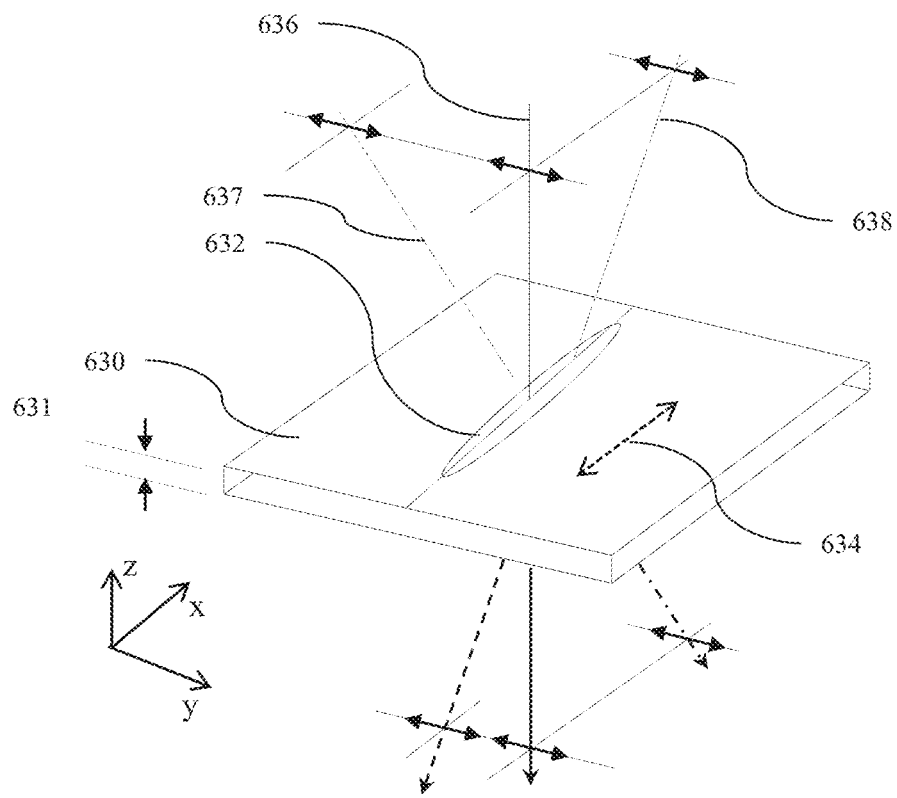
FIG. 32B is a schematic diagram illustrating in perspective view illumination of a retarder layer by off-axis light of a first linear polarization state at 0 degrees.
Figure 32C:
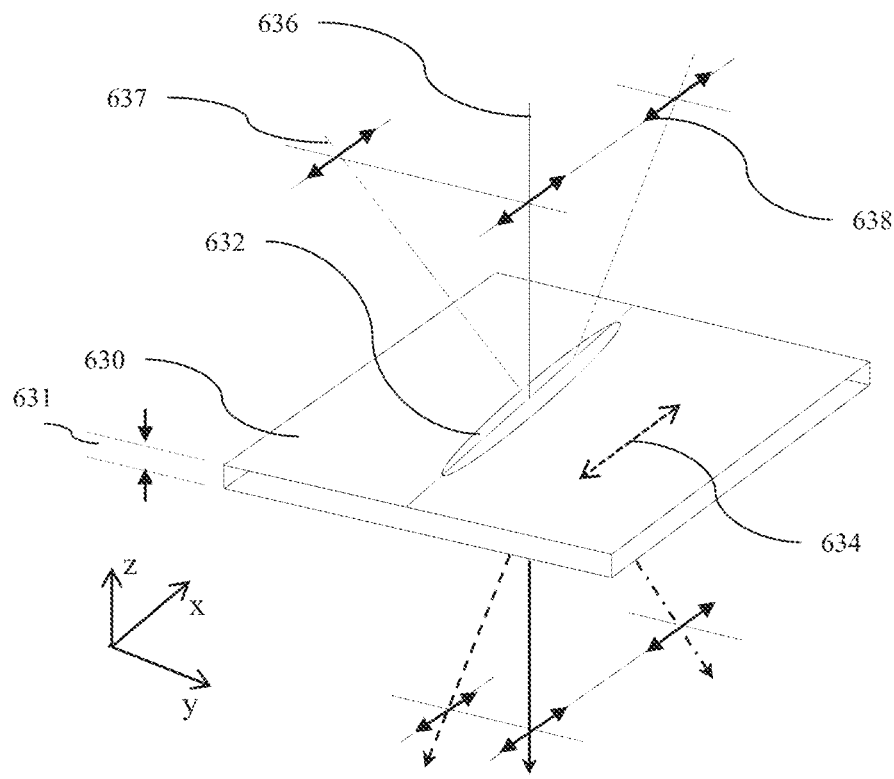
FIG. 32C is a schematic diagram illustrating in perspective view illumination of a retarder layer by off-axis light of a first linear polarization state at 90 degrees.

FIG. 32B is a schematic diagram illustrating in perspective view illumination of a retarder layer by off-axis light of a third linear polarization state at 90 degrees to the x-axis and FIG. 32C is a schematic diagram illustrating in perspective view illumination of a retarder layer by off-axis light of a fourth linear polarization state at 0 degrees to the x-axis. In such arrangements, the incident linear polarization states are aligned to the optical axes of the birefringent material, represented by ellipse 632. Consequently, no phase difference between the third and fourth orthogonal polarization components is provided, and there is no resultant change of the polarization state of the linearly polarized input for each ray 636, 637, 638. Thus, the retarder 630 introduces no phase shift to polarisation components of light passed by the polariser on the input side of the retarder 630 along an axis along a normal to the plane of the retarder 630. Accordingly, the retarder 630 does not affect the luminance of light passing through the retarder 630 and polarisers (not shown) on each side of the retarder 630. Although FIGS. 29A-C relate specifically to the retarder 630 that is passive, a similar effect is achieved by the retarders in the devices described above.

Figure 32D:
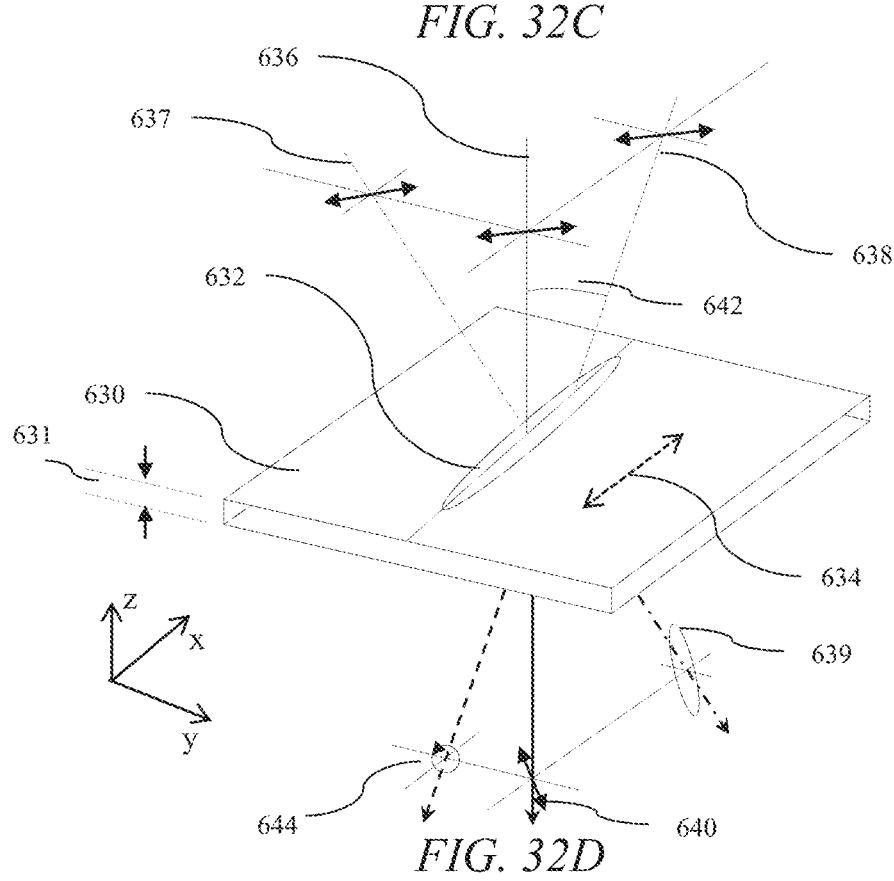
FIG. 32D is a schematic diagram illustrating in perspective view illumination of a retarder layer by off-axis light of a first linear polarization state at 45 degrees.

FIG. 32D is a schematic diagram illustrating in perspective view illumination of a retarder 630 layer by off-axis light of a linear polarization state at 45 degrees. The linear polarization state may be resolved into third and fourth polarization components that are respectively orthogonal and parallel to optical axis 634 direction. The retarder thickness 631 and material retardance represented by refractive index ellipsoid 632 may provide a net effect of relatively shifting the phase of the third and fourth polarization components incident thereon in a normal direction represented by ray 636 by half a wavelength, for a design wavelength. The design wavelength may for example be in the range of 500 to 550 nm.

At the design wavelength and for light propagating normally along ray 636 then the output polarization may be rotated by 90 degrees to a linear polarization state 640 at −45 degrees. Light propagating along ray 637 may see a phase difference that is similar but not identical to the phase difference along ray 637 due to the change in thickness, and thus an elliptical polarization state 639 may be output which may have a major axis similar to the linear polarization axis of the output light for ray 636.

By way of contrast, the phase difference for the incident linear polarization state along ray 638 may be significantly different, in particular a lower phase difference may be provided. Such phase difference may provide an output polarization state 644 that is substantially circular at a given inclination angle 642. Thus, the retarder 630 introduces a phase shift to polarisation components of light passed by the polariser on the input side of the retarder 630 along an axis corresponding to ray 638 that is inclined to a normal to the plane of the retarder 630. Although FIG. 29BD relates to the retarder 630 that is passive, a similar effect is achieved by the retarders described above, in a switchable state of the switchable liquid crystal retarder corresponding to the privacy mode.

To illustrate the off-axis behaviour of retarder stacks, the angular luminance control of C-plates 308A, 308B between an additional polariser 318 and output display polariser 218 will now be described for various off-axis illumination arrangements with reference to the operation of a C-plate between the parallel polarisers 500, 210 will now be described.

Figure 33A:
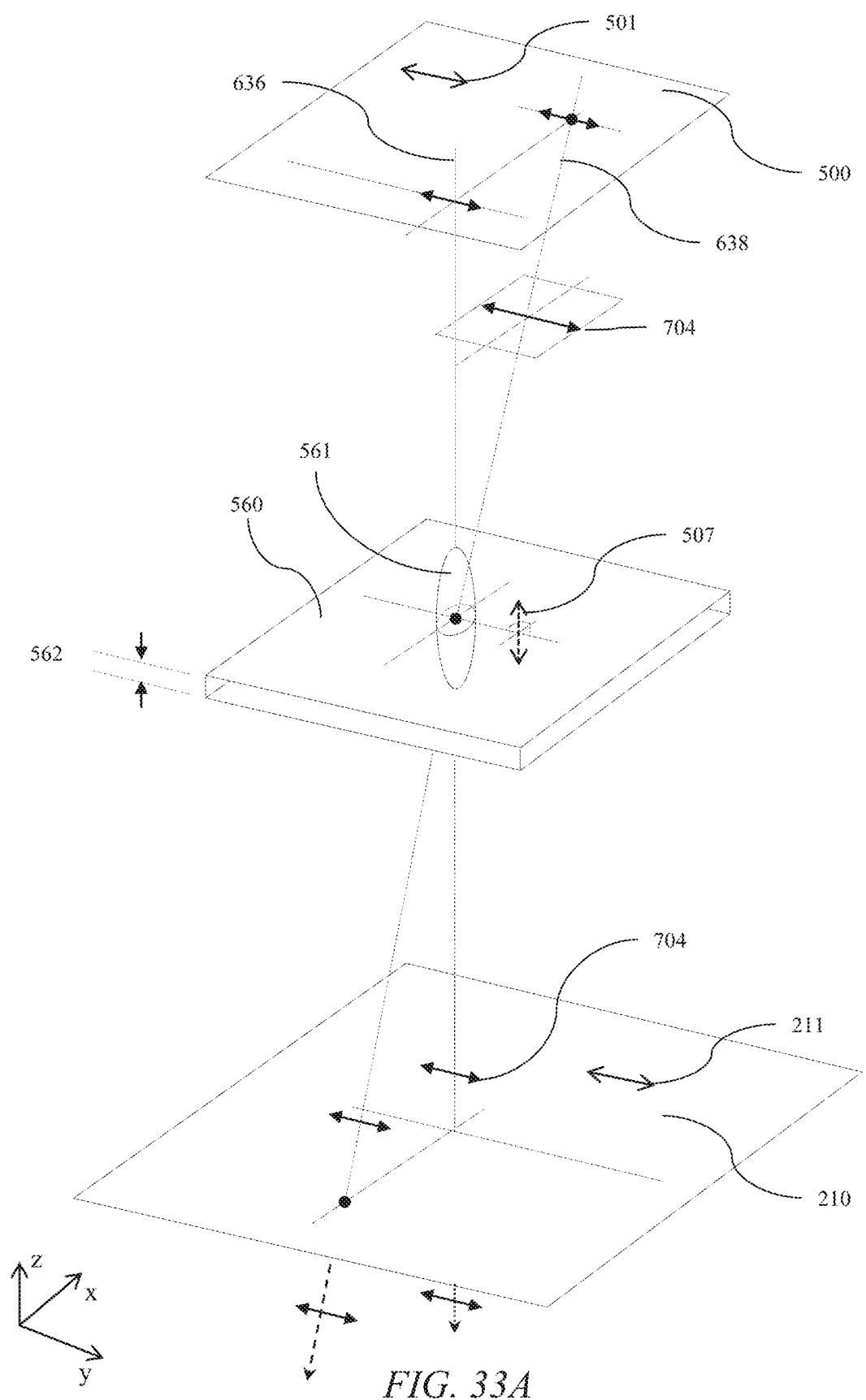
FIG. 33A is a schematic diagram illustrating in perspective view illumination of a C-plate retarder by off-axis polarised light with a positive elevation.

FIG. 33A is a schematic diagram illustrating in perspective view illumination of a C-plate layer by off-axis polarised light with a positive elevation. Incident linear polarisation component 704 is incident onto the birefringent material 632 of the retarder 560 that is a C-plate with optical axis direction 507 that is perpendicular to the plane of the retarder 560. Polarisation component 704 sees no net phase difference on transmission through the liquid crystal molecule and so the output polarisation component is the same as component 704. Thus a maximum transmission is seen through the polariser 210. Thus the retarder 560 having an optical axis 561 perpendicular to the plane of the retarder 560, that is the x-y plane. The retarder 560 having an optical axis perpendicular to the plane of the retarder comprises a C-plate.

Figure 33B:
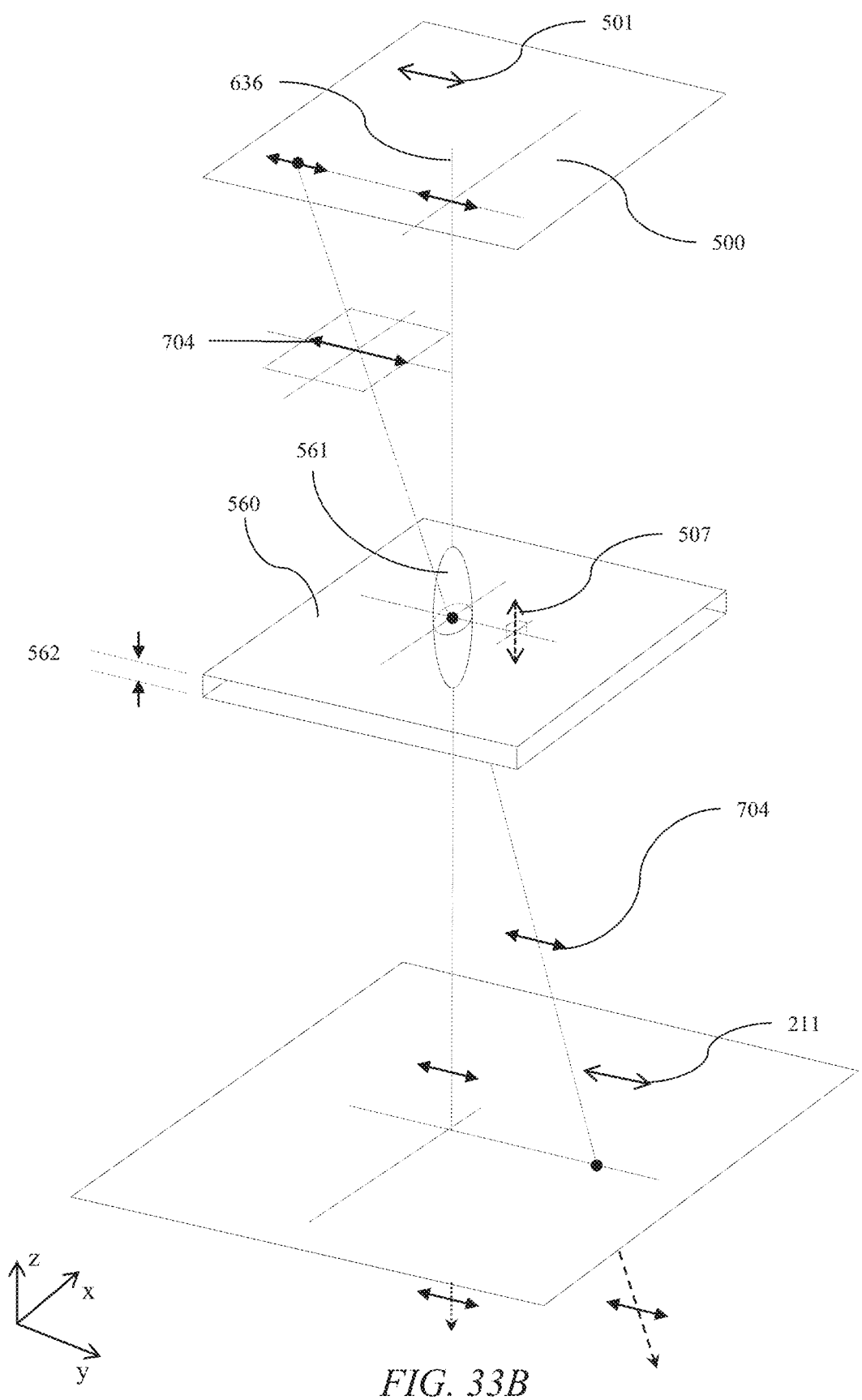
FIG. 33B is a schematic diagram illustrating in perspective view illumination of a C-plate retarder by off-axis polarised light with a negative lateral angle.

FIG. 33B is a schematic diagram illustrating in perspective view illumination of a C-plate layer by off-axis polarised light with a negative lateral angle. As with the arrangement of FIG. 33A, polarisation state 704 sees no net phase difference and is transmitted with maximum luminance. Thus, the retarder 560 introduces no phase shift to polarisation components of light passed by the polariser on the input side of the retarder 560 along an axis along a normal to the plane of the retarder 560. Accordingly, the retarder 560 does not affect the luminance of light passing through the retarder 560 and polarisers (not shown) on each side of the retarder 560. Although FIGS. 29A-C relate specifically to the retarder 560 that is passive, a similar effect is achieved by the retarders in the devices described above.

Figure 33C:
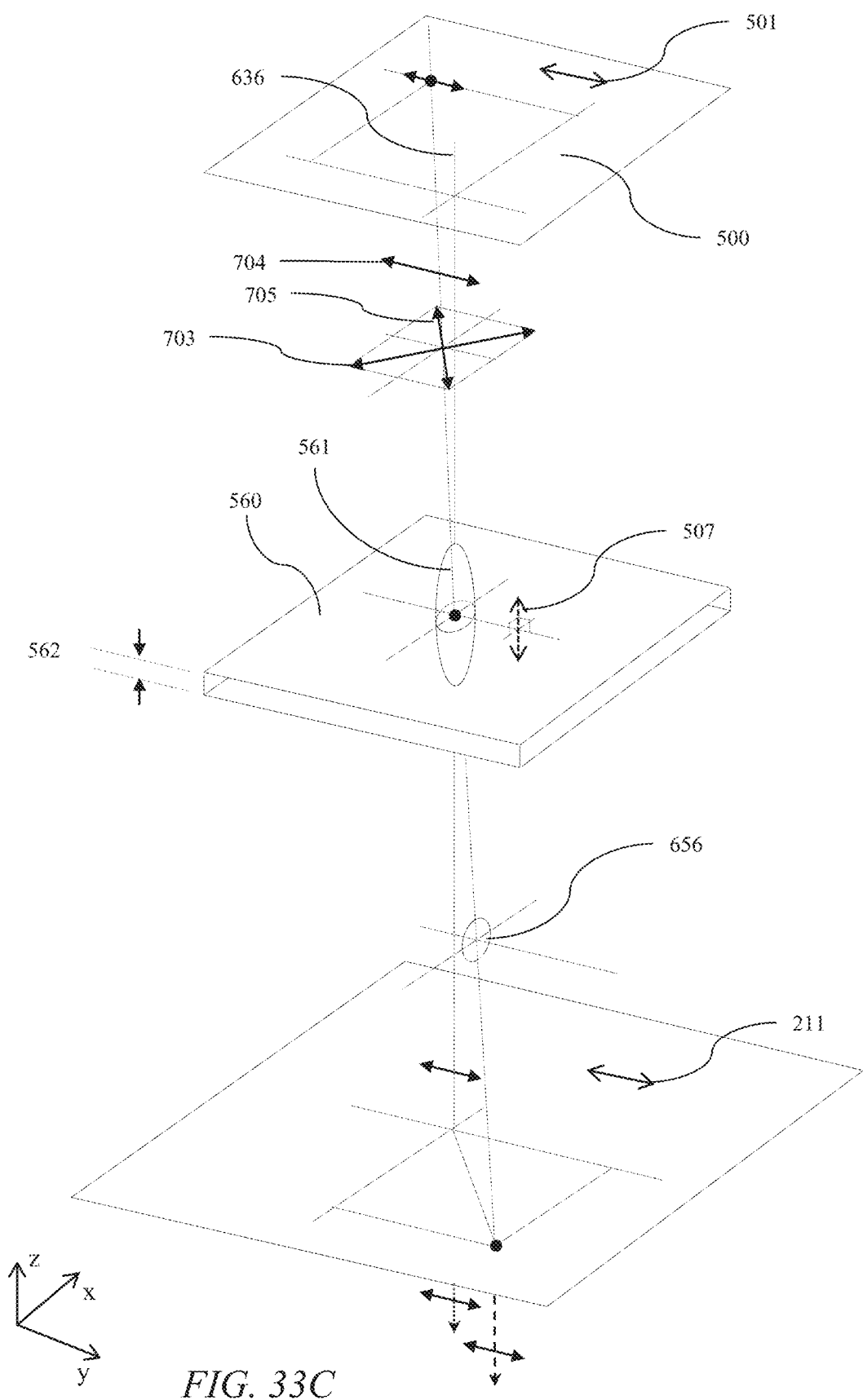
FIG. 33C is a schematic diagram illustrating in perspective view illumination of a C-plate retarder by off-axis polarised light with a positive elevation and negative lateral angle.

FIG. 33C is a schematic diagram illustrating in perspective view illumination of a C-plate layer by off-axis polarised light with a positive elevation and negative lateral angle. In comparison to the arrangement of FIGS. 33A-B, the polarisation state 704 resolves onto eigenstates 703, 705 with respect to the birefringent material 632 providing a net phase difference on transmission through the retarder 560. The resultant elliptical polarisation component 656 is transmitted through polariser 210 with reduced luminance in comparison to the rays illustrated in FIGS. 33A-B.

Figure 33D:
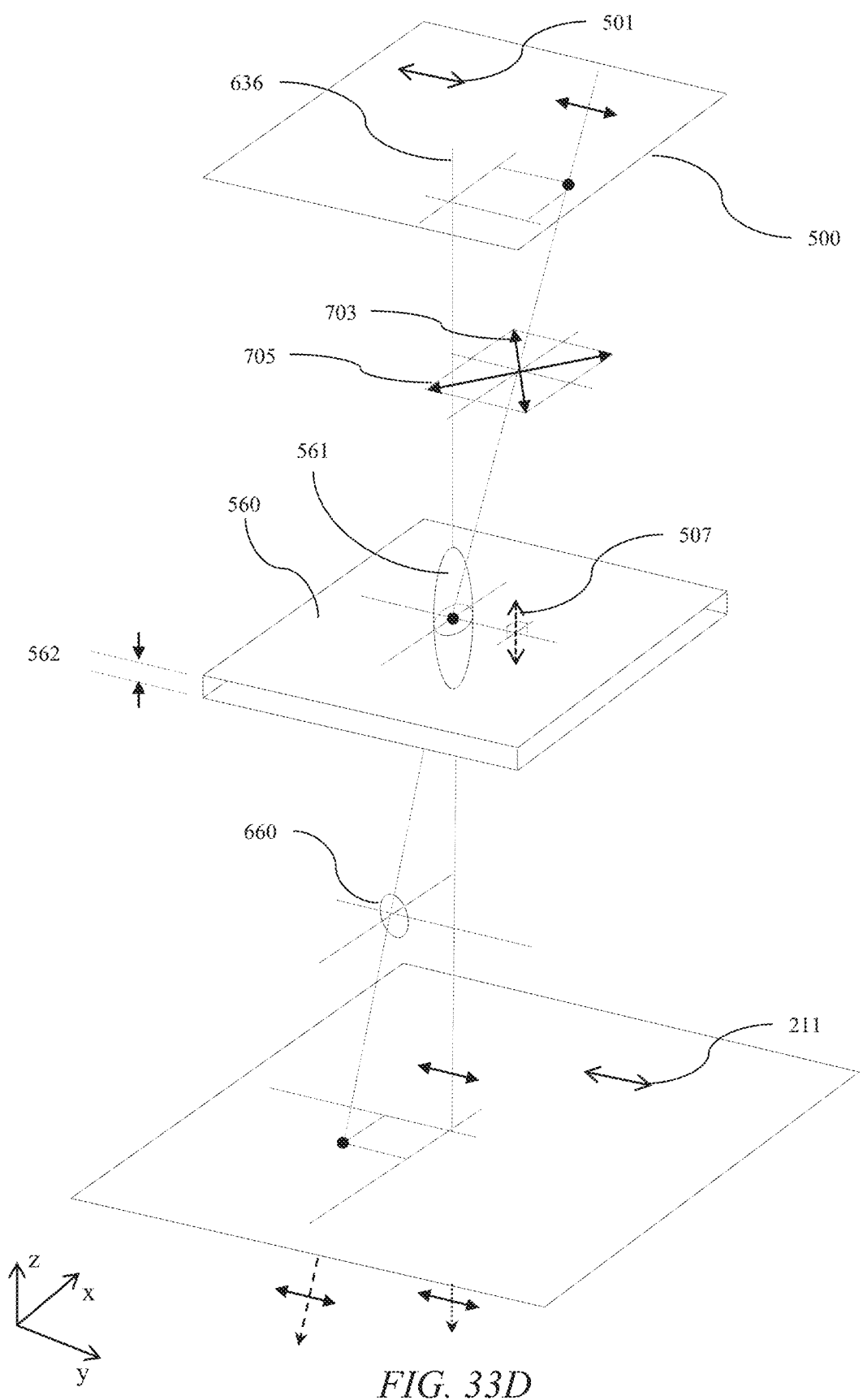
FIG. 33D is a schematic diagram illustrating in perspective view illumination of a C-plate retarder by off-axis polarised light with a positive elevation and positive lateral angle.

FIG. 33D is a schematic diagram illustrating in perspective view illumination of a C-plate layer by off-axis polarised light with a positive elevation and positive lateral angle. In a similar manner to FIG. 33C, the polarisation component 704 is resolved into eigenstates 703, 705 that undergo a net phase difference, and elliptical polarisation component 660 is provided, which after transmission through the polariser reduces the luminance of the respective off-axis ray. Thus, the retarder 560 introduces a phase shift to polarisation components of light passed by the polariser on the input side of the retarder 560 along an axis that is inclined to a normal to the plane of the retarder 560. Although FIG. 29BD relates to the retarder 560 that is passive, a similar effect is achieved by the retarders described above, in a switchable state of the switchable liquid crystal retarder corresponding to the privacy mode.

Figure 34:
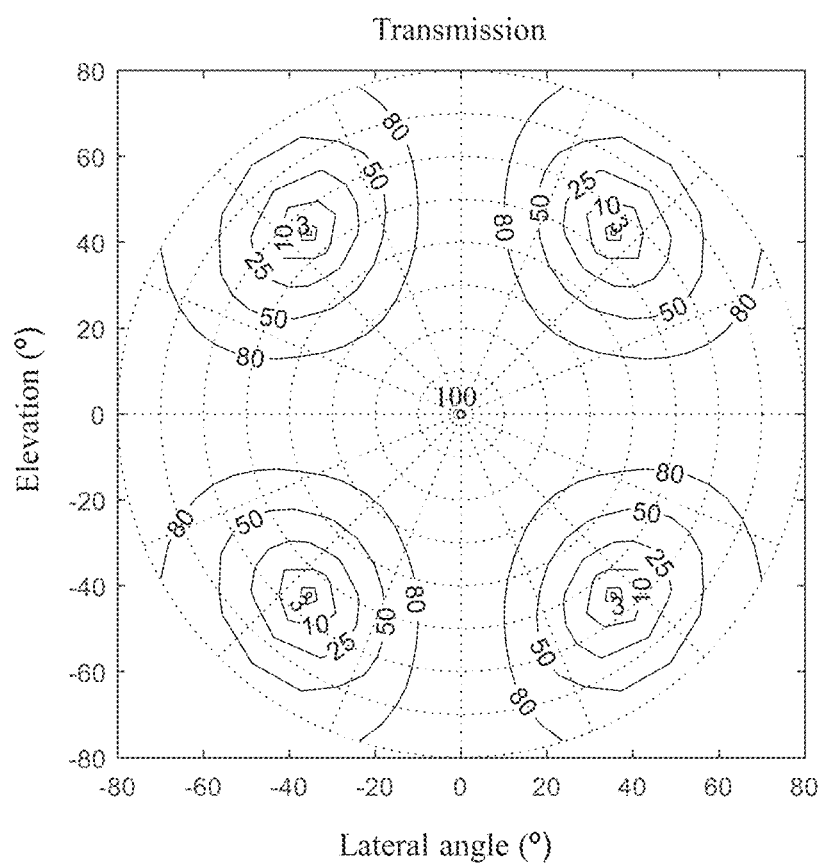
FIG. 34 is a schematic graph illustrating the variation of output transmission with polar direction for transmitted light rays in FIGS. 33A-D.

FIG. 34 is a schematic graph illustrating the variation of output transmission with polar direction for transmitted light rays in FIGS. 33A-D. Thus, the C-plate may provide luminance reduction in polar quadrants. In combination with switchable liquid crystal retarder layer 314 described elsewhere herein, (i) removal of luminance reduction of the C-plate may be provided in a first wide-angle state of operation (ii) extended polar region for luminance reduction may be achieved in a second privacy state of operation.

To illustrate the off-axis behaviour of retarder stacks, the angular luminance control of crossed A-plates 308A, 308B between an additional polariser 318 and output display polariser 218 will now be described for various off-axis illumination arrangements.

Figure 35A:
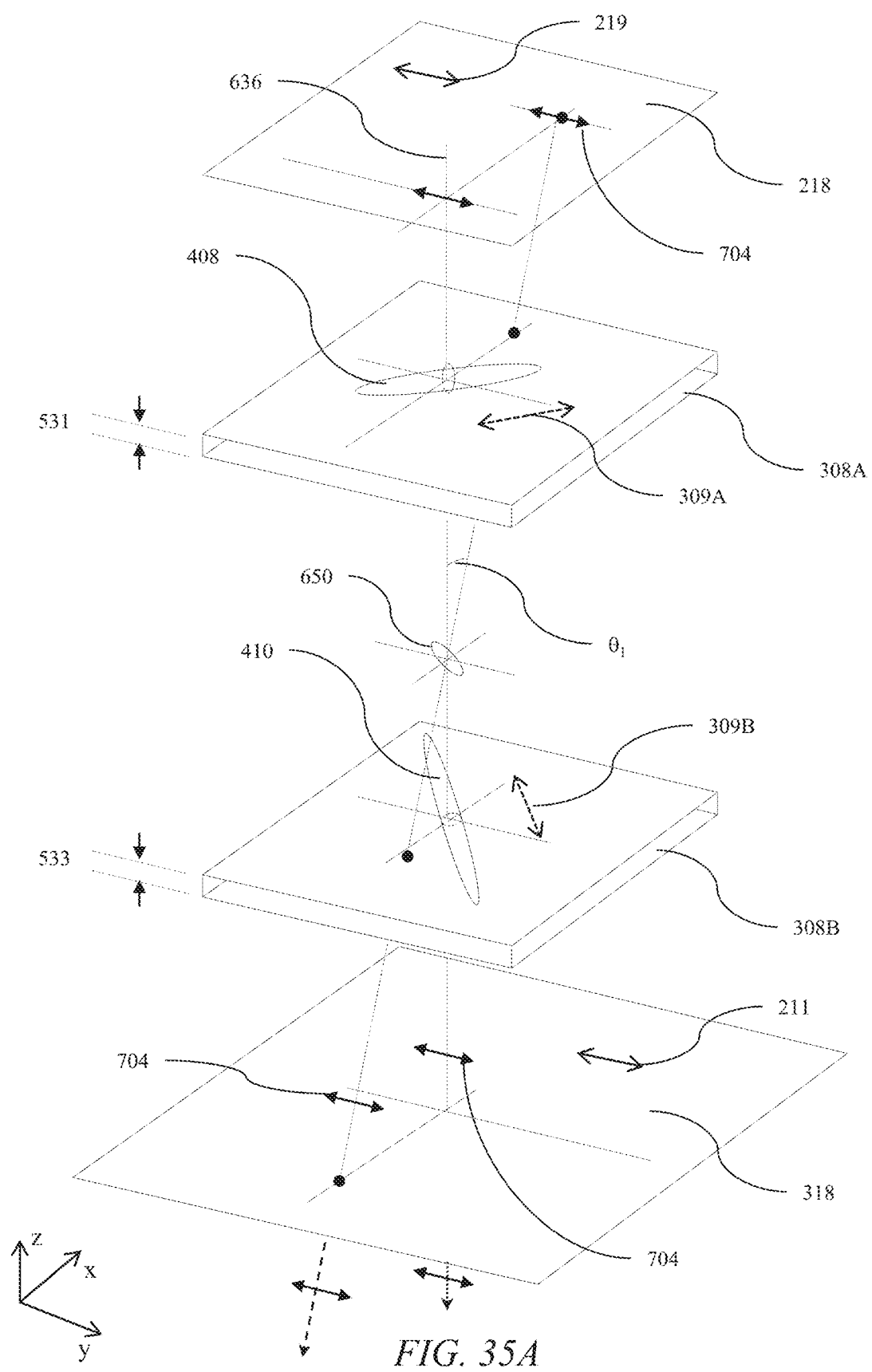
FIG. 35A is a schematic diagram illustrating in perspective view illumination of crossed A-plate retarder layers by off-axis polarised light with a positive elevation.

FIG. 35A is a schematic diagram illustrating in perspective view illumination of crossed A-plate retarder layers by off-axis polarised light with a positive elevation. Linear polariser 218 with electric vector transmission direction 219 is used to provide a linear polarisation state 704 that is parallel to the lateral direction onto first A-plate 308A of the crossed A-plates 308A, 308B. The optical axis direction 309A is inclined at +45 degrees to the lateral direction. The retardance of the retarder 308A for the off-axis angle $\theta_1$ in the positive elevation direction provides a resultant polarisation component 650 that is generally elliptical on output. Polarisation component 650 is incident onto the second A-plate 308B of the crossed A-plates 308A, 308B that has an optical axis direction 309B that is orthogonal to the optical axis direction 309A of the first A-plate 308A. In the plane of incidence of FIG. 35A, the retardance of the second A-plate 308B for the off-axis angle $\theta_1$ is equal and opposite to the retardance of the first A-plate 308A. Thus a net zero retardation is provided for the incident polarisation component 704 and the output polarisation component is the same as the input polarisation component 704.

The output polarisation component is aligned to the electric vector transmission direction of the additional polariser 318, and thus is transmitted efficiently. Advantageously substantially no losses are provided for light rays that have zero lateral angle angular component so that full transmission efficiency is achieved.

Figure 35B:
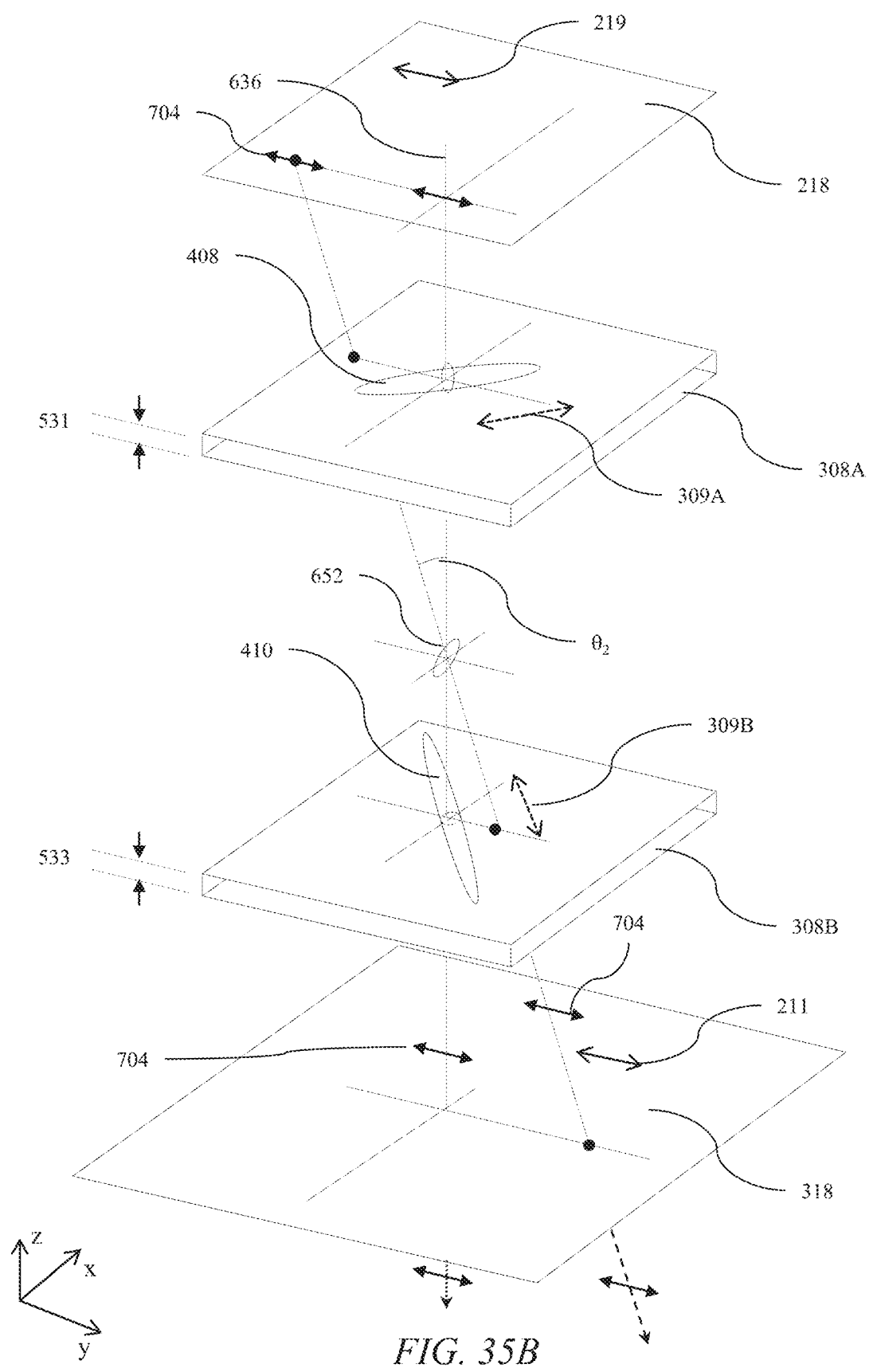
FIG. 35B is a schematic diagram illustrating in perspective view illumination of crossed A-plate retarder layers by off-axis polarised light with a negative lateral angle.

FIG. 35B is a schematic diagram illustrating in perspective view illumination of crossed A-plate retarder layers by off-axis polarised light with a negative lateral angle. Thus input polarisation component is converted by the first A-plate 308A to an intermediate polarisation component 652 that is generally an elliptical polarisation state. The second A-plate 308B again provides an equal and opposite retardation to the first A-plate so that the output polarisation component is the same as the input polarisation component 704 and light is efficiently transmitted through the polariser 318.

Thus the retarder comprises a pair of retarders 308A, 308B which have optical axes in the plane of the retarders 308A, 308B that are crossed, that is the x-y plane in the present embodiments. The pair of retarders 308A, 308B have optical axes 309A, 309B that each extend at 45° with respect to an electric vector transmission direction that is parallel to the electric vector transmission of the polariser 318.

Advantageously substantially no losses are provided for light rays that have zero elevation angular component so that full transmission efficiency is achieved.

Figure 35C:
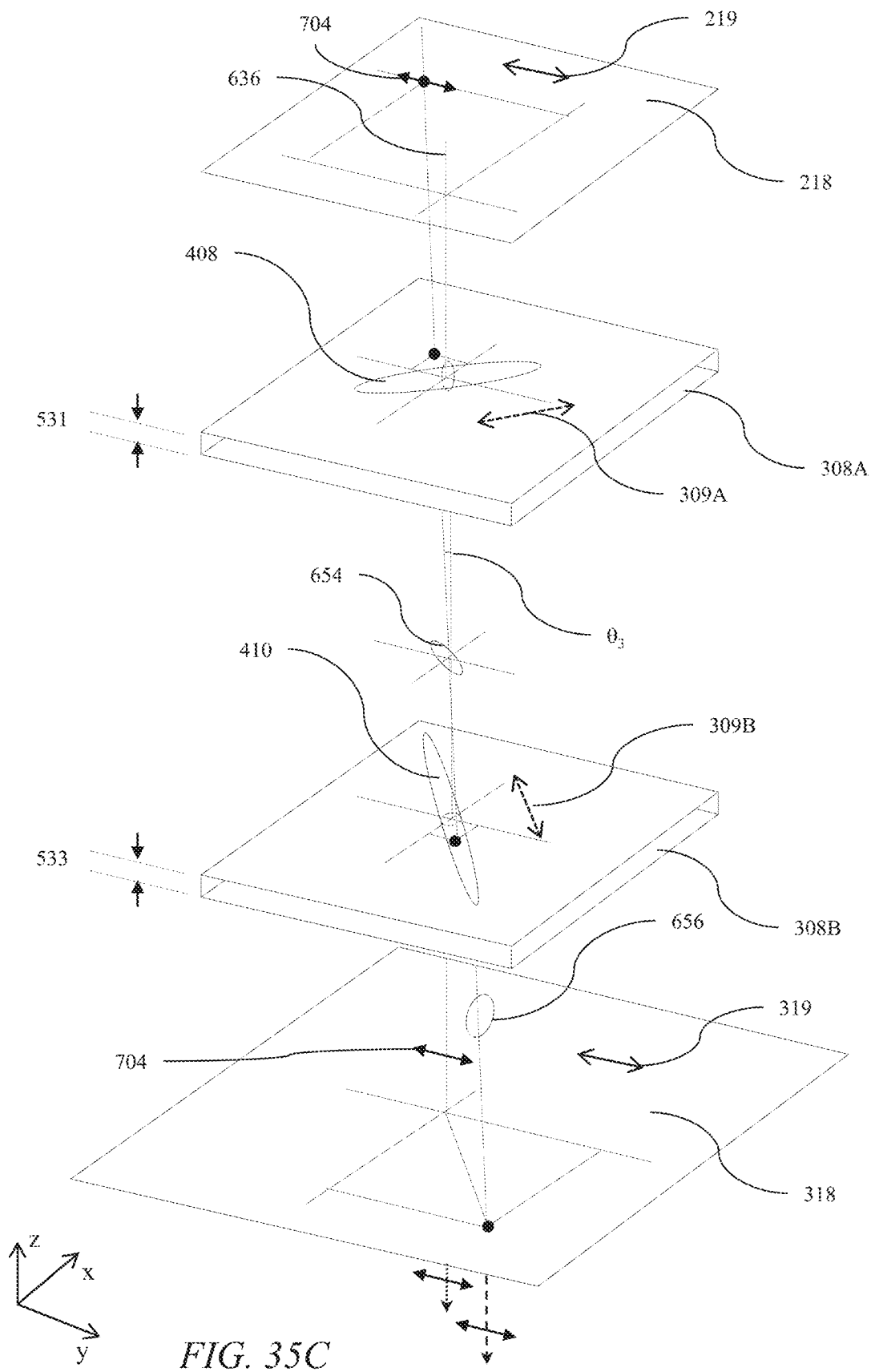
FIG. 35C is a schematic diagram illustrating in perspective view illumination of crossed A-plate retarder layers by off-axis polarised light with a positive elevation and negative lateral angle.

FIG. 35C is a schematic diagram illustrating in perspective view illumination of crossed A-plate retarder layers by off-axis polarised light with a positive elevation and negative lateral angle. Polarisation component 704 is converted to an elliptical polarisation component 654 by first A-plate 308A. A resultant elliptical component 656 is output from the second A-plate 308B. Elliptical component 656 is analysed by input polariser 318 with reduced luminance in comparison to the input luminance of the first polarisation component 704.

Figure 35D:
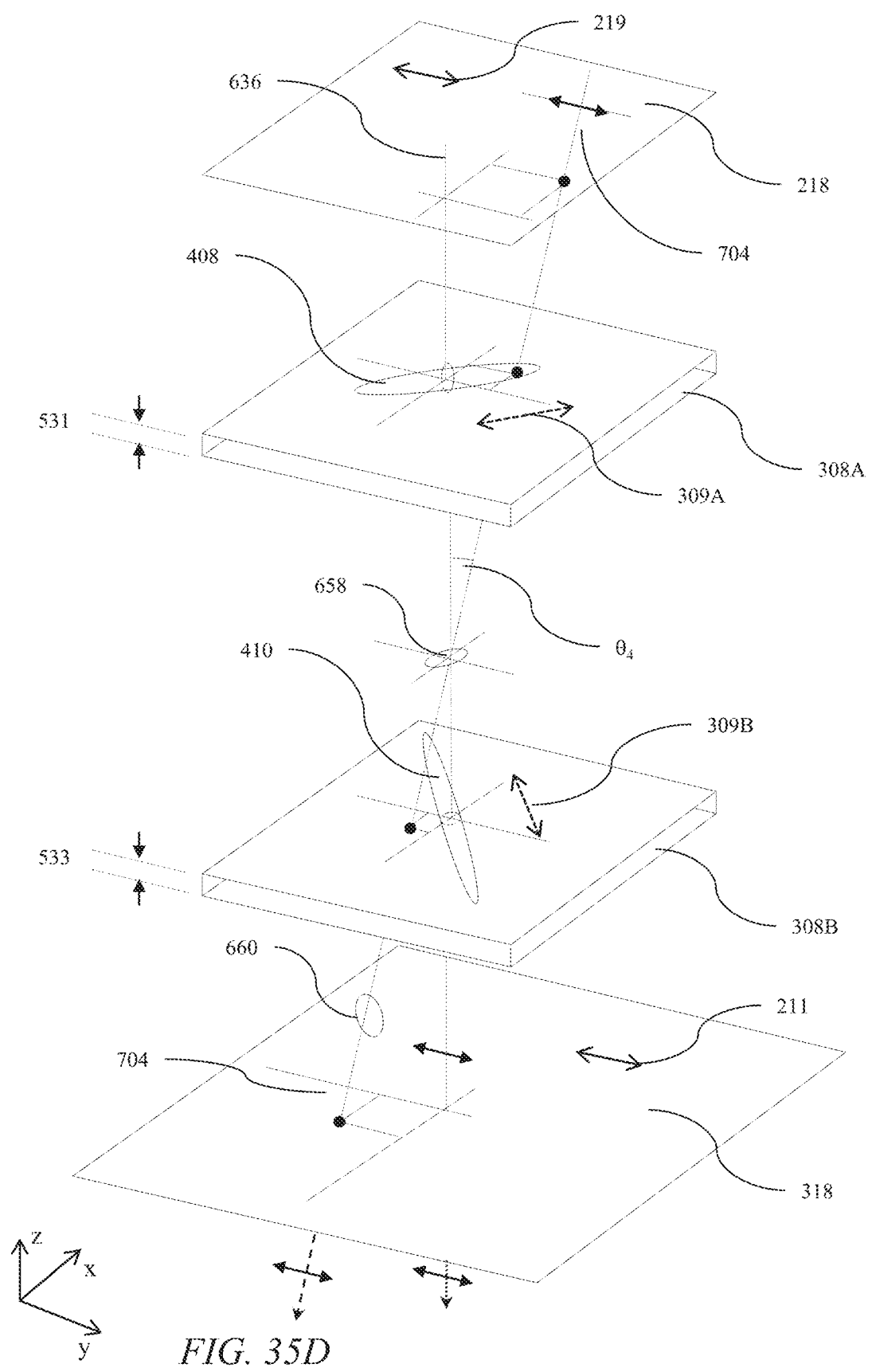
FIG. 35D is a schematic diagram illustrating in perspective view illumination of crossed A-plate retarder layers by off-axis polarised light with a positive elevation and positive lateral angle.

FIG. 35D is a schematic diagram illustrating in perspective view illumination of crossed A-plate retarder layers by off-axis polarised light with a positive elevation and positive lateral angle. Polarisation components 658 and 660 are provided by first and second A-plates 308A, 308B as net retardance of first and second retarders does not provide compensation.

Thus luminance is reduced for light rays that have non-zero lateral angle and non-zero elevation components. Advantageously display privacy can be increased for snoopers that are arranged in viewing quadrants while luminous efficiency for primary display users is not substantially reduced.

Figure 36:
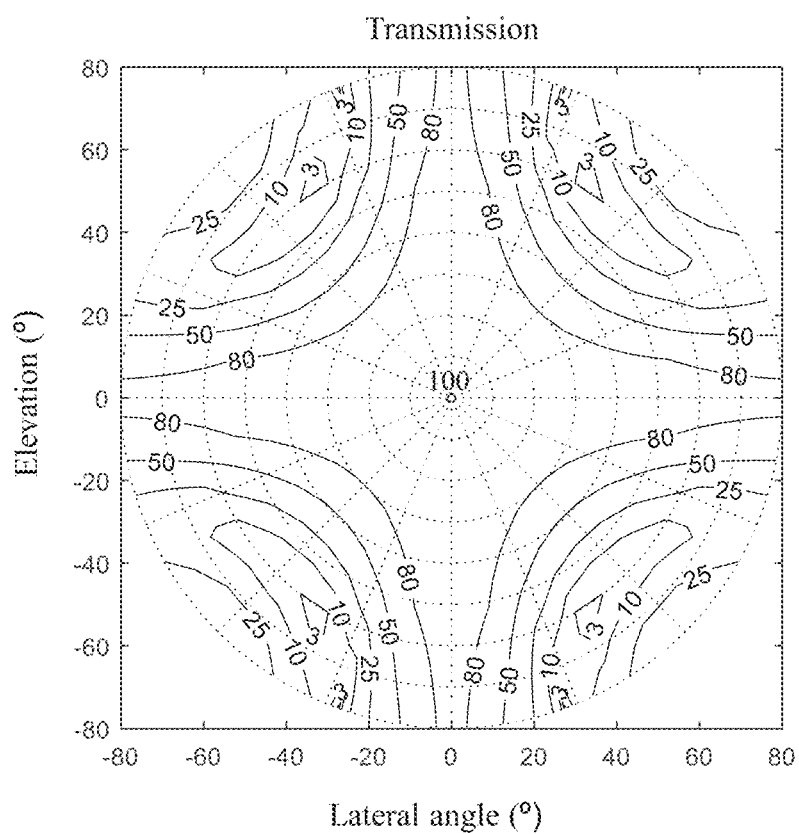
FIG. 36 is a schematic graph illustrating; the variation of output transmission with polar direction for transmitted light rays in FIGS. 35A-D.

FIG. 36 is a schematic graph illustrating the variation of output transmission with polar direction for transmitted light rays in FIGS. 35A-D. In comparison to the arrangement of FIG. 34, the area of luminance reduction is increased for off-axis viewing. However, the switchable liquid crystal retarder layer 301 may provide reduced uniformity in comparison to the C-plate arrangements for off-axis viewing in the first wide mode state of operation.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A display device comprising:
a spatial light modulator arranged to output light along an output direction;
a display polariser arranged on a side of the spatial light modulator;
an additional polariser arranged on the same side of the spatial light modulator as the display polariser, the display polariser and the additional polariser being arranged to pass respective linearly polarised polarisation components; and
first and second quarter-wave plates arranged between the additional polariser and the display polariser, the first quarter-wave plate being arranged on the input side of the second quarter-wave plate and being arranged to convert a linearly polarised polarisation state passed by the one of the display polariser and the additional polariser on the input side thereof into a circularly polarised polarisation state, and the second quarter-wave plate on the output side being arranged to convert a circularly polarised polarisation state that is incident thereon into a linearly polarised polarisation state that is passed by the other of the display polariser and the additional polariser on the output side thereof; and
at least one retarder arranged between the pair of quarter-wave plates, wherein the at least one retarder comprises a switchable liquid crystal retarder comprising a layer of liquid crystal material that has a twist and electrodes arranged to apply a voltage for switching the layer of liquid crystal material.

2. A display device according to claim 1, wherein the pair of quarter-wave plates each comprise a passive quarter-wave plate comprising a layer of aligned uniaxial birefringent material.

3. A display device according to claim 2, wherein the pair of quarter-wave plates have optical axes that are crossed.

4. A display device according to claim 2, wherein each of the pair of quarter-wave plates has an optical axis that is arranged at 45 degrees to the electric vector transmission direction of the adjacent display polariser or additional polariser.

5. A display device according to claim 2, wherein the pair of quarter-wave plates each have a retardance for light of a wavelength of 550 nm in a range from 110 nm to 175 nm.

6. A display device according to claim 1, wherein the liquid crystal retarder comprises two surface alignment layers disposed adjacent to the layer of liquid crystal material and on opposite sides thereof and each arranged to provide homogenous alignment in the adjacent liquid crystal material.

7. A display device according to claim 6, wherein each of the two surface alignment layers has an alignment direction that is arranged at 45 degrees to the electric vector transmission direction of at least one of the display polariser and additional polariser.

8. A display device according to claim 1, wherein the liquid crystal material has a positive dielectric anisotropy.

9. A display device according to claim 1, wherein the twist is (90+m*180) degrees, where m is zero or a positive integer.

10. A display device according to claim 1, wherein the twist is 90 degrees and the layer of liquid crystal material has a retardance for light of a wavelength of 550 nm in a range from 420 nm to 550 nm.

11. A display device according to claim 1, wherein the twist is 270 degrees and the layer of liquid crystal material has a retardance for light of a wavelength of 550 nm in a range from 650 nm to 800 nm.

12. A display device according to claim 1, wherein the twist is 360 degrees and the layer of liquid crystal material has a retardance for light of a wavelength of 550 nm in a range from 1100 nm to 1400 nm.

13. A display device according to claim 1, wherein the twist is 450 degrees and the layer of liquid crystal material has a retardance for light of a wavelength of 550 nm in a range from 820 nm to 1000 nm.

14. A display device according to claim 1, wherein the twist is 225 degrees and the layer of liquid crystal material has a retardance for light of a wavelength of 550 nm in a range from 750 nm to 1200 nm.

15. A display device according to claim 1, wherein the at least one retarder further comprises at least one passive retarder.

16. A display device according to claim 15, wherein the at least one passive retarder comprises a passive retarder having an optical axis perpendicular to the plane of the passive retarder.

17. A display device according to claim 1, wherein the display polariser and the additional polariser have electric vector transmission directions that are parallel.

18. A display device according to claim 1, wherein the at least one retarder comprises a retarder comprising an aligned uniaxial birefringent material.

19. A display device according to claim 1, wherein the at least one retarder is arranged to introduce a phase shift to polarisation components of light passed by the one of the display polariser and the additional polariser and the quarter-wave plate on the input side of the at least one retarder along an axis inclined to the optical axis of the retarder.

20. A display device according to claim 19, wherein the switchable liquid crystal retarder is arranged to introduce a phase shift to polarisation components of light passed by the one of the display polariser and the additional polariser and the quarter-wave plate on the input side of the at least one retarder along an axis inclined to the optical axis of the retarder in a switchable mode of the switchable liquid crystal retarder.

21. A display device according to claim 1, wherein the at least one retarder is arranged to introduce no phase shift to polarisation components of light passed by one of the display polariser and the additional polariser and the quarter-wave plate on the input side of the at least one retarder along an axis along the optical axis of the retarder.

22. A display device according to claim 1, wherein the display polariser is an output polariser arranged on the output side of the spatial light modulator, and the additional polariser is arranged on the output side the display polariser, whereby said one of the display polariser and the additional polariser on the input side thereof is the display polariser.

23. A display device according to claim 22, further comprising a reflective polariser arranged between the display polariser and the first quarter-wave plate, the display polariser and the reflective polariser being arranged to pass the same linearly polarised polarisation state.

24. A display device according to claim 22, further comprising:
a further additional polariser arranged on the output side of the first mentioned additional polariser, the further additional polariser being arranged to pass linearly polarised polarisation states; and
at least one further retarder arranged between the first mentioned additional polariser and the further additional polariser.

25. A display device according to claim 24, wherein
the additional polariser is a reflective polariser, and
the at least one further retarder comprises a switchable liquid crystal retarder comprising a layer of liquid crystal material and electrodes arranged to apply a voltage for switching the layer of liquid crystal material.

26. A display device according to claim 24, wherein the at least one retarder arranged between the pair of quarter-wave plates comprises at least one passive retarder having a retardance for light of a wavelength of 550 nm in a range from −100 nm to −400 nm or in a range from +200 nm to +600 nm.

27. A display device according to claim 1, wherein the display polariser is an input polariser arranged on the input side of the spatial light modulator, and the additional polariser is arranged on the input side the display polariser, whereby said one of the display polariser and the additional polariser on the input side thereof is the additional polariser.

28. A display device according to claim 27, further comprising:
an output polariser arranged on the output side of the spatial light modulator;
a further additional polariser arranged on the output side of the output polariser, the output polariser and the further additional polariser being arranged to pass respective linearly polarised polarisation states; and
at least one further retarder arranged between the output polariser and the further additional polariser.

29. A display device according to claim 28, wherein
the display device further comprises a reflective polariser arranged between the output polariser and the at least one further retarder, the output polariser and the reflective polariser being arranged to pass the same linearly polarised polarisation state, and
the at least one further retarder comprises a switchable liquid crystal retarder comprising a layer of liquid crystal material and electrodes arranged to apply a voltage for switching the layer of liquid crystal material.

30. A display device according to claim 28, wherein the at least one retarder arranged between the pair of quarter-wave plates comprises at least one passive retarder having a retardance for light of a wavelength of 550 nm in a range from −100 nm to −400 nm or in a range from +200 nm to +600 nm.

31. A display device according to claim 1, wherein the additional polariser when crossed with a second notional polariser of the same material has transmission for wavelengths from 520 nm to 560 nm that is less than the transmission for wavelengths from 450 nm to 490 nm.

32. A display device according to claim 31 wherein
the transmission for wavelengths from 450 nm to 490 nm is greater than 1%; and
the transmission for wavelengths from 520 nm to 560 nm is less than 3%.

* * * * *